US012809140B2

(12) United States Patent
Kawamura et al.

(10) Patent No.: US 12,809,140 B2
(45) Date of Patent: Nov. 24, 2026

(54) ZOOM LENS AND IMAGING APPARATUS

(71) Applicant: FUJIFILM Corporation, Tokyo (JP)

(72) Inventors: Daiki Kawamura, Saitama (JP); Hiroki Saito, Saitama (JP); Ryoko Tomioka, Saitama (JP); Daiki Komatsu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 289 days.

(21) Appl. No.: 18/781,991

(22) Filed: Jul. 23, 2024

(65) Prior Publication Data

US 2025/0035898 A1 Jan. 30, 2025

(30) Foreign Application Priority Data

Jul. 26, 2023 (JP) ................................ 2023-122003

(51) Int. Cl.
*G02B 15/14* (2006.01)
*G02B 13/00* (2006.01)

(52) U.S. Cl.
CPC ..... *G02B 15/1461* (2019.08); *G02B 13/0045* (2013.01); *G02B 13/009* (2013.01)

(58) Field of Classification Search
CPC ........... G02B 15/1461; G02B 13/0045; G02B 13/009; G02B 15/20; G02B 15/144105; G02B 15/144113; G02B 15/16
See application file for complete search history.

(56) References Cited

U.S. PATENT DOCUMENTS

2017/0261728 A1* 9/2017 Shibata .......... G02B 15/145113
2018/0267280 A1 9/2018 Shibata et al.
2018/0267281 A1 9/2018 Shibata et al.
2019/0170989 A1 6/2019 Shibata et al.
2020/0049963 A1 2/2020 Shibata et al.
2021/0096345 A1 4/2021 Shibata et al.
2023/0056627 A1 2/2023 Shibata et al.
2023/0367108 A1 11/2023 Shibata et al.

FOREIGN PATENT DOCUMENTS

JP 2021-043375 A 3/2021
WO 2016/031256 A1 3/2016

* cited by examiner

*Primary Examiner* — Charles S Chang
(74) *Attorney, Agent, or Firm* — Studebaker Brackett PLLC

(57) ABSTRACT

A zoom lens consists of, in order from an object side to an image side: an object side positive group which has a positive refractive power; an object side negative group which has a negative refractive power; an intermediate group; and a final group. The object side positive group, the object side negative group, the intermediate group, and the final group each include at least one lens group. All spacings between adjacent lens groups change, and all mutual spacings between lenses in each lens group do not change during zooming. All lenses in the object side positive group and all lenses in the intermediate group remain stationary with respect to an image plane during focusing. The zoom lens satisfies predetermined conditional expressions.

22 Claims, 58 Drawing Sheets

EXAMPLE 2

EXAMPLE 3

EXAMPLE 5

EXAMPLE 8

EXAMPLE 8

EXAMPLE 9

EXAMPLE 10

EXAMPLE 10

EXAMPLE 11

EXAMPLE 13

EXAMPLE 14

EXAMPLE 15

EXAMPLE 16

EXAMPLE 17

EXAMPLE 18

EXAMPLE 19

EXAMPLE 20

EXAMPLE 21

EXAMPLE 23

EXAMPLE 24

EXAMPLE 25

EXAMPLE 26

EXAMPLE 27

EXAMPLE 28

ZOOM LENS AND IMAGING APPARATUS

CROSS-REFERENCE TO RELATED APPLICATIONS

This application claims priority from Japanese Patent Application No. 2023-122003, filed on Jul. 26, 2023, the entire disclosure of which is incorporated herein by reference.

BACKGROUND

Technical Field

The technique of the present disclosure relates to a zoom lens and an imaging apparatus.

Related Art

In the related art, as a zoom lens that can be used in an imaging apparatus such as a digital camera, a zoom lens described in JP2021-043375A below is known.

SUMMARY

There is a demand for a zoom lens that has a small size and that maintains favorable optical performance by correcting various aberrations. The demand levels are increasing year by year.

The present disclosure has been made in view of the above-mentioned circumstances, and an object of the present disclosure is to provide a zoom lens that has a small size and that maintains favorable optical performance by correcting various aberrations and an imaging apparatus including the zoom lens.

A zoom lens according to one aspect of the present disclosure consists of, in order from an object side to an image side: an object side positive group which has a positive refractive power; an object side negative group which has a negative refractive power; an intermediate group; and a final group. The object side positive group, the object side negative group, the intermediate group, and the final group each include at least one lens group. All spacings between adjacent lens groups change, and all mutual spacings between lenses in each lens group do not change during zooming. All lenses in the object side positive group and all lenses in the intermediate group remain stationary with respect to an image plane during focusing. The zoom lens satisfies Conditional Expression (1), which is represented by $$0.2 < Bfw/(fw \times \tan\omega w) < 5. \qquad (1)$$

Here, it is assumed that a back focal length of the whole system in terms of an air-equivalent distance in a state where an infinite distance object is in focus at a wide-angle end is Bfw. It is assumed that a focal length of the whole system in a state where the infinite distance object is in focus at the wide-angle end is fw. It is assumed that a maximum half angle of view in a state where the infinite distance object is in focus at the wide-angle end is ωw.

It is preferable that the object side negative group includes a lens group, which is closest to the object side and which has a negative refractive power, among the lens groups which have negative refractive powers and which are included in the zoom lens.

It is preferable that the final group consists of one lens group.

It is preferable that the intermediate group includes at least three lenses.

Assuming that a paraxial curvature radius of an object side surface of a negative lens, which is closest to the object side, among the negative lenses, which are included in the object side negative group, is Rnf, and a paraxial curvature radius of an image side surface of the negative lens, which is closest to the object side, among the negative lenses, which are included in the object side negative group, is Rnr, it is preferable that the zoom lens of the above-mentioned aspect satisfies Conditional Expression (2), which is represented by $$0.02 < (Rnf - Rnr)/(Rnf + Rnr) < 3. \qquad (2)$$

A lens group, which is closest to the object side in the object side positive group, may be configured to move during zooming.

It is preferable that the zoom lens includes at least one focusing group that moves during focusing, and a focusing group, which is closest to the object side, among the focusing groups, which are included in the zoom lens, has a negative refractive power.

It is preferable that the object side negative group includes at least two negative lenses, an image side surface of a negative lens, which is closest to the object side, among the negative lenses, which are included in the object side negative group, is a concave surface, and an object side surface of a negative lens, which is closest to the image side, among the negative lenses, which are included in the object side negative group, is a concave surface.

It is preferable that the intermediate group includes at least one lens group which has a positive refractive power, and a lens group, which is closest to the object side and which has a positive refractive power, among lens groups, which are included in the intermediate group and which have positive refractive powers, includes at least two positive lenses. In such a configuration, it is preferable that the zoom lens of the above-mentioned aspect satisfies Conditional Expression (3), which is represented by $$20 < (\nu MP1 + \nu MP2)/2 < 100. \qquad (3)$$

Here, it is assumed that an Abbe number of a positive lens, which is closest to the object side, among positive lenses, which are included in the intermediate group, based on a d-line is νMp1. It is assumed that an Abbe number of a positive lens, which is second from the object side, among the positive lenses, which are included in the intermediate group, based on the d-line is νMp2.

It is preferable that the intermediate group includes at least two lens groups in which a spacing between adjacent lens groups changes during zooming.

It is preferable that the intermediate group includes at least one lens group which has a positive refractive power, and a lens group, which is closest to the object side and which has a positive refractive power, among lens groups, which have positive refractive powers and which are included in the intermediate group, includes two positive lenses, successively in order from a position closest to the object side to the image side.

It is preferable that the intermediate group includes at least one lens group which has a positive refractive power, and a lens group, which is closest to the object side and which has a positive refractive power, among lens groups, which are included in the intermediate group and which have positive refractive powers, includes at least two positive lenses. In such a configuration, it is preferable that an object side surface of a positive lens, which is closest to the object side, among the positive lenses, which are included in the lens group that is closest to the object side and that has a positive refractive power in the intermediate group, is a convex surface.

It is preferable that the object side negative group includes at least four lenses.

Assuming that an open F number in a state where the infinite distance object is in focus at the wide-angle end is Fnow, it is preferable that the zoom lens of the above-mentioned aspect satisfies Conditional Expression (4), which is represented by $$2 < Fnow < 4.8. \tag{4}$$

A lens group closest to the image side among lens groups that are included in the intermediate group may be configured to have a positive refractive power.

Assuming that a focal length of the object side positive group at the wide-angle end is fGPw, it is preferable that the zoom lens of the above-mentioned aspect satisfies Conditional Expression (5), which is represented by $$0.05 < fw/fGPw < 2.5. \tag{5}$$

Assuming that a focal length of the whole system in a state where the infinite distance object is in focus at a telephoto end is ft, and a focal length of the object side positive group at the wide-angle end is fGPw, it is preferable that the zoom lens of the above-mentioned aspect satisfies Conditional Expression (6), which is represented by $$0.4 < ft/fGPw < 4.5. \tag{6}$$

It is preferable that the object side negative group includes a lens group in which a biconvex air lens is formed.

The object side negative group may be configured to include a lens group which has a negative refractive power, and the entirety or a part of the lens group which has a negative refractive power in the object side negative group may be configured to move along an optical axis during focusing.

The entirety or a part of the final group may be configured to move along the optical axis during focusing.

The lens group closest to the image side in the final group may be configured to move during zooming.

The imaging apparatus according to another aspect of the present disclosure comprises the zoom lens according to the above-mentioned aspect of the present disclosure.

In the present specification, it should be noted that the terms "consisting of" and "consists of" mean that the lens may include not only the above-mentioned constituent elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

In the present specification, the terms "group that has a positive refractive power" and "group that has a positive refractive power" mean that the group as a whole has a positive refractive power. Similarly, the terms "group which has a negative refractive power" and "group has a negative refractive power" mean that the group as a whole has a negative refractive power. The terms "~ lens group", "focusing group", and "vibration-proof group" in the present specification are not limited to a configuration consisting of a plurality of lenses, but may be a configuration consisting of only one lens.

A compound aspherical lens (in which a lens (for example, a spherical lens) and an aspherical film formed on the lens are integrally formed and function as one aspherical lens as a whole) is not regarded as cemented lenses, but the compound aspherical lens is regarded as one lens. The curvature radius, the sign of the refractive power, and the surface shape of the lens including the aspherical surface will be used in terms of the paraxial region unless otherwise specified. The sign of the curvature radius of the convex surface facing toward the object side is positive, and the sign of the curvature radius of the convex surface facing toward the image side is negative.

In the present specification, the term "whole system" means "zoom lens". The term "back focal length in terms of the air-equivalent distance" means the air-equivalent distance on the optical axis from the lens surface closest to the image side in the whole system to the image plane. The term "focal length" used in a conditional expression means a paraxial focal length. Unless otherwise specified, the term "distance on the optical axis" used in Conditional Expression means a geometrical distance. The values used in the conditional expressions are values in a case where the d-line is used as a reference in a state where the infinite distance object is in focus unless otherwise specified.

According to the present disclosure, it is possible to provide a zoom lens that has a small size and that maintains favorable optical performance by correcting various aberrations, and an imaging apparatus comprising the zoom lens.

DESCRIPTION OF EMBODIMENTS

Hereinafter, embodiments of the present disclosure will be described with reference to the accompanying drawings.

Figure 1:
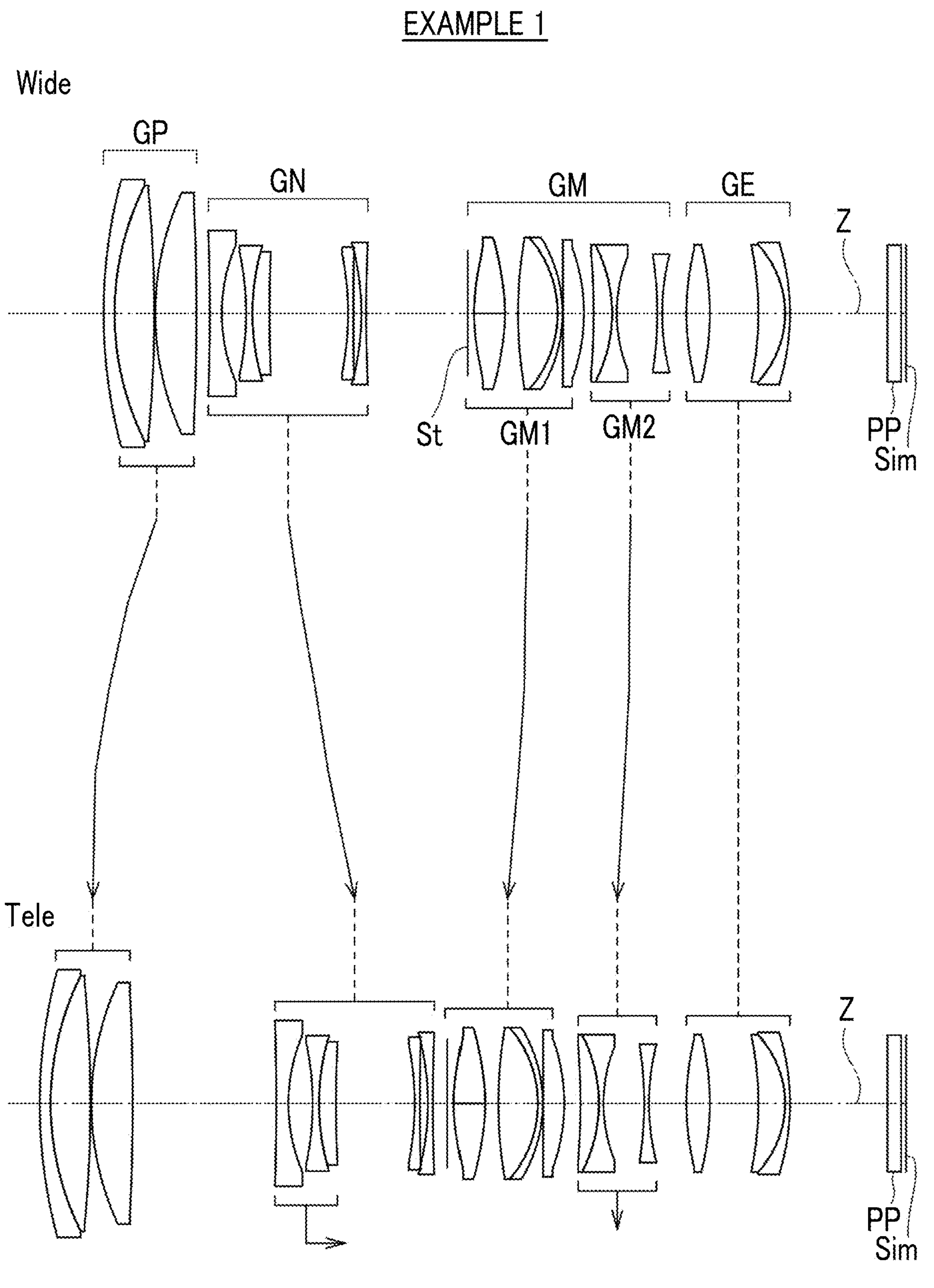
FIG. 1 is a cross-sectional view showing a configuration of a zoom lens according to an embodiment and a diagram showing movement loci thereof, the zoom lens corresponding to a zoom lens of Example 1.
Figure 2:
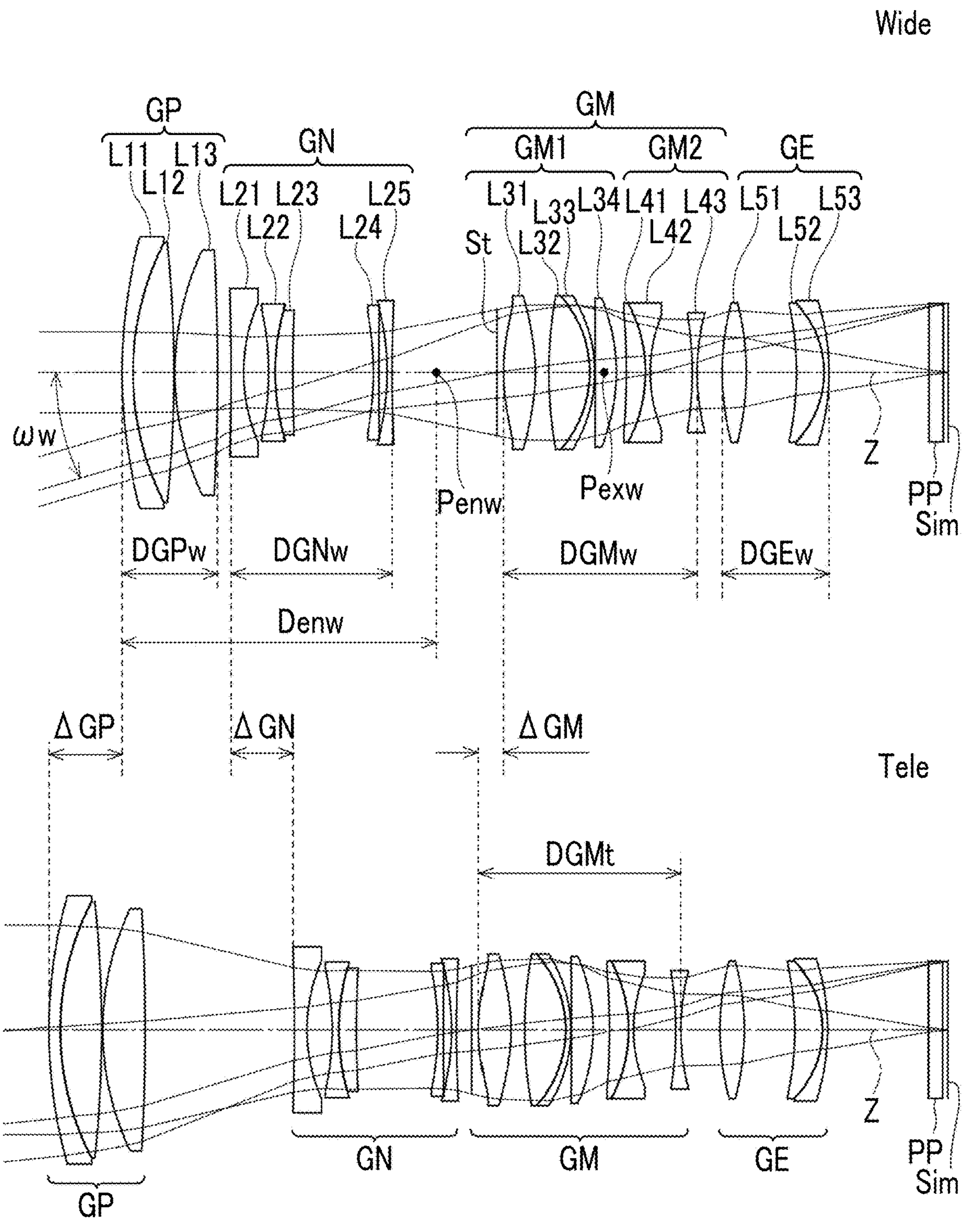
FIG. 2 is a diagram showing a configuration and luminous flux in each zooming state of the zoom lens of FIG. 1, and is a diagram for explaining symbols of conditional expressions.

FIG. 1 shows a cross-sectional view and a movement locus of a configuration of a zoom lens according to an embodiment of the present disclosure. Further, FIG. 2 shows a diagram in which the luminous flux is shown together with a cross-sectional view of the configuration of the zoom lens of FIG. 1. FIG. 2 shows, as the luminous flux, the on-axis luminous flux and the luminous flux at the maximum half angle of view in each state. In FIGS. 1 and 2, the upper part labeled "Wide" shows a wide-angle end state, and the lower part labeled "Tele" shows a telephoto end state. Examples shown in FIGS. 1 and 2 correspond to a zoom lens of Example 1 to be described later. FIGS. 1 and 2 show situations where an infinite distance object is in focus, the left side thereof is an object side, and the right side thereof is an image side. Hereinafter, description will be given mainly with reference to FIG. 1 and will be given with reference to FIG. 2 as necessary.

FIG. 1 shows an example in which, assuming that a zoom lens is applied to an imaging apparatus, an optical member PP having a parallel plate shape is disposed between the zoom lens and an image plane Sim. The optical member PP is a member assumed to include various filters, a cover glass, and/or the like. The various filters include a low pass filter, an infrared cut filter, and/or a filter that cuts a specific wavelength region. The optical member PP is a member that has no refractive power. It is also possible to configure the imaging apparatus by removing the optical member PP.

The zoom lens of the present disclosure consists of an object side positive group GP, an object side negative group GN, an intermediate group GM, and a final group GE in order from the object side to the image side along the optical axis Z. The object side positive group GP has a positive refractive power. The object side negative group GN has a negative refractive power. With such a configuration, there is an advantage in suppressing various aberrations throughout the entire zoom range.

The object side positive group GP, the object side negative group GN, the intermediate group GM, and the final group GE each include at least one lens group. All spacings between adjacent lens groups change, and all mutual spacings between lenses in each lens group do not change during zooming. By allowing each of the object side positive group GP, the object side negative group GN, the intermediate group GM, and the final group GE to include at least one or more lens group, there is an advantage in suppressing fluctuation in aberrations during zooming.

In the present specification, a group, in which a spacing between the group and the adjacent group changes in the optical axis direction during zooming, is set as one lens group. During zooming, spacing between adjacent lenses does not change inside one lens group. The term "lens group" in the present specification means a part including the at least one lens, which is a constituent part of the zoom lens and is divided by an air spacing that changes during zooming. During zooming, each lens group as a unit moves or remains stationary. It should be noted that the "lens group" may include a constituent element other than a lens having no refractive power such as the aperture stop St.

For example, each group of the zoom lens shown in FIG. 2 is configured as follows. The object side positive group GP consists of one lens group. The lens group, which constitutes the object side positive group GP, consists of three lenses L11 to L13, in order from the object side to the image side. The object side negative group GN consists of one lens group. The lens group, which constitutes the object side negative group GN, consists of five lenses L21 to L25, in order from the object side to the image side. The intermediate group GM consists of two lens groups including the first M lens group GM1 and the second M lens group GM2, in order from the object side to the image side. The first M lens group GM1 consists of four lenses L31 to L34 and an aperture stop St, in order from the object side to the image side. The second M lens group GM2 consists of three lenses L41 to L43, in order from the object side to the image side. The final group GE consists of one lens group. The lens group, which forms the final group GE, consists of three lenses L51 to L53, in order from the object side to the image side. The aperture stop St shown in FIGS. 1 and 2 does not show the size or the shape, but shows a position thereof in the optical axis direction.

In the example of FIG. 1, during zooming, the object side positive group GP, the object side negative group GN, the first M lens group GM1, and the second M lens group GM2 move along the optical axis Z by changing spacings between the adjacent lens groups, and the final group GE remains stationary with respect to the image plane Sim. In FIG. 1, between the Wide diagram and the Tele diagram, an arrow of a solid line indicates a schematic movement locus during zooming from the wide-angle end to the telephoto end, for each lens group that moves during zooming, and a linear dotted line in the vertical direction is shown for the lens group that remains stationary during zooming.

The object side positive group GP may be configured to consist of one lens group. In such a case, there is an advantage in achieving reduction in size thereof.

It is preferable that the number of lenses, which are included in the object side positive group GP, is equal to or less than 3. The object side positive group GP is a lens group on the object side, and has a large lens outer diameter. Therefore, by adopting a configuration of three or fewer lenses, there is an advantage in achieving reduction in weight.

It is preferable that a lens group, which is closest to the object side in the object side positive group, GP moves during zooming. By adopting a configuration in which the lens group closest to the object side in the zoom lens moves during zooming, there is an advantage in suppressing various aberrations during zooming.

It is preferable that the object side negative group GN includes a lens group, which is closest to the object side and which has a negative refractive power, among the lens groups which have negative refractive powers and which are included in the zoom lens. That is, it is preferable that all the lens groups that are included in the object side positive group GP are lens groups that have positive refractive powers. By adopting such a configuration of the object side positive group GP which is the group closest to the object side, there is an advantage in achieving reduction in size thereof.

It is preferable that the object side negative group GN includes at least four lenses. In such a case, there is an advantage in achieving high performance.

It is preferable that the object side negative group GN includes at least two negative lenses. In such a case, it is preferable that an image side surface of a negative lens, which is closest to the object side, among the negative lenses, which are included in the object side negative group GN, is a concave surface, and an object side surface of a negative lens, which is closest to the image side, among the negative lenses, which are included in the object side negative group GN, is a concave surface. In such a case, there is an advantage in correcting field curvature.

It is preferable that the object side negative group GN includes a lens group in which a biconvex air lens is formed.

In such a case, there is an advantage in suppressing field curvature. In the present specification, the air spacing interposed between two lens surfaces facing toward each other is regarded as a lens having a refractive index of 1, and the air spacing is referred to as an air lens. In the example of FIG. 2, a biconvex air lens is formed of an image side surface of the lens L21 and an object side surface of the lens L22, a biconvex air lens is formed of an image side surface of the lens L23 and an object side surface of the lens L24, and a biconvex air lens is formed of an image side surface of the lens L24 and an object side surface of the lens L25.

In the present specification, it is assumed that a lens group, which is closest to the object side and which has a negative refractive power, among the lens groups, which have negative refractive powers and which are included in the zoom lens, is a first negative lens group. For example, in the example of FIG. 1, the object side negative group GN is the first negative lens group. It is preferable that a lens group, which is closest to the object side and which has a positive refractive power, among lens groups, which are closer to the image side than the first negative lens group and which have positive refractive powers, is disposed closest to the object side in the intermediate group GM. In such a case, there is an advantage in achieving reduction in size of the intermediate group GM.

It is preferable that the intermediate group GM includes at least three lenses. In such a case, there is an advantage in suppressing various aberrations during zooming. In order to suppress various aberrations which occur during zooming, it is more preferable that the intermediate group GM includes at least four lenses and it is still more preferable that the intermediate group GM includes at least five lenses.

It is preferable that the intermediate group GM includes at least two lens groups in which a spacing between adjacent lens groups changes during zooming. In such a case, it is easy to suppress fluctuation in aberrations during zooming.

It is preferable that the intermediate group GM includes at least one lens group which has a positive refractive power. In the present specification, it is assumed that a lens group, which is closest to the object side and which has a positive refractive power, among the lens groups, which are included in the intermediate group GM and which have positive refractive powers, is a first intermediate positive lens group. For example, in the example of FIG. 1, the first M lens group GM1 is the first intermediate positive lens group. It is preferable that the first intermediate positive lens group includes at least two positive lenses. In such a case, the positive refractive powers of the first intermediate positive lens group can be shared by two or more positive lenses. Thus, there is an advantage in suppressing various aberrations. It is preferable that the first intermediate positive lens group includes two positive lenses, successively in order from a position closest to the object side to the image side. In such a case, there is an advantage in correcting various aberrations, particularly, spherical aberration. In a configuration in which the first intermediate positive lens group includes at least two positive lenses, it is preferable that an object side surface of a positive lens, which is closest to the object side, among the positive lenses, which are included in the first intermediate positive lens group, is a convex surface. In such a case, there is an advantage in correcting spherical aberration.

A lens group closest to the image side among lens groups that are included in the intermediate group GM may be configured to have a positive refractive power. By disposing the lens group, which has a positive refractive power, at a position closer to the object side than the final group GE, there is an advantage in achieving reduction in lens outer diameter of the final group GE. In particular, by disposing the lens group, which has a positive refractive power, at a position adjacent to the object side of the final group GE, there is further an advantage in achieving reduction in lens outer diameter of the final group GE.

It is preferable that the final group GE consists of one lens group. In such a case, it is easy to reduce the total length of the optical system.

It is preferable that the final group GE remains stationary with respect to the image plane Sim during zooming. During zooming, by causing the final group GE to remain stationary, it is easy to prevent the entry of dust or the like into the zoom lens.

In the example of FIG. 1, the aperture stop St is included in the intermediate group GM. By disposing the aperture stop St in the intermediate group GM having a relatively small lens outer diameter, it is possible to achieve reduction in size of the stop unit. Therefore, it is easy to achieve reduction in size of the entire lens device.

It is preferable that the zoom lens of the present disclosure includes at least one focusing group that moves during focusing. Hereinafter, the group that moves along the optical axis Z during focusing is referred to as the focusing group. Focusing is performed by moving the focusing group. For example, in the example of FIG. 1, the focusing group consists of three lenses L21 to L23 of the object side negative group GN. In FIG. 1, an arrow in a horizontal direction indicating a direction in which the lens moves during focusing from the infinite distance object to the closest object is noted in parentheses below the lens corresponding to the focusing group in the lower part of the drawing. The focusing group functions throughout the entire zoom range including the wide-angle end state, but in FIG. 1, the arrows are noted only in the lower part of the drawing in order to avoid complication of the drawing.

In a case where the object side negative group GN includes a lens group which has a negative refractive power, the entirety or a part of the lens group which has a negative refractive power of the object side negative group GN may be configured to move along the optical axis Z during focusing. The lens group of the object side negative group GN has a relatively small lens outer diameter. By setting the entire lens group or a part of the lens group, in which the lens outer diameter is small, as the focusing group, it is easy to achieve reduction in diameter of the whole zoom lens.

In the zoom lens of the present disclosure, all the lenses in the object side positive group GP remain stationary with respect to the image plane Sim during focusing. By forming another group as the focusing group instead of the object side positive group GP having a large lens outer diameter, it is possible to reduce the outer diameter of the focusing group. Therefore, it is easy to achieve reduction in weight of the focusing group. As a result, the load on the drive mechanism can be reduced.

Further, in the zoom lens of the present disclosure, all the lenses in the intermediate group GM are configured to remain stationary with respect to the image plane Sim during focusing. By forming another group as the focusing group instead of the intermediate group GM in which the diameter of the on-axis luminous flux is large, there is an advantage in suppressing fluctuation in spherical aberration during focusing.

The zoom lens of the example shown in FIG. 1 includes only one focusing group, but the zoom lens of the present disclosure may be configured to include a plurality of focusing groups. Hereinafter, in the zoom lens, the focusing group, which is closest to the object side, among the focusing groups, which are included in the zoom lens, is referred to as a first focusing group. For example, in the example of FIG. 1, the first focusing group consists of the lenses L21 to L23. It is preferable that the first focusing group has a negative refractive power. In such a case, there is an advantage in achieving reduction in amount of movement during focusing.

It is preferable that the first focusing group includes a negative lens that has a concave surface facing in a direction of moving during focusing from the infinite distance object to a close-range object. Such a case is advantageous for suppressing fluctuation in field curvature in a case where the close-range object is in focus. For example, the first focusing group in the example of FIG. 1 moves toward the image side during focusing from the infinite distance object to the close-range object. The lenses L21 and L22 in the example of FIG. 1 are both negative lenses that are concave toward the image side.

It is preferable that the zoom lens of the present disclosure includes a vibration-proof group that moves during image blur correction. Hereinafter, the group, which moves in the direction intersecting with the optical axis Z during the image blur correction, will be referred to as the vibration-proof group. The image blur correction is performed by moving the vibration-proof group. For example, in the example of FIG. 1, the vibration-proof group consists of a second M lens group GM2. In FIG. 1, an arrow, which indicates the downward direction, is noted together with a parenthesis below the lens corresponding to the vibration-proof group in the lower part of the diagram. The vibration-proof group functions throughout the entire zoom range including the wide-angle end state, but in FIG. 1, the arrows are noted only in the lower part to avoid complication of the figure.

The vibration-proof group may be configured to be disposed closer to the image side than the focusing group. By using, as the vibration-proof group, a lens that is positioned closer to the image side than the focusing group and that has a relatively small lens outer diameter, it is also possible to achieve reduction in size of the vibration-proof mechanism. Therefore, it is easy to achieve reduction in size of the entire lens device.

The vibration-proof group may be configured to be included in the intermediate group GM. By disposing the vibration-proof group in the intermediate group GM having a relatively small lens outer diameter, it is also possible to achieve reduction in size of the vibration-proof mechanism. Therefore, it is easy to achieve reduction in size of the entire lens device.

The vibration-proof group may be configured to include at least one positive lens and at least one negative lens. In such a case, there is an advantage in reducing color bleeding during image blur correction.

Next, preferable and possible configurations about the conditional expressions of the zoom lens of the present disclosure will be described. In the following description of conditional expressions, in order to avoid redundant descriptions, the same symbols are used for those having the same definition, and some duplicate descriptions of the symbols will not be repeated. Further, in the following description, the term “zoom lens according to the embodiment of the present disclosure” is also simply referred to as a “zoom lens” in order to avoid redundant description.

It is preferable that the zoom lens satisfies Conditional Expression (1). Here, it is assumed that a back focal length of the whole system in terms of an air-equivalent distance in a state where an infinite distance object is in focus at a wide-angle end is Bfw. It is assumed that a focal length of the whole system in a state where the infinite distance object is in focus at the wide-angle end is fw. It is assumed that a maximum half angle of view in a state where the infinite distance object is in focus at the wide-angle end is ωw. For example, FIG. 2 shows the maximum half angle of view ωw. By not allowing the corresponding value of Conditional Expression (1) to be equal to or less than the lower limit value thereof, there is an advantage in ensuring an amount of peripheral light. By not allowing the corresponding value of Conditional Expression (1) to be equal to or greater than the upper limit value thereof, there is an advantage in achieving reduction in total length of the optical system.

$$0.2 < Bfw/(fw \times \tan\omega w) < 5 \quad (1)$$

In order to obtain more favorable characteristics, the lower limit value of Conditional Expression (1) is preferably 0.3, more preferably 0.5, yet more preferably 0.7, most preferably 0.8, and especially preferably 0.9. The upper limit value of Conditional Expression (1) is preferably 4, more preferably 3, yet more preferably 2, most preferably 1.7, and especially preferably 1.

It is preferable that the zoom lens satisfies Conditional Expression (2). Here, it is assumed that a paraxial curvature radius of an object side surface of the negative lens, which is closest to the object side, among the negative lenses, which are included in the object side negative group GN, is Rnf. It is assumed that a paraxial curvature radius of an image side surface of the negative lens, which is closest to the object side, among the negative lenses, which are included in the object side negative group GN, is Rnr. By not allowing the corresponding value of Conditional Expression (2) to be equal to or less than the lower limit value thereof, there is an advantage in suppressing astigmatism in a range from the wide-angle end to the telephoto end. By not allowing the corresponding value of Conditional Expression (2) to be equal to or greater than the upper limit value thereof, there is an advantage in suppressing distortion and field curvature at the wide-angle end.

$$0.02 < (Rnf - Rnr)/(Rnf + Rnr) < 3 \quad (2)$$

In order to obtain more favorable characteristics, the lower limit value of Conditional Expression (2) is preferably 0.04, more preferably 0.1, yet more preferably 0.3, even more preferably 0.5, yet even more preferably 0.62, most preferably 0.68, and especially preferably 0.75. The upper limit value of Conditional Expression (2) is preferably 2.5, more preferably 2, yet more preferably 1.5, even more preferably 1.17, yet even more preferably 1.13, most preferably 1.1, and especially preferably 1.

In a configuration in which the intermediate group GM includes at least one lens group which has a positive refractive power and the first intermediate positive lens group includes at least two positive lenses, it is preferable that the zoom lens satisfies Conditional Expression (3). Here, it is assumed that an Abbe number of a positive lens, which is closest to the object side, among the positive lenses, which are included in the intermediate group GM, based on the d-line is νMp1. An Abbe number of the positive lens which is second from the object side among the positive lenses, which are included in the intermediate group GM, based on the d-line is vMp2. By not allowing the corresponding value of Conditional Expression (3) to be equal to or less than the lower limit value thereof, it is possible to prevent longitudinal chromatic aberration at the wide-angle end from being insufficiently corrected. As a result, there is an advantage in achieving high performance. By not allowing the corresponding value of Conditional Expression (3) to be equal to or greater than the upper limit value thereof, it is possible to prevent longitudinal chromatic aberration at the wide-angle end from being excessively corrected. As a result, there is an advantage in achieving high performance.

$$20 < (vMP1 + vMP2)/2 < 100 \qquad (3)$$

In order to obtain more favorable characteristics, the lower limit value of Conditional Expression (3) is preferably 27, more preferably 32, yet more preferably 39, even more preferably 45, yet even more preferably 50, most preferably 60, and especially preferably 70. The upper limit value of Conditional Expression (3) is preferably 90 and more preferably 80.

It is preferable that the zoom lens satisfies Conditional Expression (4). Here, it is assumed that an open F number in a state where the infinite distance object is in focus at the wide-angle end is Fnow. By not allowing the corresponding value of Conditional Expression (4) to be equal to or less than the lower limit value thereof, there is an advantage in achieving reduction in size of the entire zoom lens. By not allowing the corresponding value of Conditional Expression (4) to be equal to or greater than the upper limit value thereof, there is an advantage in achieving an increase in diameter.

$$2 < Fnow < 4.8 \qquad (4)$$

In order to obtain more favorable characteristics, the lower limit value of Conditional Expression (4) is preferably 2.3, more preferably 2.4, and yet more preferably 2.5. The upper limit value of Conditional Expression (4) is preferably 4.5, more preferably 4, and yet more preferably 3.9.

It is preferable that the zoom lens satisfies Conditional Expression (5). Here, it is assumed that a focal length of the object side positive group GP at the wide-angle end is fGPw. By not allowing the corresponding value of Conditional Expression (5) to be equal to or less than the lower limit value thereof, the refractive power of the object side positive group GP is prevented from becoming excessively weak. As a result, there is an advantage in achieving reduction in size of the lens group closest to the object side. By not allowing the corresponding value of Conditional Expression (5) to be equal to or greater than the upper limit value thereof, the refractive power of the object side positive group GP is prevented from becoming excessively weak. As a result, there is an advantage in suppressing fluctuation in aberrations during zooming.

$$0.05 < fw/fGPw < 2.5 \qquad (5)$$

In order to obtain more favorable characteristics, the lower limit value of Conditional Expression (5) is preferably 0.1, more preferably 0.13, yet more preferably 0.15, even more preferably 0.16, yet even more preferably 0.18, most preferably 0.2, and especially preferably 0.35. The upper limit value of Conditional Expression (5) is preferably 2, more preferably 1.5, yet more preferably 1.25, even more preferably 1, yet even more preferably 0.85, most preferably 0.75, and especially preferably 0.55.

It is preferable that the zoom lens satisfies Conditional Expression (6). Here, it is assumed that a focal length of the whole system in a state where the infinite distance object is in focus at the telephoto end is ft. By not allowing the corresponding value of Conditional Expression (6) to be equal to or less than the lower limit value thereof, the refractive power of the object side positive group GP is prevented from becoming excessively weak. As a result, there is an advantage in achieving reduction in size of the lens group closest to the object side. By not allowing the corresponding value of Conditional Expression (6) to be equal to or greater than the upper limit value thereof, the refractive power of the object side positive group GP is prevented from becoming excessively weak. As a result, there is an advantage in suppressing fluctuation in aberrations during zooming.

$$0.4 < ft/fgPw < 4.5 \qquad (6)$$

In order to obtain more favorable characteristics, the lower limit value of Conditional Expression (6) is preferably 0.5, more preferably 0.6, yet more preferably 0.7, most preferably 0.8, and especially preferably 1.1. The upper limit value of Conditional Expression (6) is preferably 4, more preferably 3.5, yet more preferably 3, most preferably 2.7, and especially preferably 1.5.

It is preferable that the zoom lens satisfies Conditional Expression (7). Here, it is assumed that a focal length of a lens group, which has a strongest positive refractive power, among the lens groups, which are included in the intermediate group GM, is fGMp. By not allowing the corresponding value of Conditional Expression (7) to be equal to or less than the lower limit value thereof, the refractive power of the intermediate group GM is prevented from becoming excessively weak. As a result, there is an advantage in achieving reduction in size thereof. By not allowing the corresponding value of Conditional Expression (7) to be equal to or greater than the upper limit value thereof, the refractive power of the intermediate group GM is prevented from becoming excessively strong. As a result, there is an advantage in suppressing fluctuation in aberrations during zooming.

$$0.3 < fw/fGMp < 4 \qquad (7)$$

In order to obtain more favorable characteristics, the lower limit value of Conditional Expression (7) is preferably 0.35, more preferably 0.4, yet more preferably 0.45, and especially preferably 0.5. The upper limit value of Conditional Expression (7) is preferably 3.5, more preferably 3, yet more preferably 2.8, even more preferably 2, most preferably 1.8, and especially preferably 1.3.

It is preferable that the zoom lens satisfies Conditional Expression (8). Here, it is assumed that a focal length of the intermediate group GM at the wide-angle end is fGMw. By not allowing the corresponding value of Conditional Expression (8) to be equal to or less than the lower limit value thereof, the refractive power of the intermediate group GM is prevented from becoming excessively weak. As a result, there is an advantage in achieving reduction in size thereof. By not allowing the corresponding value of Conditional Expression (8) to be equal to or greater than the upper limit value thereof, the refractive power of the intermediate group GM is prevented from becoming excessively strong. As a result, there is an advantage in suppressing fluctuation in aberrations during zooming.

$$0.1 < fw/fGMw < 3 \tag{8}$$

In order to obtain more favorable characteristics, the lower limit value of Conditional Expression (8) is preferably 0.2, more preferably 0.25, yet more preferably 0.3, even more preferably 0.4, yet even more preferably 0.5, most preferably 0.6, and especially preferably 0.7. The upper limit value of Conditional Expression (8) is preferably 2.5, more preferably 2, yet more preferably 1.8, even more preferably 1.6, yet even more preferably 1.2, most preferably 1, and especially preferably 0.8.

It is preferable that the zoom lens satisfies Conditional Expression (9). Here, it is assumed that a focal length of the final group GE in a state where the infinite distance object is in focus at the wide-angle end is fGEw. By not allowing the corresponding value of Conditional Expression (9) to be equal to or less than the lower limit value thereof, there is an advantage in suppressing various aberrations in the entire zoom range. By not allowing the corresponding value of Conditional Expression (9) to be equal to or greater than the upper limit value thereof, there is an advantage in achieving reduction in sensitivity of error of the final group GE in assembly.

$$-3 < fw/fGEw < 3 \tag{9}$$

In order to obtain more favorable characteristics, the lower limit value of Conditional Expression (9) is preferably −2.5, more preferably −2, yet more preferably −1.5, and especially preferably −1. The upper limit value of Conditional Expression (9) is preferably 2.5, more preferably 2.3, yet more preferably 2, even more preferably 1.7, most preferably 1.5, and especially preferably 1.2.

It is preferable that the zoom lens satisfies Conditional Expression (10). Here, it is assumed that a focal length of the first focusing group is ffoc. By not allowing the corresponding value of Conditional Expression (10) to be equal to or less than the lower limit value thereof, it is possible to reduce the amount of movement during focusing. As a result, there is an advantage in achieving reduction in size and an increase in speed of focusing. By not allowing the corresponding value of Conditional Expression (10) to be equal to or greater than the upper limit value thereof, the refractive power of the focusing group is prevented from becoming excessively strong. As a result, there is an advantage in suppressing fluctuation in aberrations during focusing.

$$0.05 < fw/|ffoc| < 3.5. \tag{10}$$

In order to obtain more favorable characteristics, the lower limit value of the numerical value of Conditional Expression (10) is preferably 0.08, more preferably 0.12, yet more preferably 0.16, even more preferably 0.25, yet even more preferably 0.3, most preferably 0.4, and especially preferably 0.5. The upper limit value of Conditional Expression (10) is preferably 3, more preferably 2.5, yet more preferably 2.2, most preferably 2, and especially preferably 1.5.

It is preferable that the zoom lens satisfies Conditional Expression (11). By not allowing the corresponding value of Conditional Expression (11) to be equal to or less than the lower limit value thereof, it is possible to reduce the amount of movement during focusing. As a result, there is an advantage in achieving reduction in size and an increase in speed of focusing. By not allowing the corresponding value of Conditional Expression (11) to be equal to or greater than the upper limit value thereof, the refractive power of the focusing group is prevented from becoming excessively strong. As a result, there is an advantage in suppressing fluctuation in aberrations during focusing.

$$0.9 < ft/|ffoc| < 20 \tag{11}$$

In order to obtain more favorable characteristics, the lower limit value of Conditional Expression (11) is preferably 1, more preferably 1.1, yet more preferably 1.2, most preferably 1.3, and especially preferably 1.5. The upper limit value of Conditional Expression (11) is preferably 15, more preferably 12, yet more preferably 10, most preferably 8, and especially preferably 6.

It is preferable that the zoom lens satisfies Conditional Expression (12). In the present specification, the unit of ωw is degree. By not allowing the corresponding value of Conditional Expression (12) to be equal to or less than the lower limit value thereof, there is an advantage in achieving a wide angle. By not allowing the corresponding value of Conditional Expression (12) to be equal to or greater than the upper limit value thereof, there is an advantage in achieving reduction in size thereof.

$$10 < \omega w < 55 \tag{12}$$

In order to obtain more favorable characteristics, the lower limit value of Conditional Expression (12) is preferably 12, more preferably 15, yet more preferably 20, most preferably 25, and especially preferably 30. The upper limit value of Conditional Expression (12) is preferably 50, more preferably 48, yet more preferably 46, most preferably 44, and especially preferably 42.

It is preferable that the zoom lens satisfies Conditional Expression (13). Here, it is assumed that a focal length of the object side negative group GN in a state where the infinite distance object is in focus at the wide-angle end is fGNw. By not allowing the corresponding value of Conditional Expression (13) to be equal to or less than the lower limit value thereof, the refractive power of the object side negative group GN is prevented from becoming excessively strong. Therefore, there is an advantage in suppressing fluctuation in aberrations during zooming. By not allowing the corresponding value of Conditional Expression (13) to be equal to or greater than the upper limit value thereof, the refractive power of the object side negative group GN is prevented from becoming excessively weak. Therefore, it is possible to suppress the amount of movement of the object side negative group GN during zooming. As a result, there is an advantage in achieving reduction in size in the optical axis direction.

$$-4.5 < fw/fGNw < -0.3 \quad (13)$$

In order to obtain more favorable characteristics, the lower limit value of Conditional Expression (13) is preferably −4, more preferably −3.5, yet more preferably −3.2, even more preferably −3, most preferably −2.5, and especially preferably −2. The upper limit value of Conditional Expression (13) is preferably −0.5, more preferably −0.7, yet more preferably −0.9, even more preferably −1, most preferably −1.1, and especially preferably −1.2.

It is preferable that the zoom lens satisfies Conditional Expression (14). By not allowing the corresponding value of Conditional Expression (14) to be equal to or less than the lower limit value thereof, the refractive power of the object side negative group GN is prevented from becoming excessively strong. Therefore, there is an advantage in suppressing fluctuation in aberrations during zooming. By not allowing the corresponding value of Conditional Expression (14) to be equal to or greater than the upper limit value thereof, the refractive power of the object side negative group GN is prevented from becoming excessively weak. Therefore, it is possible to suppress the amount of movement of the object side negative group GN during zooming. As a result, there is an advantage in achieving reduction in size in the optical axis direction.

$$-21 < ft/fGNw < -2.5 \quad (14)$$

In order to obtain more favorable characteristics, the lower limit value of Conditional Expression (14) is preferably −18, more preferably −16, yet more preferably −14, even more preferably −12, most preferably −9, and especially preferably −6. The upper limit value of Conditional Expression (14) is preferably −3, more preferably −3.5, and especially preferably −4.

It is preferable that the zoom lens satisfies Conditional Expression (15). Here, it is assumed that a focal length of the intermediate group GM at the telephoto end is fGMt. By not allowing the corresponding value of Conditional Expression (15) to be equal to or less than the lower limit value thereof, it is possible to minimize the diameter of the luminous flux incident on the final group GE. As a result, there is an advantage in achieving reduction in diameter. By not allowing the corresponding value of Conditional Expression (15) to be equal to or greater than the upper limit value thereof, there is an advantage in suppressing fluctuation in aberrations during zooming.

$$0.5 < ft/fGMt < 15 \quad (15)$$

In order to obtain more favorable characteristics, the lower limit value of Conditional Expression (15) is preferably 0.8, more preferably 1, yet more preferably 1.2, even more preferably 2, most preferably 2.5, and especially preferably 3. The upper limit value of Conditional Expression (15) is preferably 13, more preferably 12, yet more preferably 10, even more preferably 9, most preferably 7, and especially preferably 6.5.

It is preferable that the zoom lens satisfies Conditional Expression (16). Here, it is assumed that a sum of a back focal length of the whole system in terms of the air-equivalent distance and a distance on the optical axis from a lens surface, which is closest to the object side in the object side positive group GP, to a lens surface, which is closest to the image side in the final group GE, in a state where the infinite distance object is in focus at the telephoto end is TLt. It is assumed that a sum of a back focal length of the whole system in terms of the air-equivalent distance and a distance on the optical axis from the lens surface, which is closest to the object side in the object side positive group GP, to the lens surface, which is closest to the image side in the final group GE, in a state where the infinite distance object is in focus at the wide-angle end is TLw. By not allowing the corresponding value of Conditional Expression (16) to be equal to or less than the lower limit value thereof, it is possible to significantly move the lens group closest to the object side during zooming. As a result, there is an advantage in suppressing fluctuation in aberrations during zooming. By not allowing the corresponding value of Conditional Expression (16) to be equal to or greater than the upper limit value thereof, it is possible to reduce the amount of change in total length during zooming. As a result, there is an advantage in achieving reduction in size thereof.

$$0.05 < (TLt - TLw)/fw \times (fw/ft) < 1.5 \quad (16)$$

In order to obtain more favorable characteristics, the lower limit value of Conditional Expression (16) is preferably 0.07, more preferably 0.08, yet more preferably 0.09, most preferably 0.12, and especially preferably 0.15. The upper limit value of the Expression (16) is preferably 1, more preferably 0.8, yet more preferably 0.6, most preferably 0.55, and especially preferably 0.35.

It is preferable that the zoom lens satisfies Conditional Expression (17). Here, it is assumed that a lateral magnification of the first focusing group in a state where the infinite distance object is in focus at the wide-angle end is βfw. It is assumed that a combined lateral magnification of all lenses closer to the image side than the first focusing group in a state where the infinite distance object is in focus at the wide-angle end is βfRw. It should be noted that βfRw=1 in a case where there is no lens closer to the image side than the first focusing group. By not allowing the corresponding value of Conditional Expression (17) to be equal to or less than the lower limit value thereof, it is possible to reduce the amount of movement of the focusing group during focusing. As a result, there is an advantage in achieving reduction in size of the entire zoom lens. By not allowing the corresponding value of Conditional Expression (17) to be equal to or greater than the upper limit value thereof, there is an advantage in suppressing fluctuation in aberrations during focusing.

$$0.15 < \left|(1 - \beta fw^2) \times \beta fRw^2\right| < 9 \quad (17)$$

In order to obtain more favorable characteristics, the lower limit value of Conditional Expression (17) is preferably 0.16, more preferably 0.18, yet more preferably 0.2, even more preferably 0.25, yet even more preferably 0.5, most preferably 0.8, and especially preferably 1.1. The upper limit value of Conditional Expression (17) is preferably 7, more preferably 4.9, yet more preferably 4, even more preferably 3, yet even more preferably 2.5, most preferably 2, and especially preferably 1.8.

It is preferable that the zoom lens satisfies Conditional Expression (18). Here, it is assumed that a lateral magnification of the first focusing group in a state where the infinite distance object is in focus at the telephoto end is βft. It is assumed that a combined lateral magnification of all lenses closer to the image side than the first focusing group in a state where the infinite distance object is in focus at the telephoto end is βfRt. It should be noted that βfRt=1 in a case where there is no lens closer to the image side than the first focusing group. By not allowing the corresponding value of Conditional Expression (18) to be equal to or less than the lower limit value thereof, it is possible to reduce the amount of movement of the focusing group during focusing. As a result, there is an advantage in achieving reduction in size of the entire zoom lens. By not allowing the corresponding value of Conditional Expression (18) to be equal to or greater than the upper limit value thereof, there is an advantage in suppressing fluctuation in aberrations during focusing.

$$0.8 < \left|(1 - \beta ft^2) \times \beta fRt^2\right| < 23 \quad (18)$$

In order to obtain more favorable characteristics, the lower limit value of Conditional Expression (18) is preferably 1, more preferably 1.1, yet more preferably 1.2, even more preferably 1.5, yet even more preferably 2, most preferably 3, and especially preferably 4.5. The upper limit value of Conditional Expression (18) is preferably 18, more preferably 15, yet more preferably 12, even more preferably 10, yet even more preferably 9, most preferably 8, and especially preferably 7.

It is preferable that the zoom lens satisfies Conditional Expression (19) in a configuration including the aperture stop St. Here, it is assumed that an open stop diameter of the aperture stop St in a state where the infinite distance object is in focus at the wide-angle end is STw. It is assumed that an open stop diameter of the aperture stop St in a state where the infinite distance object is in focus at the telephoto end is STt. It should be noted that the open stop diameter is a diameter of an opening portion of the aperture stop St in an open state. In a case where the opening portion has a polygonal shape, a diameter of a circumscribed circle of the polygonal shape in the open state is set as the open stop diameter. By not allowing the corresponding value of Conditional Expression (19) to be equal to or less than the lower limit value thereof, the difference in the open stop diameter between the wide-angle end and the telephoto end is prevented from becoming excessively large. As a result, there is an advantage in achieving reduction in size of the stop unit. By not allowing the corresponding value of Conditional Expression (19) to be equal to or greater than the upper limit value thereof, it is easy to reduce the change in F number between the wide-angle end and the telephoto end.

$$0.55 < STw / STt < 1 \quad (19)$$

In order to obtain more favorable characteristics, the lower limit value of Conditional Expression (19) is preferably 0.6, more preferably 0.65, yet more preferably 0.7, even more preferably 0.73, most preferably 0.74, and especially preferably 0.75. The upper limit value of Conditional Expression (19) is preferably 0.99, more preferably 0.98, yet more preferably 0.97, even more preferably 0.96, most preferably 0.92, and especially preferably 0.86.

It is preferable that the zoom lens satisfies Conditional Expression (20). Here, it is assumed that an average of Abbe numbers of all positive lenses of the object side positive group GP based on the d-line is νPave. By not allowing the corresponding value of Conditional Expression (20) to be equal to or less than the lower limit value thereof, there is an advantage in suppressing longitudinal chromatic aberration. By not allowing the corresponding value of Conditional Expression (20) to be equal to or greater than the upper limit value thereof, the availability of the material is increased, and a material that is easier to manufacture can be used.

$$50 < \nu Pave < 115 \quad (20)$$

In order to obtain more favorable characteristics, the lower limit value of Conditional Expression (20) is preferably 52, more preferably 53, yet more preferably 55, even more preferably 59, most preferably 62, and especially preferably 75. The upper limit value of Conditional Expression (20) is preferably 110, more preferably 105, yet more preferably 100, even more preferably 98, most preferably 95, and especially preferably 90.

It is preferable that the zoom lens satisfies Conditional Expression (21). Here, it is assumed that a thickness of the object side positive group GP on the optical axis at the wide-angle end is DGPw. It should be noted that the "thickness on the optical axis" of a certain group refers to a distance on the optical axis from a lens surface closest to the object side in the certain group to a lens surface closest to the image side in the certain group. For example, FIG. 2 shows the thickness DGPw. By not allowing the corresponding value of Conditional Expression (21) to be equal to or less than the lower limit value thereof, there is an advantage in suppressing longitudinal chromatic aberration. By not allowing the corresponding value of Conditional Expression (21) to be equal to or greater than the upper limit value thereof, there is an advantage in achieving reduction in size and weight of the entire zoom lens.

$$0.04 < DGPw / TLw < 0.25 \quad (21)$$

In order to obtain more favorable characteristics, the lower limit value of Conditional Expression (21) is preferably 0.05, more preferably 0.06, and especially preferably 0.08. The upper limit value of Conditional Expression (21) is preferably 0.2, more preferably 0.18, and especially preferably 0.15.

It is preferable that the zoom lens satisfies Conditional Expression (22). Here, it is assumed that a thickness of the object side negative group GN on the optical axis in a state where the infinite distance object is in focus at the wide-angle end is DGNw. For example, FIG. 2 shows the thickness DGNw. By not allowing the corresponding value of Conditional Expression (22) to be equal to or less than the lower limit value thereof, there is an advantage in suppressing fluctuation in aberrations during zooming. By not allowing the corresponding value of Conditional Expression (22)

to be equal to or greater than the upper limit value thereof, there is an advantage in achieving reduction in size and weight of the entire zoom lens.

$$0.01 < DGNw/TLw < 0.35 \quad (22)$$

In order to obtain more favorable characteristics, the lower limit value of Conditional Expression (22) is preferably 0.03, more preferably 0.05, yet more preferably 0.07, even more preferably 0.08, most preferably 0.09, and especially preferably 0.1. The upper limit value of Conditional Expression (22) is preferably 0.3, more preferably 0.25, yet more preferably 0.2, even more preferably 0.16, most preferably 0.13, and especially preferably 0.11.

It is preferable that the zoom lens satisfies Conditional Expression (23). Here, it is assumed that a thickness of the intermediate group GM on the optical axis at the wide-angle end is DGMw. For example, FIG. 2 shows the thickness DGMw. By not allowing the corresponding value of Conditional Expression (23) to be equal to or less than the lower limit value thereof, there is an advantage in suppressing fluctuation in aberrations during zooming. By not allowing the corresponding value of Conditional Expression (23) to be equal to or greater than the upper limit value thereof, there is an advantage in achieving reduction in size and weight of the entire zoom lens.

$$0.03 < DGMw/TLw < 0.45 \quad (23)$$

In order to obtain more favorable characteristics, the lower limit value of Conditional Expression (23) is preferably 0.05, more preferably 0.07, yet more preferably 0.09, even more preferably 0.1, yet even more preferably 0.13, most preferably 0.15, and especially preferably 0.16. The upper limit value of Conditional Expression (23) is preferably 0.4, more preferably 0.38, yet more preferably 0.36, even more preferably 0.34, yet even more preferably 0.32, most preferably 0.3, and especially preferably 0.28.

It is preferable that the zoom lens satisfies Conditional Expression (24). Here, it is assumed that a thickness of the final group GE on the optical axis in a state where the infinite distance object is in focus at the wide-angle end is DGEw. For example, FIG. 2 shows the thickness DGEw. By not allowing the corresponding value of Conditional Expression (24) to be equal to or less than the lower limit value thereof, there is an advantage in suppressing fluctuation in astigmatism during zooming. By not allowing the corresponding value of Conditional Expression (24) to be equal to or greater than the upper limit value thereof, there is an advantage in achieving reduction in size and weight of the entire zoom lens.

$$0.015 < DGEw/TLw < 0.4 \quad (24)$$

In order to obtain more favorable characteristics, the lower limit value of Conditional Expression (24) is preferably 0.016, more preferably 0.018, yet more preferably 0.025, even more preferably 0.04, yet even more preferably 0.06, most preferably 0.08, and especially preferably 0.11. The upper limit value of Conditional Expression (24) is preferably 0.35, more preferably 0.3, yet more preferably 0.26, even more preferably 0.24, yet even more preferably 0.22, most preferably 0.2, and especially preferably 0.19.

It is preferable that the zoom lens satisfies Conditional Expression (25). Here, it is assumed that a thickness of the intermediate group GM on the optical axis at the telephoto end is DGMt. For example, FIG. 2 shows the thickness DGMt. By not allowing the corresponding value of Conditional Expression (25) to be equal to or less than the lower limit value thereof, there is an advantage in suppressing fluctuation in aberrations during zooming. By not allowing the corresponding value of Conditional Expression (25) to be equal to or greater than the upper limit value thereof, there is an advantage in achieving reduction in size and weight of the entire zoom lens.

$$0.02 < DGMt/TLt < 0.35 \quad (25)$$

In order to obtain more favorable characteristics, the lower limit value of Conditional Expression (25) is preferably 0.04, more preferably 0.06, yet more preferably 0.08, even more preferably 0.1, yet even more preferably 0.12, most preferably 0.13, and especially preferably 0.14. The upper limit value of Conditional Expression (25) is preferably 0.3, more preferably 0.28, yet more preferably 0.26, even more preferably 0.24, yet even more preferably 0.22, most preferably 0.2, and especially preferably 0.19.

It is preferable that the zoom lens satisfies Conditional Expression (26). Here, it is assumed that an amount of displacement of a position of the lens surface, which is closest to the object side in the object side positive group GP, on the optical axis during zooming from the wide-angle end to the telephoto end is ΔGP. For example, FIG. 2 shows the amount of displacement ΔGP. A sign of ΔGP is set to be negative in a case where the lens surface, which is closest to the object side in the object side positive group GP, moves to the object side during zooming from the wide-angle end to the telephoto end, and is set to be positive in a case where the lens surface, which is closest to the object side in the object side positive group GP, moves to the image side. By not allowing the corresponding value of Conditional Expression (26) to be equal to or less than the lower limit value thereof, there is an advantage in suppressing fluctuation in aberrations during zooming. By not allowing the corresponding value of Conditional Expression (26) to be equal to or greater than the upper limit value thereof, there is an advantage in achieving reduction in size and weight of the entire zoom lens.

$$-0.6 < \Delta GP/TLt < -0.04 \quad (26)$$

In order to obtain more favorable characteristics, the lower limit value of Conditional Expression (26) is preferably −0.55, more preferably −0.52, yet more preferably −0.5, even more preferably −0.45, most preferably −0.43, and especially preferably −0.4. The upper limit value of Conditional Expression (26) is preferably −0.05, more preferably −0.07, yet more preferably −0.1, even more preferably −0.15, most preferably −0.2, and especially preferably −0.25.

It is preferable that the zoom lens satisfies Conditional Expression (27). Here, it is assumed that an amount of displacement of a position of the lens surface, which is closest to the object side in the object side negative group GN, with respect to the optical axis during zooming from the wide-angle end to the telephoto end in a state where the infinite distance object is in focus is ΔGN. For example, FIG. 2 shows the amount of displacement ΔGN. By not allowing the corresponding value of Conditional Expression (27) to be equal to or less than the lower limit value thereof, there is an advantage in suppressing fluctuation in aberrations during zooming, and there is an advantage in achieving an increase in magnification change ratio. By not allowing the corresponding value of Conditional Expression (27) to be equal to or greater than the upper limit value thereof, there is an advantage in achieving reduction in size of the entire zoom lens.

$$0.002 < |\Delta GN|/TLt < 0.35 \quad (27)$$

In order to obtain more favorable characteristics, the lower limit value of Conditional Expression (27) is preferably 0.003, more preferably 0.004, yet more preferably 0.005, even more preferably 0.006, most preferably 0.007, and especially preferably 0.008. The upper limit value of Conditional Expression (27) is preferably 0.3, more preferably 0.25, yet more preferably 0.23, even more preferably 0.2, most preferably 0.19, and especially preferably 0.18.

It is preferable that the zoom lens satisfies Conditional Expression (28). Here, it is assumed that an amount of displacement of the lens surface, which is closest to the object side in the intermediate group GM, on the optical axis during zooming from the wide-angle end to the telephoto end is ΔGM. For example, FIG. 2 shows the amount of displacement ΔGM. By not allowing the corresponding value of Conditional Expression (28) to be equal to or less than the lower limit value thereof, there is an advantage in suppressing fluctuation in aberrations during zooming. By not allowing the corresponding value of Conditional Expression (28) to be equal to or greater than the upper limit value thereof, there is an advantage in achieving reduction in size of the entire zoom lens.

$$0.001 < |\Delta GM|/TLt < 0.4 \quad (28)$$

In order to obtain more favorable characteristics, the lower limit value of Conditional Expression (28) is preferably 0.01, more preferably 0.015, yet more preferably 0.02, even more preferably 0.04, most preferably 0.06, and especially preferably 0.08. The upper limit value of the numerical value of Conditional Expression (28) is preferably 0.35, more preferably 0.33, yet more preferably 0.31, even more preferably 0.29, most preferably 0.27, and especially preferably 0.25.

It is preferable that the zoom lens satisfies Conditional Expression (29). By not allowing the corresponding value of Conditional Expression (29) to be equal to or less than the lower limit value thereof, there is an advantage in achieving an increase in magnification change ratio. By not allowing the corresponding value of Conditional Expression (29) to be equal to or greater than the upper limit value thereof, there is an advantage in achieving reduction in size thereof.

$$-15 < fGPw/fGNw < -1.8 \quad (29)$$

In order to obtain more favorable characteristics, the lower limit value of Conditional Expression (29) is preferably −10, more preferably −8, most preferably −7.4, and especially preferably −7. The upper limit value of the Expression (29) is preferably −2, more preferably −2.5, most preferably −3, and especially preferably −3.6.

It is preferable that the zoom lens satisfies Conditional Expression (30). By not allowing the corresponding value of Conditional Expression (30) to be equal to or less than the lower limit value thereof, there is an advantage in suppressing fluctuation in aberrations on the telephoto side during zooming. By not allowing the corresponding value of Conditional Expression (30) to be equal to or greater than the upper limit value thereof, there is an advantage in suppressing fluctuation in aberrations on the wide angle side during zooming.

$$0.5 < fGMt/fGMw < 3 \quad (30)$$

In order to obtain more favorable characteristics, the lower limit value of Conditional Expression (30) is preferably 0.6, more preferably 0.65, and especially preferably 0.7. The upper limit value of Conditional Expression (30) is preferably 2, more preferably 1.5, and especially preferably 1.1.

It is preferable that the zoom lens satisfies Conditional Expression (31). By not allowing the corresponding value of Conditional Expression (31) to be equal to or less than the lower limit value thereof, there is an advantage in achieving reduction in amount of movement of the object side negative group GN during zooming. By not allowing the corresponding value of Conditional Expression (31) to be equal to or greater than the upper limit value thereof, there is an advantage in satisfactorily correcting lateral chromatic aberration at the wide-angle end.

$$-3 < fGNw/fGMw < -0.1 \quad (31)$$

In order to obtain more favorable characteristics, the lower limit value of Conditional Expression (31) is preferably −2.5, more preferably −2, yet more preferably −1.7, even more preferably −1.5, yet even more preferably −1.2, most preferably −1, and especially preferably −0.68. The upper limit value of Conditional Expression (31) is preferably −0.15, more preferably −0.2, yet more preferably −0.25, even more preferably −0.3, yet even more preferably −0.35, most preferably −0.4, and especially preferably −0.45.

It is preferable that the zoom lens satisfies Conditional Expression (32). By not allowing the corresponding value of Conditional Expression (32) to be equal to or less than the lower limit value thereof, the refractive power of the object side positive group GP can be prevented from becoming excessively strong. Therefore, in particular, there is an advantage in satisfactorily correcting spherical aberration and longitudinal chromatic aberration at the telephoto end. By not allowing the corresponding value of Conditional Expression (32) to be equal to or greater than the upper limit value, the refractive power of the object side positive group GP can be prevented from becoming excessively weak. Therefore, it is possible to suppress the amount of movement of the object side positive group GP during zooming. As a result, there is an advantage in achieving reduction in size of the lens system.

$$0.15 < fGPw/|fGEw| < 10 \quad (32)$$

In order to obtain more favorable characteristics, the lower limit value of Conditional Expression (32) is preferably 0.2, more preferably 0.25, yet more preferably 0.3, even more preferably 0.35, yet even more preferably 0.4, most preferably 0.45, and especially preferably 0.5. The upper limit value of Conditional Expression (32) is preferably 9.5, more preferably 9, yet more preferably 8.5, even more preferably 8, yet even more preferably 7.5, most preferably 7, and especially preferably 6.5.

It is preferable that the zoom lens satisfies Conditional Expression (33). By not allowing the corresponding value of Conditional Expression (33) to be equal to or less than the lower limit value thereof, there is an advantage in ensuring the back focal length at the wide-angle end while achieving an increase in magnification change ratio. By not allowing the corresponding value of Conditional Expression (33) to be equal to or greater than the upper limit value thereof, the image side principal point position can be closer to the object side. As a result, there is an advantage in achieving reduction in total length of the optical system.

$$-2 < fGMw/fGEw < 5 \quad (33)$$

In order to obtain more favorable characteristics, the lower limit value of Conditional Expression (33) is preferably −1.5, more preferably −1, yet more preferably −0.5, even more preferably 0, most preferably 0.5, and especially preferably 1. The upper limit value of Conditional Expression (33) is preferably 4, more preferably 3, yet more preferably 2.5, even more preferably 2.2, most preferably 2, and especially preferably 1.5.

It is preferable that the zoom lens satisfies Conditional Expression (34). Here, it is assumed that a distance on the optical axis from the lens surface, which is closest to the object side in the object side positive group GP, to a paraxial entrance pupil position Penw in a state where the infinite distance object is in focus at the wide-angle end is Denw. For example, FIG. 2 shows the above-mentioned paraxial entrance pupil position Penw and distance Denw. By not allowing the corresponding value of Conditional Expression (34) to be equal to or less than the lower limit value thereof, there is an advantage in suppressing fluctuation in aberrations during zooming. By not allowing the corresponding value of Conditional Expression (34) to be equal to or greater than the upper limit value thereof, it is possible to suppress an increase in diameter of the object side positive group GP. As a result, it is easy to achieve reduction in size thereof.

$$0.5 < Denw/fw < 3 \quad (34)$$

In order to obtain more favorable characteristics, the lower limit value of Conditional Expression (34) is preferably 0.65, more preferably 0.8, yet more preferably 0.9, even more preferably 1, most preferably 1.2, and especially preferably 1.4. The upper limit value of Conditional Expression (34) is preferably 2.6, more preferably 2.2, yet more preferably 2, even more preferably 1.8, most preferably 1.7, and especially preferably 1.6.

It is preferable that the zoom lens satisfies Conditional Expression (35). Here, it is assumed that a distance on the optical axis from the paraxial exit pupil position Pexw to the image plane Sim in a state where the infinite distance object is in focus at the wide-angle end is Dexw. However, in a case where the optical member that does not have a refractive power is disposed between the exit pupil position Pexw and the image plane Sim, the Dexw is calculated for the optical member using the air-equivalent distance. For example, FIG. 2 shows the paraxial exit pupil position Pexw. By not allowing the corresponding value of Conditional Expression (35) to be equal to or less than the lower limit value thereof, the incidence angle of the off-axis principal ray on the image plane Sim can be reduced. As a result, there is an advantage in ensuring the amount of peripheral light. By not allowing the corresponding value of Conditional Expression (35) to be equal to or greater than the upper limit value thereof, the total length of the optical system can be reduced. As a result, there is an advantage in achieving reduction in size thereof.

$$1.2 < Dexw/(fw \times \tan\omega w) < 8 \quad (35)$$

In order to obtain more favorable characteristics, the lower limit value of Conditional Expression (35) is preferably 1.5, more preferably 2, yet more preferably 2.3, even more preferably 2.5, most preferably 2.8, and especially preferably 3. The upper limit value of Conditional Expression (35) is preferably 7, more preferably 6.8, yet more preferably 6.4, even more preferably 5.5, most preferably 4.8, and especially preferably 4.

It is preferable that the zoom lens satisfies Conditional Expression (36). Here, it is assumed that an open F number in a state where the infinite distance object is in focus at the telephoto end is Fnot. By not allowing the corresponding value of Conditional Expression (36) to be equal to or less than the lower limit value thereof, there is an advantage in achieving reduction in total length while decreasing the F number at the telephoto end. By not allowing the corresponding value of Conditional Expression (36) to be equal to or greater than the upper limit value thereof, there is an advantage in suppressing various aberrations throughout the entire zoom range.

$$1 < ft \times Fnot/TLt < 10.5 \quad (36)$$

In order to obtain more favorable characteristics, the lower limit value of Conditional Expression (36) is preferably 1.2, more preferably 1.4, yet more preferably 1.6, most preferably 1.8, and especially preferably 2. The upper limit value of the numerical expression of Conditional Expression (36) is preferably 8.6, more preferably 6, yet more preferably 5.5, even more preferably 5, yet even more preferably 4.7, most preferably 4, most preferably 3, and especially preferably 2.5.

The example shown in FIG. 1 is an example, and various modifications can be made without departing from the scope of the technique according to the embodiment of the present disclosure. For example, the number of lens groups, which are included in each of the object side positive group GP, the object side negative group GN, the intermediate group GM, and the final group GE, may be different from the number in the example of FIG. 1. Further, the number of lenses, which are included in each lens group, the number of lenses that are included in the focusing group, and the number of lenses, which are included in the vibration-proof group, may be different from the numbers in the example of FIG. 1. The lens corresponding to the focusing group, the lens corresponding to the vibration-proof group, the position of the aperture stop St, and the lens group, which moves during zooming, may be configured to be different from those in the example shown in FIG. 1.

The object side negative group GN may be configured to consist of two lens groups. In such a case, there is an advantage in suppressing fluctuation in aberrations during zooming.

The intermediate group GM may be configured to consist of three lens groups. In such a case, there is an advantage in suppressing fluctuation in aberrations during zooming as compared with a configuration in which the intermediate group GM consists of two lens groups.

During focusing, the entirety or a part of the final group GE may be configured to move along the optical axis Z. According to this configuration, there is an advantage in suppressing occurrence of bleeding. Further, as described above, in a case where the final group GE includes the focusing group, the vibration-proof group may be configured to be included in the object side negative group GN. By disposing the vibration-proof group in the object side negative group GN having a relatively small lens outer diameter, the size of the vibration-proof mechanism can also be reduced. Therefore, it is easy to achieve reduction in size of the entire lens device.

The vibration-proof group may be configured to consist of a lens group which is second from the image side of the intermediate group GM. Alternatively, the vibration-proof group may be configured to consist of only a part of the lens groups which are included in the intermediate group GM.

The aperture stop St may be configured to be included in the final group GE. In such a case, there is an advantage in achieving reduction in diameter of the final group GE.

During zooming, the lens group, which is closest to the object side in the object side positive group, may be configured to remain stationary with respect to the image plane. In such a case, since the total length during zooming is unchanged, it is possible to reduce fluctuation in the position of the center of gravity during zooming. As a result, it is possible to increase convenience during imaging.

During zooming, the lens group, which is closest to the image side in the final group GE, may be configured to move. In such a case, there is an advantage in suppressing fluctuation in aberrations during zooming.

The above-mentioned preferred configurations and available configurations may be optionally combined without contradiction, and it is preferable to selectively adopt the configurations in accordance with necessary specification.

For example, according to a preferable aspect of the zoom lens of the present disclosure, the zoom lens consists of, in order from the object side to the image side, an object side positive group GP that has a positive refractive power, an object side negative group GN that has a negative refractive power, an intermediate group GM, and a final group GE. The object side positive group GP, the object side negative group GN, the intermediate group GM, and the final group GE each include at least one lens group. During zooming, all spacings between adjacent lens groups change, and all spacings between all lenses in each lens group do not change. During focusing, all lenses in the object side positive group GP and all lenses in the intermediate group GM remain stationary with respect to the image plane Sim. The zoom lens satisfies Conditional Expression (1).

Next, examples of the zoom lens according to the embodiment of the present disclosure will be described, with reference to the drawings. The reference numerals attached to the groups in the cross-sectional views of each example are used independently for each example in order to avoid complication of description and drawings due to an increase in number of digits of the reference numerals. Therefore, even in a case where common reference numerals are attached in the drawings of different examples, components do not necessarily have a common configuration.

EXAMPLE 1

FIG. 1 shows a configuration and movement loci of a zoom lens of Example 1, and an illustration method and a configuration thereof are as described above. Therefore, some description is not repeated herein. The zoom lens of Example 1 consists of, in order from the object side to the image side, an object side positive group GP, an object side negative group GN, an intermediate group GM, and a final group GE. The object side positive group GP consists of one lens group which has a positive refractive power. The object side negative group GN consists of one lens group which has a negative refractive power. The intermediate group GM consists of, in order from the object side to the image side, two lens groups including a first M lens group GM1 that has a positive refractive power and a second M lens group GM2 that has a negative refractive power. The final group GE consists of one lens group which has a positive refractive power. The first M lens group GM1 includes an aperture stop St.

During zooming from the wide-angle end to the telephoto end, the final group GE remains stationary with respect to the image plane Sim, and the other lens groups move by changing the spacings between the adjacent lens groups. The zoom lens includes only one focusing group. The focusing group consists of three lenses which are first, second, and third from the object side of the object side negative group GN. During focusing from the infinite distance object to the close-range object, the focusing group moves to the image side. The vibration-proof group consists of the second M lens group GM2.

Regarding the zoom lens of Example 1, Table 1 shows basic lens data, Table 2 shows specifications and variable surface spacings, and Table 3 shows aspherical coefficients thereof.

The table of basic lens data will be described as follows. The Sn column shows surface numbers in a case where the surface closest to the object side is the first surface and the number is increased one by one toward the image side. The R column shows a curvature radius of each surface. The D column shows a surface spacing between each surface and the surface adjacent to the image side on the optical axis. The Nd column indicates a refractive index of each lens at the d-line. The νd column shows the Abbe number of each lens based on the d-line. The θgF column shows a partial dispersion ratio between the g-line and the F-line of each lens.

Assuming that refractive indexes for the g-line, F-line, and C-line of a certain lens are Ng, NF, and NC, respectively, and the partial dispersion ratio thereof between the g-line and F-line of the lens is θgF, θgF is defined by the following expression.

$$\theta gF = (Ng - NF)/(NF - NC)$$

The "d-line", "C-line", "F-line", and "g-line" described in the present specification are emission lines. The wavelength of the d-line is 587.56 nm (nanometers) and the wavelength of the C-line is 656.27 nm (nanometers), the wavelength of F-line is 486.13 nm (nanometers), and the wavelength of g-line is 435.84 nm (nanometers).

In the table of the basic lens data, the sign of the curvature radius of the convex surface facing toward the object side is positive, and the sign of the curvature radius of the convex surface facing toward the image side is negative. Table 1 also shows the aperture stop St and the optical member PP. In a cell of a surface number of a surface corresponding to the aperture stop St, the surface number and a term of (St) are noted. A value at the bottom cell of the column of D in the table indicates a spacing between the image plane Sim and the surface closest to the image side in the table. The symbol DD [ ] is used for each variable surface spacing during zooming, and the object side surface number of the spacing is given in [ ] and is noted in the column of D.

Table 2 shows the variable magnification change ratio Zr, the focal length f, the back focal length Bf in terms of the air-equivalent distance, the open F number FNo, the maximum total angle of view 2ω, and the variable surface spacing during zooming, based on the d-line. The magnification change ratio is synonymous with the zoom magnification. [°] in the cells of 2ω indicates that the unit thereof is a degree. In Table 2, the values in the wide-angle end state, the middle focal length state, and the telephoto end state are respectively shown in the columns labeled with "Wide", "Middle", and "Tele".

In basic lens data, a reference sign * is attached to surface numbers of aspherical surfaces, and values of the paraxial curvature radius are written into the column of the curvature radius of the aspherical surface. In Table 3, the Sn row shows surface numbers of the aspherical surfaces, and the KA and Am rows show numerical values of the aspherical coefficients for each aspherical surface. It should be noted that m of Am is an integer of 3 or more, and differs depending on the surface. For example, on the sixteenth surface of Example 1, m=4, 6, 8, 10, 12, 14, and 16. The "E±n" (n: an integer) in numerical values of the aspherical coefficients of Table 3 indicates "$\times 10^{\pm n}$". KA and Am are the aspherical coefficients in the aspherical surface expression represented by the following expression.

$$Zd = C\times h^2/\left\{1+\left(1-KA\times C^2\times h^2\right)^{1/2}\right\}+\Sigma Am\times h^m$$

Here,

Zd is an aspherical surface depth (a length of a perpendicular from a point on an aspherical surface at height h to a plane that is perpendicular to the optical axis Z and that is in contact with the vertex of the aspherical surface), h is a height (a distance from the optical axis Z to the lens surface), C is an inverse of the paraxial curvature radius, KA and Am are aspherical coefficients, and Σ in the aspherical surface expression means the sum with respect to m.

In the data of each table, degrees are used as a unit of an angle, and millimeters are used as a unit of a length, but appropriate different units may be used since the optical system can be used even in a case where the system is enlarged or reduced in proportion. Each of the following tables shows numerical values rounded off to predetermined decimal places.

TABLE 1

Example 1

| Sn | R | D | Nd | νd | θgF |
|---|---|---|---|---|---|
| 1 | 111.3894 | 2.2498 | 1.91082 | 35.25 | 0.5822 |
| 2 | 61.9160 | 8.1973 | 1.49700 | 81.54 | 0.5375 |
| 3 | −274.7607 | 0.2002 | | | |
| 4 | 62.3341 | 8.5002 | 1.43875 | 94.66 | 0.5340 |
| 5 | −499.9508 | DD[5] | | | |
| 6 | −567.6755 | 2.4999 | 1.57099 | 50.80 | 0.5589 |
| 7 | 37.8542 | 4.9998 | | | |
| 8 | −62.3122 | 1.3098 | 1.49700 | 81.54 | 0.5375 |
| 9 | 50.6016 | 3.4998 | 1.96300 | 24.11 | 0.6213 |
| 10 | 289.0587 | 16.1955 | | | |
| 11 | −64.8481 | 1.1002 | 1.58913 | 61.13 | 0.5407 |
| 12 | 864.0494 | 1.6295 | | | |
| 13 | −57.8552 | 1.0002 | 1.51680 | 64.20 | 0.5343 |
| 14 | 356.8210 | DD[14] | | | |
| 15(St) | ∞ | 1.2998 | | | |
| *16 | 43.3770 | 6.3526 | 1.49710 | 81.56 | 0.5385 |
| *17 | −43.1162 | 2.7054 | | | |
| 18 | 95.2050 | 8.1432 | 1.43875 | 94.66 | 0.5340 |
| 19 | −24.9998 | 1.0101 | 1.56732 | 42.82 | 0.5731 |
| 20 | −31.3338 | 0.1000 | | | |
| 21 | −3866.5265 | 4.3181 | 1.49700 | 81.54 | 0.5375 |
| 22 | −41.0060 | DD[22] | | | |
| 23 | −155.8406 | 3.7939 | 1.83481 | 42.74 | 0.5649 |
| 24 | −31.9858 | 0.9598 | 1.72047 | 34.71 | 0.5835 |
| 25 | 33.0734 | 8.3679 | | | |
| 26 | −80.4775 | 0.9998 | 1.85150 | 40.78 | 0.5696 |
| 27 | 51.6572 | DD[27] | | | |
| 28 | 58.8331 | 4.8108 | 1.80518 | 25.42 | 0.6162 |
| 29 | −60.4693 | 10.0000 | | | |
| 30 | −71.0811 | 5.5098 | 1.48749 | 70.24 | 0.5301 |
| 31 | −21.5513 | 1.0002 | 1.95375 | 32.32 | 0.5901 |
| 32 | −51.2427 | 20.0540 | | | |
| 33 | ∞ | 2.8500 | 1.54763 | 54.98 | 0.5525 |
| 34 | ∞ | 1.0219 | | | |

TABLE 2

Example 1

| | Wide | Middle | Tele |
|---|---|---|---|
| Zr | 1.0 | 1.5 | 2.6 |
| f | 48.42 | 74.53 | 127.79 |
| Bf | 22.92 | 22.92 | 22.92 |
| FNo. | 2.88 | 2.88 | 2.89 |
| 2ω[°] | 34.0 | 21.4 | 12.4 |
| DD[5] | 2.7071 | 18.0754 | 29.5806 |
| DD[14] | 20.7702 | 14.5243 | 2.9796 |
| DD[22] | 1.9999 | 2.3969 | 3.3398 |
| DD[27] | 4.9997 | 5.2928 | 7.7602 |

TABLE 3

Example 1

| Sn | 16 | 17 |
|---|---|---|
| KA | 1.0000000E+00 | 1.0000000E+00 |
| A4 | −1.2419408E−05 | 1.2035504E−05 |
| A6 | 5.6164927E−09 | 1.0843346E−08 |
| A8 | −3.6265670E−11 | −4.2052493E−11 |

TABLE 3-continued

| Example 1 | | |
|---|---|---|
| Sn | 16 | 17 |
| A10 | −2.1952852E−13 | 3.7499070E−14 |
| A12 | 3.6696294E−16 | −3.0837923E−16 |
| A14 | −7.2818234E−19 | −1.5237933E−18 |
| A16 | −1.0418293E−20 | −3.3319023E−21 |

Figure 3:
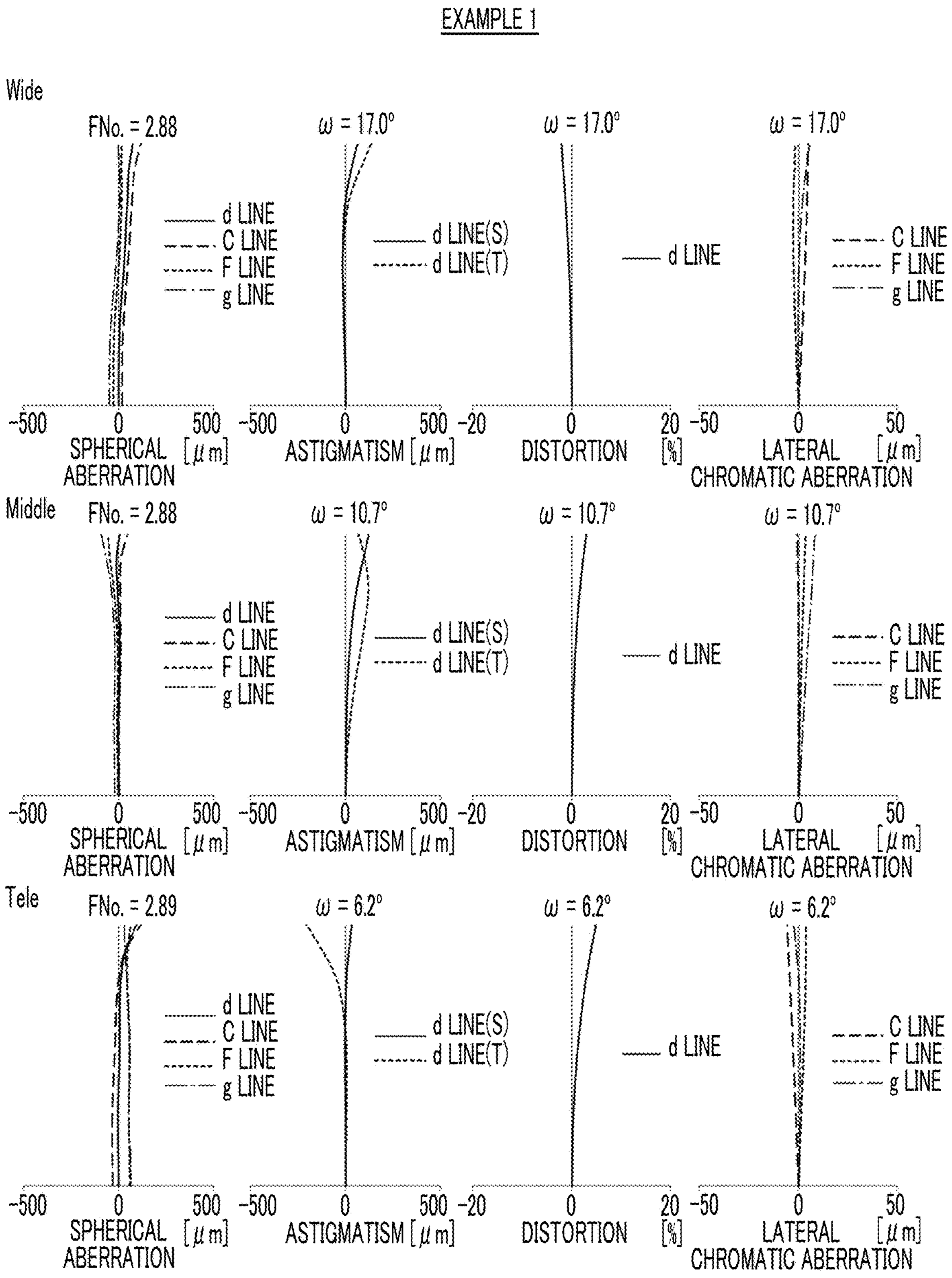
FIG. 3 is a diagram showing aberrations of the zoom lens of Example 1.

FIG. 3 is a diagram showing aberrations of the zoom lens of Example 1 in a state where the infinite distance object is in focus. FIG. 3 shows spherical aberration, astigmatism, distortion, and lateral chromatic aberration, in order from the left side. In FIG. 3, the upper part labeled "Wide" shows aberrations in the wide-angle end state, the middle part labeled "Middle" shows aberrations in the middle focal length state, and the lower part labeled "Tele" shows aberrations in the telephoto end state. In the spherical aberration diagram, aberrations at the d-line, the C-line, the F-line, and the g-line are indicated by the solid line, the long broken line, the short broken line, and the chain line, respectively. In the astigmatism diagram, aberration in the sagittal direction at the d-line is indicated by the solid line, and aberration in the tangential direction at the d-line is indicated by the short broken line. In the distortion diagram, aberration at the d-line is indicated by a solid line. In the lateral chromatic aberration diagram, aberrations at the C-line, the F-line, and the g-line are respectively indicated by the long broken line, the short broken line, and the chain line. In the spherical aberration diagram, the value of the open F number is shown after FNo.=. In other aberration diagrams, the value of the maximum half angle of view is shown after ω=.

Symbols, meanings, description methods, and illustration methods of the respective data pieces according to Example 1 are basically similar to those in the following examples unless otherwise specified. Therefore, in the following description, repeated description will not be given.

EXAMPLE 2

Figure 4:
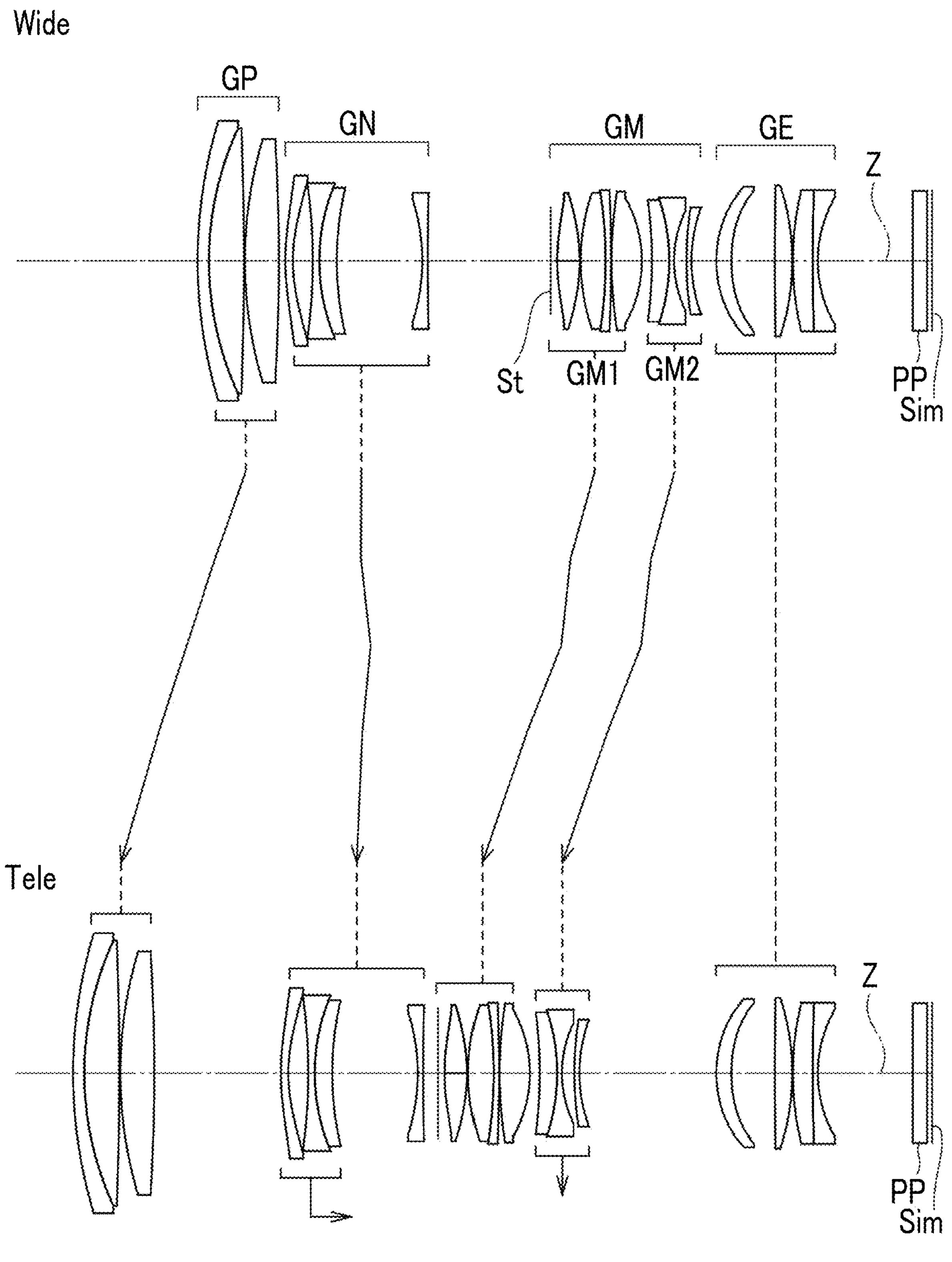
FIG. 4 is a cross-sectional view of a configuration of a zoom lens of Example 2 and a diagram showing movement loci thereof.

FIG. 4 shows a configuration and movement loci of the zoom lens of Example 2. The zoom lens of Example 2 consists of, in order from the object side to the image side, an object side positive group GP, an object side negative group GN, an intermediate group GM, and a final group GE. The object side positive group GP consists of one lens group which has a positive refractive power. The object side negative group GN consists of one lens group which has a negative refractive power. The intermediate group GM consists of, in order from the object side to the image side, two lens groups including a first M lens group GM1 that has a positive refractive power and a second M lens group GM2 that has a negative refractive power. The final group GE consists of one lens group which has a positive refractive power. The first M lens group GM1 includes an aperture stop St.

During zooming from the wide-angle end to the telephoto end, the final group GE remains stationary with respect to the image plane Sim, and the other lens groups move by changing the spacings between the adjacent lens groups. The zoom lens includes only one focusing group. The focusing group consists of three lenses which are first, second, and third from the object side of the object side negative group GN. During focusing from the infinite distance object to the close-range object, the focusing group moves to the image side. The vibration-proof group consists of the second M lens group GM2.

Figure 5:
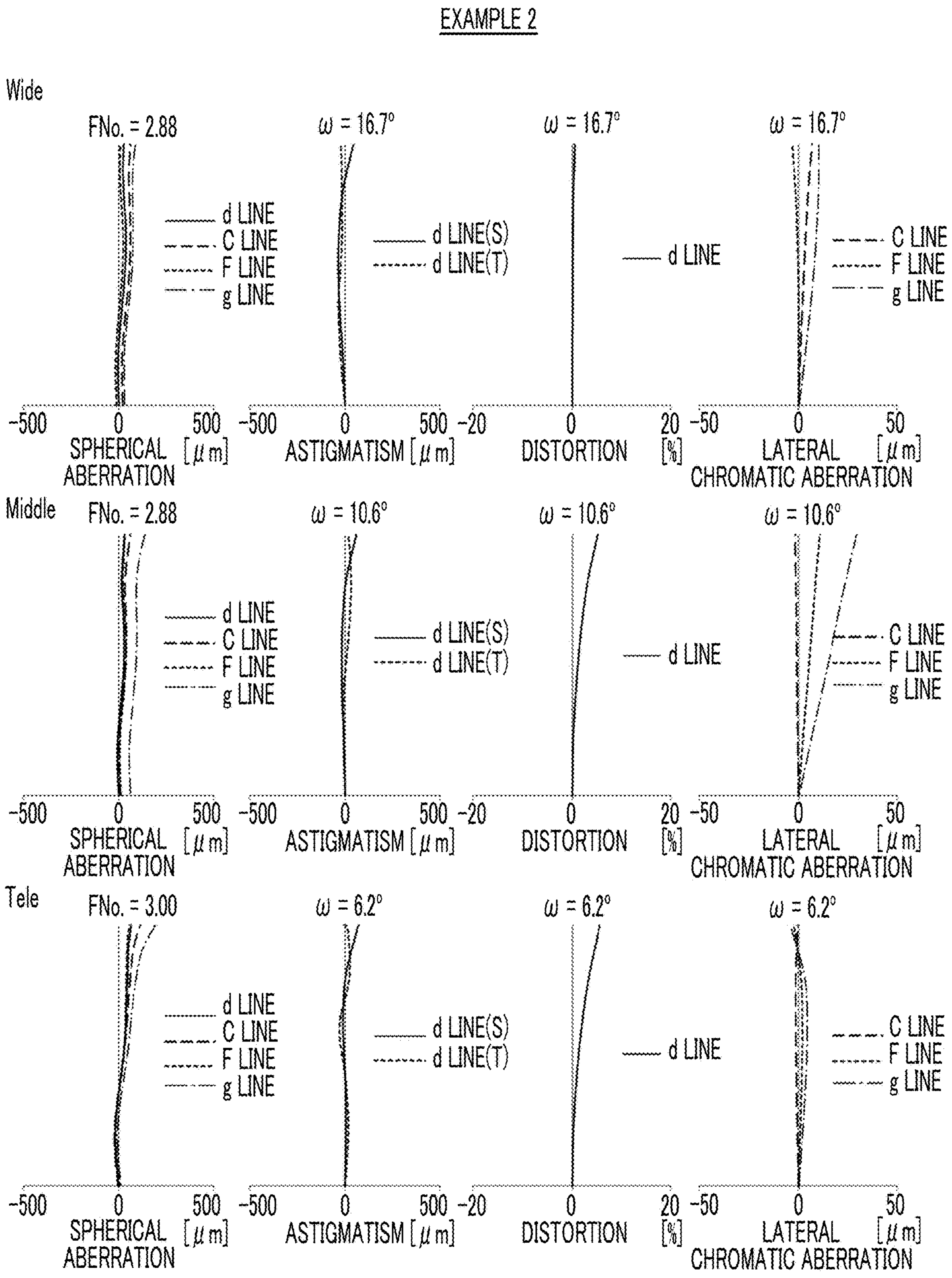
FIG. 5 is a diagram showing aberrations of the zoom lens of Example 2.

Regarding the zoom lens of Example 2, Table 4 shows basic lens data, Table 5 shows specifications and variable surface spacings, and Table 6 shows aspherical coefficients thereof. FIG. 5 shows aberration diagrams thereof.

TABLE 4

| Example 2 | | | | | |
|---|---|---|---|---|---|
| Sn | R | D | Nd | νd | θgF |
| 1 | 101.6291 | 2.2498 | 1.74950 | 35.33 | 0.5819 |
| 2 | 66.5974 | 7.0198 | 1.49700 | 81.54 | 0.5375 |
| 3 | −724.5520 | 0.2002 | | | |
| 4 | 89.2447 | 6.7998 | 1.43875 | 94.66 | 0.5340 |
| 5 | −415.4053 | DD[5] | | | |
| *6 | 48.8253 | 1.4998 | 1.51633 | 64.06 | 0.5334 |
| *7 | 33.0200 | 4.0002 | | | |
| 8 | −117.4667 | 1.3098 | 1.49700 | 81.54 | 0.5375 |
| 9 | 41.8875 | 3.4998 | 1.89286 | 20.36 | 0.6394 |
| 10 | 67.3213 | 17.1299 | | | |
| 11 | −41.8005 | 1.0998 | 1.72916 | 54.68 | 0.5445 |
| 12 | 685.6389 | DD[12] | | | |
| 13(St) | ∞ | 1.2998 | | | |
| *14 | 42.7676 | 4.4998 | 1.49710 | 81.56 | 0.5385 |
| *15 | −38.7584 | 0.1998 | | | |
| 16 | 44.6279 | 5.0098 | 1.43875 | 94.66 | 0.5340 |
| 17 | −92.6481 | 1.0853 | 2.10420 | 17.02 | 0.6631 |
| 18 | −316.7705 | 0.1000 | | | |
| 19 | 94.5639 | 6.0568 | 1.49700 | 81.54 | 0.5375 |
| 20 | −26.9042 | DD[20] | | | |
| 21 | −99.7889 | 3.4998 | 2.05090 | 26.94 | 0.6052 |
| 22 | −40.9244 | 0.9598 | 1.72916 | 54.68 | 0.5445 |
| 23 | 24.0712 | 2.4999 | | | |
| 24 | 75.6605 | 1.0000 | 1.72916 | 54.68 | 0.5445 |
| 25 | 32.4346 | DD[25] | | | |
| *26 | 25.7981 | 3.0000 | 2.00178 | 19.32 | 0.6448 |
| *27 | 31.0914 | 8.6941 | | | |
| 28 | 657.9443 | 3.5185 | 1.88100 | 40.14 | 0.5701 |
| 29 | −50.8129 | 0.0998 | | | |
| 30 | 61.7795 | 4.0000 | 2.00069 | 25.46 | 0.6136 |
| 31 | 518.6742 | 1.0102 | 1.85896 | 22.73 | 0.6284 |
| 32 | 26.7314 | 19.0536 | | | |
| 33 | ∞ | 2.8500 | 1.54763 | 54.98 | 0.5525 |
| 34 | ∞ | 1.0205 | | | |

TABLE 5

| Example 2 | | | |
|---|---|---|---|
| | Wide | Middle | Tele |
| Zr | 1.0 | 1.5 | 2.6 |
| f | 47.86 | 73.67 | 126.32 |
| Bf | 21.92 | 21.92 | 21.92 |
| FNo. | 2.88 | 2.88 | 3.00 |
| 2ω[°] | 33.4 | 21.2 | 12.4 |
| DD[5] | 1.3002 | 15.0157 | 25.3602 |
| DD[12] | 24.4848 | 15.8924 | 2.9527 |
| DD[20] | 2.0002 | 2.0238 | 1.9720 |
| DD[25] | 4.9796 | 11.6742 | 27.4689 |

TABLE 6

| Example 2 | | |
|---|---|---|
| Sn | 6 | 7 |
| KA | 1.0000000E+00 | 1.0000000E+00 |
| A4 | −2.4717499E−05 | −2.7914908E−05 |
| A6 | 3.2371583E−08 | 3.2072540E−08 |
| A8 | 9.4758912E−11 | 7.0856270E−11 |
| A10 | −6.1550357E−13 | −1.7639044E−13 |

TABLE 6-continued

| Example 2 | | |
|---|---|---|
| A12 | 6.8071301E−16 | −3.0934128E−15 |
| A14 | 2.3535216E−18 | 1.6175770E−17 |
| A16 | −4.7952669E−21 | −2.2837461E−20 |
| Sn | 14 | 15 |
| KA | 1.0000000E+00 | 1.0000000E+00 |
| A3 | 0.0000000E+00 | 0.0000000E+00 |
| A4 | −1.9991725E−05 | 4.7723918E−06 |
| A5 | 3.9473220E−07 | 9.4694434E−07 |
| A6 | 4.0101440E−10 | −7.7926531E−08 |
| A7 | −5.8286894E−09 | −3.8825404E−10 |
| A8 | −7.2472936E−11 | 2.6387210E−10 |
| A9 | 3.7981637E−11 | −2.2845663E−13 |
| A10 | 3.3518680E−14 | 2.5671900E−13 |
| A11 | −8.6019873E−14 | −1.3326688E−13 |
| A12 | −4.0916219E−15 | 9.5301147E−15 |
| A13 | −3.8201194E−17 | 1.3717897E−16 |
| A14 | 9.3069142E−18 | −2.8716969E−17 |
| A15 | 1.3447988E−18 | −1.3403056E−18 |
| A16 | −8.4447948E−20 | 9.3185430E−20 |
| Sn | 26 | 27 |
| KA | 1.0000000E+00 | 1.0000000E+00 |
| A4 | 8.9298812E−06 | 2.0012141E−05 |
| A6 | 9.6757143E−09 | −3.1775156E−09 |
| A8 | −2.4229924E−10 | 2.5458814E−11 |
| A10 | 2.5909688E−12 | −1.5453938E−15 |
| A12 | −9.2489763E−15 | 9.9601984E−15 |
| A14 | 5.1132243E−18 | −7.6097389E−17 |
| A16 | 1.7362599E−20 | 1.5017010E−19 |

EXAMPLE 3

Figure 6:
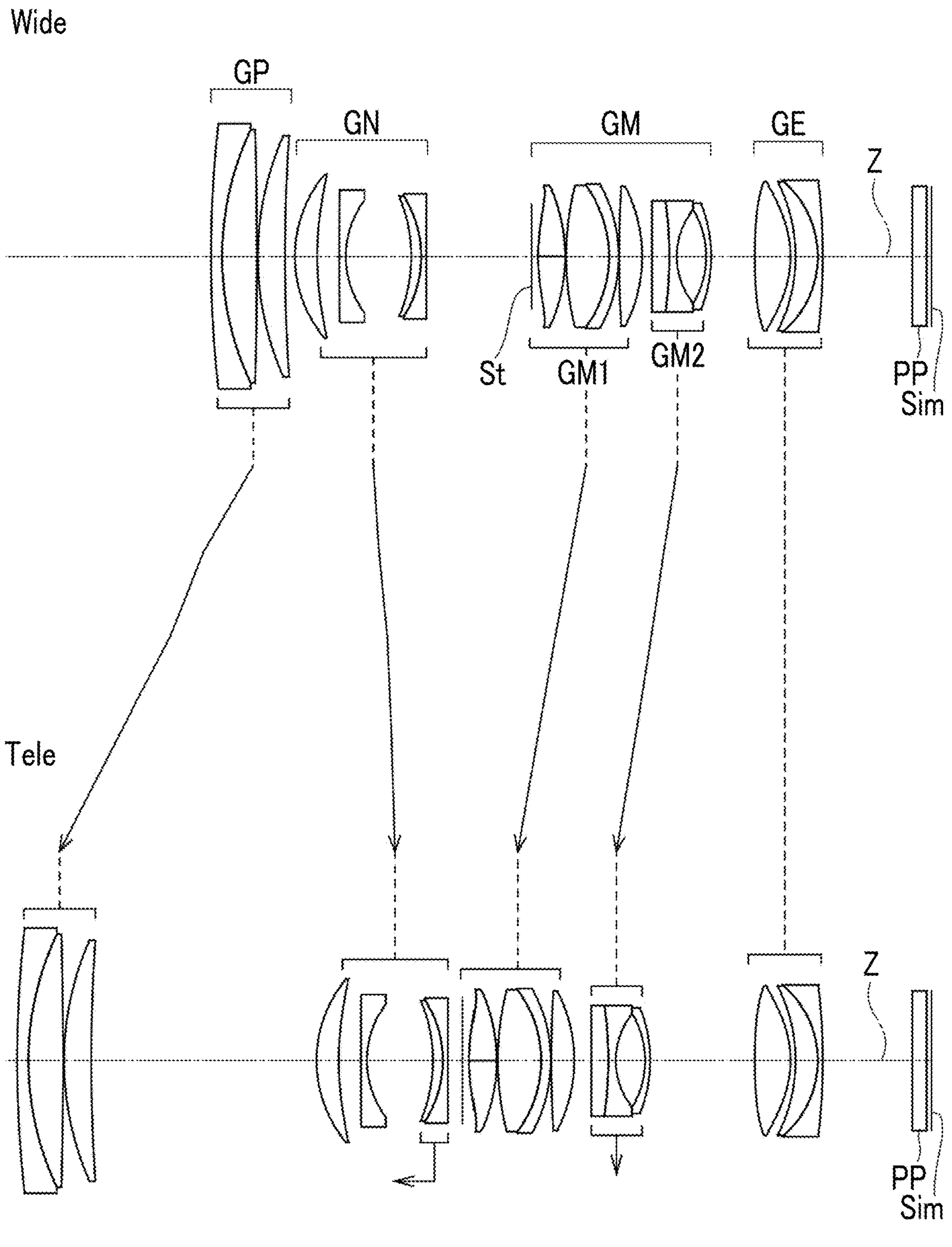
FIG. 6 is a cross-sectional view of a configuration of a zoom lens of Example 3 and a diagram showing movement loci thereof.

FIG. 6 shows a configuration and movement loci of the zoom lens of Example 3. The zoom lens of Example 3 consists of, in order from the object side to the image side, an object side positive group GP, an object side negative group GN, an intermediate group GM, and a final group GE. The object side positive group GP consists of one lens group which has a positive refractive power. The object side negative group GN consists of one lens group which has a negative refractive power. The intermediate group GM consists of, in order from the object side to the image side, two lens groups including a first M lens group GM1 that has a positive refractive power and a second M lens group GM2 that has a negative refractive power. The final group GE consists of one lens group which has a positive refractive power. The first M lens group GM1 includes an aperture stop St.

During zooming from the wide-angle end to the telephoto end, the final group GE remains stationary with respect to the image plane Sim, and the other lens groups move by changing the spacings between the adjacent lens groups. The zoom lens includes only one focusing group. The focusing group consists of two lenses which are first and second from the image side of the object side negative group GN. During focusing from the infinite distance object to the close-range object, the focusing group moves toward the object side. The vibration-proof group consists of the second M lens group GM2.

Figure 7:
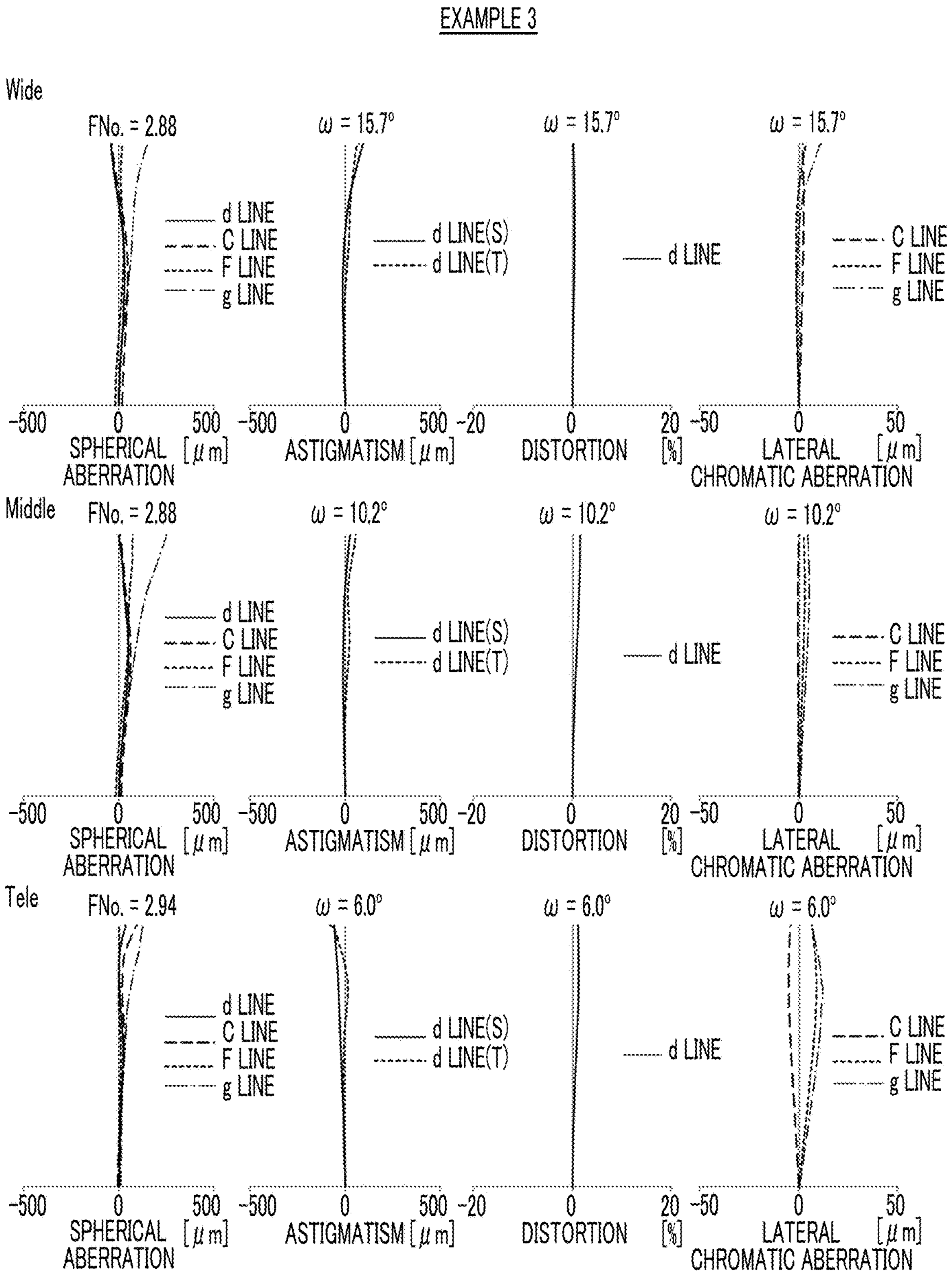
FIG. 7 is a diagram showing a configuration and luminous flux of the zoom lens of Example 3 in each zooming state.

Regarding the zoom lens of Example 3, Table 7 shows basic lens data, Table 8 shows specifications and variable surface spacings, and Table 9 shows aspherical coefficients thereof. FIG. 7 shows aberration diagrams thereof.

TABLE 7

Example 3

| Sn | R | D | Nd | νd | θgF |
|---|---|---|---|---|---|
| 1 | 253.9889 | 2.2498 | 1.66672 | 48.32 | 0.5610 |
| 2 | 62.6552 | 7.0198 | 1.49700 | 81.54 | 0.5375 |
| 3 | −1007.9041 | 0.1998 | | | |
| 4 | 63.2451 | 5.4998 | 1.43875 | 94.66 | 0.5340 |
| 5 | 380.5695 | DD[5] | | | |
| *6 | 27.1426 | 4.5002 | 1.85135 | 40.10 | 0.5695 |
| *7 | 64.8024 | 4.4875 | | | |
| 8 | 1405.4396 | 1.2998 | 1.72916 | 54.68 | 0.5445 |
| 9 | 19.8295 | 13.3428 | | | |
| 10 | −32.1727 | 2.0098 | 1.74077 | 27.79 | 0.6096 |
| 11 | −23.8100 | 1.0000 | 1.75500 | 52.32 | 0.5476 |
| 12 | 2232.2602 | DD[12] | | | |
| 13(St) | ∞ | 1.2998 | | | |
| *14 | 40.3562 | 5.4833 | 1.49710 | 81.56 | 0.5385 |
| *15 | −33.4300 | 0.1998 | | | |
| 16 | 61.5842 | 8.7676 | 1.43875 | 94.66 | 0.5340 |
| 17 | −24.9998 | 1.9378 | 1.98613 | 16.48 | 0.6656 |
| 18 | −31.5110 | 0.0998 | | | |
| 19 | 244.1655 | 4.6387 | 1.49700 | 81.54 | 0.5375 |
| 20 | −32.3536 | DD[20] | | | |
| 21 | −2841.4344 | 3.5002 | 2.10420 | 17.02 | 0.6631 |
| 22 | −84.6397 | 1.5091 | 1.75500 | 52.32 | 0.5476 |
| 23 | 15.8832 | 5.9443 | | | |
| 24 | −19.1633 | 0.9998 | 1.51680 | 64.20 | 0.5343 |
| 25 | −30.7365 | DD[25] | | | |
| *26 | 149.5478 | 7.2157 | 1.51633 | 64.06 | 0.5334 |
| *27 | −21.3479 | 0.9998 | | | |
| 28 | −35.0332 | 4.4998 | 1.48749 | 70.24 | 0.5301 |
| 29 | −20.9562 | 1.0098 | 1.51742 | 52.43 | 0.5565 |
| 30 | −133.6070 | 18.2250 | | | |
| 31 | ∞ | 2.8500 | 1.54763 | 54.98 | 0.5525 |
| 32 | ∞ | 1.0114 | | | |

TABLE 8

Example 3

| | Wide | Middle | Tele |
|---|---|---|---|
| Zr | 1.0 | 1.5 | 2.6 |
| f | 51.17 | 78.77 | 135.05 |
| Bf | 21.08 | 21.08 | 21.08 |
| FNo. | 2.88 | 2.88 | 2.94 |
| 2ω[°] | 31.4 | 20.4 | 12.0 |
| DD[5] | 1.9892 | 21.7130 | 45.6342 |
| DD[12] | 21.1715 | 12.0770 | 2.9639 |
| DD[20] | 1.9998 | 2.9263 | 3.4833 |
| DD[25] | 8.8448 | 14.1917 | 21.2211 |

TABLE 9

| Example 3 | | |
|---|---|---|
| Sn | 6 | 7 |
| KA | 1.0000000E+00 | 1.0000000E+00 |
| A4 | 4.6492081E−08 | −3.7387502E−06 |
| A6 | −4.9507058E−10 | −3.0237611E−11 |
| A8 | 1.0946057E−11 | 1.1667324E−11 |
| A10 | −4.3036967E−14 | −1.1583921E−13 |
| A12 | 2.0526741E−19 | 3.9777380E−16 |
| A14 | 3.0534974E−19 | −4.5021787E−19 |
| A16 | −4.1936726E−22 | −4.1190118E−23 |
| Sn | 14 | 15 |
| KA | 1.0000000E+00 | 1.0000000E+00 |
| A3 | 0.0000000E+00 | 0.0000000E+00 |
| A4 | −2.2753306E−05 | 1.2044403E−05 |
| A5 | −6.4911058E−08 | −1.5850793E−07 |
| A6 | −1.7230231E−08 | −5.2311171E−09 |

TABLE 9-continued

| Example 3 | | |
|---|---|---|
| A7 | 5.8668995E−11 | −5.0587320E−11 |
| A8 | 4.7272527E−11 | 2.6120933E−12 |
| A9 | 2.5829138E−12 | 4.1167098E−12 |
| A10 | −5.2784760E−13 | −2.5131660E−13 |
| A11 | −3.5032070E−14 | −3.2740423E−15 |
| A12 | −1.2075856E−17 | −1.5295135E−15 |
| A13 | −6.3935650E−17 | −5.6594055E−17 |
| A14 | 1.0674165E−17 | 1.8908233E−18 |
| A15 | 5.6535646E−19 | 7.5601009E−19 |
| A16 | −7.2595935E−20 | −5.2069814E−20 |
| Sn | 26 | 27 |
| KA | 1.0000000E+00 | 1.0000000E+00 |
| A4 | 1.8210768E−05 | 2.6754553E−05 |
| A6 | 1.3612488E−08 | 3.3827529E−08 |
| A8 | −3.2678590E−10 | −3.3940830E−10 |
| A10 | 1.5530353E−12 | 1.4895151E−12 |
| A12 | −8.3207859E−16 | −2.0658111E−16 |
| A14 | −1.1764013E−17 | −1.1402928E−17 |
| A16 | 2.5705997E−20 | 2.3006538E−20 |

EXAMPLE 4

Figure 8:
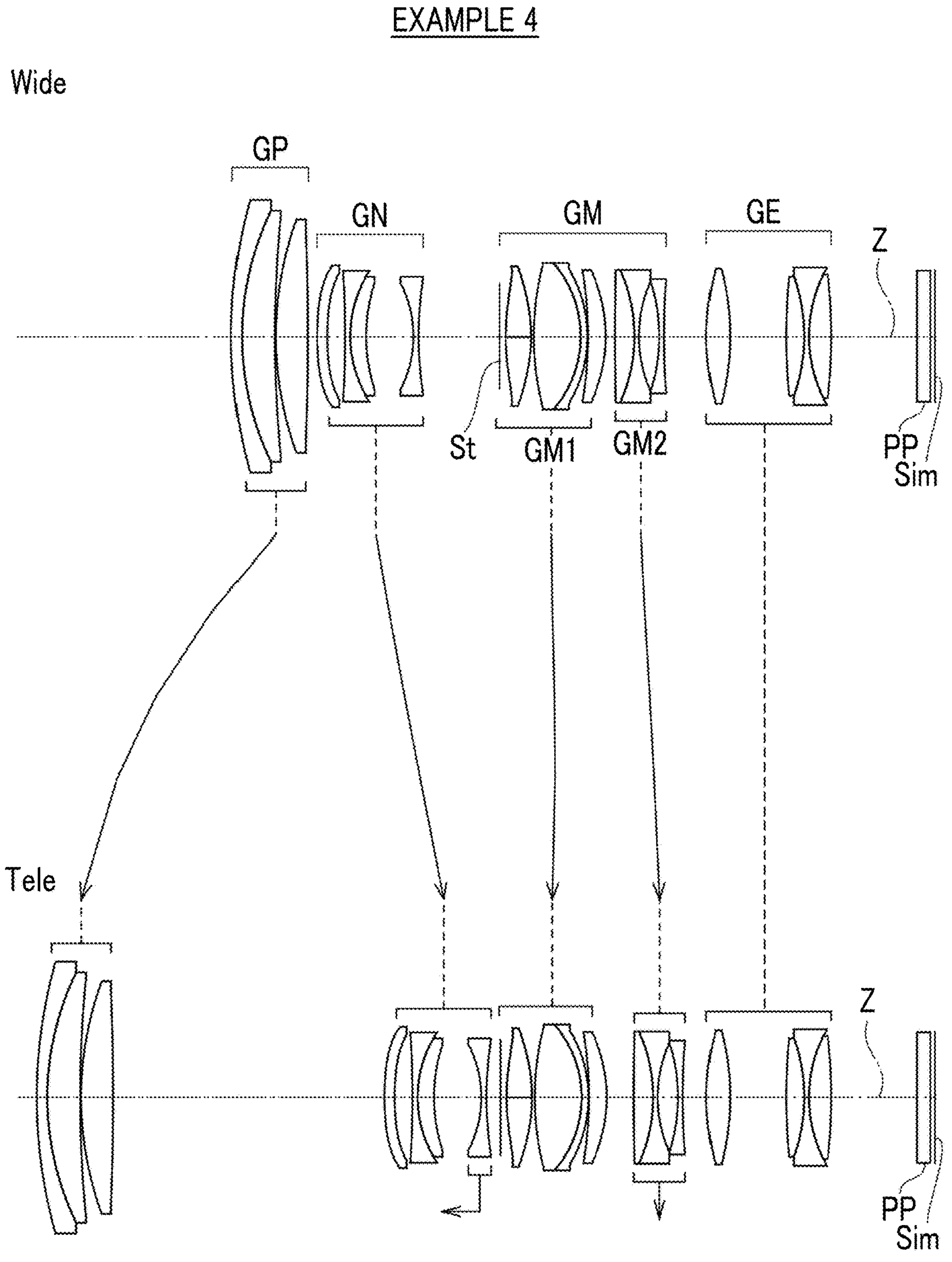
FIG. 8 is a cross-sectional view of a configuration of a zoom lens of Example 4 and a diagram showing movement loci thereof.

FIG. 8 shows a configuration and movement loci of the zoom lens of Example 4. The zoom lens of Example 4 consists of, in order from the object side to the image side, an object side positive group GP, an object side negative group GN, an intermediate group GM, and a final group GE. The object side positive group GP consists of one lens group which has a positive refractive power. The object side negative group GN consists of one lens group which has a negative refractive power. The intermediate group GM consists of, in order from the object side to the image side, two lens groups including a first M lens group GM1 that has a positive refractive power and a second M lens group GM2 that has a negative refractive power. The final group GE consists of one lens group which has a positive refractive power. The first M lens group GM1 includes an aperture stop St.

During zooming from the wide-angle end to the telephoto end, the final group GE remains stationary with respect to the image plane Sim, and the other lens groups move by changing the spacings between the adjacent lens groups. The zoom lens includes only one focusing group. The focusing group consists of one lens which is closest to the image side in the object side negative group GN. During focusing from the infinite distance object to the close-range object, the focusing group moves toward the object side. The vibration-proof group consists of the second M lens group GM2.

Figure 9:
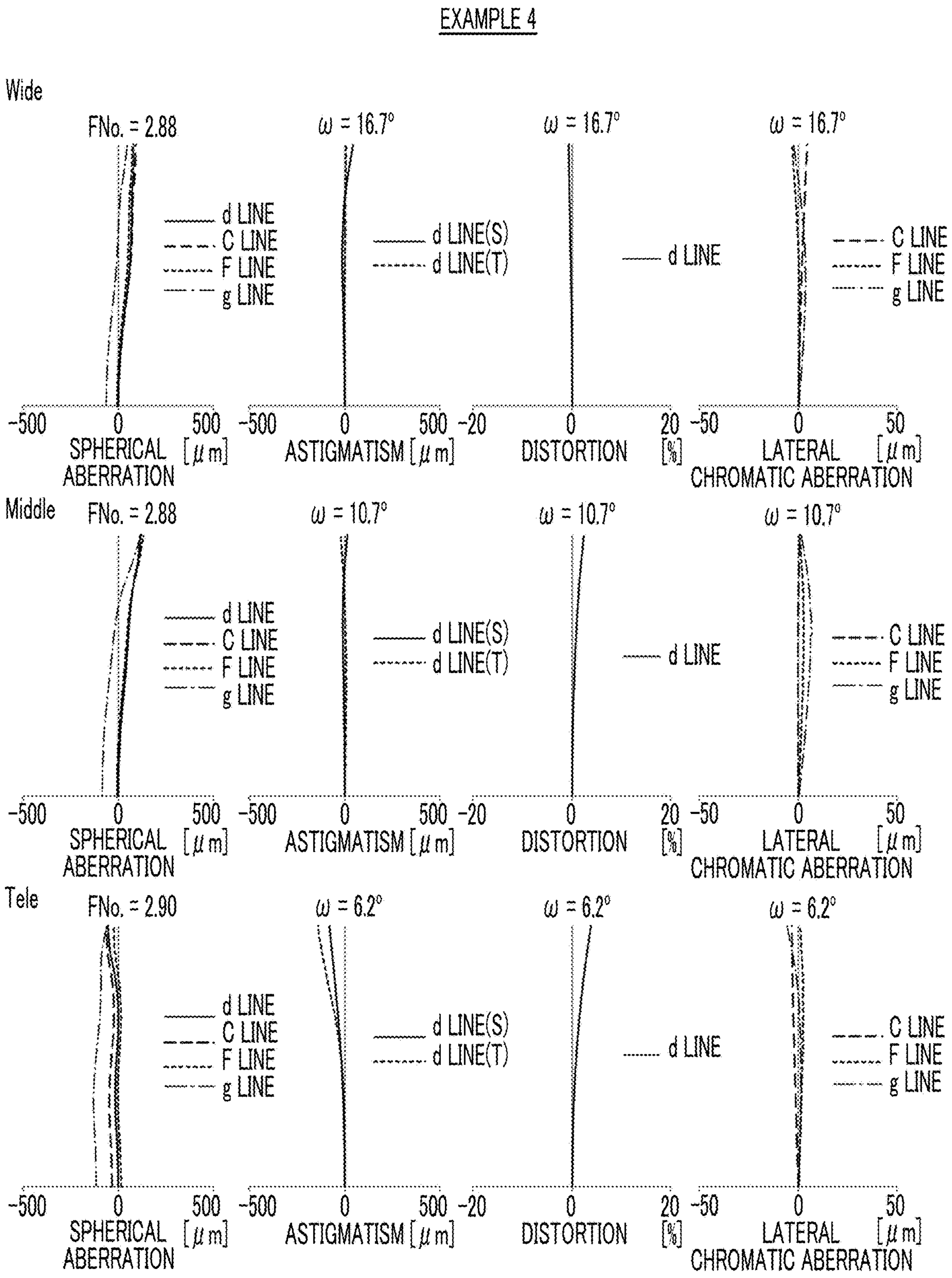
FIG. 9 is a diagram showing aberrations of the zoom lens of Example 4.

Regarding the zoom lens of Example 4, Table 10 shows basic lens data, Table 11 shows specifications and variable surface spacings, and Table 12 shows aspherical coefficients thereof. FIG. 9 shows aberration diagrams thereof.

TABLE 10

Example 4

| Sn | R | D | Nd | νd | θgF |
|---|---|---|---|---|---|
| 1 | 112.5378 | 2.2498 | 1.91650 | 31.60 | 0.5912 |
| 2 | 64.2134 | 7.0199 | 1.49700 | 81.54 | 0.5375 |
| 3 | 279.0310 | 0.1999 | | | |
| 4 | 76.4118 | 6.7998 | 1.43875 | 94.66 | 0.5340 |
| 5 | −665.0768 | DD[5] | | | |
| *6 | 67.9408 | 2.1606 | 2.00178 | 19.32 | 0.6448 |
| *7 | 61.7076 | 3.7932 | | | |
| 8 | −238.8919 | 1.1098 | 1.49700 | 81.54 | 0.5375 |
| 9 | 26.5642 | 3.4998 | 1.98613 | 16.48 | 0.6656 |
| 10 | 37.9008 | 10.0919 | | | |
| *11 | −26.0477 | 1.1000 | 1.51633 | 64.06 | 0.5334 |
| *12 | 73.3224 | DD[12] | | | |
| 13(St) | ∞ | 1.3000 | | | |
| *14 | 48.0953 | 5.4331 | 1.49710 | 81.56 | 0.5385 |
| *15 | −35.9908 | 0.5784 | | | |
| 16 | 64.1146 | 10.0102 | 1.43875 | 94.66 | 0.5340 |
| 17 | −24.9998 | 1.4388 | 1.95906 | 17.47 | 0.6599 |
| 18 | −29.2832 | 0.1000 | | | |
| 19 | −90.0654 | 3.8959 | 1.49700 | 81.54 | 0.5375 |
| 20 | −34.0355 | DD[20] | | | |
| 21 | 657.8134 | 4.1285 | 2.05090 | 26.94 | 0.6052 |
| 22 | −36.0388 | 0.9601 | 1.84666 | 23.78 | 0.6205 |
| 23 | 29.9262 | 4.3445 | | | |
| 24 | −39.9712 | 1.0000 | 1.95375 | 32.32 | 0.5901 |
| 25 | 164.2657 | DD[25] | | | |
| *26 | 52.5133 | 5.0000 | 2.00178 | 19.32 | 0.6448 |
| *27 | −58.1718 | 11.9572 | | | |
| 28 | 136.0172 | 3.8367 | 1.51742 | 52.43 | 0.5565 |
| 29 | −39.6957 | 0.9998 | 2.00069 | 25.46 | 0.6136 |
| 30 | 31.1927 | 4.8550 | 1.51742 | 52.43 | 0.5565 |
| 31 | −113.3294 | 18.3026 | | | |
| 32 | ∞ | 2.8500 | 1.54763 | 54.98 | 0.5525 |
| 33 | ∞ | 1.0161 | | | |

TABLE 11

Example 4

| | Wide | Middle | Tele |
|---|---|---|---|
| Zr | 1.0 | 1.5 | 2.6 |
| f | 48.36 | 74.43 | 127.62 |
| Bf | 21.16 | 21.16 | 21.16 |
| FNo. | 2.88 | 2.88 | 2.90 |
| 2ω[°] | 33.4 | 21.4 | 12.4 |
| DD[5] | 1.9968 | 33.5598 | 58.0003 |
| DD[12] | 17.2747 | 11.8158 | 2.9919 |
| DD[20] | 2.0001 | 3.2287 | 5.7953 |
| DD[25] | 8.9914 | 7.0738 | 4.9806 |

TABLE 12

| Example 4 | | | | |
|---|---|---|---|---|
| Sr | 6 | 7 | 11 | 12 |
| KA | 1.0000000E+00 | 1.0000000E+00 | 1.0000000E+00 | 1.0000000E+00 |
| A4 | 2.0870851E−05 | 2.3307273E−05 | −1.7725316E−06 | −7.6540485E−06 |
| A6 | −1.0113707E−08 | −8.9008957E−09 | −1.1244366E−08 | 5.9521692E−09 |
| A8 | 1.2819148E−10 | 1.9460301E−10 | 2.6060512E−11 | −3.0688670E−13 |
| A10 | −5.0512587E−13 | −1.2549123E−12 | 2.4645485E−13 | 1.1936443E−14 |
| A12 | 2.8980111E−15 | 9.8009151E−15 | 8.7508926E−16 | 5.1434042E−16 |
| A14 | −7.2128287E−18 | −3.6608222E−17 | 5.4839203E−18 | 2.6181814E−18 |
| A16 | 1.5620258E−20 | 8.5275056E−20 | −1.9282598E−20 | −1.5179250E−20 |
| Sr | 14 | 15 | 26 | 27 |
| KA | 1.0000000E+00 | 1.0000000E+00 | 1.0000000E+00 | 1.0000000E+00 |
| A4 | −1.7111347E−05 | 1.0686273E−05 | −3.3006038E−06 | 1.9774661E−06 |
| A6 | 7.2509283E−09 | 1.1311766E−08 | −6.8880967E−09 | −9.2195203E−09 |
| A8 | −1.7425347E−11 | −7.4493915E−12 | 3.8639285E−11 | 3.7779046E−11 |
| A10 | −3.1465898E−13 | 2.9358158E−14 | −1.2202630E−13 | −7.8182003E−14 |
| A12 | 2.8992503E−16 | −3.6831022E−16 | 3.0860469E−16 | 3.5992858E−16 |
| A14 | −6.0065057E−19 | −2.2579542E−18 | 3.8864598E−21 | −1.3381725E−18 |
| A16 | −1.7770492E−20 | −9.3306622E−21 | −3.4655292E−21 | −3.5834315E−22 |

EXAMPLE 5

Figure 10:
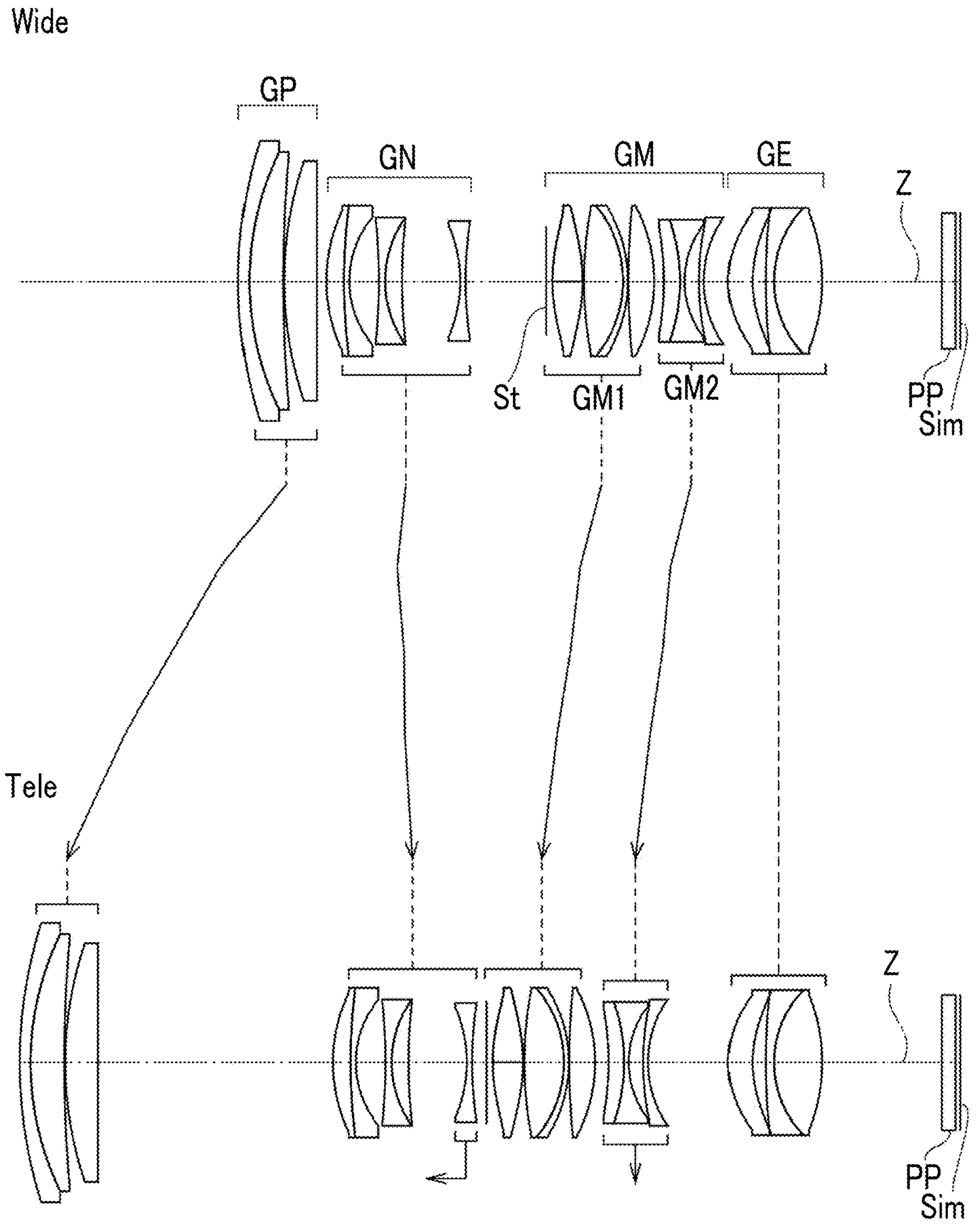
FIG. 10 is a cross-sectional view of a configuration of a zoom lens of Example 5 and a diagram showing movement loci thereof.

FIG. 10 shows a configuration and movement loci of a zoom lens of Example 5. The zoom lens of Example 5 consists of, in order from the object side to the image side, an object side positive group GP, an object side negative group GN, an intermediate group GM, and a final group GE. The object side positive group GP consists of one lens group which has a positive refractive power. The object side negative group GN consists of one lens group which has a negative refractive power. The intermediate group GM consists of, in order from the object side to the image side, two lens groups including a first M lens group GM1 that has a positive refractive power and a second M lens group GM2 that has a negative refractive power. The final group GE consists of one lens group which has a positive refractive power. The first M lens group GM1 includes an aperture stop St.

During zooming from the wide-angle end to the telephoto end, the final group GE remains stationary with respect to the image plane Sim, and the other lens groups move by changing the spacings between the adjacent lens groups. The zoom lens includes only one focusing group. The focusing group consists of one lens which is closest to the image side in the object side negative group GN. During focusing from the infinite distance object to the close-range object, the focusing group moves toward the object side. The vibration-proof group consists of the second M lens group GM2.

Figure 11:
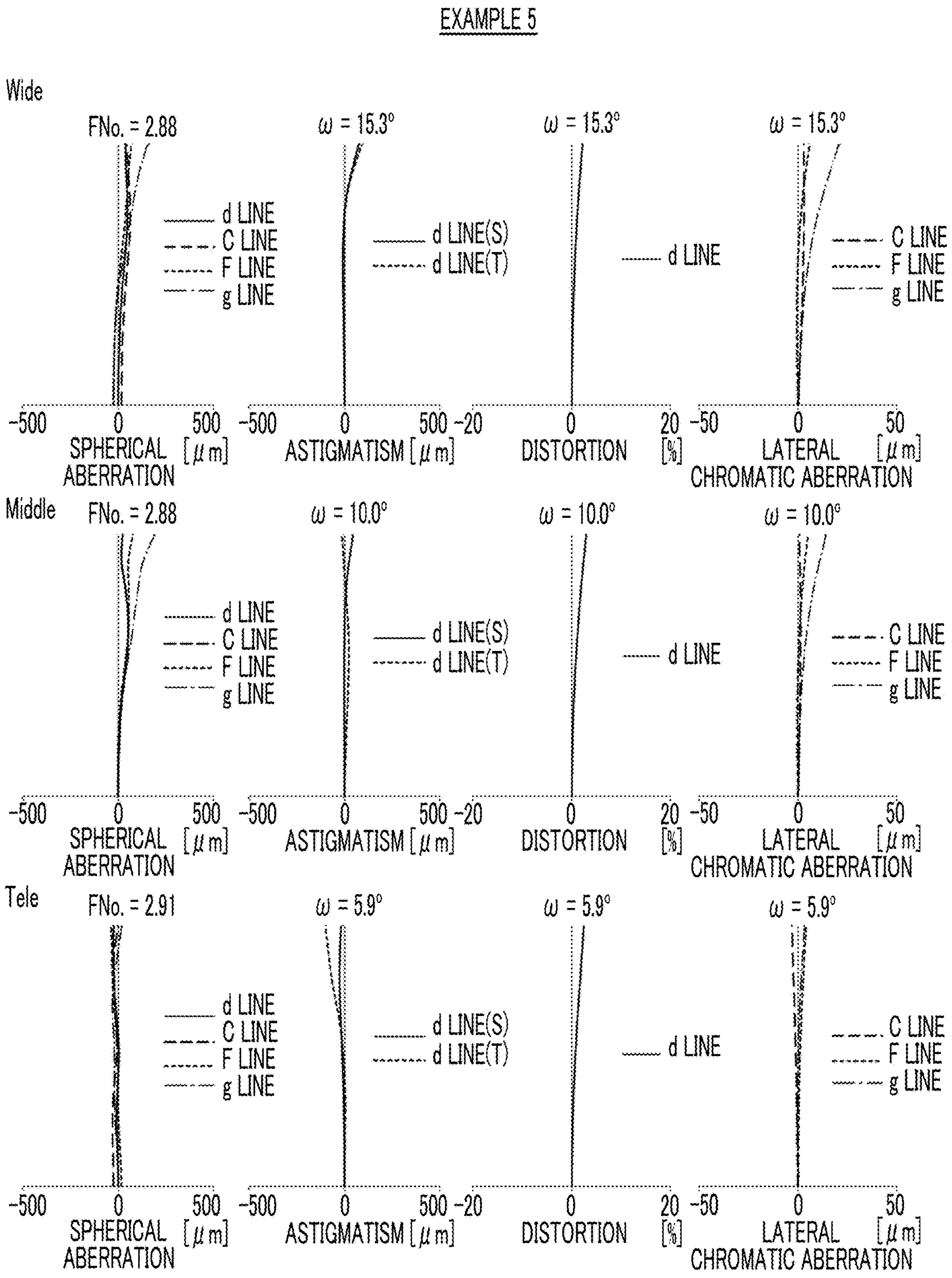
FIG. 11 is a diagram showing aberrations of the zoom lens of Example 5.

Regarding the zoom lens of Example 5, Table 13 shows basic lens data, Table 14 shows specifications and variable surface spacings, and Table 15 shows aspherical coefficients thereof. FIG. 11 shows aberration diagrams thereof.

TABLE 13

| Example 5 | | | | | |
|---|---|---|---|---|---|
| Sn | R | D | Nd | νd | θgF |
| 1 | 101.6299 | 2.2498 | 1.80610 | 33.27 | 0.5885 |
| 2 | 64.0986 | 7.0198 | 1.49700 | 81.54 | 0.5375 |
| 3 | 309.4385 | 0.1998 | | | |
| 4 | 81.3138 | 6.7998 | 1.43875 | 94.66 | 0.5340 |
| 5 | 22235.9155 | DD[5] | | | |
| 6 | 35.6996 | 3.6492 | 1.80809 | 22.76 | 0.6307 |

TABLE 13-continued

| Example 5 | | | | | |
|---|---|---|---|---|---|
| Sn | R | D | Nd | νd | θgF |
| 7 | 126.6377 | 1.1098 | 1.65160 | 58.54 | 0.5390 |
| 8 | 21.4125 | 6.2653 | | | |
| 9 | −129.1274 | 1.3098 | 1.78472 | 25.68 | 0.6162 |
| 10 | 23.7538 | 3.4998 | 2.05090 | 26.94 | 0.6052 |
| 11 | 116.9497 | 12.1440 | | | |
| *12 | −29.3830 | 1.0998 | 1.51633 | 64.06 | 0.5334 |
| *13 | 86.1432 | DD[13] | | | |
| 14(St) | ∞ | 1.2998 | | | |
| *15 | 37.1871 | 6.3071 | 1.49710 | 81.56 | 0.5385 |
| *16 | −37.0608 | 0.2736 | | | |
| 17 | 85.1295 | 8.2386 | 1.43875 | 94.66 | 0.5340 |
| 18 | −24.9998 | 1.0165 | 1.98613 | 16.48 | 0.6656 |
| 19 | −30.3607 | 0.1000 | | | |
| 20 | 171.4293 | 5.3648 | 1.49700 | 81.54 | 0.5375 |
| 21 | −34.5797 | DD[21] | | | |
| 22 | −65.8345 | 3.3592 | 1.98613 | 16.48 | 0.6656 |
| 23 | −40.1462 | 0.9600 | 1.51742 | 52.43 | 0.5565 |
| 24 | 20.1497 | 3.0000 | | | |
| 25 | 61.1951 | 0.9998 | 1.72916 | 54.68 | 0.5445 |
| 26 | 24.3224 | DD[26] | | | |
| *27 | 22.0371 | 5.0332 | 1.51633 | 64.06 | 0.5334 |
| *28 | 26.9355 | 2.7294 | | | |
| 29 | 140.7640 | 1.7142 | 1.95375 | 32.32 | 0.5901 |
| 30 | 22.8133 | 10.0102 | 1.63980 | 34.47 | 0.5923 |
| 31 | −40.0952 | 25.0219 | | | |
| 32 | ∞ | 2.8500 | 1.54763 | 54.98 | 0.5525 |
| 33 | ∞ | 1.0060 | | | |

TABLE 14

| Example 5 | | | |
|---|---|---|---|
| | Wide | Middle | Tele |
| Zr | 1.0 | 1.5 | 2.6 |
| f | 51.65 | 79.51 | 136.33 |
| Bf | 27.87 | 27.87 | 27.87 |
| FNo. | 2.88 | 2.88 | 2.91 |
| 2ω[°] | 30.6 | 20.0 | 11.8 |
| DD[5] | 1.9931 | 25.0861 | 48.8920 |
| DD[13] | 16.7700 | 10.7082 | 2.9828 |
| DD[21] | 1.9998 | 2.5241 | 2.7974 |
| DD[26] | 4.9927 | 10.9289 | 16.6193 |

TABLE 15

| Example 5 | | |
|---|---|---|
| Sn | 12 | 13 |
| KA | 1.0000000E+00 | 1.0000000E+00 |
| A4 | 4.5449921E−06 | −9.8866047E−07 |
| A6 | −9.9406226E−09 | 3.5920253E−09 |
| A8 | 2.7251640E−10 | −2.6491626E−11 |
| A10 | −3.1089106E−12 | −3.1607974E−14 |
| A12 | 1.0395367E−14 | −2.2522290E−15 |
| A14 | 1.3435914E−17 | 2.1280859E−17 |
| A16 | −9.0724063E−20 | −4.6893900E−20 |
| Sn | 15 | 16 |
| KA | 1.0000000E+00 | 1.0000000E+00 |
| A3 | 0.0000000E+00 | 0.0000000E+00 |
| A4 | −1.6902979E−05 | 1.5834113E−05 |
| A5 | 1.3079661E−07 | 6.8571048E−08 |
| A6 | −4.7883043E−09 | −1.2607713E−09 |
| A7 | −1.7415163E−10 | −1.6764941E−10 |
| A8 | 4.1530893E−11 | 2.8625926E−11 |
| A9 | 3.7737266E−12 | 3.9850437E−12 |
| A10 | −3.7786752E−13 | −1.9096682E−13 |
| A11 | −1.8039123E−14 | 5.1645811E−16 |
| A12 | 4.9885086E−16 | −1.1714858E−15 |
| A13 | −6.1316468E−17 | −2.4405235E−17 |
| A14 | 9.4197606E−18 | 4.5268823E−18 |
| A15 | 4.7387715E−19 | 8.0955690E−19 |
| A16 | −5.6147089E−20 | −5.8881217E−20 |
| Sn | 27 | 28 |
| KA | 1.0000000E+00 | 1.0000000E+00 |
| A4 | −1.5167055E−06 | −5.0054577E−06 |
| A6 | −5.8734252E−08 | −7.0263956E−08 |
| A8 | 4.1850902E−11 | 8.8354240E−11 |
| A10 | 3.2827873E−13 | 4.0018190E−13 |
| A12 | −8.3498646E−16 | −9.6796262E−16 |
| A14 | −1.2639034E−18 | −4.3500969E−18 |
| A16 | −6.0077084E−21 | 8.5162979E−23 |

EXAMPLE 6

Figure 12:
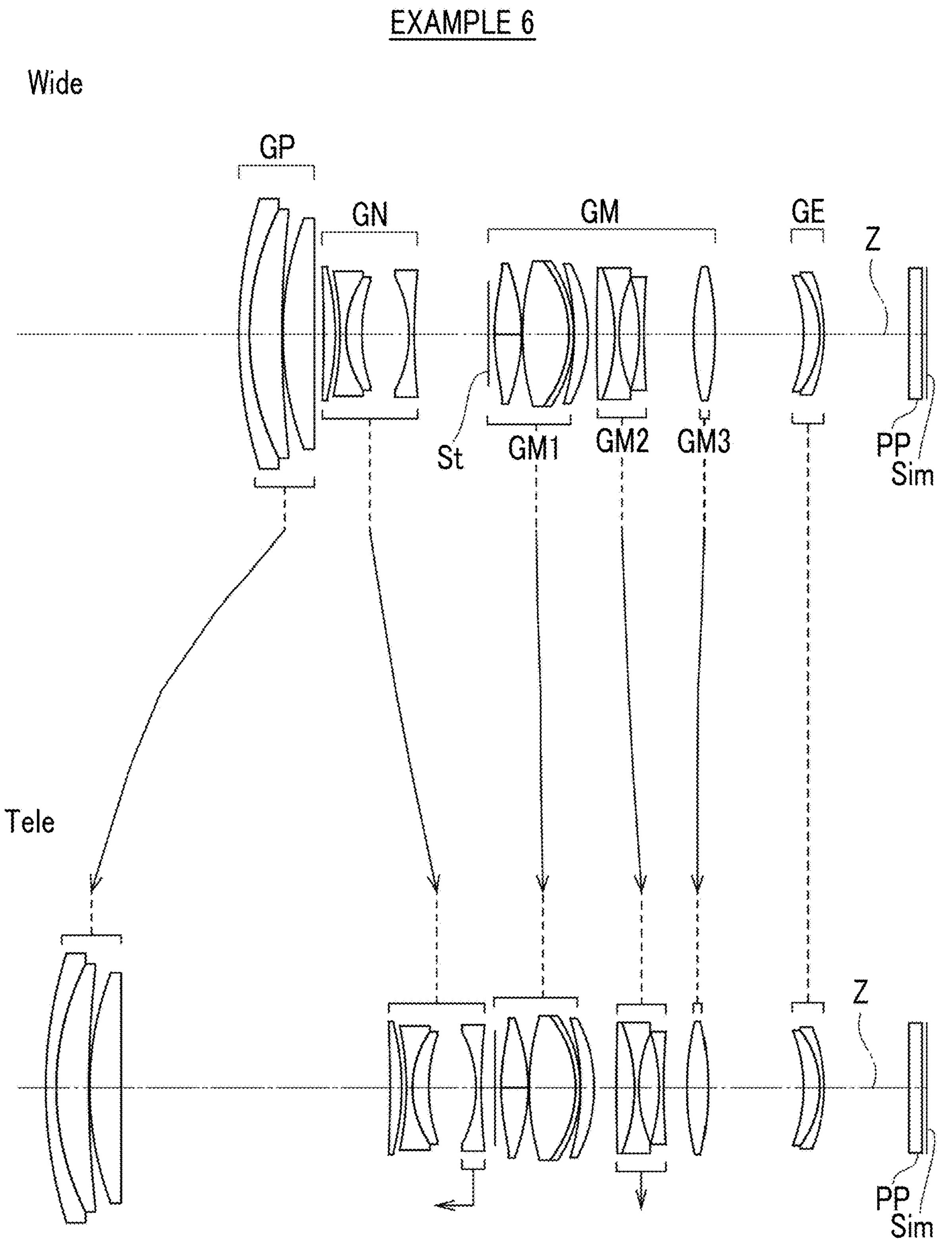
FIG. 12 is a cross-sectional view of a configuration of a zoom lens of Example 6 and a diagram showing movement loci thereof.

FIG. 12 shows a configuration and movement loci of a zoom lens of Example 6. The zoom lens of Example 6 consists of, in order from the object side to the image side, an object side positive group GP, an object side negative group GN, an intermediate group GM, and a final group GE. The object side positive group GP consists of one lens group which has a positive refractive power. The object side negative group GN consists of one lens group which has a negative refractive power. The intermediate group GM consists of three lens groups, in order from the object side to the image side, a first M lens group GM1 that has a positive refractive power, a second M lens group GM2 that has a negative refractive power, and a third M lens group GM3 that has a positive refractive power. The final group GE consists of one lens group which has a negative refractive power. The first M lens group GM1 includes an aperture stop St.

During zooming from the wide-angle end to the telephoto end, the final group GE remains stationary with respect to the image plane Sim, and the other lens groups move by changing the spacings between the adjacent lens groups. The zoom lens includes only one focusing group. The focusing group consists of one lens which is closest to the image side in the object side negative group GN. During focusing from the infinite distance object to the close-range object, the focusing group moves toward the object side. The vibration-proof group consists of the second M lens group GM2.

Figure 13:
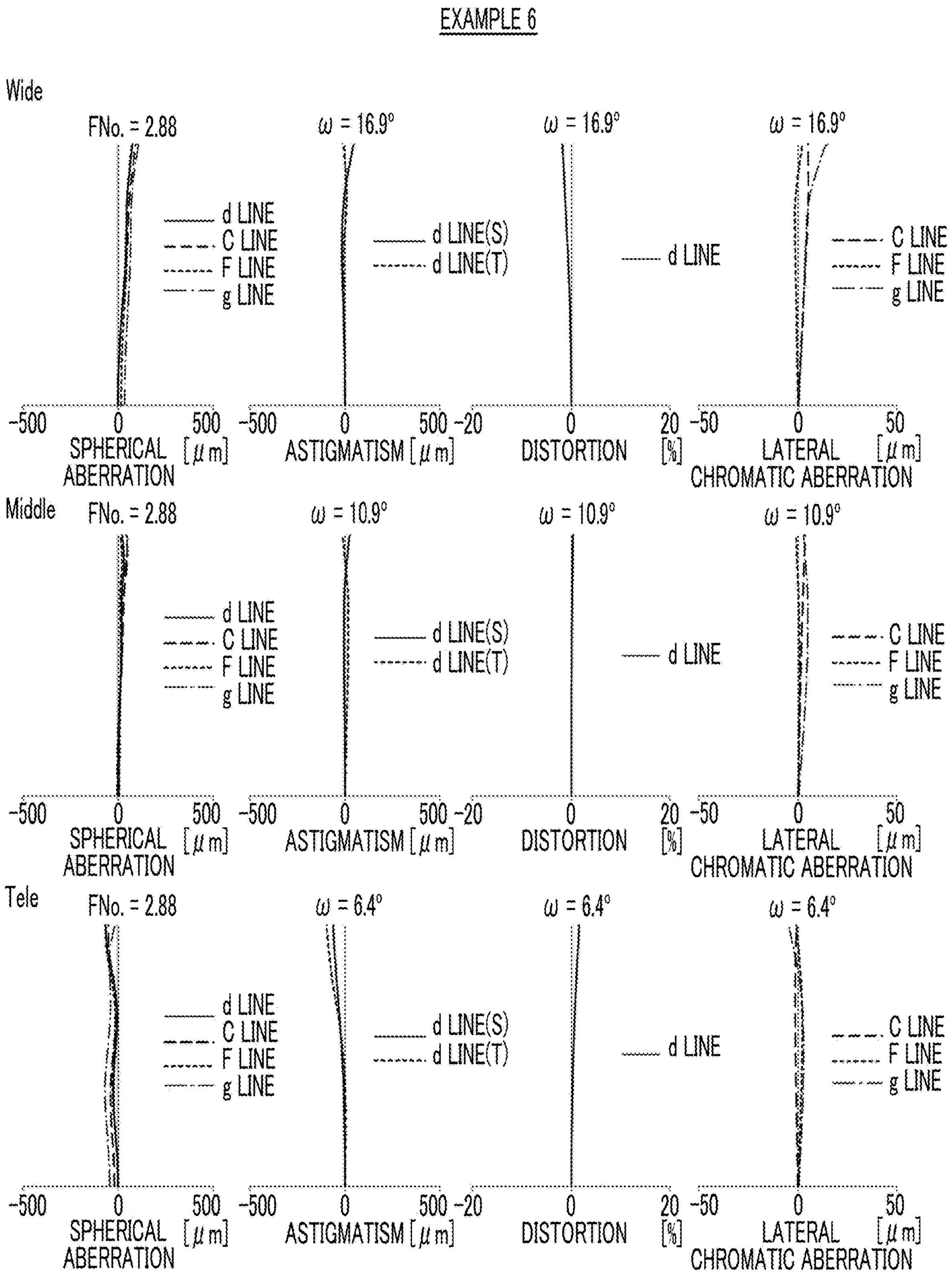
FIG. 13 is a diagram showing aberrations of the zoom lens of Example 6.

Regarding the zoom lens of Example 6, Table 16 shows basic lens data, Table 17 shows specifications and variable surface spacings, and Table 18 shows aspherical coefficients thereof. FIG. 13 shows aberration diagrams thereof.

TABLE 16

| Example 6 | | | | | |
|---|---|---|---|---|---|
| Sn | R | D | Nd | νd | θgF |
| 1 | 101.6298 | 2.2498 | 1.90110 | 27.06 | 0.6072 |
| 2 | 62.8070 | 7.0198 | 1.49700 | 81.54 | 0.5375 |
| 3 | 243.4924 | 0.1998 | | | |
| 4 | 73.6249 | 6.7998 | 1.43875 | 94.66 | 0.5340 |
| 5 | −29119.8134 | DD[5] | | | |
| *6 | −262.5447 | 2.5002 | 1.82115 | 24.06 | 0.6237 |
| *7 | −53.0492 | 0.9998 | | | |
| 8 | −66.6483 | 1.3100 | 1.64000 | 60.08 | 0.5370 |
| 9 | 22.3830 | 3.4998 | 1.84666 | 23.78 | 0.6205 |
| 10 | 36.4729 | 10.2039 | | | |
| *11 | −27.4716 | 1.0998 | 1.58913 | 61.25 | 0.5374 |
| *12 | 111.1680 | DD[12] | | | |
| 13(St) | ∞ | 1.2998 | | | |
| *14 | 44.1708 | 5.8515 | 1.49710 | 81.56 | 0.5385 |
| *15 | −34.9462 | 0.1998 | | | |
| 16 | 57.1727 | 10.0100 | 1.43875 | 94.66 | 0.5340 |
| 17 | −25.7053 | 0.9998 | 2.10420 | 17.02 | 0.6631 |
| 18 | −28.7137 | 0.1000 | | | |
| 19 | −53.9354 | 2.9998 | 1.49700 | 81.54 | 0.5375 |
| 20 | −33.2910 | DD[20] | | | |
| 21 | 519.5504 | 3.8617 | 2.05090 | 26.94 | 0.6052 |
| 22 | −39.9331 | 0.9598 | 1.80809 | 22.76 | 0.6307 |
| 23 | 30.9582 | 4.3414 | | | |
| 24 | −42.0002 | 0.9998 | 2.05090 | 26.94 | 0.6052 |
| 25 | 161.1021 | DD[25] | | | |
| *26 | 61.5389 | 4.4998 | 2.00178 | 19.32 | 0.6448 |
| *27 | −67.8520 | DD[27] | | | |
| 28 | −36.0237 | 3.5099 | 1.51680 | 64.20 | 0.5343 |
| 29 | −21.4250 | 1.0002 | 2.00272 | 19.32 | 0.6451 |
| 30 | −35.7475 | 18.3015 | | | |
| 31 | ∞ | 2.8500 | 1.54763 | 54.98 | 0.5525 |
| 32 | ∞ | 1.0084 | | | |

TABLE 17

| Example 6 | | | |
|---|---|---|---|
| | Wide | Middle | Tele |
| Zr | 1.0 | 1.5 | 2.6 |
| f | 48.40 | 74.51 | 127.75 |
| Bf | 21.15 | 21.15 | 21.15 |
| FNo. | 2.88 | 2.88 | 2.88 |
| 2ω[°] | 33.8 | 21.8 | 12.8 |
| DD[5] | 1.9964 | 33.9897 | 58.0008 |
| DD[12] | 15.9958 | 11.3186 | 2.9825 |
| DD[20] | 1.9998 | 2.5127 | 4.8252 |
| DD[25] | 10.6824 | 7.9296 | 4.9936 |
| DD[27] | 19.0371 | 20.3507 | 20.4930 |

TABLE 18

| Example 6 | | | | |
|---|---|---|---|---|
| Sn | 6 | 7 | 11 | 12 |
| KA | 1.0000000E+00 | 1.0000000E+00 | 1.0000000E+00 | 1.0000000E+00 |
| A4 | 3.8170767E−06 | 5.5161992E−06 | −3.3975537E−06 | −7.3012835E−06 |
| A6 | −1.0198135E−08 | −1.2674578E−08 | 1.0697476E−08 | 2.2716037E−08 |
| A8 | 3.5922721E−11 | 2.8426706E−11 | −1.2438789E−11 | 9.1136304E−12 |
| A10 | −5.0632169E−14 | −1.4887300E−14 | 7.3972724E−13 | −2.3704049E−13 |
| A12 | 1.3370332E−16 | 6.1475624E−16 | −1.9724724E−16 | 2.3661182E−16 |
| A14 | −3.5144097E−19 | −3.9548513E−18 | −2.7380220E−17 | 4.8500076E−18 |
| A16 | −2.4779299E−21 | 4.4173109E−21 | 7.7027669E−20 | −1.8532897E−20 |
| Sn | 14 | 15 | 26 | 27 |
| KA | 1.0000000E+00 | 1.0000000E+00 | 1.0000000E+00 | 1.0000000E+00 |
| A4 | −1.6582735E−05 | 1.1359723E−05 | −1.7289072E−06 | 7.9095895E−07 |
| A6 | 9.2186602E−09 | 1.4519771E−08 | −4.5132882E−09 | −8.5680820E−09 |
| A8 | −3.9054977E−12 | 1.8972285E−12 | 2.1113890E−11 | 4.9360905E−11 |
| A10 | −2.9483025E−13 | 4.3717048E−14 | 7.9345408E−14 | −2.9528224E−14 |
| A12 | 2.5938195E−16 | −2.3545100E−16 | −6.2909109E−16 | −5.7766478E−16 |
| A14 | −4.4691973E−20 | −1.8565920E−18 | 8.5561676E−19 | 1.8058743E−18 |
| A16 | −1.6563025E−20 | −9.5131787E−21 | 4.7507871E−22 | −1.6022256E−21 |

EXAMPLE 7

Figure 14:
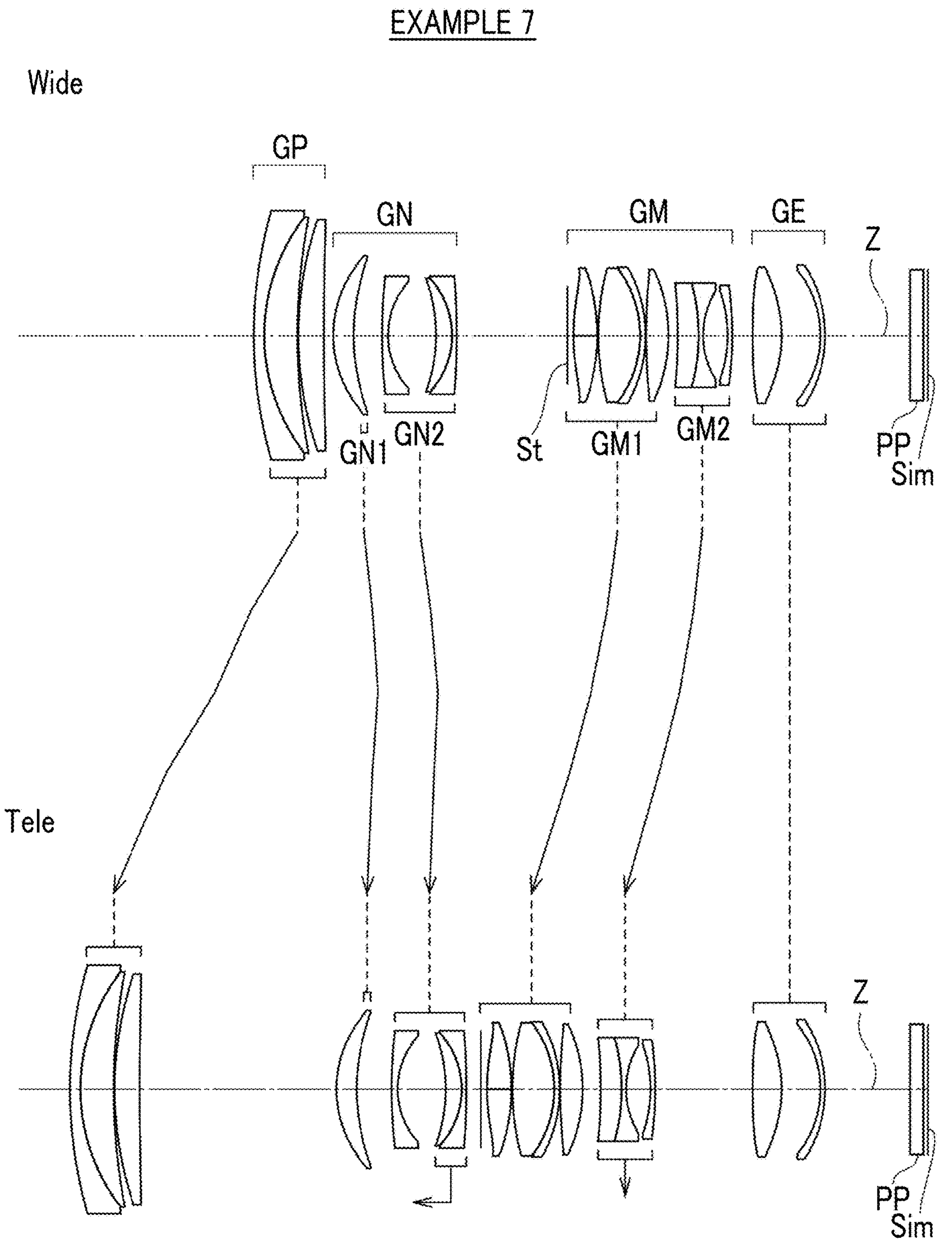
FIG. 14 is a cross-sectional view of a configuration of a zoom lens of Example 7 and a diagram showing movement loci thereof.

FIG. 14 shows a configuration and movement loci of the zoom lens of Example 7. The zoom lens of Example 7 consists of, in order from the object side to the image side, an object side positive group GP, an object side negative group GN, an intermediate group GM, and a final group GE. The object side positive group GP consists of one lens group which has a positive refractive power. The object side negative group GN consists of, in order from the object side to the image side, two lens groups including a first N lens group GN1 that has a positive refractive power and a second N lens group GN2 that has a negative refractive power. The intermediate group GM consists of, in order from the object side to the image side, two lens groups including a first M lens group GM1 that has a positive refractive power and a second M lens group GM2 that has a negative refractive power. The final group GE consists of one lens group which has a positive refractive power. The first M lens group GM1 includes an aperture stop St.

During zooming from the wide-angle end to the telephoto end, the final group GE remains stationary with respect to the image plane Sim, and the other lens groups move by changing the spacings between the adjacent lens groups. The zoom lens includes only one focusing group. The focusing group consists of two lenses which are first and second from the image side of the second N lens group GN2. During focusing from the infinite distance object to the close-range object, the focusing group moves toward the object side. The vibration-proof group consists of the second M lens group GM2.

Figure 15:
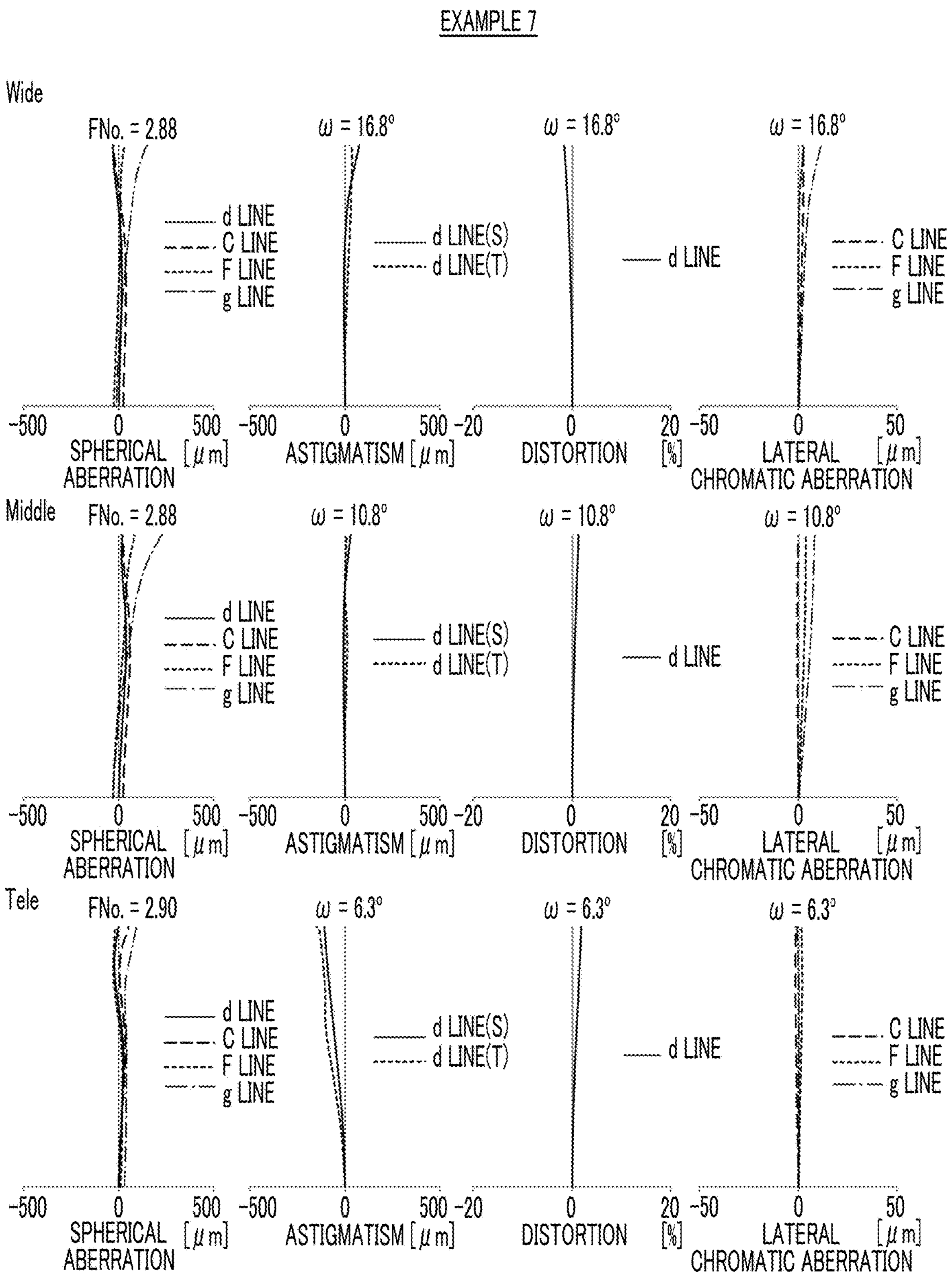
FIG. 15 is a diagram showing aberrations of the zoom lens of Example 7.

Regarding the zoom lens of Example 7, Table 19 shows basic lens data, Table 20 shows specifications and variable surface spacings, and Table 21 shows aspherical coefficients thereof. FIG. 15 shows aberration diagrams thereof.

TABLE 19

| Example 7 | | | | | |
|---|---|---|---|---|---|
| Sn | R | D | Nd | νd | θgF |
| 1 | 101.6288 | 2.2698 | 1.57501 | 41.50 | 0.5767 |
| 2 | 43.4976 | 7.1530 | 1.49700 | 81.54 | 0.5375 |
| 3 | 142.5938 | 0.1998 | | | |

TABLE 19-continued

| Example 7 | | | | | |
|---|---|---|---|---|---|
| Sn | R | D | Nd | νd | θgF |
| 4 | 81.0671 | 5.4998 | 1.43875 | 94.66 | 0.5340 |
| 5 | 889.1019 | DD[5] | | | |
| *6 | 25.9659 | 4.3763 | 1.88202 | 37.22 | 0.5770 |
| *7 | 44.0877 | DD[7] | | | |
| 8 | 118.9783 | 1.2998 | 1.72916 | 54.68 | 0.5445 |
| 9 | 17.9567 | 10.3418 | | | |
| 10 | −36.7929 | 3.4496 | 1.68893 | 31.07 | 0.6004 |
| 11 | −18.8855 | 1.0000 | 1.80400 | 46.53 | 0.5578 |
| 12 | −167.9044 | DD[12] | | | |
| 13(St) | ∞ | 1.2998 | | | |
| *14 | 44.2510 | 5.2821 | 1.49710 | 81.56 | 0.5385 |
| *15 | −39.0192 | 0.1998 | | | |
| 16 | 58.2112 | 9.0050 | 1.43875 | 94.66 | 0.5340 |
| 17 | −25.0000 | 1.1803 | 2.10420 | 17.02 | 0.6631 |
| 18 | −31.0391 | 0.0999 | | | |
| 19 | 133.7621 | 4.8292 | 1.49700 | 81.54 | 0.5375 |
| 20 | −34.5458 | DD[20] | | | |
| 21 | −118.1317 | 4.5002 | 1.98613 | 16.48 | 0.6656 |
| 22 | −43.6248 | 0.9598 | 1.72916 | 54.68 | 0.5445 |
| 23 | 19.0939 | 5.2625 | | | |
| 24 | −29.9949 | 0.9998 | 1.51680 | 64.20 | 0.5343 |
| 25 | −84.2491 | DD[25] | | | |
| *26 | 217.4563 | 6.2337 | 1.58913 | 61.25 | 0.5374 |
| *27 | −29.1078 | 8.3491 | | | |
| 28 | −23.2387 | 1.0998 | 1.94595 | 17.98 | 0.6546 |
| 29 | −28.5980 | 18.3171 | | | |
| 30 | ∞ | 2.8500 | 1.54763 | 54.98 | 0.5525 |
| 31 | ∞ | 1.0154 | | | |

TABLE 20

| Example 7 | | | |
|---|---|---|---|
| | Wide | Middle | Tele |
| Zr | 1.0 | 1.5 | 2.6 |
| f | 48.49 | 74.64 | 127.98 |
| Bf | 21.17 | 21.17 | 21.17 |
| FNo. | 2.88 | 2.88 | 2.90 |
| 2ω[°] | 33.6 | 21.6 | 12.6 |
| DD[5] | 1.9953 | 22.8442 | 42.3768 |

TABLE 20-continued

| Example 7 | | | |
|---|---|---|---|
| | Wide | Middle | Tele |
| DD[7] | 6.2350 | 7.0919 | 7.6207 |
| DD[12] | 23.6660 | 14.0388 | 2.9824 |
| DD[20] | 1.9998 | 2.8807 | 4.0054 |
| DD[25] | 4.4222 | 9.3045 | 21.0287 |

TABLE 21

| Example 7 | | |
|---|---|---|
| Sn | 6 | 7 |
| KA | 1.0000000E+00 | 1.0000000E+00 |
| A4 | −5.6651024E−07 | −3.3599707E−06 |
| A6 | −1.2057743E−09 | −2.0270238E−09 |
| A8 | 2.2107233E−12 | 5.1958660E−12 |
| A10 | −2.4405714E−14 | −6.8015753E−14 |
| A12 | 6.1112587E−17 | 3.9174780E−16 |
| A14 | −7.6858372E−20 | −1.1937971E−18 |
| A16 | −1.6563690E−22 | 1.3560795E−21 |
| Sn | 14 | 15 |
| KA | 1.0000000E+00 | 1.0000000E+00 |
| A3 | 0.0000000E+00 | 0.0000000E+00 |
| A4 | −1.8523361E−05 | 8.9791788E−06 |
| A5 | 1.8107805E−07 | 6.2415642E−08 |
| A6 | −2.4543293E−08 | −1.0705179E−08 |
| A7 | −4.2600814E−10 | −7.4280063E−11 |
| A8 | 4.3236134E−11 | −5.5563555E−12 |
| A9 | 3.5028685E−12 | 7.8119116E−13 |
| A10 | −4.3258725E−13 | −1.1607242E−13 |
| A11 | −2.9605732E−14 | 4.3908590E−15 |
| A12 | 9.4196765E−17 | −1.0261805E−15 |
| A13 | −6.8458961E−17 | −7.4035685E−17 |
| A14 | 9.4716662E−18 | 6.7994496E−19 |
| A15 | 5.5180691E−19 | 7.6977166E−19 |
| A16 | −6.6144571E−20 | −4.9471477E−20 |
| Sn | 26 | 27 |
| KA | 1.0000000E+00 | 1.0000000E+00 |
| A4 | 1.0794134E−05 | 9.6966926E−06 |
| A6 | 4.6472913E−09 | 1.0727208E−08 |
| A8 | −1.1425699E−10 | −1.3872361E−10 |
| A10 | 9.0056138E−13 | 8.2740961E−13 |
| A12 | −1.0057226E−15 | 4.7239237E−16 |
| A14 | −9.6114159E−18 | −1.6088634E−17 |
| A16 | 2.9917974E−20 | 3.9723074E−20 |

EXAMPLE 8

Figure 16:
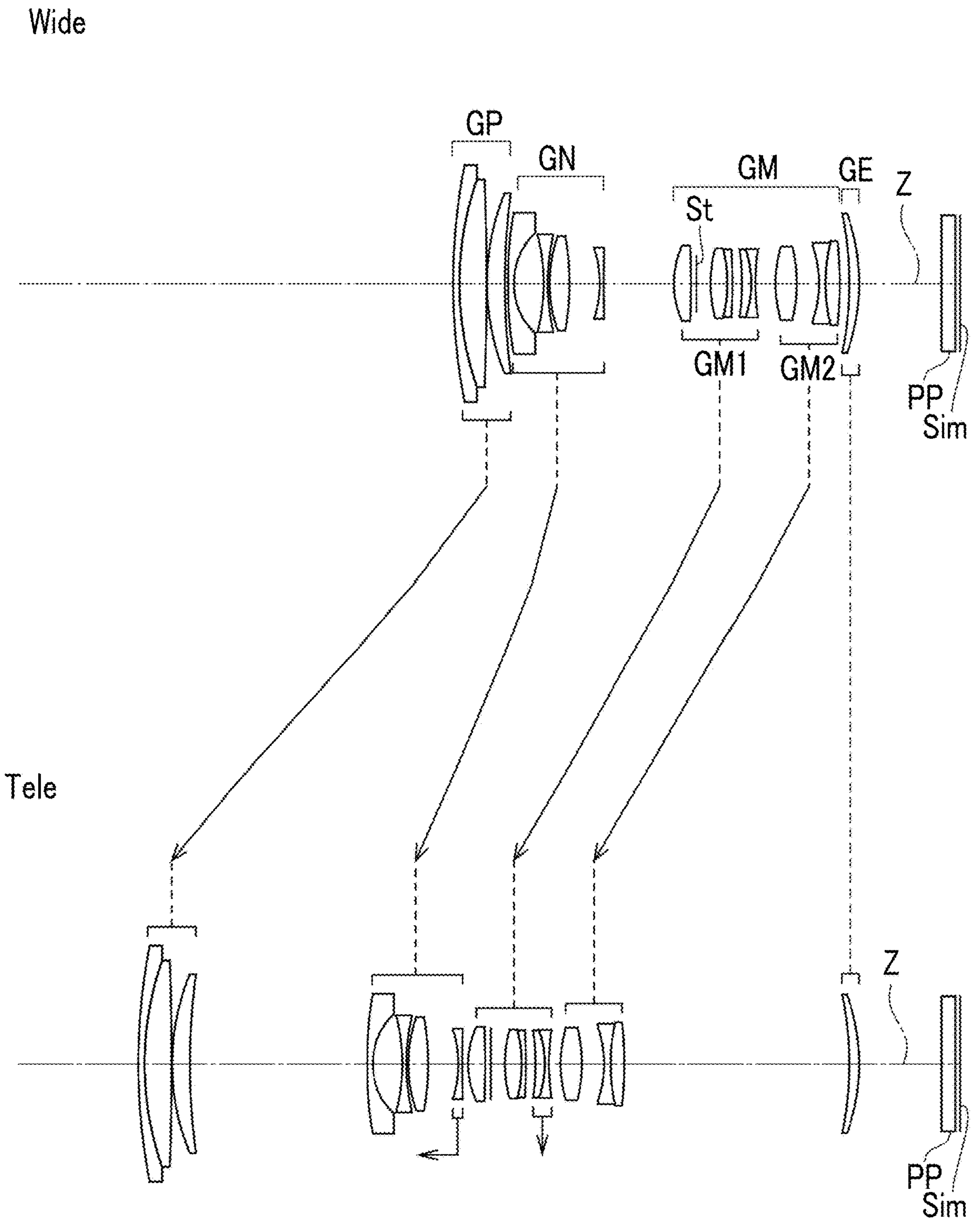
FIG. 16 is a cross-sectional view of a configuration of a zoom lens of Example 8 and a diagram showing movement loci thereof.

FIG. 16 shows a configuration and movement loci of the zoom lens of Example 8. The zoom lens of Example 8 consists of, in order from the object side to the image side, an object side positive group GP, an object side negative group GN, an intermediate group GM, and a final group GE. The object side positive group GP consists of one lens group which has a positive refractive power. The object side negative group GN consists of one lens group which has a negative refractive power. The intermediate group GM consists of, in order from the object side to the image side, two lens groups including a first M lens group GM1 that has a positive refractive power and a second M lens group GM2 that has a positive refractive power. The final group GE consists of one lens group which has a positive refractive power. The first M lens group GM1 includes an aperture stop St.

During zooming from the wide-angle end to the telephoto end, the final group GE remains stationary with respect to the image plane Sim, and the other lens groups move by changing the spacings between the adjacent lens groups. The zoom lens includes only one focusing group. The focusing group consists of one lens which is closest to the image side in the object side negative group GN. During focusing from the infinite distance object to the close-range object, the focusing group moves toward the object side. The vibration-proof group consists of two lenses which are first and second from the image side of the first M lens group GM1.

Figure 17:
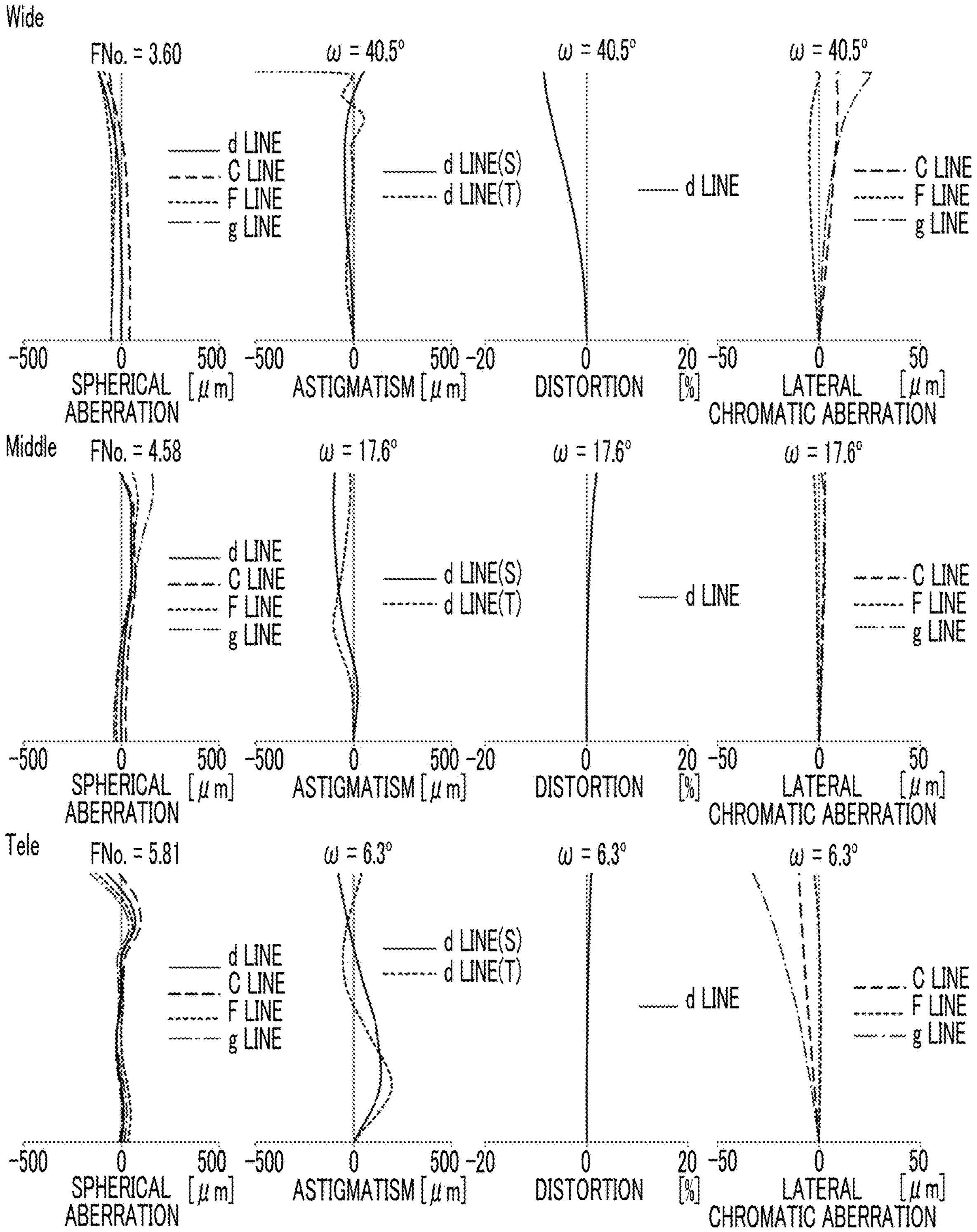
FIG. 17 is a diagram showing aberrations of the zoom lens of Example 8.

Regarding the zoom lens of Example 8, Table 22 shows basic lens data, Table 23 shows specifications and variable surface spacings, and Table 24 shows aspherical coefficients thereof. FIG. 17 shows aberration diagrams thereof.

TABLE 22

| Example 8 | | | | | |
|---|---|---|---|---|---|
| Sn | R | D | Nd | νd | θgF |
| 1 | 135.8962 | 1.3000 | 1.89286 | 20.36 | 0.6394 |
| 2 | 68.7740 | 5.6326 | 1.59282 | 68.62 | 0.5441 |
| 3 | −622.9654 | 0.0999 | | | |
| 4 | 51.7074 | 3.7137 | 1.76385 | 48.49 | 0.5590 |
| 5 | 148.3044 | DD[5] | | | |
| *6 | 656.2350 | 1.2031 | 1.85060 | 41.62 | 0.5645 |
| *7 | 17.0845 | 6.1695 | | | |
| 8 | −42.0620 | 0.8502 | 1.81600 | 46.59 | 0.5566 |
| 9 | 45.0577 | 0.3998 | | | |
| 10 | 30.5836 | 4.1216 | 1.92286 | 20.88 | 0.6390 |
| 11 | −57.7616 | 6.2922 | | | |
| *12 | −26.5545 | 0.8306 | 1.72903 | 54.04 | 0.5447 |
| *13 | 168.9694 | DD[13] | | | |
| *14 | 18.6812 | 3.5615 | 1.65670 | 62.28 | 0.5421 |
| *15 | −157.5818 | 1.1553 | | | |
| 16(St) | ∞ | 2.9323 | | | |
| 17 | 28.2284 | 3.5169 | 1.49700 | 81.54 | 0.5375 |
| 18 | −29.2027 | 0.8498 | 1.94595 | 17.98 | 0.6546 |
| 19 | −147.5385 | 2.0002 | | | |
| 20 | −53.6907 | 1.9396 | 2.00171 | 20.66 | 0.6347 |
| 21 | −22.1027 | 0.8598 | 1.74950 | 35.33 | 0.5819 |
| 22 | 48.4615 | DD[22] | | | |
| *23 | 25.4758 | 4.4341 | 1.63860 | 63.43 | 0.5427 |
| *24 | −31.1182 | 4.6232 | | | |
| 25 | −24.3965 | 1.3502 | 1.85150 | 40.78 | 0.5696 |
| 26 | 36.5514 | 2.9614 | 1.69895 | 30.13 | 0.6030 |
| 27 | −83.6957 | DD[27] | | | |
| 28 | −74.8014 | 2.1505 | 1.72916 | 54.61 | 0.5443 |
| 29 | −43.3560 | 17.1613 | | | |
| 30 | ∞ | 2.8500 | 1.54763 | 54.98 | 0.5525 |
| 31 | ∞ | 1.0248 | | | |

TABLE 23

| Example 8 | | | |
|---|---|---|---|
| | Wide | Middle | Tele |
| Zr | 1.0 | 2.4 | 7.1 |
| f | 18.50 | 44.81 | 130.77 |
| Bf | 20.03 | 20.03 | 20.03 |
| FNo. | 3.60 | 4.58 | 5.81 |
| 2ω[°] | 81.0 | 35.2 | 12.6 |
| DD[5] | 0.7000 | 17.8934 | 36.7565 |
| DD[13] | 14.6994 | 7.3329 | 1.1912 |
| DD[22] | 4.1817 | 3.0195 | 2.4266 |
| DD[27] | 2.0000 | 21.6359 | 46.7425 |

TABLE 24

| Example 8 | | | | |
|---|---|---|---|---|
| Sn | 6 | 7 | 12 | 13 |
| KA | 1.0000000E+00 | 1.0000000E+00 | 1.0000000E+00 | 1.0000000E+00 |
| A3 | 3.0773866E−05 | 6.7946694E−05 | −2.4077396E−04 | −2.4079679E−04 |
| A4 | 1.0557550E−04 | 1.0019763E−04 | −3.0492620E−05 | −3.2857030E−05 |
| A5 | −4.8748704E−06 | −3.8112072E−06 | 2.8879771E−07 | 2.4194459E−06 |
| A6 | −1.0711509E−06 | −1.2209066E−08 | 1.3449552E−06 | 4.9153829E−07 |
| A7 | 6.1827235E−08 | −1.1135225E−07 | −8.0344552E−08 | 5.0861100E−08 |
| A8 | 4.4455205E−09 | 3.9918157E−09 | 4.2871299E−09 | −3.2167315E−09 |
| A9 | −3.2581193E−11 | 1.0508361E−09 | −2.7628903E−09 | −1.5203981E−09 |
| A10 | −1.6668966E−11 | −1.1019053E−11 | 2.3075002E−10 | −1.3509259E−10 |
| A11 | −9.9708115E−13 | 6.9998753E−12 | 4.1820160E−12 | 1.0331920E−11 |
| A12 | 3.0595935E−15 | −1.1367690E−12 | 1.3079936E−13 | 2.2950986E−12 |
| A13 | 2.0469271E−15 | −4.5112983E−14 | −2.0513572E−14 | 2.4899713E−13 |
| A14 | 2.1483372E−16 | 2.2435277E−15 | −2.4931118E−15 | 3.5628763E−14 |
| A15 | 1.1582444E−17 | 4.4695528E−16 | 1.2057094E−15 | −1.3987128E−16 |
| A16 | 1.5113336E−19 | 2.6315328E−17 | 1.4584022E−16 | −3.9661607E−16 |
| A17 | −4.0083629E−20 | −4.6891952E−19 | −1.2686471E−16 | −1.8560400E−16 |
| A18 | −4.5443255E−21 | −2.9823587E−19 | 6.3084620E−18 | −7.0163006E−17 |
| A19 | −1.6286503E−22 | −3.0460110E−20 | 9.5089581E−19 | 1.7483147E−17 |
| A20 | 1.9688651E−23 | 3.0881395E−21 | −5.5992023E−20 | −8.8782487E−19 |
| Sn | 14 | 15 | 23 | 24 |
| KA | 1.0000000E+00 | 1.0000000E+00 | 1.0000000E+00 | 1.0000000E+00 |
| A3 | −2.5617325E−05 | −3.1999723E−05 | −3.6243605E−05 | −3.7846602E−05 |
| A4 | 1.0141826E−05 | 4.2127921E−05 | −9.7142694E−07 | 3.8250128E−05 |
| A5 | −8.6102124E−06 | −1.4222411E−05 | −7.6082727E−06 | −2.0177345E−06 |
| A6 | 1.4020447E−06 | 2.0048434E−06 | 5.3171630E−07 | −1.4668764E−07 |
| A7 | −3.8948907E−08 | 8.5784412E−08 | 9.7925361E−08 | 2.7255361E−08 |
| A8 | −6.2585048E−09 | −2.7382937E−08 | −6.6760245E−09 | 3.9173444E−09 |
| A9 | 1.6127379E−12 | −1.5703919E−09 | −1.0412099E−09 | −1.0995802E−09 |
| A10 | 3.9171762E−11 | 9.7211082E−11 | −2.8317860E−10 | 1.3088413E−10 |
| A11 | −8.3677913E−12 | 2.7593538E−11 | 1.2638610E−11 | −4.5057307E−12 |
| A12 | −5.7071373E−13 | 3.2805898E−12 | 4.5331519E−12 | −1.9698390E−12 |
| A13 | 8.4420031E−14 | 4.9133366E−14 | 4.4738028E−13 | −1.2088861E−13 |
| A14 | 3.1722637E−14 | −3.6531404E−14 | 1.5236803E−15 | 1.2193575E−14 |
| A15 | 3.9366653E−15 | −6.2664773E−15 | −4.9814616E−15 | 3.9235358E−15 |
| A16 | −1.7761388E−17 | −5.7008740E−16 | −9.0319589E−16 | 2.7084510E−16 |
| A17 | −1.4812163E−16 | −2.6398902E−17 | −2.2952119E−16 | −1.5932298E−17 |
| A18 | −3.1258147E−17 | 9.1707972E−18 | −3.1090321E−17 | −1.8587246E−18 |
| A19 | 7.9959951E−18 | 4.4675846E−18 | 1.6555297E−17 | −1.5903452E−18 |
| A20 | −4.0907241E−19 | −4.2281607E−19 | −1.0743215E−18 | 1.4514459E−19 |

EXAMPLE 9

Figure 18:
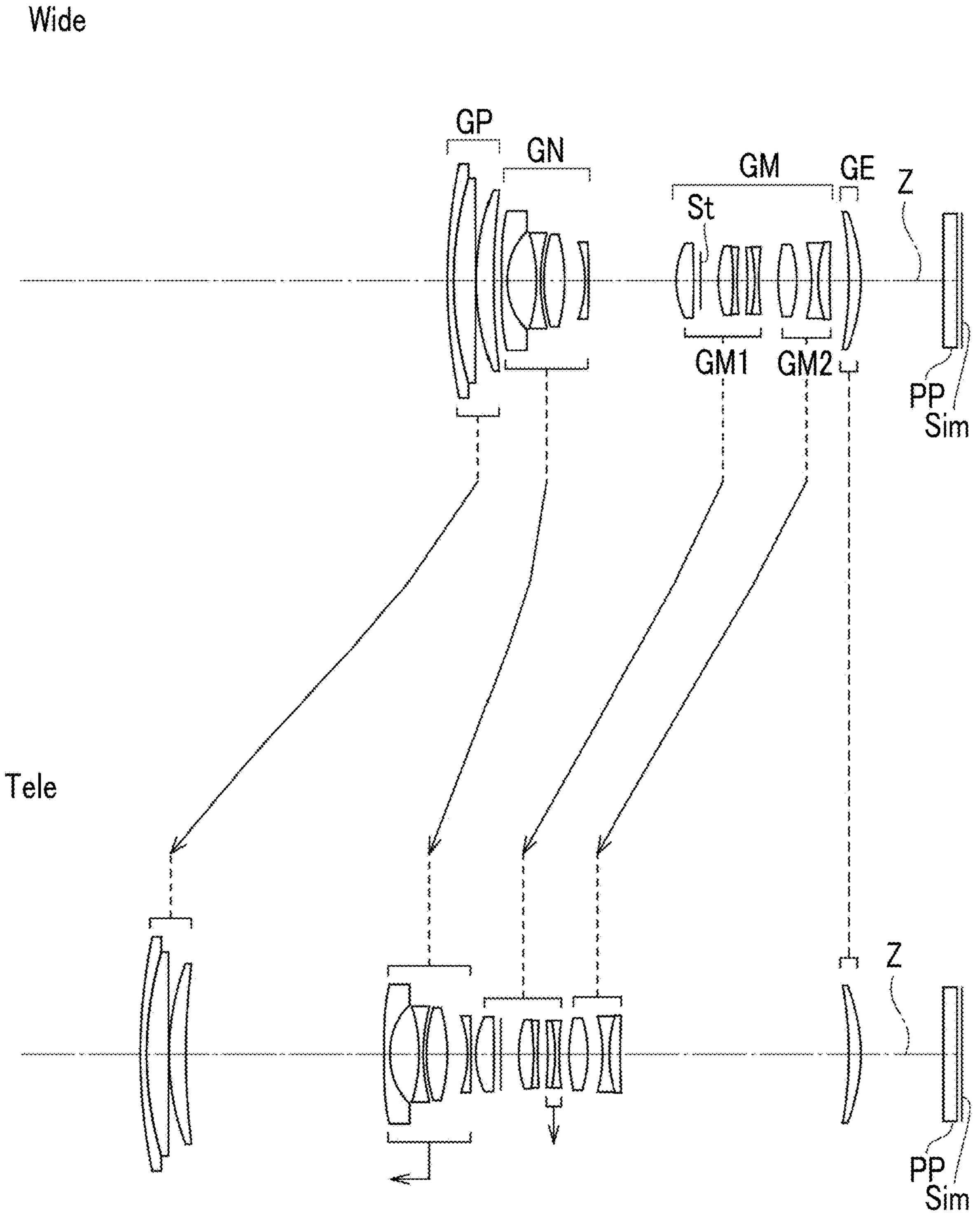
FIG. 18 is a cross-sectional view of a configuration of a zoom lens of Example 9 and a diagram showing movement loci thereof.

FIG. 18 shows a configuration and movement loci of the zoom lens of Example 9. The zoom lens of Example 9 consists of, in order from the object side to the image side, an object side positive group GP, an object side negative group GN, an intermediate group GM, and a final group GE. The object side positive group GP consists of one lens group which has a positive refractive power. The object side negative group GN consists of one lens group which has a negative refractive power. The intermediate group GM consists of, in order from the object side to the image side, two lens groups including a first M lens group GM1 that has a positive refractive power and a second M lens group GM2 that has a positive refractive power. The final group GE consists of one lens group which has a positive refractive power. The first M lens group GM1 includes an aperture stop St.

During zooming from the wide-angle end to the telephoto end, the final group GE remains stationary with respect to the image plane Sim, and the other lens groups move by changing the spacings between the adjacent lens groups. The zoom lens includes only one focusing group. The focusing group consists of the object side negative group GN. During focusing from the infinite distance object to the close-range object, the focusing group moves toward the object side. The vibration-proof group consists of two lenses which are first and second from the image side of the first M lens group GM1.

Figure 19:
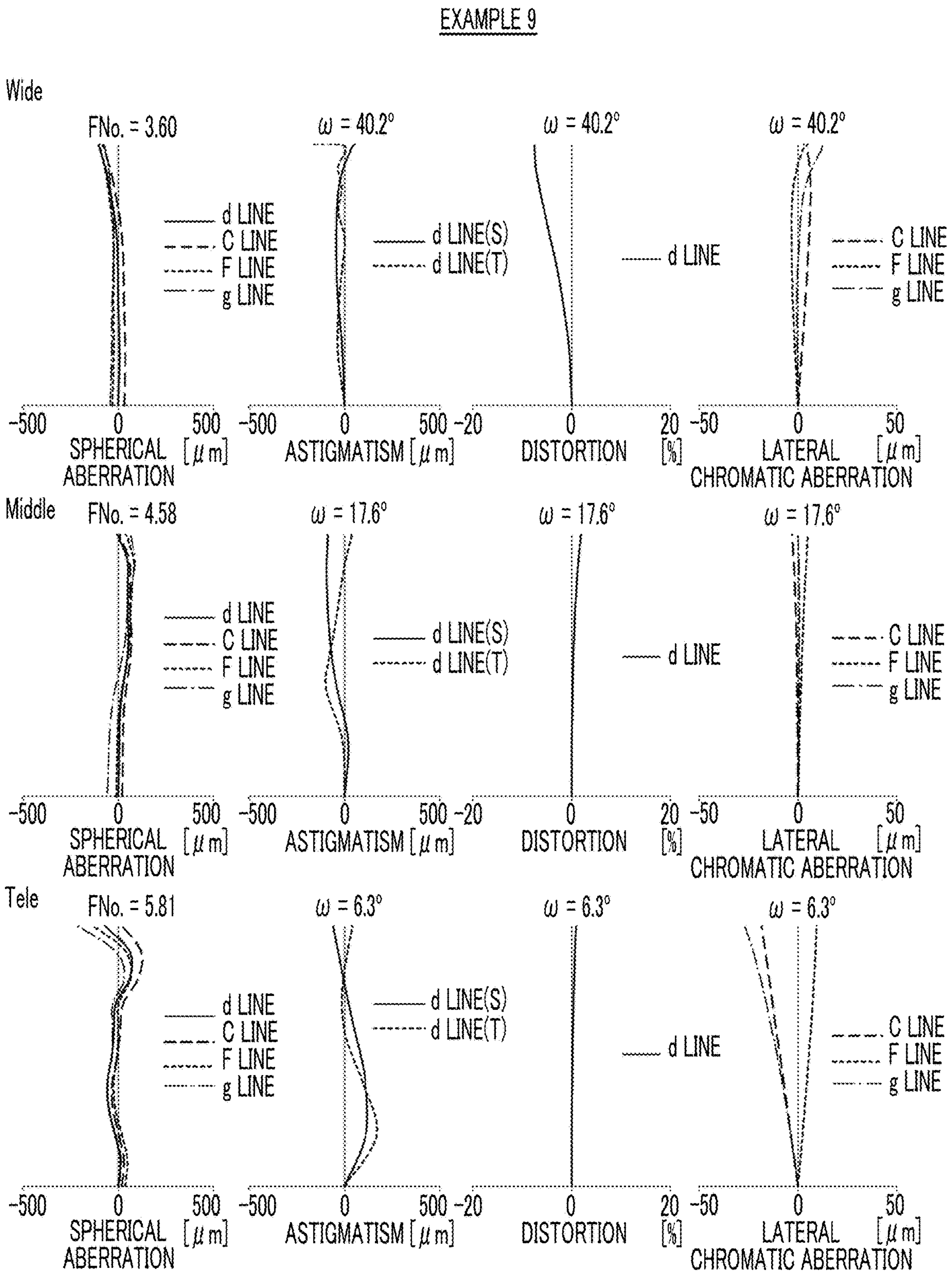
FIG. 19 is a diagram showing aberrations of the zoom lens of Example 9.

Regarding the zoom lens of Example 9, Table 25 shows basic lens data, Table 26 shows specifications and variable surface spacings, and Table 27 shows aspherical coefficients thereof. FIG. 19 shows aberration diagrams thereof.

TABLE 25

| Example 9 | | | | | |
|---|---|---|---|---|---|
| Sn | R | D | Nd | νd | θgF |
| 1 | 130.4890 | 1.3000 | 1.94595 | 17.98 | 0.6546 |
| 2 | 80.5823 | 4.5671 | 1.61800 | 63.32 | 0.5427 |
| 3 | −6784.2120 | 0.1002 | | | |
| 4 | 57.0518 | 3.4967 | 1.72916 | 54.54 | 0.5454 |
| 5 | 161.8048 | DD[5] | | | |
| *6 | −323.7418 | 1.2002 | 1.85135 | 40.23 | 0.5605 |
| *7 | 19.2387 | 6.0687 | | | |
| 8 | −35.5893 | 0.8502 | 1.72916 | 54.68 | 0.5445 |
| 9 | 40.1675 | 0.6789 | | | |
| 10 | 35.3886 | 4.3308 | 1.84666 | 23.78 | 0.6192 |
| 11 | −38.7126 | 4.2334 | | | |
| *12 | −26.0435 | 0.7255 | 1.69560 | 59.05 | 0.5435 |
| *13 | −685.6065 | DD[13] | | | |
| *14 | 18.6093 | 3.6202 | 1.59201 | 67.02 | 0.5359 |
| *15 | −181.1803 | 1.4363 | | | |
| 16(St) | ∞ | 3.7048 | | | |

TABLE 25-continued

| Example 9 | | | | | |
|---|---|---|---|---|---|
| Sn | R | D | Nd | νd | θgF |
| 17 | 24.4272 | 3.0853 | 1.49700 | 81.54 | 0.5375 |
| 18 | −61.2261 | 0.8500 | 1.84666 | 23.78 | 0.6192 |
| 19 | 103.1729 | 2.1244 | | | |
| 20 | −80.5684 | 1.4898 | 1.98613 | 16.48 | 0.6656 |
| 21 | −37.3368 | 0.8601 | 1.84666 | 23.78 | 0.6192 |
| 22 | 59.8906 | DD[22] | | | |
| *23 | 29.1319 | 3.9040 | 1.72903 | 54.04 | 0.5447 |
| *24 | −25.8804 | 3.0853 | | | |
| 25 | −30.8875 | 1.3502 | 1.95000 | 29.37 | 0.6002 |
| 26 | 26.8969 | 2.4044 | 1.94595 | 17.98 | 0.6546 |
| 27 | 159.8564 | DD[27] | | | |
| 28 | −85.8638 | 2.6001 | 1.48071 | 85.29 | 0.5362 |
| 29 | −39.2052 | 17.1613 | | | |
| 30 | ∞ | 2.8500 | 1.54763 | 54.98 | 0.5525 |
| 31 | ∞ | 1.0155 | | | |

TABLE 26

| Example 9 | | | |
|---|---|---|---|
| | Wide | Middle | Tele |
| Zr | 1.0 | 2.4 | 7.1 |
| f | 18.49 | 44.79 | 130.71 |
| Bf | 20.02 | 20.02 | 20.02 |
| FNo. | 3.60 | 4.58 | 5.81 |
| 2ω[°] | 80.4 | 35.2 | 12.6 |
| DD[5] | 1.6302 | 20.1361 | 41.3435 |
| DD[13] | 18.3535 | 8.6593 | 0.9603 |
| DD[22] | 4.0002 | 2.7494 | 2.0609 |
| DD[27] | 3.9819 | 23.0788 | 47.6344 |

TABLE 27

| Example 9 | | | | |
|---|---|---|---|---|
| Sn | 6 | 7 | 12 | 13 |
| KA | 1.0000000E+00 | 1.0000000E+00 | 1.0000000E+00 | 1.0000000E+00 |
| A3 | 6.4247896E−05 | 9.3317825E−05 | −2.9564357E−04 | −2.9120128E−04 |
| A4 | 1.0542066E−04 | 9.8702056E−05 | −1.8033878E−05 | −2.1113518E−05 |
| A5 | −3.7691451E−06 | −3.2192717E−06 | 5.5948087E−07 | 2.5680333E−06 |
| A6 | −1.0967622E−06 | 3.9435334E−08 | 1.3470914E−06 | 4.9094060E−07 |
| A7 | 6.0554749E−08 | −1.0966269E−07 | −8.2609895E−08 | 5.2406792E−08 |
| A8 | 4.4072477E−09 | 4.0858589E−09 | 5.1742372E−09 | −3.1387685E−09 |
| A9 | −3.2178392E−11 | 1.0620659E−09 | −2.7800003E−09 | −1.5342908E−09 |
| A10 | −1.6625188E−11 | −1.0099325E−11 | 2.3003154E−10 | −1.3946515E−10 |
| A11 | −9.9446320E−13 | 6.5934260E−12 | 4.0378293E−12 | 9.7284424E−12 |
| A12 | 3.2117090E−15 | −1.1320698E−12 | 1.2662535E−13 | 2.1963500E−12 |
| A13 | 2.0543561E−15 | −4.4598422E−14 | −2.5532706E−14 | 2.3543204E−13 |
| A14 | 2.1519608E−16 | 2.2644865E−15 | −3.1457863E−15 | 4.4501359E−14 |
| A15 | 1.1593448E−17 | 4.5080019E−16 | 1.0582859E−15 | −2.9059287E−16 |
| A16 | 1.5189156E−19 | 2.6566102E−17 | 1.3097563E−16 | −4.0553476E−16 |
| A17 | −4.0038337E−20 | −4.4577613E−19 | −1.0441797E−16 | −1.8702413E−16 |
| A18 | −4.5458133E−21 | −2.9649931E−19 | 4.8102444E−18 | −7.0047716E−17 |
| A19 | −1.6308089E−22 | −3.0391941E−20 | 8.4448186E−19 | 1.7496037E−17 |
| A20 | 1.9660199E−23 | 3.0801965E−21 | −5.0424758E−20 | −8.9755746E−19 |
| Sn | 14 | 15 | 23 | 24 |
| KA | 1.0000000E+00 | 1.0000000E+00 | 1.0000000E+00 | 1.0000000E+00 |
| A3 | −2.9847770E−05 | −3.5752622E−05 | −3.2992858E−05 | −3.0882188E−05 |
| A4 | 1.4137071E−05 | 4.5007843E−05 | −3.5742895E−06 | 3.5642775E−05 |
| A5 | −8.8436431E−06 | −1.4204568E−05 | −7.7999485E−06 | −1.9936383E−06 |
| A6 | 1.4112474E−06 | 1.9998529E−06 | 5.6119412E−07 | −1.4426332E−07 |
| A7 | −3.8259929E−08 | 8.5938564E−08 | 9.8087019E−08 | 2.8101182E−08 |
| A8 | −6.2058753E−09 | −2.7306286E−08 | −6.6428958E−09 | 3.9117109E−09 |
| A9 | 6.6547253E−12 | −1.5581681E−09 | −1.0491503E−09 | −1.1003414E−09 |
| A10 | 3.9551869E−11 | 9.8659893E−11 | −2.8255648E−10 | 1.3087998E−10 |
| A11 | −8.3477260E−12 | 2.7752278E−11 | 1.2692809E−11 | −4.4687025E−12 |
| A12 | −5.7212659E−13 | 3.2906399E−12 | 4.5380679E−12 | −1.9617250E−12 |
| A13 | 8.4023295E−14 | 4.9454408E−14 | 4.4787120E−13 | −1.1984910E−13 |
| A14 | 3.1649277E−14 | −3.6662277E−14 | 1.5962121E−15 | 1.2291818E−14 |
| A15 | 3.9311781E−15 | −6.2925598E−15 | −4.9719461E−15 | 3.9330900E−15 |
| A16 | −1.7960963E−17 | −5.7482189E−16 | −9.0255022E−16 | 2.7087644E−16 |
| A17 | −1.4806598E−16 | −2.6928535E−17 | −2.2957927E−16 | −1.6021250E−17 |
| A18 | −3.1239169E−17 | 9.1341988E−18 | −3.1135122E−17 | −1.8889826E−18 |
| A19 | 7.9968900E−18 | 4.4698736E−18 | 1.6547009E−17 | −1.5967880E−18 |
| A20 | −4.0921936E−19 | −4.2114319E−19 | −1.0757551E−18 | 1.4364023E−19 |

EXAMPLE 10

Figure 20:
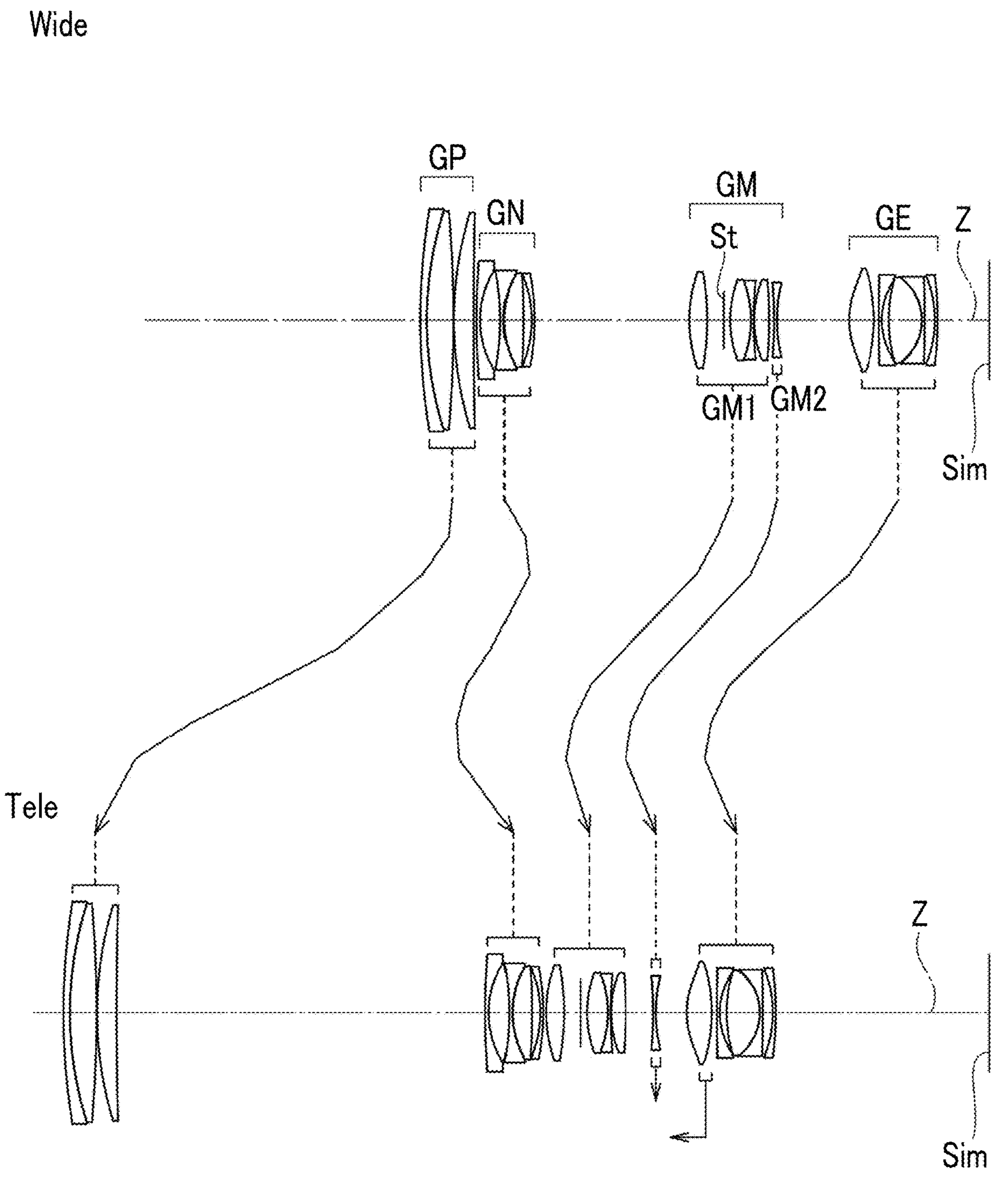
FIG. 20 is a cross-sectional view of a configuration of a zoom lens of Example 10 and a diagram showing movement loci thereof.

FIG. 20 shows a configuration and movement loci of the zoom lens of Example 10. The zoom lens of Example 10 consists of, in order from the object side to the image side, an object side positive group GP, an object side negative group GN, an intermediate group GM, and a final group GE. The object side positive group GP consists of one lens group which has a positive refractive power. The object side negative group GN consists of one lens group which has a negative refractive power. The intermediate group GM consists of, in order from the object side to the image side, two lens groups including a first M lens group GM1 that has a positive refractive power and a second M lens group GM2 that has a negative refractive power. The final group GE consists of one lens group which has a positive refractive power. The first M lens group GM1 includes an aperture stop St.

During zooming from the wide-angle end to the telephoto end, all the lens groups move by changing the spacings between the adjacent lens groups. The zoom lens includes only one focusing group. The focusing group consists of one lens which is closest to the object side in the final group GE. During focusing from the infinite distance object to the close-range object, the focusing group moves toward the object side. The vibration-proof group consists of the second M lens group GM2.

Figure 21:
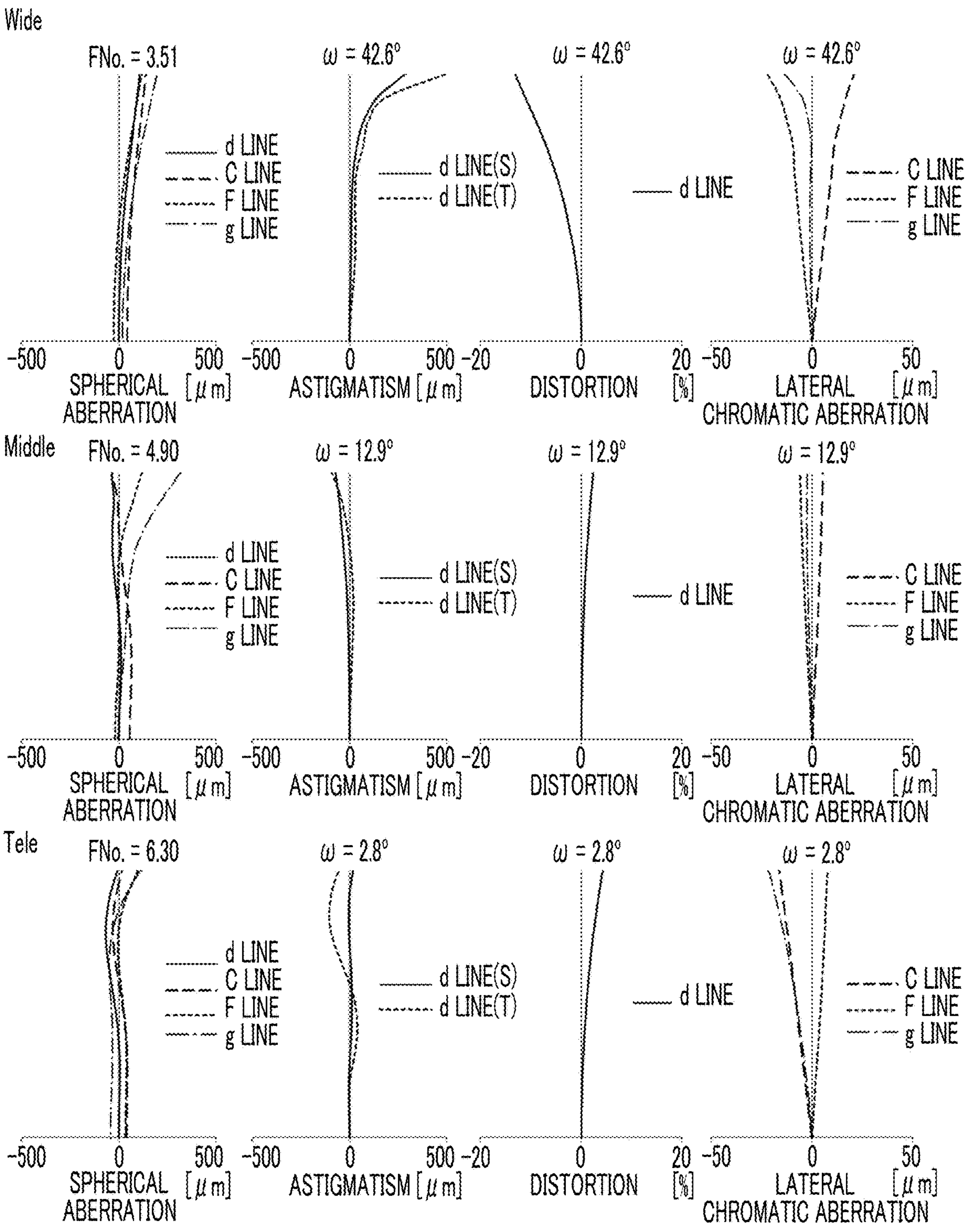
FIG. 21 is a diagram showing aberrations of the zoom lens of Example 10.

Regarding the zoom lens of Example 10, Table 28 shows basic lens data, Table 29 shows specifications and variable surface spacings, and Table 30 shows aspherical coefficients thereof. FIG. 21 shows aberration diagrams thereof.

TABLE 28

| Example 10 | | | | | |
|---|---|---|---|---|---|
| Sn | R | D | Nd | νd | θgF |
| 1 | 172.1092 | 1.4935 | 1.95675 | 33.02 | 0.5880 |
| 2 | 90.4449 | 6.1966 | 1.49837 | 81.40 | 0.5376 |
| 3 | −320.1346 | 0.1000 | | | |
| 4 | 92.5186 | 4.5505 | 1.55919 | 72.14 | 0.5409 |
| 5 | 1088.4412 | DD[5] | | | |
| 6 | 198.7507 | 0.8077 | 1.90933 | 37.87 | 0.5756 |
| 7 | 23.7443 | 4.6397 | | | |
| 8 | −65.7758 | 0.7113 | 1.73447 | 55.76 | 0.5431 |
| 9 | 23.4591 | 0.0998 | | | |
| 10 | 23.9613 | 4.4325 | 1.88221 | 21.15 | 0.6358 |
| 11 | −190.4694 | 1.9090 | | | |

TABLE 28-continued

| Example 10 | | | | | |
|---|---|---|---|---|---|
| Sn | R | D | Nd | νd | θgF |
| 12 | −29.3329 | 0.6811 | 1.93816 | 34.92 | 0.5831 |
| 13 | −60.4261 | DD[13] | | | |
| 14 | 36.2658 | 4.1469 | 1.70744 | 29.63 | 0.6048 |
| 15 | −66.6877 | 3.8357 | | | |
| 16(St) | ∞ | 1.5000 | | | |
| 17 | 28.5397 | 4.8370 | 1.44022 | 90.25 | 0.5318 |
| 18 | −26.5835 | 0.6402 | 1.99518 | 21.85 | 0.6362 |
| 19 | 114.4019 | 0.0998 | | | |
| 20 | 26.8760 | 3.4325 | 1.49790 | 81.47 | 0.5376 |
| 21 | −114.5468 | DD[21] | | | |
| *22 | −78.2128 | 0.6399 | 1.54856 | 73.75 | 0.5403 |
| *23 | 40.9592 | DD[23] | | | |
| *24 | 20.4328 | 5.8037 | 1.73723 | 55.48 | 0.5433 |
| *25 | −37.8155 | 1.1924 | | | |
| *26 | 8327.7815 | 0.6674 | 1.84999 | 34.90 | 0.5856 |
| *27 | 17.1108 | 1.6040 | | | |
| 28 | 36.7997 | 7.6937 | 1.82014 | 23.99 | 0.6196 |
| 29 | −13.2621 | 0.6628 | 1.93317 | 35.43 | 0.5818 |
| 30 | −339.4792 | 2.3308 | | | |
| 31 | −29.4882 | 0.6713 | 1.93067 | 35.69 | 0.5812 |
| 32 | −88.6919 | DD[32] | | | |

TABLE 29

| Example 10 | | | |
|---|---|---|---|
| | Wide | Middle | Tele |
| Zr | 1.0 | 3.4 | 15.7 |
| f | 17.82 | 60.59 | 279.76 |
| Bf | 12.00 | 42.68 | 49.69 |
| FNo. | 3.51 | 4.90 | 6.30 |
| 2ω[°] | 85.2 | 25.8 | 5.6 |
| DD[5] | 0.6954 | 24.2224 | 85.6878 |
| DD[13] | 36.0032 | 14.0044 | 0.6988 |
| DD[21] | 1.1940 | 4.1012 | 6.4311 |
| DD[23] | 16.7468 | 8.1905 | 7.1543 |
| DD[32] | 12.0016 | 42.6813 | 49.6905 |

TABLE 30

| Example 10 | | | | |
|---|---|---|---|---|
| Sn | 22 | 23 | 24 | 25 |
| KA | −5.0000063E+00 | −4.2706730E+00 | −9.8909244E−01 | 1.2625823E+00 |
| A4 | 1.5769855E−05 | 1.7824393E−05 | −4.3389340E−06 | 2.8115011E−05 |
| A6 | −2.6926616E−08 | 2.7180323E−08 | 5.4927995E−08 | −5.8918119E−08 |
| A8 | 7.2311241E−10 | −3.3621024E−10 | −1.7626537E−09 | −5.6963767E−10 |
| A10 | −2.4230934E−12 | 5.2107118E−12 | 1.0316055E−11 | −1.6417198E−13 |
| A12 | 1.9225096E−14 | 1.8586030E−14 | −3.7814307E−14 | −4.2667688E−15 |

| Sn | 26 | 27 |
|---|---|---|
| KA | 5.0000089E+00 | −5.4704779E−01 |
| A4 | 1.5274298E−05 | 2.3264271E−05 |
| A6 | 1.3512122E−08 | 2.3757083E−08 |
| A8 | 8.9401155E−10 | 1.1176116E−09 |
| A10 | −2.4441710E−11 | −3.4308342E−11 |
| A12 | 8.3219945E−14 | 1.1578037E−13 |

EXAMPLE 11

Figure 22:
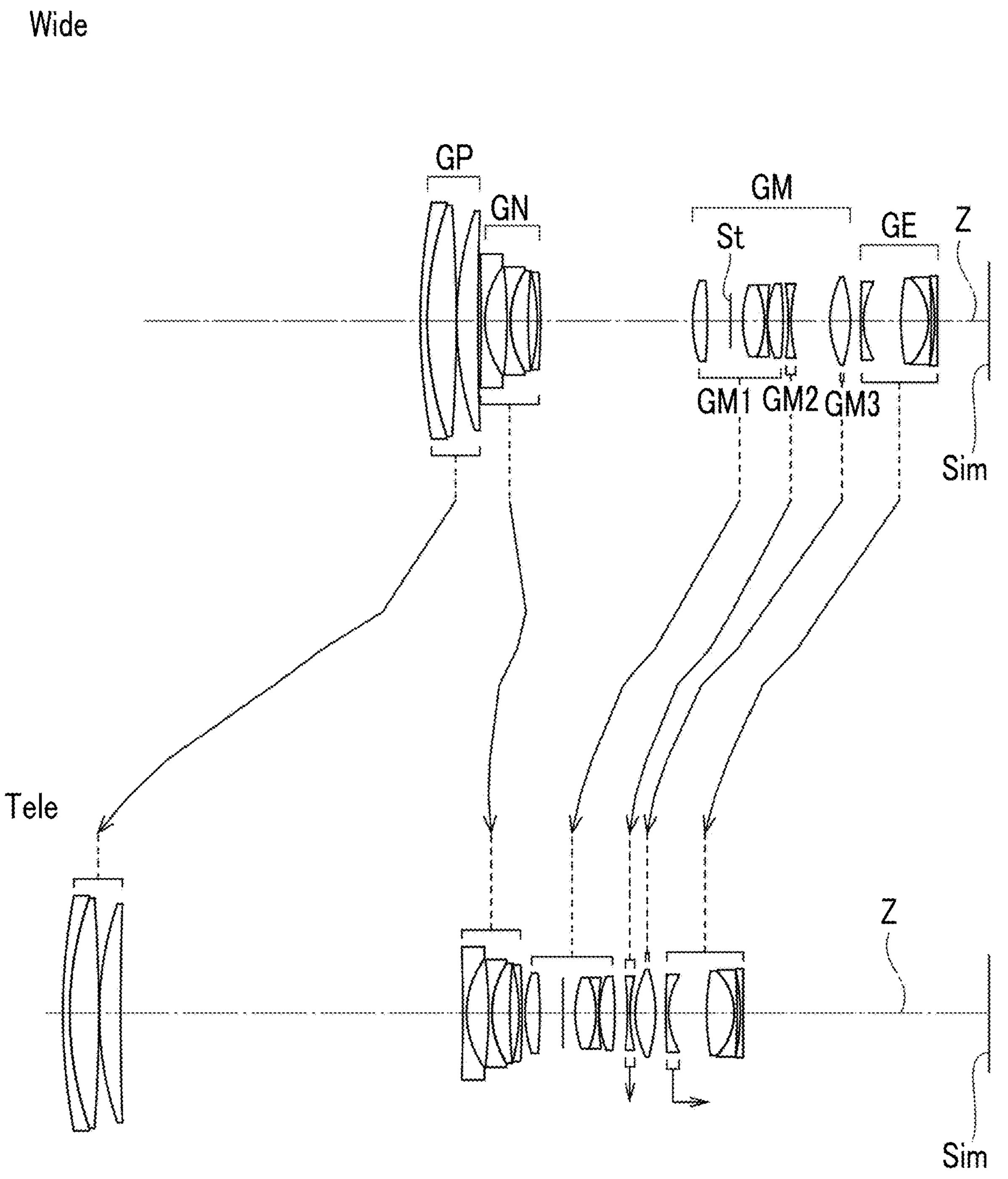
FIG. 22 is a cross-sectional view of a configuration of a zoom lens of Example 11 and a diagram showing movement loci thereof.

FIG. 22 shows a configuration and movement loci of the zoom lens of Example 11. The zoom lens of Example 11 consists of, in order from the object side to the image side, an object side positive group GP, an object side negative group GN, an intermediate group GM, and a final group GE. The object side positive group GP consists of one lens group which has a positive refractive power. The object side negative group GN consists of one lens group which has a negative refractive power. The intermediate group GM consists of three lens groups, in order from the object side to the image side, a first M lens group GM1 that has a positive refractive power, a second M lens group GM2 that has a negative refractive power, and a third M lens group GM3 that has a positive refractive power. The final group GE consists of one lens group which has a negative refractive power. The first M lens group GM1 includes an aperture stop St.

During zooming from the wide-angle end to the telephoto end, all the lens groups move by changing the spacings between the adjacent lens groups. The zoom lens includes only one focusing group. The focusing group consists of one lens which is closest to the object side in the final group GE. During focusing from the infinite distance object to the close-range object, the focusing group moves to the image side. The vibration-proof group consists of the second M lens group GM2.

Figure 23:
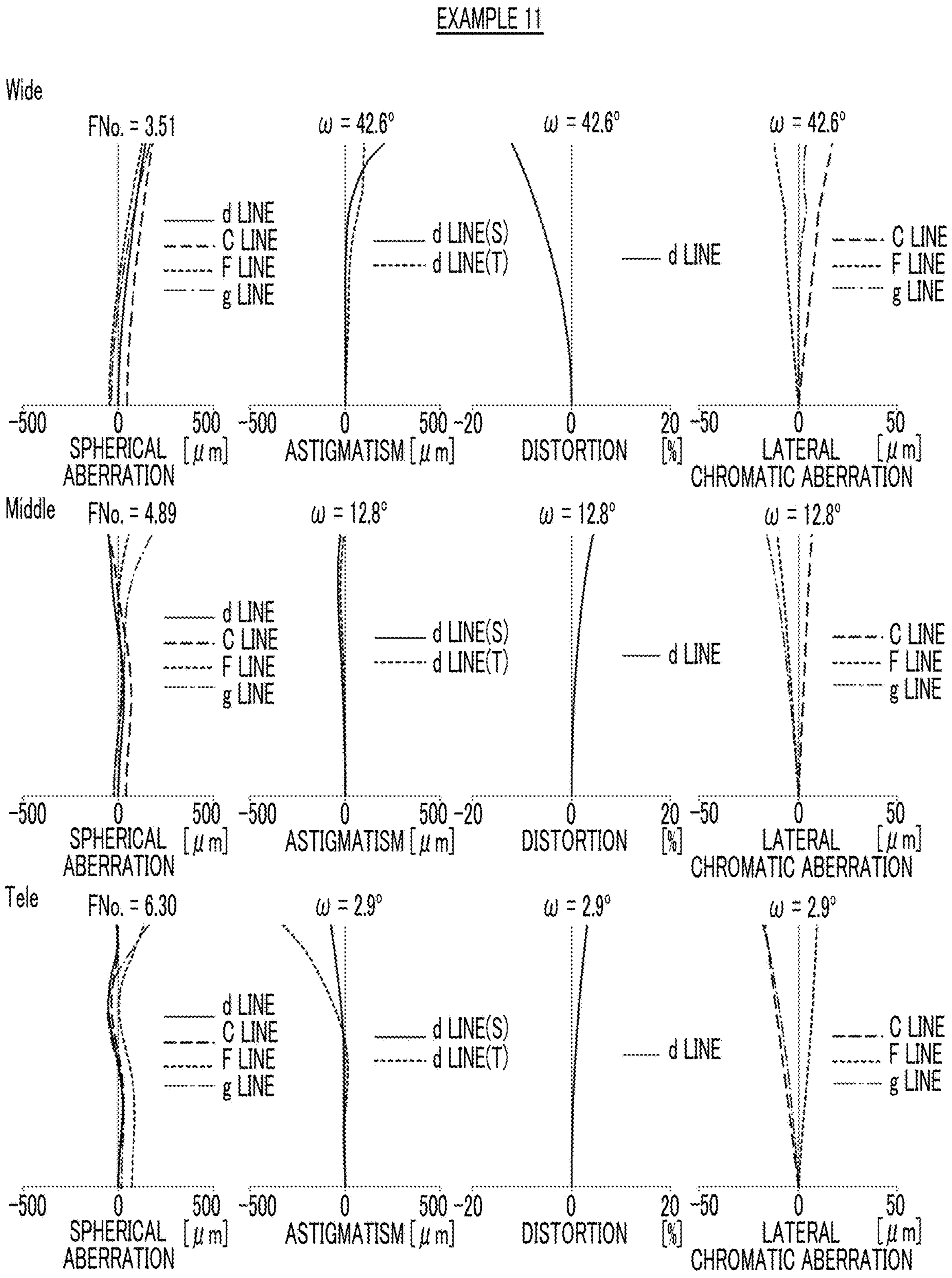
FIG. 23 is a diagram showing aberrations of the zoom lens of Example 11.

Regarding the zoom lens of Example 11, Table 31 shows basic lens data, Table 32 shows specifications and variable surface spacings, and Table 33 shows aspherical coefficients thereof. FIG. 23 shows aberration diagrams thereof.

TABLE 31

| Example 11 | | | | | |
|---|---|---|---|---|---|
| Sn | R | D | Nd | νd | θgF |
| 1 | 158.1289 | 1.5778 | 1.96687 | 31.99 | 0.5909 |
| 2 | 86.8636 | 6.7578 | 1.50204 | 80.84 | 0.5378 |
| 3 | −382.1573 | 0.0998 | | | |
| 4 | 84.5257 | 4.9360 | 1.54601 | 74.14 | 0.5402 |
| 5 | 806.2757 | DD[5] | | | |
| 6 | −695.0153 | 0.9102 | 1.76763 | 52.37 | 0.5473 |

TABLE 31-continued

| Example 11 | | | | | |
|---|---|---|---|---|---|
| Sn | R | D | Nd | νd | θgF |
| 7 | 22.9882 | 5.1063 | | | |
| 8 | −114.8877 | 0.7434 | 1.71747 | 56.85 | 0.5425 |
| 9 | 23.1796 | 0.0999 | | | |
| 10 | 23.5954 | 4.0857 | 1.99707 | 23.29 | 0.6275 |
| 11 | 126.7586 | 2.1250 | | | |
| 12 | −47.4841 | 0.7059 | 1.81872 | 47.14 | 0.5560 |
| 13 | −186.7701 | DD[13] | | | |
| 14 | 31.7917 | 3.4415 | 1.67500 | 31.79 | 0.5997 |
| 15 | −105.8188 | 5.3672 | | | |
| 16(St) | ∞ | 2.8339 | | | |
| 17 | 26.4170 | 4.8340 | 1.43599 | 90.90 | 0.5313 |
| 18 | −23.0540 | 0.6414 | 2.00001 | 24.69 | 0.6195 |
| 19 | 77.5930 | 0.1000 | | | |
| 20 | 24.8294 | 3.6008 | 1.49647 | 81.69 | 0.5375 |
| 21 | −77.1805 | DD[21] | | | |
| *22 | −68.2576 | 0.6416 | 1.55699 | 72.47 | 0.5408 |
| *23 | 37.0777 | DD[23] | | | |
| *24 | 21.2101 | 4.7248 | 1.74152 | 55.04 | 0.5436 |
| *25 | −30.5017 | DD[25] | | | |
| *26 | 238.9625 | 0.6417 | 1.76940 | 52.19 | 0.5475 |
| *27 | 17.9749 | 8.8373 | | | |
| 28 | 59.8409 | 6.3839 | 1.82444 | 23.78 | 0.6200 |
| 29 | −15.0655 | 0.6669 | 1.92340 | 36.43 | 0.5792 |
| 30 | −142.8340 | 0.7323 | | | |
| 31 | −50.8797 | 0.6736 | 2.00000 | 28.60 | 0.6012 |
| 32 | 2984.9416 | DD[32] | | | |

TABLE 32

| Example 11 | | | |
|---|---|---|---|
| | Wide | Middle | Tele |
| Zr | 1.0 | 3.4 | 15.7 |
| f | 17.55 | 59.68 | 275.58 |
| Bf | 12.02 | 35.70 | 57.03 |
| FNo. | 3.51 | 4.89 | 6.30 |
| 2ω[°] | 85.2 | 25.6 | 5.8 |
| DD[5] | 0.6973 | 33.2488 | 79.4333 |
| DD[13] | 35.4244 | 14.0508 | 0.7007 |
| DD[21] | 1.2010 | 2.2658 | 3.0200 |
| DD[23] | 9.0199 | 3.5302 | 1.1948 |
| DD[25] | 2.3939 | 2.7264 | 2.3940 |
| DD[32] | 12.0170 | 35.6973 | 57.0325 |

TABLE 33

| Example 11 | | | | |
|---|---|---|---|---|
| Sn | 22 | 23 | 24 | 25 |
| KA | −2.0439918E+00 | −3.6825168E+00 | −1.2930160E+00 | 1.2307377E+00 |
| A4 | 1.7480109E−07 | −4.6099737E−07 | −9.4104338E−06 | 2.5524314E−05 |
| A6 | −4.2159867E−08 | 4.1635099E−08 | 1.3328807E−07 | 6.7592446E−08 |
| A8 | 1.9987386E−09 | 3.0057263E−10 | −1.6564981E−09 | −1.2365936E−09 |
| A10 | −5.3323539E−12 | 7.6694721E−12 | 6.0744842E−12 | 4.4830362E−12 |
| A12 | −2.8682006E−14 | −5.5540072E−14 | 2.1698634E−14 | 2.0213174E−14 |

| Sn | 26 | 27 |
|---|---|---|
| KA | −4.9999978E+00 | −3.2961360E−01 |
| A4 | 1.6128962E−05 | 3.4097087E−05 |
| A6 | −9.4724957E−08 | −1.3466461E−07 |
| A8 | 1.7355568E−10 | 2.4090531E−09 |
| A10 | −3.7818597E−12 | −4.5320862E−11 |
| A12 | −1.2477297E−14 | 1.9115894E−13 |

EXAMPLE 12

Figure 24:
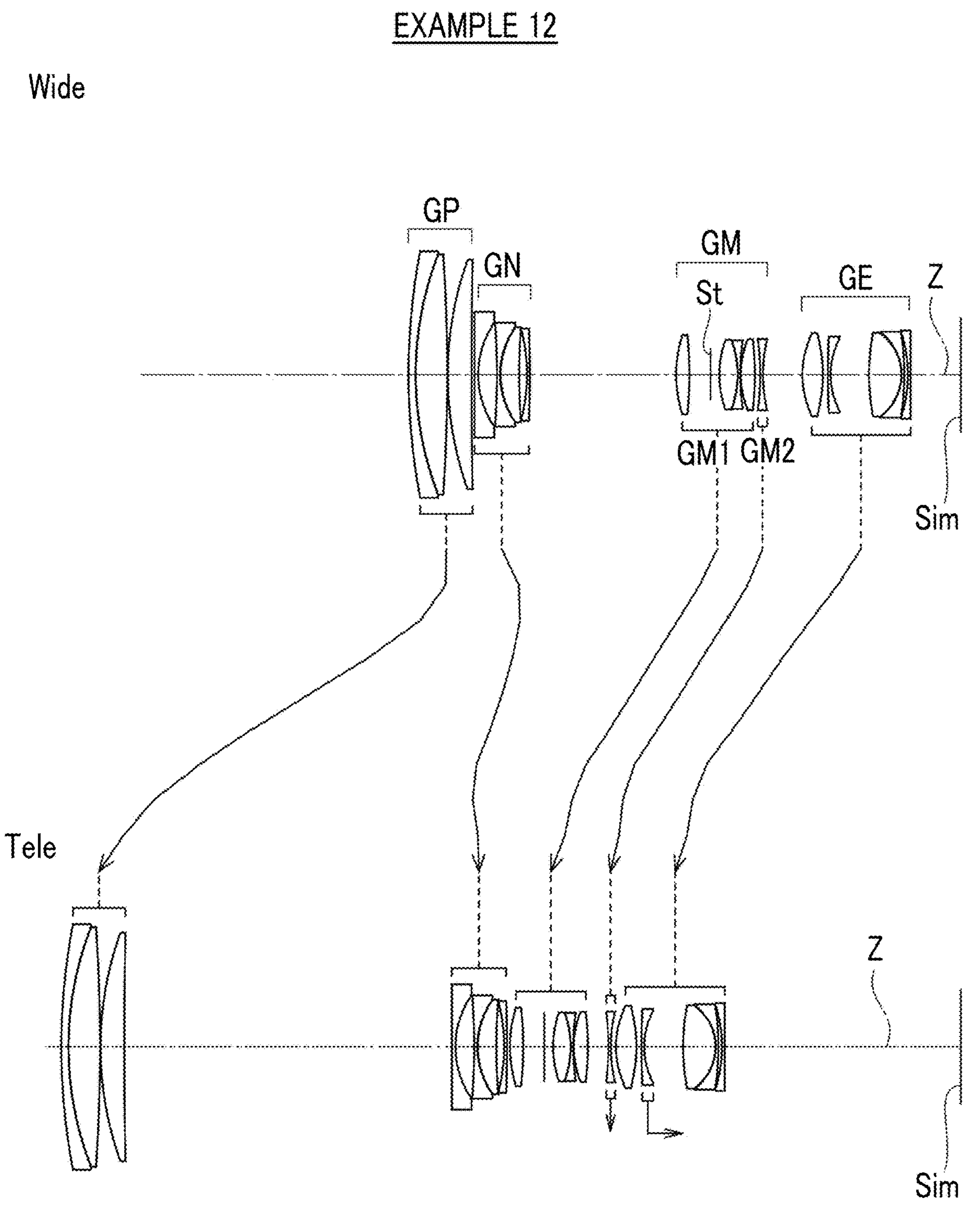
FIG. 24 is a cross-sectional view of a configuration of a zoom lens of Example 12 and a diagram showing movement loci thereof.

FIG. 24 shows a configuration and movement loci of the zoom lens of Example 12. The zoom lens of Example 12 consists of, in order from the object side to the image side, an object side positive group GP, an object side negative group GN, an intermediate group GM, and a final group GE. The object side positive group GP consists of one lens group which has a positive refractive power. The object side negative group GN consists of one lens group which has a negative refractive power. The intermediate group GM consists of, in refractive power. The first M lens group GM1 includes an aperture stop St.

During zooming from the wide-angle end to the telephoto end, all the lens groups move by changing the spacings between the adjacent lens groups. The zoom lens includes only one focusing group. The focusing group consists of one lens which is second from the object side in the final group GE. During focusing from the infinite distance object to the close-range object, the focusing group moves to the image side. The vibration-proof group consists of the second M lens group GM2.

Figure 25:
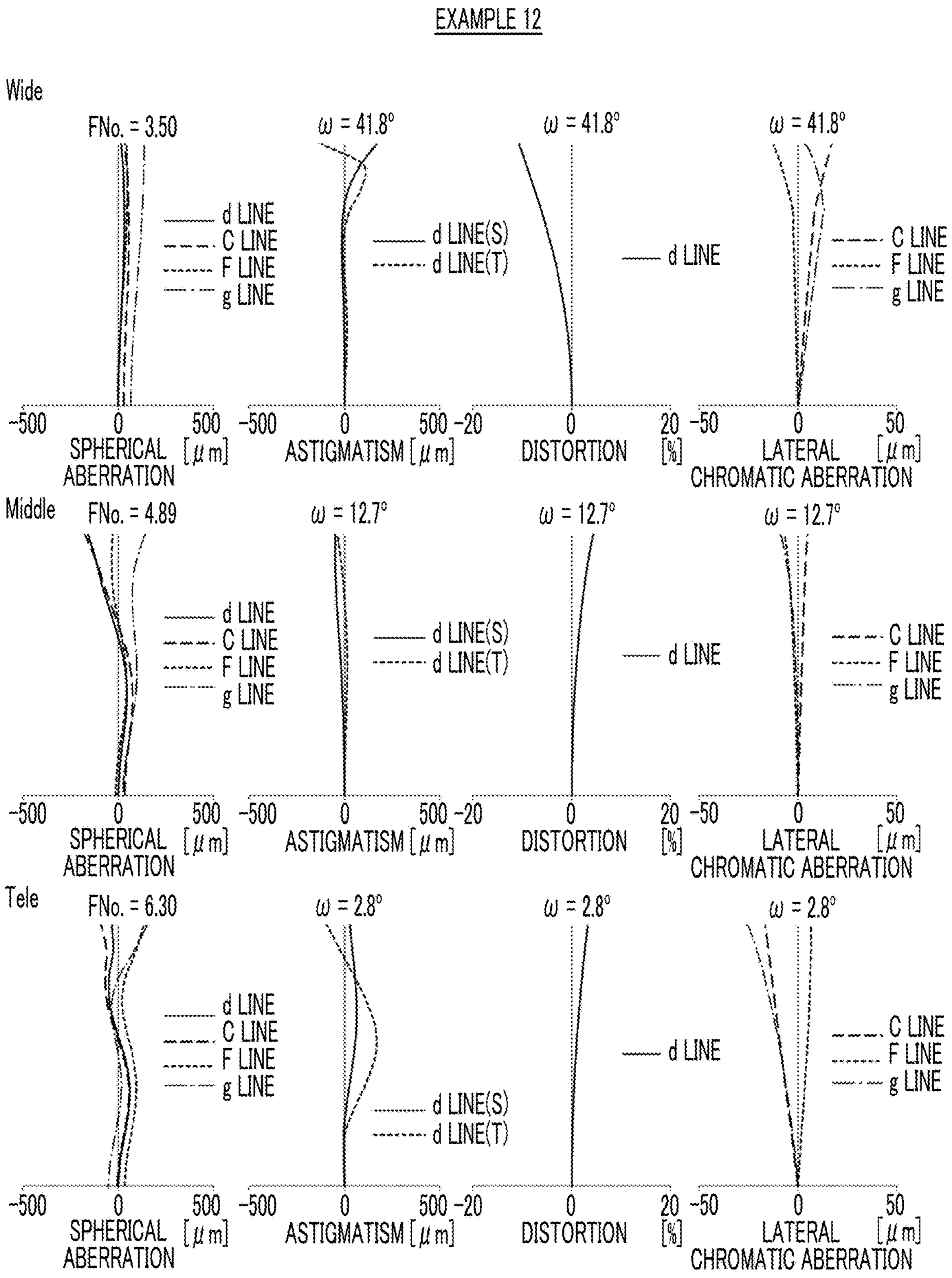
FIG. 25 is a diagram showing aberrations of the zoom lens of Example 12.

Regarding the zoom lens of Example 12, Table 34 shows basic lens data, Table 35 shows specifications and variable surface spacings, and Table 36 shows aspherical coefficients thereof. FIG. 25 shows aberration diagrams thereof.

TABLE 34

Example 12

| Sn | R | D | Nd | νd | θgF |
|---|---|---|---|---|---|
| 1 | 169.0991 | 1.6913 | 1.95375 | 32.32 | 0.5906 |
| 2 | 84.9976 | 7.5628 | 1.49700 | 81.55 | 0.5384 |
| 3 | −454.0866 | 0.1000 | | | |
| 4 | 87.1813 | 5.7152 | 1.59500 | 67.84 | 0.5432 |
| 5 | 2041.7799 | DD[5] | | | |
| 6 | −123259.4458 | 0.8732 | 1.80420 | 46.50 | 0.5573 |
| 7 | 23.6254 | 4.4955 | | | |
| 8 | −167.5043 | 0.7291 | 1.72903 | 54.04 | 0.5447 |
| 9 | 20.9433 | 0.1410 | | | |
| 10 | 21.5689 | 4.4429 | 1.90680 | 21.40 | 0.6335 |
| 11 | 186.5685 | 1.8310 | | | |
| 12 | −46.7380 | 0.6896 | 1.77200 | 49.98 | 0.5548 |
| 13 | −310.2450 | DD[13] | | | |
| 14 | 33.5110 | 3.1712 | 1.76182 | 26.53 | 0.6122 |
| 15 | −93.6093 | 5.0419 | | | |
| 16(St) | ∞ | 2.1037 | | | |
| 17 | 26.7571 | 4.1898 | 1.43425 | 94.77 | 0.5321 |
| 18 | −25.7873 | 0.6420 | 2.00178 | 19.32 | 0.6448 |
| 19 | 66.6632 | 0.0998 | | | |
| 20 | 24.1944 | 3.3466 | 1.45860 | 90.17 | 0.5371 |
| 21 | −83.3341 | DD[21] | | | |
| *22 | −62.4039 | 0.6431 | 1.61996 | 63.93 | 0.5429 |
| *23 | 38.9435 | DD[23] | | | |
| *24 | 21.5737 | 4.9262 | 1.80337 | 45.49 | 0.5593 |
| *25 | −34.2054 | 1.1936 | | | |
| *26 | 271.6831 | 0.6419 | 1.80420 | 46.50 | 0.5573 |
| *27 | 19.6336 | 9.3046 | | | |
| 28 | 56.6509 | 7.7511 | 1.82115 | 24.06 | 0.6237 |
| 29 | −13.2742 | 0.6713 | 1.90068 | 37.12 | 0.5763 |
| 30 | −71.0413 | 0.8573 | | | |
| 31 | −35.5879 | 0.6789 | 2.00100 | 29.12 | 0.5996 |
| 32 | −6099.6231 | DD[32] | | | |

TABLE 35

Example 12

| | Wide | Middle | Tele |
|---|---|---|---|
| Zr | 1.0 | 3.4 | 15.7 |
| f | 17.75 | 60.35 | 278.66 |
| Bf | 11.99 | 36.55 | 56.35 |
| FNo. | 3.50 | 4.89 | 6.30 |
| 2ω[°] | 83.6 | 25.4 | 5.6 |
| DD[5] | 0.6949 | 33.1822 | 78.2663 |
| DD[13] | 35.0956 | 14.6939 | 0.6938 |
| DD[21] | 1.3112 | 2.2510 | 4.9990 |
| DD[23] | 9.3903 | 4.0886 | 1.1990 |
| DD[32] | 11.9914 | 36.5469 | 56.3541 |

TABLE 36

Example 12

| Sn | 22 | 23 | 24 | 25 |
|---|---|---|---|---|
| KA | −4.9999948E+00 | −3.5728782E+00 | −1.2030303E+00 | 1.1831381E+00 |
| A4 | −5.0402917E−07 | −2.1693014E−08 | −7.4047831E−06 | 2.2219212E−05 |
| A6 | −3.9503842E−08 | 2.3542842E−08 | 1.2938356E−07 | 6.5781572E−08 |
| A8 | 1.6239241E−09 | 3.5890722E−10 | −1.5971532E−09 | −8.9919218E−10 |
| A10 | −2.1494099E−13 | 6.6671969E−12 | 8.7030369E−12 | 3.0857943E−12 |
| A12 | −3.5739693E−14 | −2.5628444E−14 | −6.9409247E−15 | 4.7603094E−15 |

| Sn | 26 | 27 |
|---|---|---|
| KA | −5.0000069E+00 | −3.5379492E−01 |
| A4 | 1.3840995E−05 | 2.5435874E−05 |
| A6 | −1.0689142E−07 | −1.7650352E−07 |
| A8 | 3.8550367E−10 | 2.2656635E−09 |
| A10 | 1.7407554E−12 | −2.8122025E−11 |
| A12 | −6.5817586E−14 | 6.4464220E−14 |

EXAMPLE 13

Figure 26:
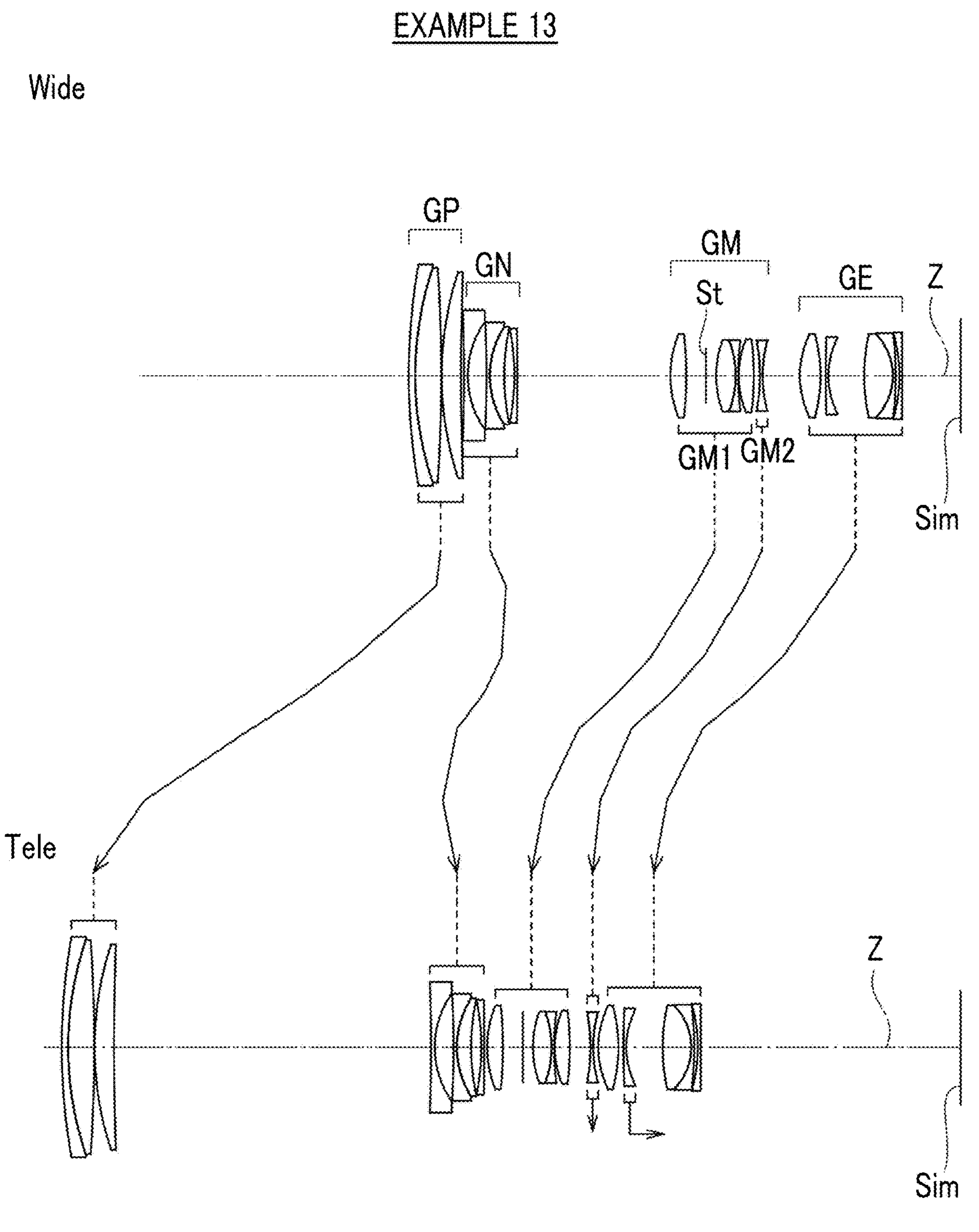
FIG. 26 is a cross-sectional view of a configuration of a zoom lens of Example 13 and a diagram showing movement loci thereof.

FIG. 26 shows a configuration and movement loci of the zoom lens of Example 13. The zoom lens of Example 13 consists of, in order from the object side to the image side, an object side positive group GP, an object side negative group GN, an intermediate group GM, and a final group GE. The object side positive group GP consists of one lens group which has a positive refractive power. The object side negative group GN consists of one lens group which has a negative refractive power. The intermediate group GM consists of, in order from the object side to the image side, two lens groups including a first M lens group refractive power. The first M lens group GM1 includes an aperture stop St.

During zooming from the wide-angle end to the telephoto end, all the lens groups move by changing the spacings between the adjacent lens groups. The zoom lens includes only one focusing group. The focusing group consists of one lens which is second from the object side in the final group GE. During focusing from the infinite distance object to the close-range object, the focusing group moves to the image side. The vibration-proof group consists of the second M lens group GM2.

Figure 27:
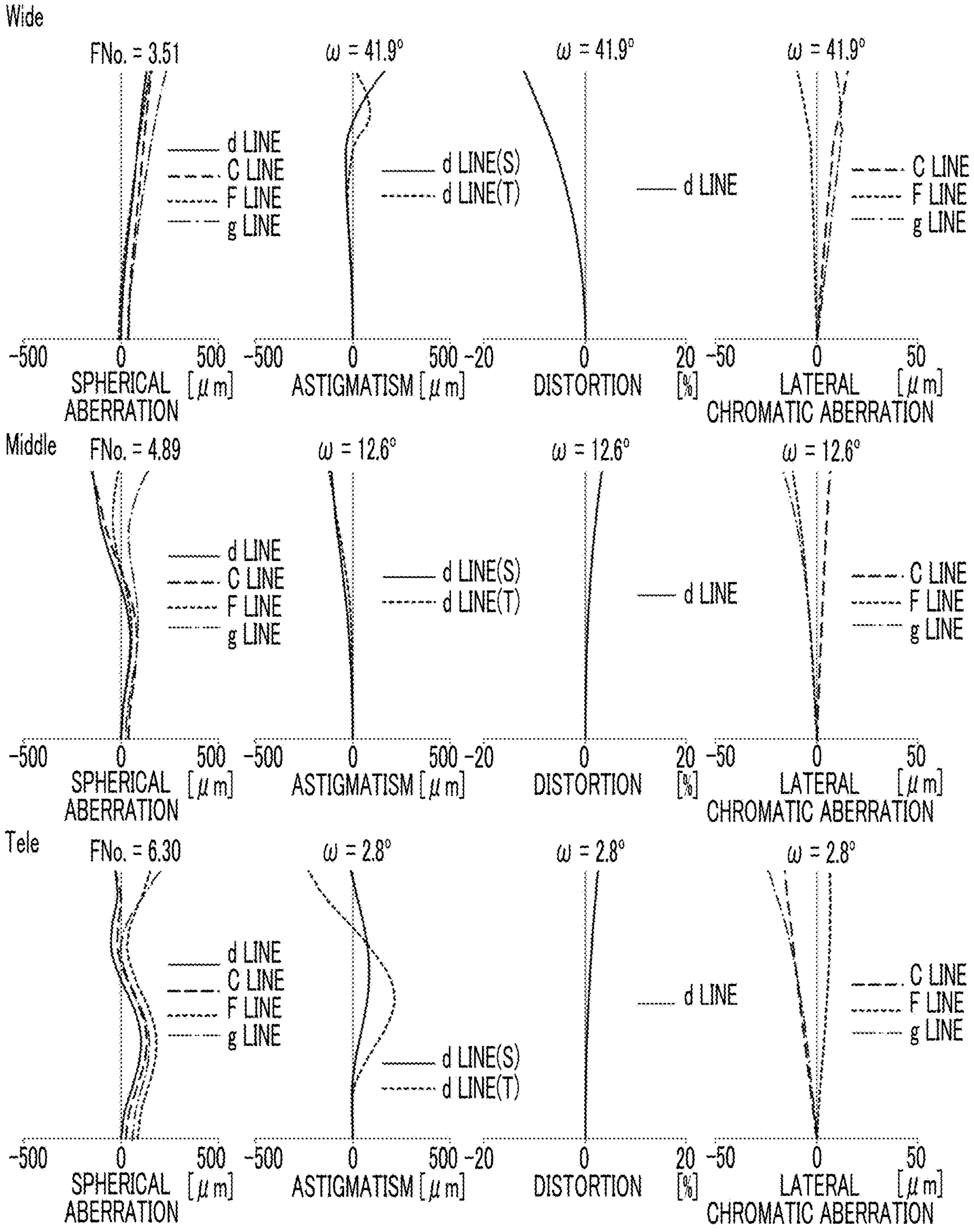
FIG. 27 is a diagram showing aberrations of the zoom lens of Example 13.

Regarding the zoom lens of Example 13, Table 37 shows basic lens data, Table 38 shows specifications and variable surface spacings, and Table 39 shows aspherical coefficients thereof. FIG. 27 shows aberration diagrams thereof.

TABLE 37

| Example 13 | | | | | |
|---|---|---|---|---|---|
| Sn | R | D | Nd | νd | θgF |
| 1 | 162.8581 | 1.5260 | 1.98441 | 30.16 | 0.5965 |
| 2 | 86.4039 | 6.2351 | 1.51500 | 78.87 | 0.5385 |
| 3 | −417.4069 | 0.1002 | | | |
| 4 | 84.8919 | 4.6358 | 1.59644 | 66.40 | 0.5429 |
| 5 | 744.2541 | DD[5] | | | |
| 6 | −544.9347 | 0.9096 | 1.74990 | 54.18 | 0.5446 |
| 7 | 23.9626 | 4.4899 | | | |
| 8 | −291.2788 | 0.7489 | 1.63355 | 60.98 | 0.5434 |
| 9 | 23.1529 | 0.1001 | | | |

TABLE 37-continued

| Example 13 | | | | | |
|---|---|---|---|---|---|
| Sn | R | D | Nd | νd | θgF |
| 10 | 23.5734 | 3.3855 | 1.92224 | 18.89 | 0.6496 |
| 11 | 59.2148 | 2.4150 | | | |
| 12 | −60.8481 | 0.7039 | 1.73386 | 55.82 | 0.5430 |
| 13 | −904.5000 | DD[13] | | | |
| 14 | 28.6350 | 3.7640 | 1.64474 | 33.95 | 0.5941 |
| 15 | −105.0828 | 4.7461 | | | |
| 16(St) | ∞ | 2.4294 | | | |
| 17 | 26.3935 | 4.4815 | 1.43599 | 90.90 | 0.5313 |
| 18 | −25.4163 | 0.6408 | 1.99310 | 23.84 | 0.6239 |
| 19 | 88.9692 | 0.1002 | | | |
| 20 | 24.8693 | 3.5827 | 1.47126 | 85.53 | 0.5349 |
| 21 | −73.8984 | DD[21] | | | |
| *22 | −44.3957 | 0.6428 | 1.53730 | 75.47 | 0.5398 |
| *23 | 33.3006 | DD[23] | | | |
| *24 | 21.3771 | 4.9944 | 1.72988 | 56.23 | 0.5427 |
| *25 | −34.1214 | 1.1957 | | | |
| *26 | 337.7282 | 0.6438 | 1.76093 | 48.61 | 0.5548 |
| *27 | 20.8753 | 8.7103 | | | |
| 28 | 49.4530 | 6.8371 | 1.78813 | 25.70 | 0.6157 |
| 29 | −15.2092 | 0.6708 | 1.85144 | 43.80 | 0.5622 |
| 30 | −96.2466 | 0.8857 | | | |
| 31 | −39.5660 | 0.6769 | 2.00001 | 26.31 | 0.6102 |
| 32 | −2769.9276 | DD[32] | | | |

TABLE 38

| Example 13 | | | |
|---|---|---|---|
| | Wide | Middle | Tele |
| Zr | 1.0 | 3.4 | 15.7 |
| f | 18.02 | 61.29 | 282.99 |
| Bf | 14.00 | 40.30 | 62.13 |
| FNo. | 3.51 | 4.89 | 6.30 |
| 2ω[°] | 83.8 | 25.2 | 5.6 |
| DD[5] | 0.6949 | 31.3627 | 75.8092 |
| DD[13] | 36.7248 | 14.9949 | 0.6994 |
| DD[21] | 1.4700 | 2.9861 | 4.9562 |
| DD[23] | 8.8726 | 4.2140 | 1.1963 |
| DD[32] | 13.9964 | 40.2988 | 62.1276 |

TABLE 39

| Example 13 | | | | |
|---|---|---|---|---|
| Sn | 22 | 23 | 24 | 25 |
| KA | −4.4378691E+00 | −4.0685567E+00 | −1.2226540E+00 | 1.2064115E+00 |
| A4 | −9.4533098E−07 | 1.1073818E−05 | −4.2862540E−06 | 2.6032925E−05 |
| A6 | 3.1610271E−08 | −6.0258188E−08 | 5.8435008E−08 | 8.7679474E−10 |
| A8 | 1.1127063E−10 | 1.8523237E−09 | −9.6721566E−10 | −6.4748457E−10 |
| A10 | 1.3120402E−11 | −1.0438205E−11 | 7.6090898E−12 | 8.1838289E−12 |
| A12 | −9.3628399E−14 | 3.1692852E−14 | −3.3917770E−14 | −5.1132146E−14 |

| Sn | 26 | 27 |
|---|---|---|
| KA | −5.0000038E+00 | −5.0938117E−01 |
| A4 | 1.4620815E−05 | 2.5304300E−05 |
| A6 | −1.1676197E−07 | −1.3082083E−07 |
| A8 | 6.0455949E−10 | 1.8961420E−09 |
| A10 | −3.9255593E−12 | −3.2396564E−11 |
| A12 | −1.0764587E−14 | 1.4466216E−13 |

EXAMPLE 14

Figure 28:
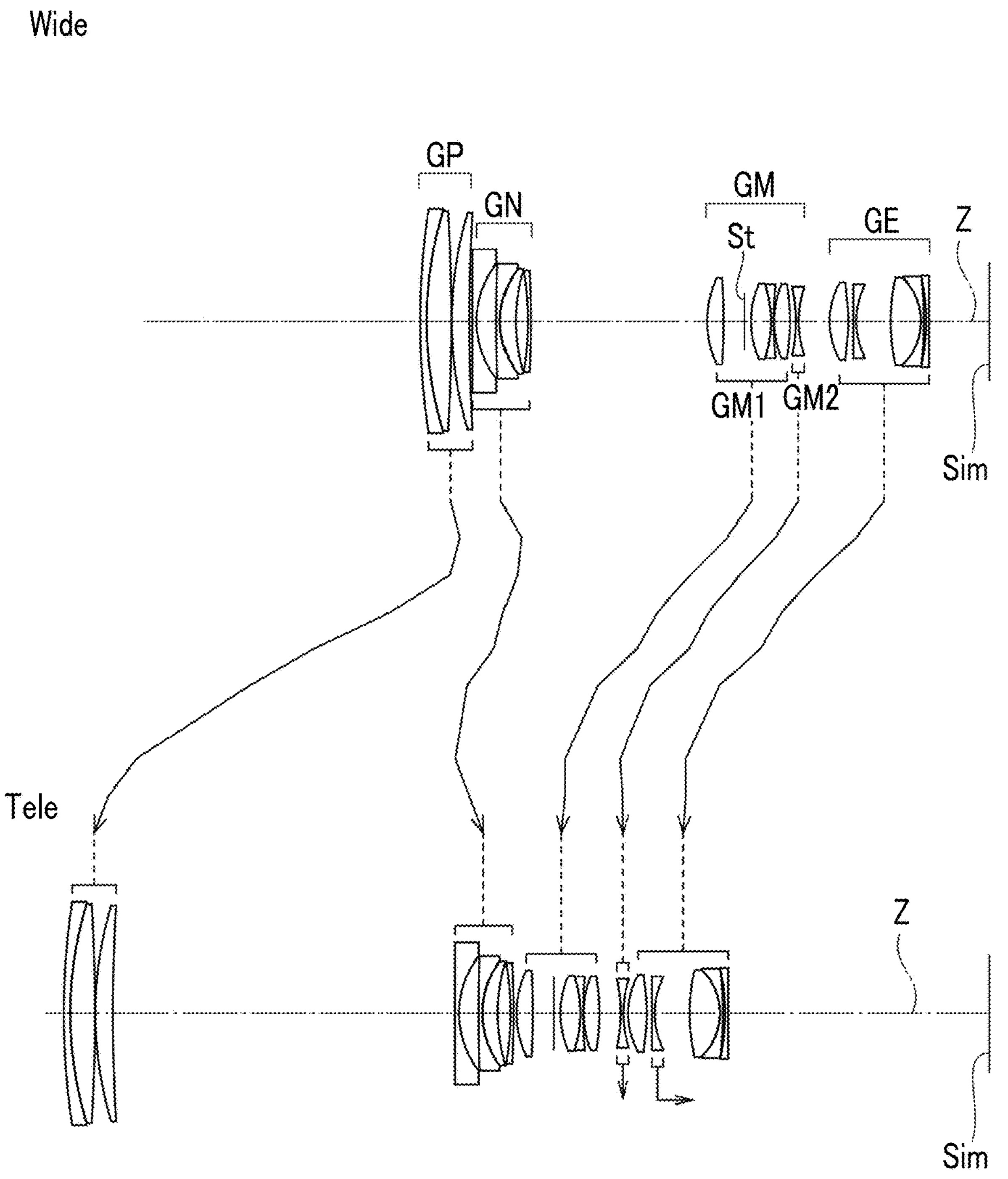
FIG. 28 is a cross-sectional view of a configuration of a zoom lens of Example 14 and a diagram showing movement loci thereof.

FIG. 28 shows a configuration and movement loci of the zoom lens of Example 14. The zoom lens of Example 14 consists of, in order from the object side to the image side, an object side positive group GP, an object side negative group GN, an intermediate group GM, and a final group GE. The object side positive group GP consists of one lens group which has a positive refractive power. The object side negative group GN consists of one lens group which has a negative refractive power. The intermediate group GM consists of, in order from the object side to the image side, two lens groups including a first M lens group refractive power. The first M lens group GM1 includes an aperture stop St.

During zooming from the wide-angle end to the telephoto end, all the lens groups move by changing the spacings between the adjacent lens groups. The zoom lens includes only one focusing group. The focusing group consists of one lens which is second from the object side in the final group GE. During focusing from the infinite distance object to the close-range object, the focusing group moves to the image side. The vibration-proof group consists of the second M lens group GM2.

Figure 29:
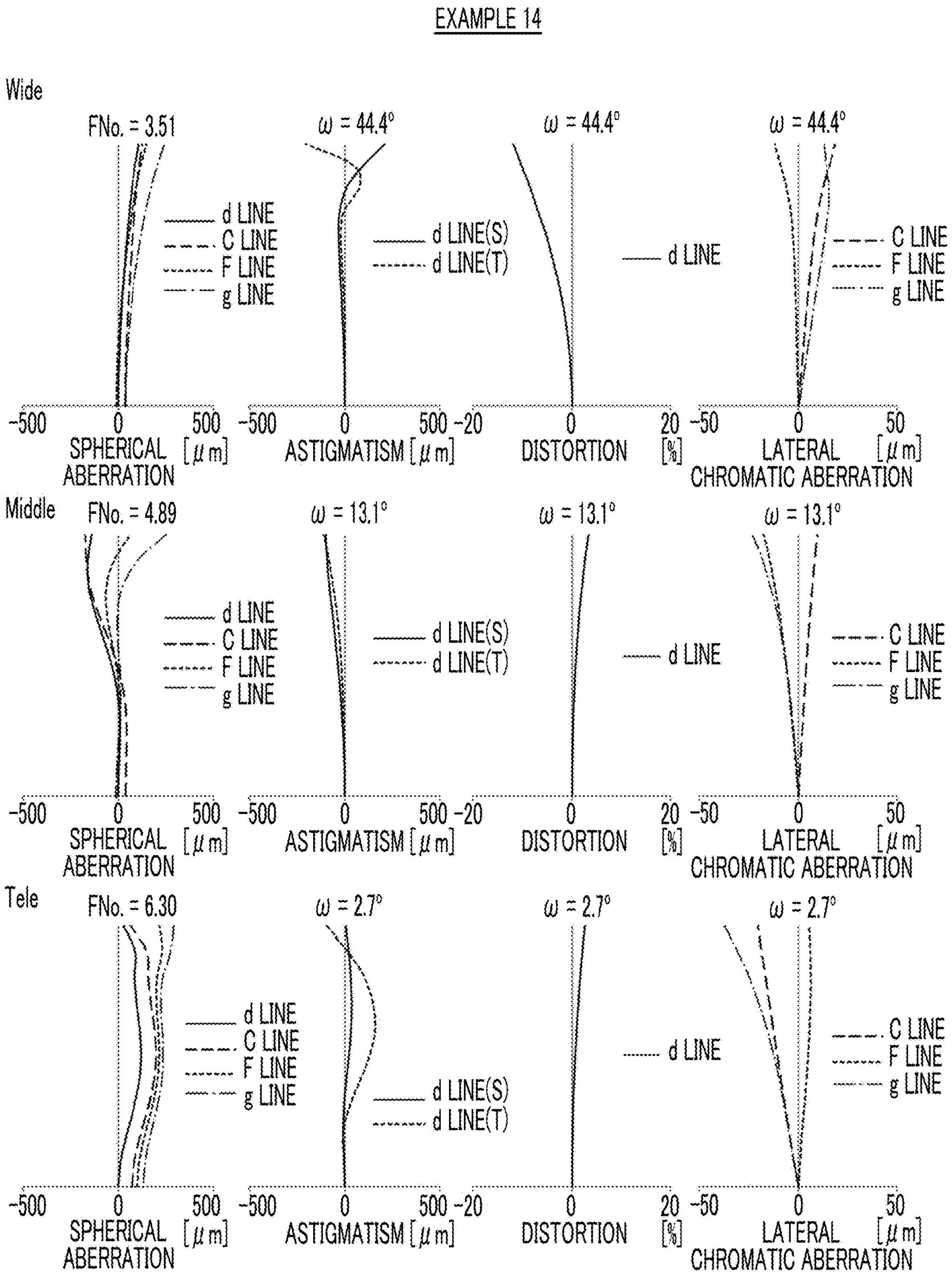
FIG. 29 is a diagram showing aberrations of the zoom lens of Example 14.

Regarding the zoom lens of Example 14, Table 40 shows basic lens data, Table 41 shows specifications and variable surface spacings, and Table 42 shows aspherical coefficients thereof. FIG. 29 shows aberration diagrams thereof.

TABLE 40

Example 14

| Sn | R | D | Nd | νd | θgF |
|---|---|---|---|---|---|
| 1 | 186.1876 | 1.4983 | 1.99905 | 26.95 | 0.6064 |
| 2 | 93.9015 | 5.7271 | 1.55046 | 73.47 | 0.5404 |
| 3 | −460.3288 | 0.1001 | | | |
| 4 | 93.9197 | 4.0726 | 1.72952 | 56.24 | 0.5427 |
| 5 | 460.9010 | DD[5] | | | |
| 6 | 3548.5546 | 0.9620 | 1.80847 | 48.19 | 0.5540 |
| 7 | 23.4067 | 4.5848 | | | |
| 8 | 577.7664 | 0.7794 | 1.73459 | 55.75 | 0.5431 |
| 9 | 21.6491 | 0.0998 | | | |
| 10 | 21.9965 | 3.4985 | 1.96376 | 16.81 | 0.6643 |
| 11 | 44.9093 | 2.7827 | | | |
| 12 | −76.3544 | 0.7135 | 1.82754 | 46.24 | 0.5577 |
| 13 | −221.6756 | DD[13] | | | |
| 14 | 25.3380 | 3.7724 | 1.61326 | 36.67 | 0.5870 |
| 15 | −180.4135 | 4.8857 | | | |
| 16(St) | ∞ | 1.5000 | | | |
| 17 | 23.1199 | 4.6390 | 1.43644 | 90.83 | 0.5314 |
| 18 | −29.2633 | 0.6405 | 2.00000 | 24.49 | 0.6206 |
| 19 | 100.5362 | 0.1001 | | | |
| 20 | 24.6099 | 3.6524 | 1.49455 | 81.98 | 0.5373 |
| 21 | −57.2343 | DD[21] | | | |
| *22 | −36.5187 | 0.6430 | 1.55505 | 72.77 | 0.5407 |
| *23 | 25.7320 | DD[23] | | | |
| *24 | 18.2501 | 4.3439 | 1.72856 | 56.29 | 0.5427 |
| *25 | −42.2736 | 1.1934 | | | |
| *26 | −486.1921 | 0.6464 | 1.84999 | 43.63 | 0.5627 |
| *27 | 20.2766 | 8.0917 | | | |
| 28 | 48.9931 | 7.0331 | 1.84304 | 22.85 | 0.6272 |
| 29 | −15.1421 | 0.6758 | 1.91930 | 36.85 | 0.5782 |
| 30 | −94.3498 | 0.5240 | | | |
| 31 | −52.4668 | 0.6810 | 2.00001 | 17.84 | 0.6599 |
| 32 | 85753.1876 | DD[32] | | | |

TABLE 41

Example 14

| | Wide | Middle | Tele |
|---|---|---|---|
| Zr | 1.0 | 3.6 | 17.7 |
| f | 16.45 | 58.95 | 290.57 |
| Bf | 14.00 | 42.75 | 60.72 |
| FNo. | 3.51 | 4.89 | 6.30 |
| 2ω[°] | 88.8 | 26.2 | 5.4 |
| DD[5] | 0.6969 | 30.8204 | 79.5164 |
| DD[13] | 40.9480 | 16.0154 | 0.6958 |
| DD[21] | 1.3719 | 2.6532 | 4.9377 |
| DD[23] | 7.1721 | 3.7213 | 1.1933 |
| DD[32] | 13.9982 | 42.7516 | 60.7246 |

TABLE 42

Example 14

| Sn | 22 | 23 | 24 | 25 |
|---|---|---|---|---|
| KA | −1.1459386E+00 | −1.7184757E+00 | −1.4754475E+00 | −1.1613188E+00 |
| A4 | 1.7081642E−05 | 1.9084997E−05 | 1.7856096E−05 | 3.8629930E−05 |
| A6 | −1.7029249E−07 | −1.4387782E−07 | 2.9359207E−08 | 5.6798728E−08 |
| A8 | 1.8047322E−09 | 1.7153140E−10 | −1.8566170E−09 | −2.9352750E−09 |
| A10 | 6.7606046E−12 | 4.0861729E−11 | 4.5301083E−11 | 6.1454547E−11 |
| A12 | −6.3552347E−14 | −2.6058293E−13 | −2.9883765E−13 | −4.0764188E−13 |

| Sn | 26 | 27 |
|---|---|---|
| KA | 5.0000055E+00 | −4.1786677E−01 |
| A4 | 3.4542208E−05 | 4.5858005E−05 |
| A6 | −3.4941202E−07 | −4.4332905E−07 |
| A8 | −7.2737424E−10 | 1.9947914E−09 |
| A10 | 4.0320238E−11 | −1.0155472E−11 |
| A12 | −2.0673951E−13 | 1.3601677E−13 |

EXAMPLE 15

Figure 30:
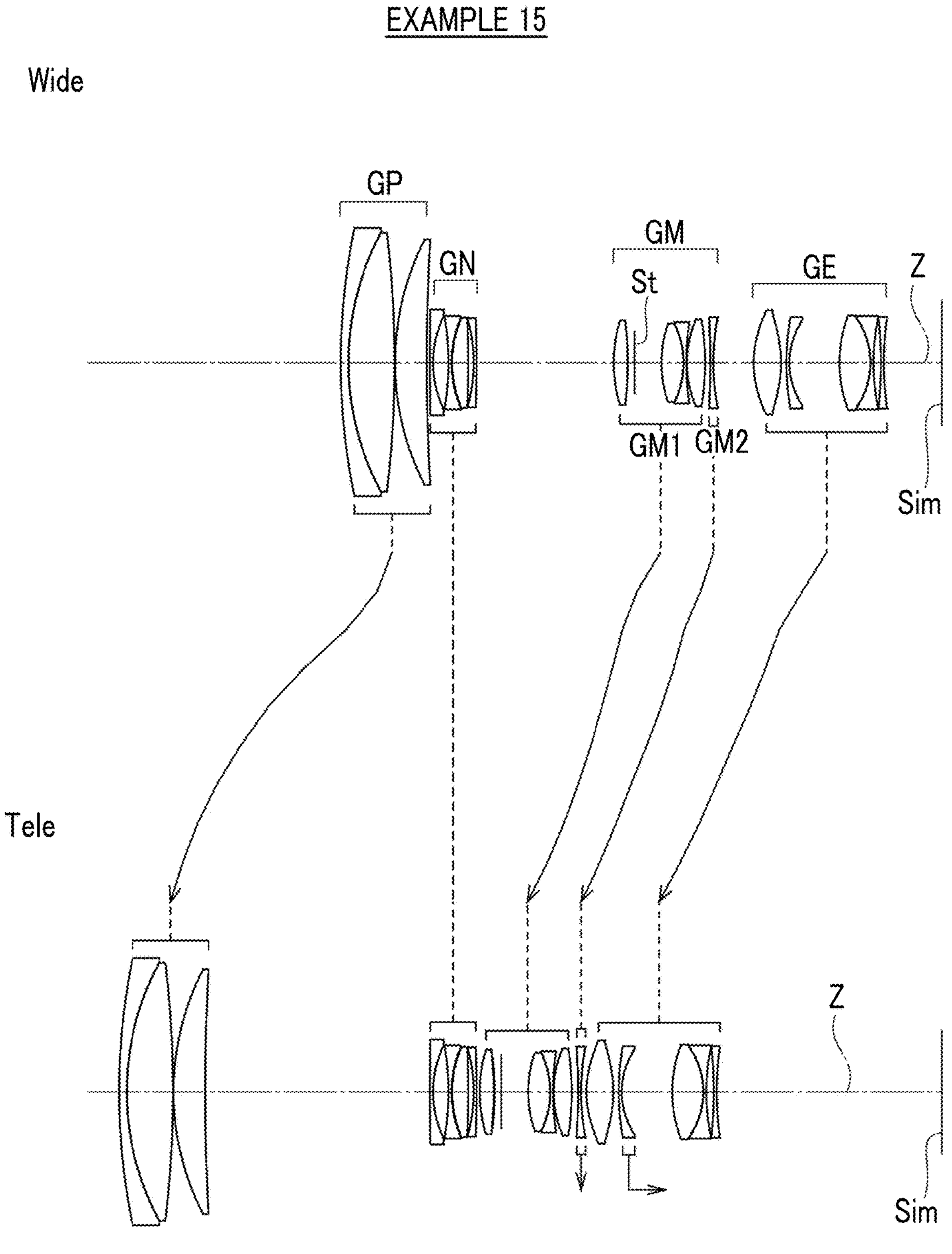
FIG. 30 is a cross-sectional view of a configuration of a zoom lens of Example 15 and a diagram showing movement loci thereof.

FIG. 30 shows a configuration and movement loci of the zoom lens of Example 15. The zoom lens of Example 15 consists of, in order from the object side to the image side, an object side positive group GP, an object side negative group GN, an intermediate group GM, and a final group GE. The object side positive group GP consists of one lens group which has a positive refractive power. The object side negative group GN consists of one lens group which has a negative refractive power. The intermediate group GM consists of, in order from the object side to the image side, two lens groups including a first M lens group refractive power. The first M lens group GM1 includes an aperture stop St.

During zooming from the wide-angle end to the telephoto end, the object side negative group GN remains stationary with respect to the image plane Sim, and the other lens groups move by changing the spacings between the adjacent lens groups. The zoom lens includes only one focusing group. The focusing group consists of one lens which is second from the object side in the final group GE. During focusing from the infinite distance object to the close-range object, the focusing group moves to the image side. The vibration-proof group consists of the second M lens group GM2.

Figure 31:
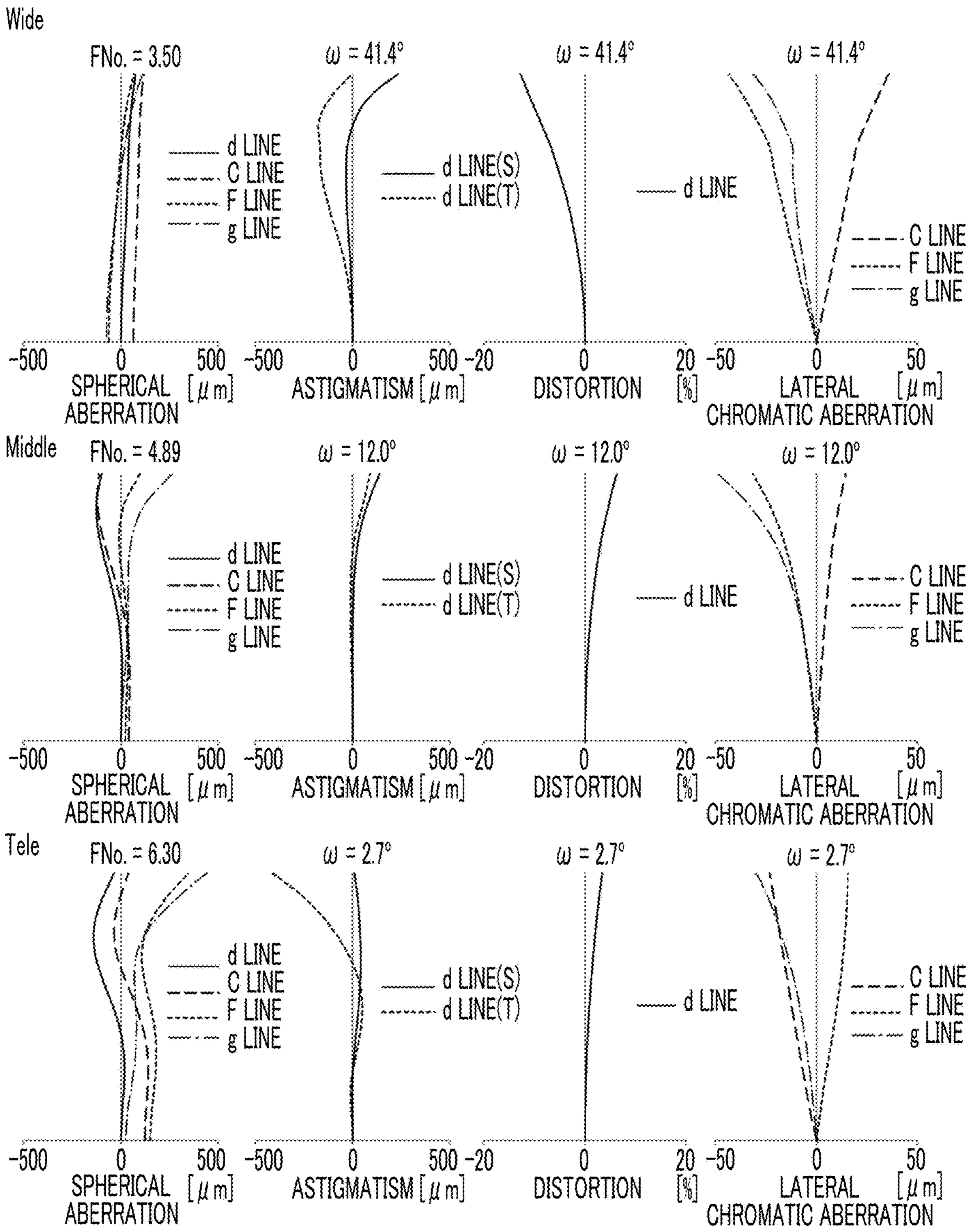
FIG. 31 is a diagram showing aberrations of the zoom lens of Example 15.

Regarding the zoom lens of Example 15, Table 43 shows basic lens data, Table 44 shows specifications and variable surface spacings, and Table 45 shows aspherical coefficients thereof. FIG. 31 shows aberration diagrams thereof.

TABLE 43

| Example 15 | | | | | |
|---|---|---|---|---|---|
| Sn | R | D | Nd | νd | θgF |
| 1 | 157.4611 | 1.6865 | 2.00000 | 25.83 | 0.6131 |
| 2 | 63.8132 | 10.2409 | 1.50938 | 79.72 | 0.5382 |
| 3 | −258.9094 | 0.0998 | | | |
| 4 | 63.5555 | 6.9534 | 1.84045 | 44.92 | 0.5602 |
| 5 | 504.1819 | DD[5] | | | |
| 6 | 929.0602 | 0.6997 | 1.97430 | 31.23 | 0.5932 |
| 7 | 25.5651 | 3.3850 | | | |
| 8 | −62.4969 | 0.6656 | 1.90547 | 38.27 | 0.5746 |
| 9 | 26.7993 | 0.1387 | | | |
| 10 | 26.7801 | 3.5351 | 2.00001 | 15.00 | 0.6777 |
| 11 | −221.1340 | 1.1856 | | | |
| 12 | −38.3116 | 0.6438 | 1.91917 | 36.87 | 0.5781 |
| 13 | −303.3334 | DD[13] | | | |
| 14 | 34.8775 | 3.0582 | 1.74188 | 27.91 | 0.6095 |

TABLE 43-continued

| Example 15 | | | | | |
|---|---|---|---|---|---|
| Sn | R | D | Nd | νd | θgF |
| 15 | −89.1638 | 1.5000 | | | |
| 16(St) | ∞ | 5.9022 | | | |
| 17 | 28.3202 | 4.8548 | 1.43600 | 67.00 | 0.5256 |
| 18 | −21.1007 | 0.6288 | 2.00000 | 23.43 | 0.6267 |
| 19 | 68.8059 | 0.1001 | | | |
| 20 | 25.8884 | 3.9769 | 1.43599 | 90.90 | 0.5313 |
| 21 | −65.1843 | DD[21] | | | |
| *22 | −185.4158 | 0.6539 | 1.58011 | 68.95 | 0.5420 |
| *23 | 52.1725 | DD[23] | | | |
| *24 | 23.2819 | 6.0124 | 1.73003 | 56.22 | 0.5428 |
| *25 | −29.5932 | 1.1859 | | | |
| *26 | 61.6022 | 0.6538 | 1.79821 | 49.24 | 0.5519 |
| *27 | 17.9068 | 11.1029 | | | |
| 28 | 31.5345 | 6.8066 | 1.82125 | 23.94 | 0.6197 |
| 29 | −18.6551 | 0.6704 | 1.92565 | 36.20 | 0.5798 |
| 30 | 52.7475 | 1.6164 | | | |
| 31 | −99.9242 | 0.6577 | 1.93842 | 34.90 | 0.5832 |
| 32 | 78.9199 | DD[32] | | | |

TABLE 44

| Example 15 | | | |
|---|---|---|---|
| | Wide | Middle | Tele |
| Zr | 1.0 | 3.4 | 15.7 |
| f | 18.46 | 62.76 | 289.77 |
| Bf | 12.74 | 29.59 | 49.53 |
| FNo. | 3.50 | 4.89 | 6.30 |
| 2ω[°] | 82.8 | 24.0 | 5.4 |
| DD[5] | 0.6895 | 28.0318 | 49.4338 |
| DD[13] | 30.0359 | 17.0755 | 0.6830 |
| DD[21] | 1.1823 | 2.6543 | 1.3873 |
| DD[23] | 8.8238 | 3.4636 | 1.1826 |
| DD[32] | 12.7373 | 29.5859 | 49.5265 |

TABLE 45

| Example 15 | | | | |
|---|---|---|---|---|
| Sn | 22 | 23 | 24 | 25 |
| KA | 4.6043272E+00 | −3.0089243E+00 | −1.0305795E+00 | 1.1384073E+00 |
| A4 | −1.6180909E−05 | −1.8852692E−05 | −1.2249763E−05 | 2.3133367E−05 |
| A6 | 2.1663289E−08 | 8.1305761E−08 | 1.1869804E−07 | 5.6615407E−08 |
| A8 | 2.2424617E−09 | 1.0142225E−09 | −1.3342843E−09 | −9.2810737E−10 |
| A10 | −2.0682976E−13 | 8.1731054E−12 | 5.8513895E−12 | 3.5611823E−12 |
| A12 | −8.5538991E−14 | −9.9352443E−14 | 9.7895350E−15 | 1.6500812E−14 |

| Sn | 26 | 27 |
|---|---|---|
| KA | 2.9733181E+00 | −2.6883395E−01 |
| A4 | 1.1980307E−05 | 3.6898096E−05 |
| A6 | −1.5181017E−07 | −1.5377426E−07 |
| A8 | 7.8052055E−10 | 1.8178131E−09 |
| A10 | −9.9932832E−12 | −3.2199642E−11 |
| A12 | 4.5841395E−14 | 1.4976108E−13 |

EXAMPLE 16

Figure 32:
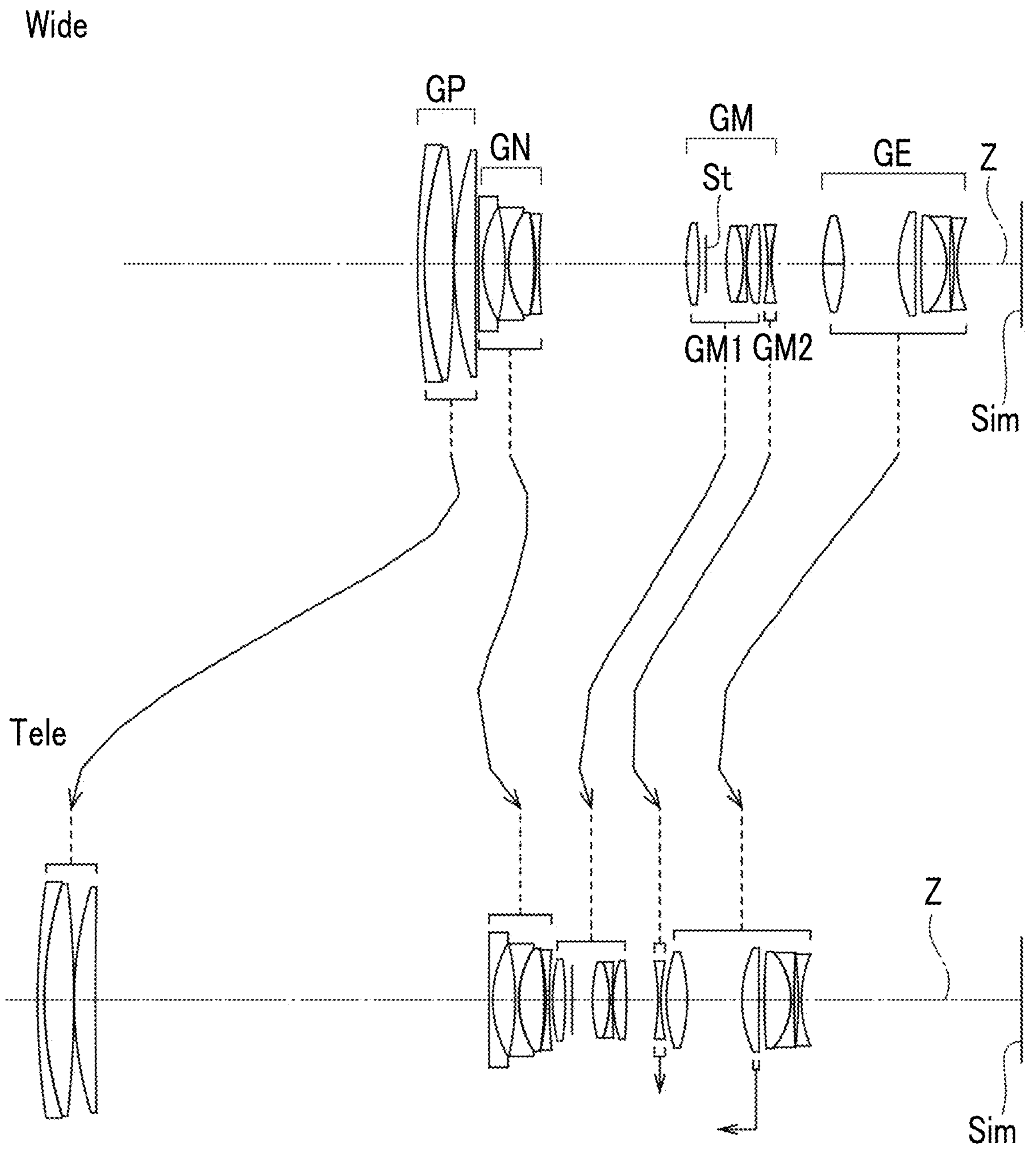
FIG. 32 is a cross-sectional view of a configuration of a zoom lens of Example 16 and a diagram showing movement loci thereof.

FIG. 32 shows a configuration and movement loci of the zoom lens of Example 16. The zoom lens of Example 16 consists of, in order from the object side to the image side, an object side positive group GP, an object side negative group GN, an intermediate group GM, and a final group GE. The object side positive group GP consists of one lens group which has a positive refractive power. The object side negative group GN consists of one lens group which has a negative refractive power. The intermediate group GM consists of, in order from the object side to the image side, two lens groups including a first M lens group refractive power. The first M lens group GM1 includes an aperture stop St.

During zooming from the wide-angle end to the telephoto end, all the lens groups move by changing the spacings between the adjacent lens groups. The zoom lens includes only one focusing group. The focusing group consists of one lens which is second from the object side in the final group GE. During focusing from the infinite distance object to the close-range object, the focusing group moves toward the object side. The vibration-proof group consists of the second M lens group GM2.

Figure 33:
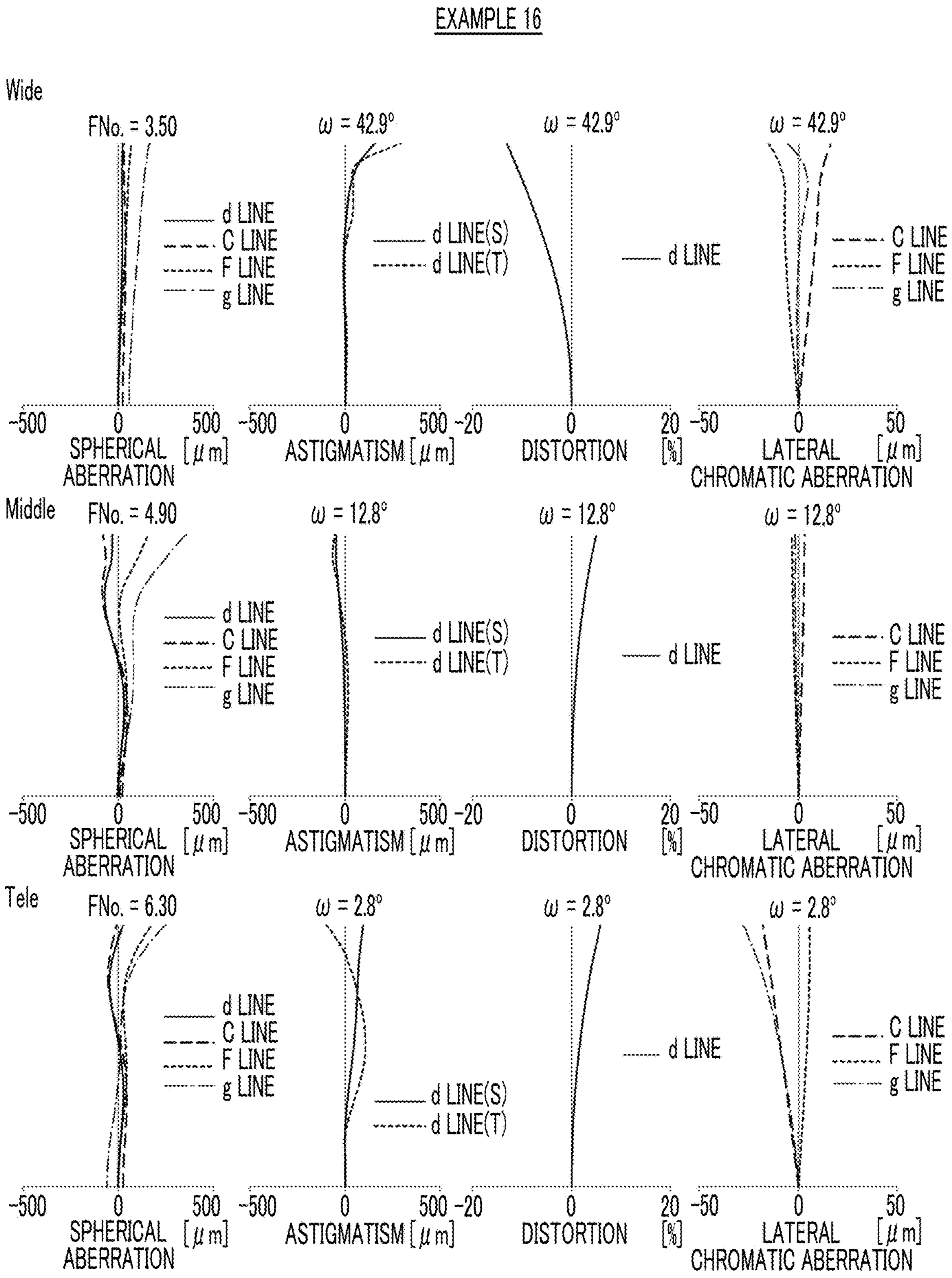
FIG. 33 is a diagram of aberrations in the zoom lens of Example 16.

Regarding the zoom lens of Example 16, Table 46 shows basic lens data, Table 47 shows specifications and variable surface spacings, and Table 48 shows aspherical coefficients thereof. FIG. 33 shows aberration diagrams thereof.

TABLE 46

Example 16

| Sn | R | D | Nd | νd | θgF |
|---|---|---|---|---|---|
| 1 | 196.3394 | 1.4909 | 1.93967 | 34.77 | 0.5835 |
| 2 | 91.1198 | 6.4369 | 1.49742 | 81.54 | 0.5376 |
| 3 | −255.3036 | 0.0998 | | | |
| 4 | 90.3977 | 4.6452 | 1.54529 | 74.25 | 0.5402 |
| 5 | 1666.9525 | DD[5] | | | |
| 6 | 2093.3558 | 0.8602 | 1.82571 | 46.43 | 0.5574 |
| 7 | 26.5938 | 4.9090 | | | |
| 8 | −57.9315 | 0.7301 | 1.67733 | 58.83 | 0.5423 |
| 9 | 22.0298 | 0.0998 | | | |

TABLE 46-continued

Example 16

| Sn | R | D | Nd | νd | θgF |
|---|---|---|---|---|---|
| 10 | 22.5867 | 5.5135 | 1.82731 | 23.63 | 0.6211 |
| 11 | −72.6861 | 0.4117 | | | |
| 12 | −51.1802 | 0.6934 | 1.91165 | 37.64 | 0.5762 |
| 13 | 125.9832 | DD[13] | | | |
| 14 | 40.7562 | 2.8080 | 1.73166 | 28.42 | 0.6081 |
| 15 | −74.3088 | 1.5142 | | | |
| 16(St) | ∞ | 4.4318 | | | |
| 17 | 36.8499 | 3.7520 | 1.43688 | 90.76 | 0.5314 |
| 18 | −25.9418 | 0.6449 | 1.99999 | 22.50 | 0.6327 |
| 19 | 163.5947 | 0.1000 | | | |
| 20 | 27.6570 | 2.9492 | 1.46856 | 85.94 | 0.5346 |
| 21 | −129.2177 | DD[21] | | | |
| *22 | −50.4992 | 0.6427 | 1.52605 | 77.18 | 0.5391 |
| *23 | 40.1181 | DD[23] | | | |
| *24 | 31.1608 | 4.5740 | 1.48899 | 82.83 | 0.5367 |
| *25 | −37.9586 | 11.9827 | | | |
| *26 | 29.2121 | 3.7136 | 1.60775 | 64.63 | 0.5435 |
| *27 | −323.9715 | 1.1970 | | | |
| 28 | 150.4329 | 5.6455 | 1.82786 | 23.61 | 0.6213 |
| 29 | −17.1457 | 0.6772 | 1.93015 | 35.74 | 0.5810 |
| 30 | 220.3351 | 0.9181 | | | |
| 31 | −84.5417 | 0.6672 | 1.74086 | 55.11 | 0.5436 |
| 32 | 27.9871 | DD[32] | | | |

TABLE 47

Example 16

| | Wide | Middle | Tele |
|---|---|---|---|
| Zr | 1.0 | 3.4 | 15.7 |
| f | 17.56 | 59.70 | 275.65 |
| Bf | 14.13 | 40.23 | 48.21 |
| FNo. | 3.50 | 4.90 | 6.30 |
| 2ω[°] | 85.8 | 25.6 | 5.6 |
| DD[5] | 0.6988 | 31.7662 | 85.9301 |
| DD[13] | 32.2261 | 13.6572 | 0.7025 |
| DD[21] | 1.6726 | 1.7471 | 6.8900 |
| DD[23] | 11.1968 | 4.6009 | 1.1964 |
| DD[32] | 14.1311 | 40.2284 | 48.2115 |

TABLE 48

Example 16

| Sn | 22 | 23 | 24 | 25 |
|---|---|---|---|---|
| KA | −4.6532648E+00 | 5.7380144E−01 | −4.4550433E+00 | −4.2877656E+00 |
| A4 | −3.6294604E−06 | −1.0462914E−05 | −2.7568645E−07 | −1.7304796E−05 |
| A6 | −9.8079837E−08 | −5.6268052E−08 | 8.1785333E−08 | 5.0303221E−08 |
| A8 | 1.4835980E−09 | 1.1713784E−09 | −3.9221087E−10 | 9.2624613E−10 |
| A10 | −3.3506078E−12 | −4.5831606E−12 | −2.9881159E−12 | −1.2814600E−11 |
| A12 | 1.5741508E−14 | 2.7892130E−14 | 2.1535846E−14 | 4.5443790E−14 |

| Sn | 26 | 27 |
|---|---|---|
| KA | −1.7387464E+00 | 5.0000065E+00 |
| A4 | 1.4859189E−05 | 1.9711902E−05 |
| A6 | −4.9937976E−08 | −9.5864134E−08 |
| A8 | 1.5857354E−09 | 2.6161816E−09 |
| A10 | −1.1211450E−11 | −2.3059296E−11 |
| A12 | 7.8344040E−15 | 4.6017496E−14 |

EXAMPLE 17

Figure 34:
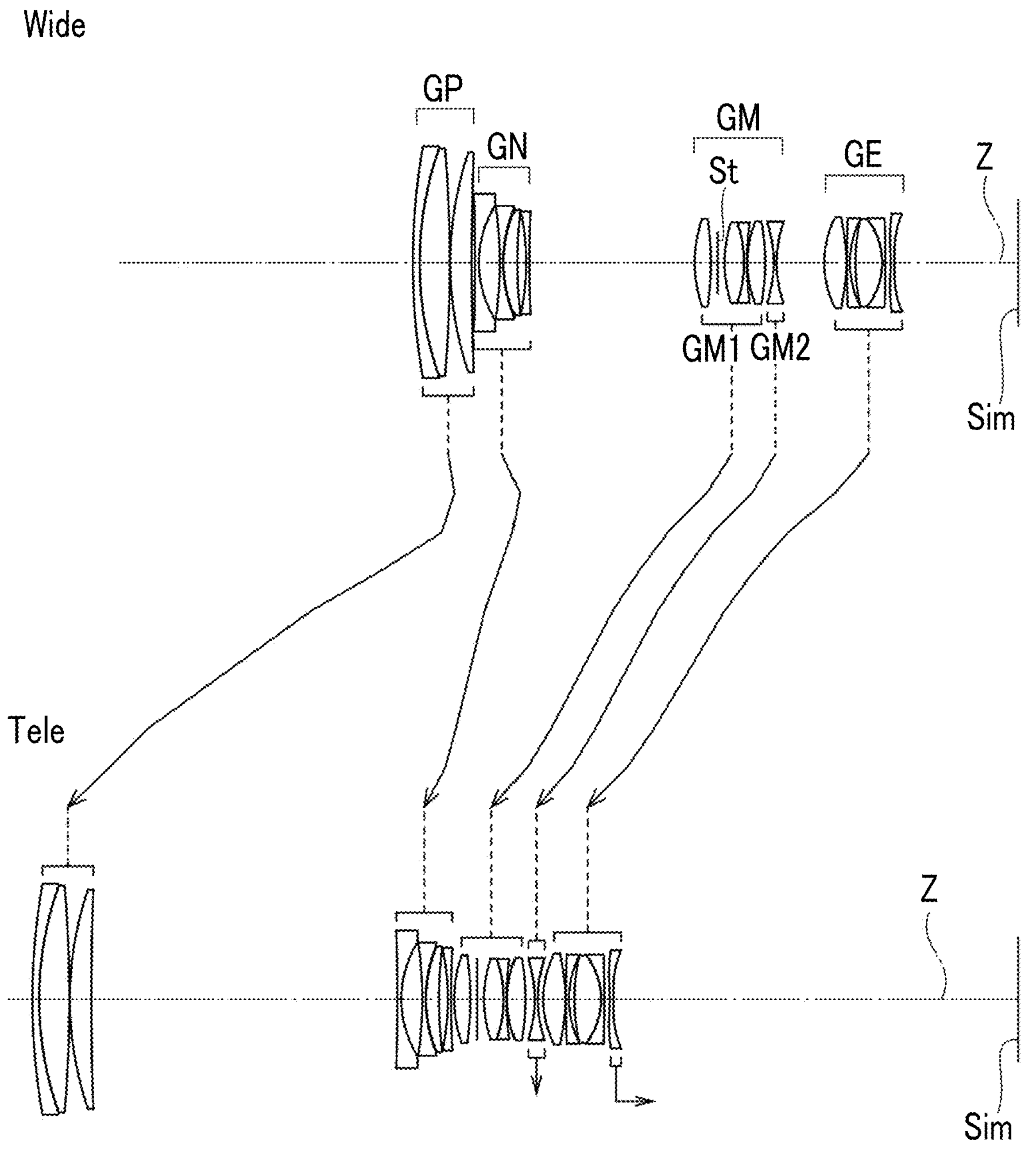
FIG. 34 is a cross-sectional view of a configuration of a zoom lens of Example 17 and a diagram showing movement loci thereof.

FIG. 34 shows a configuration and movement loci of the zoom lens of Example 17. The zoom lens of Example 17 consists of, in order from the object side to the image side, an object side positive group GP, an object side negative group GN, an intermediate group GM, and a final group GE. The object side positive group GP consists of one lens group which has a positive refractive power. The object side negative group GN consists of one lens group which has a negative refractive power. The intermediate group GM consists of, in order from the object side to the image side, two lens groups including a first M lens group refractive power. The first M lens group GM1 includes an aperture stop St.

During zooming from the wide-angle end to the telephoto end, all the lens groups move by changing the spacings between the adjacent lens groups. The zoom lens includes only one focusing group. The focusing group consists of one lens which is closest to the image side in the final group GE. During focusing from the infinite distance object to the close-range object, the focusing group moves to the image side. The vibration-proof group consists of the second M lens group GM2.

Figure 35:
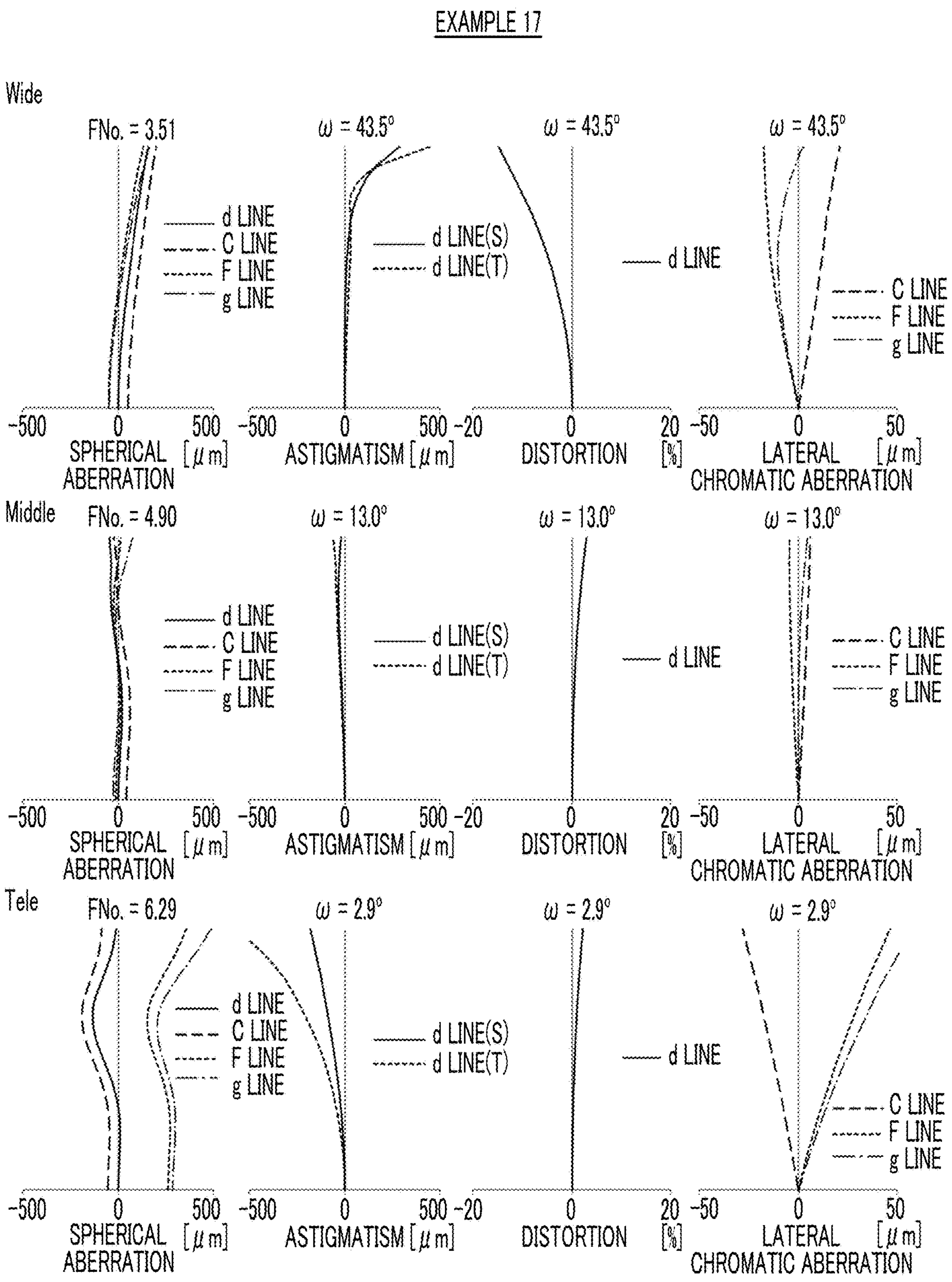
FIG. 35 is a diagram of aberrations in the zoom lens of Example 17.

Regarding the zoom lens of Example 17, Table 49 shows basic lens data, Table 50 shows specifications and variable surface spacings, and Table 51 shows aspherical coefficients thereof. FIG. 35 shows aberration diagrams thereof.

TABLE 49

Example 17

| Sn | R | D | Nd | νd | θgF |
|---|---|---|---|---|---|
| 1 | 156.0290 | 1.4739 | 1.97373 | 31.29 | 0.5931 |
| 2 | 79.7152 | 6.5935 | 1.52359 | 77.56 | 0.5390 |
| 3 | −318.5220 | 0.0998 | | | |
| 4 | 79.4803 | 4.6846 | 1.60063 | 65.74 | 0.5431 |
| 5 | 688.7552 | DD[5] | | | |
| 6 | −571.6433 | 0.8764 | 1.80707 | 48.34 | 0.5537 |
| 7 | 25.3348 | 4.5656 | | | |
| 8 | −94.0722 | 0.7309 | 1.73317 | 55.90 | 0.5430 |
| 9 | 32.9871 | 0.0998 | | | |

TABLE 49-continued

Example 17

| Sn | R | D | Nd | νd | θgF |
|---|---|---|---|---|---|
| 10 | 31.5825 | 2.8196 | 1.95117 | 17.44 | 0.6597 |
| 11 | 100.9861 | 1.9398 | | | |
| 12 | −57.1222 | 0.7000 | 1.50047 | 81.08 | 0.5377 |
| 13 | 267.8130 | DD[13] | | | |
| 14 | 31.4193 | 3.5081 | 1.67765 | 33.55 | 0.5944 |
| 15 | −72.4326 | 1.5000 | | | |
| 16(St) | ∞ | 1.5000 | | | |
| 17 | 30.1001 | 4.2751 | 1.44235 | 89.06 | 0.5315 |
| 18 | −28.1752 | 0.6412 | 1.99999 | 26.37 | 0.6099 |
| 19 | 75.9564 | 0.1002 | | | |
| 20 | 26.5267 | 3.8526 | 1.48613 | 83.26 | 0.5364 |
| 21 | −53.2562 | DD[21] | | | |
| *22 | −27.0529 | 0.6391 | 1.45783 | 87.57 | 0.5335 |
| *23 | 29.1682 | DD[23] | | | |
| *24 | 22.2635 | 4.8559 | 1.71234 | 57.10 | 0.5424 |
| *25 | −36.8329 | 0.0998 | | | |
| 26 | 269.5773 | 0.6625 | 1.82638 | 23.68 | 0.6207 |
| 27 | 22.7420 | 1.1820 | | | |
| 28 | 44.3352 | 5.8643 | 1.83255 | 24.64 | 0.6185 |
| 29 | −16.6882 | 0.6593 | 1.92169 | 32.09 | 0.5918 |
| 30 | −304.5946 | 1.1959 | | | |
| *31 | −42.9014 | 0.8113 | 1.43599 | 67.48 | 0.5252 |
| *32 | −946.6194 | DD[32] | | | |

TABLE 50

Example 17

| | Wide | Middle | Tele |
|---|---|---|---|
| Zr | 1.0 | 3.4 | 15.7 |
| f | 17.55 | 59.68 | 275.57 |
| Bf | 27.04 | 58.53 | 88.41 |
| FNo. | 3.51 | 4.90 | 6.29 |
| 2ω[°] | 87.0 | 26.0 | 5.8 |
| DD[5] | 0.6924 | 26.9191 | 66.8226 |
| DD[13] | 36.0904 | 13.8642 | 0.6973 |
| DD[21] | 1.8763 | 2.1213 | 2.0356 |
| DD[23] | 10.3798 | 4.6380 | 1.1904 |
| DD[32] | 27.0404 | 58.5257 | 88.4096 |

TABLE 51

Example 17

| Sn | 22 | 23 | 24 | 25 |
|---|---|---|---|---|
| KA | −4.2415742E+00 | −2.5354273E+00 | −1.1255368E+00 | 1.3907713E+00 |
| A4 | −4.8709802E−06 | 1.6663465E−05 | 3.8590405E−06 | 2.5482827E−05 |
| A6 | 1.4921187E−08 | −6.3561018E−08 | 8.0538629E−08 | 3.8263900E−08 |
| A8 | 5.6742705E−10 | 6.4983613E−10 | −1.0722884E−09 | −1.0104811E−09 |
| A10 | 3.0631696E−13 | 2.8711255E−12 | 8.0978404E−12 | 8.8210750E−12 |
| A12 | −2.0430458E−14 | −3.4113154E−14 | 1.4330851E−15 | −1.2860851E−15 |

| Sn | 31 | 32 |
|---|---|---|
| KA | 8.4870651E−01 | 4.9999996E+00 |
| A3 | 1.4872458E−20 | 0.0000000E+00 |
| A4 | 3.1177033E−04 | 3.0937167E−04 |
| A5 | 3.6539332E−07 | 5.6898227E−07 |
| A6 | −4.1637627E−06 | −4.0337745E−06 |
| A7 | 2.6869062E−08 | 3.3886338E−08 |
| A8 | 3.7824448E−08 | 3.5046078E−08 |
| A9 | −3.6214814E−10 | −4.2625201E−10 |
| A10 | −2.1806265E−10 | −1.9290530E−10 |
| A11 | 1.7947265E−12 | 2.0575181E−12 |
| A12 | 7.5194685E−13 | 6.3985141E−13 |

TABLE 51-continued

| Example 17 | | |
|---|---|---|
| A13 | −4.0346138E−15 | −4.5660065E−15 |
| A14 | −1.4014481E−15 | −1.1570675E−15 |
| A15 | 3.4456621E−18 | 3.8720967E−18 |
| A16 | 1.0802811E−18 | 8.7149147E−19 |

EXAMPLE 18

Figure 36:
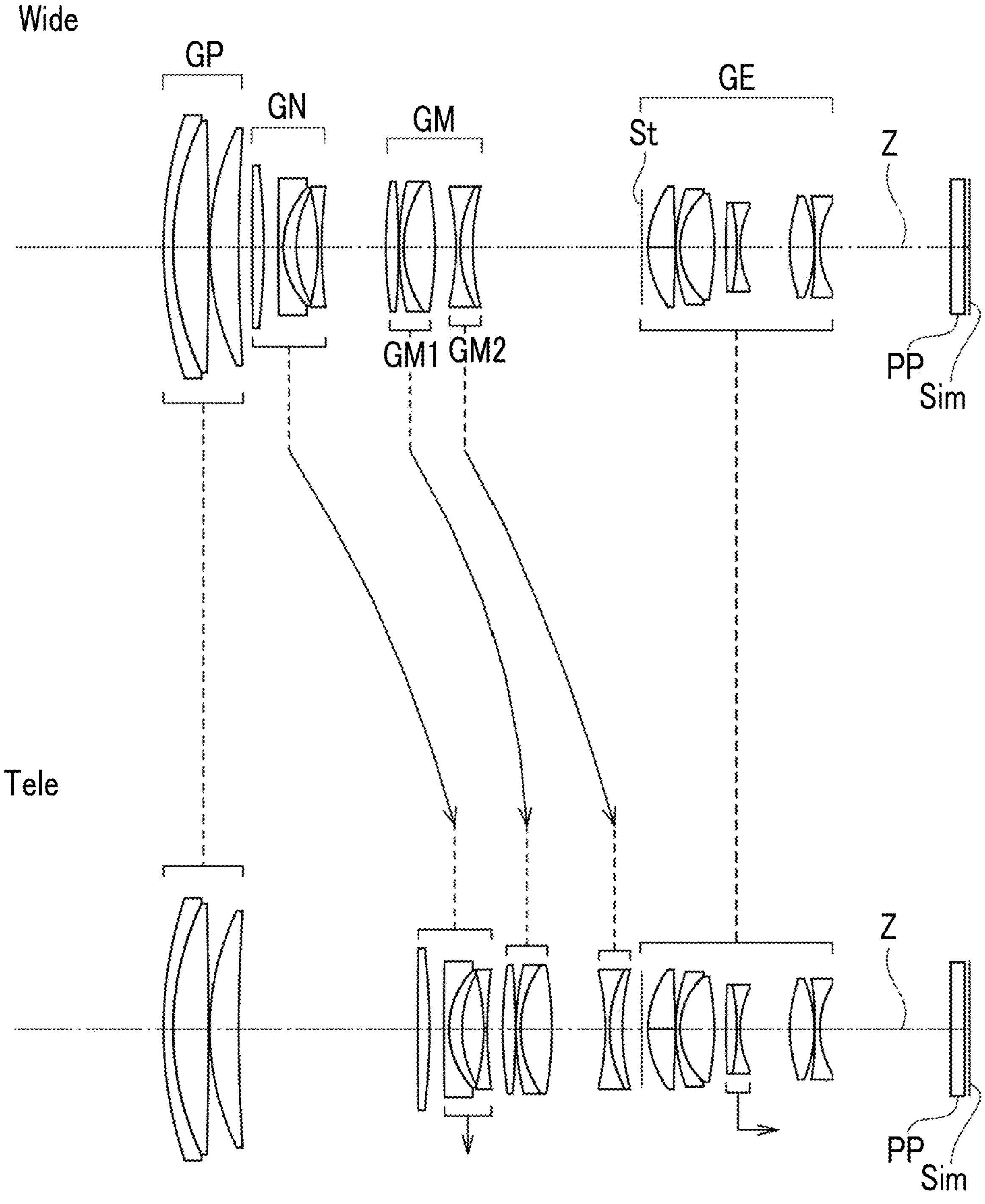
FIG. 36 is a cross-sectional view of a configuration of a zoom lens of Example 18 and a diagram showing movement loci thereof.

FIG. 36 shows a configuration and movement loci of the zoom lens of Example 18. The zoom lens of Example 18 consists of, in order from the object side to the image side, an object side positive group GP, an object side negative group GN, an intermediate group GM, and a final group GE. The object side positive group GP consists of one lens group which has a positive refractive power. The object side negative group GN consists of one lens group which has a negative refractive power. The intermediate group GM consists of, in order from the object side to the image side, two lens groups including a first M lens group GM1 that has a positive refractive power and a second M lens group GM2 that has a negative refractive power. The final group GE consists of one lens group which has a positive refractive power. The final group GE includes an aperture stop St.

During zooming from the wide-angle end to the telephoto end, the object side positive group GP and the final group GE remain stationary with respect to the image plane Sim, and the other lens groups move by changing the spacings between the adjacent lens groups. The zoom lens includes only one focusing group. The focusing group consists of two lenses which are fourth and fifth from the object side in the final group GE. During focusing from the infinite distance object to the close-range object, the focusing group moves to the image side. The vibration-proof group consists of three lenses which are second, third, and fourth from the object side in the object side negative group GN.

Figure 37:
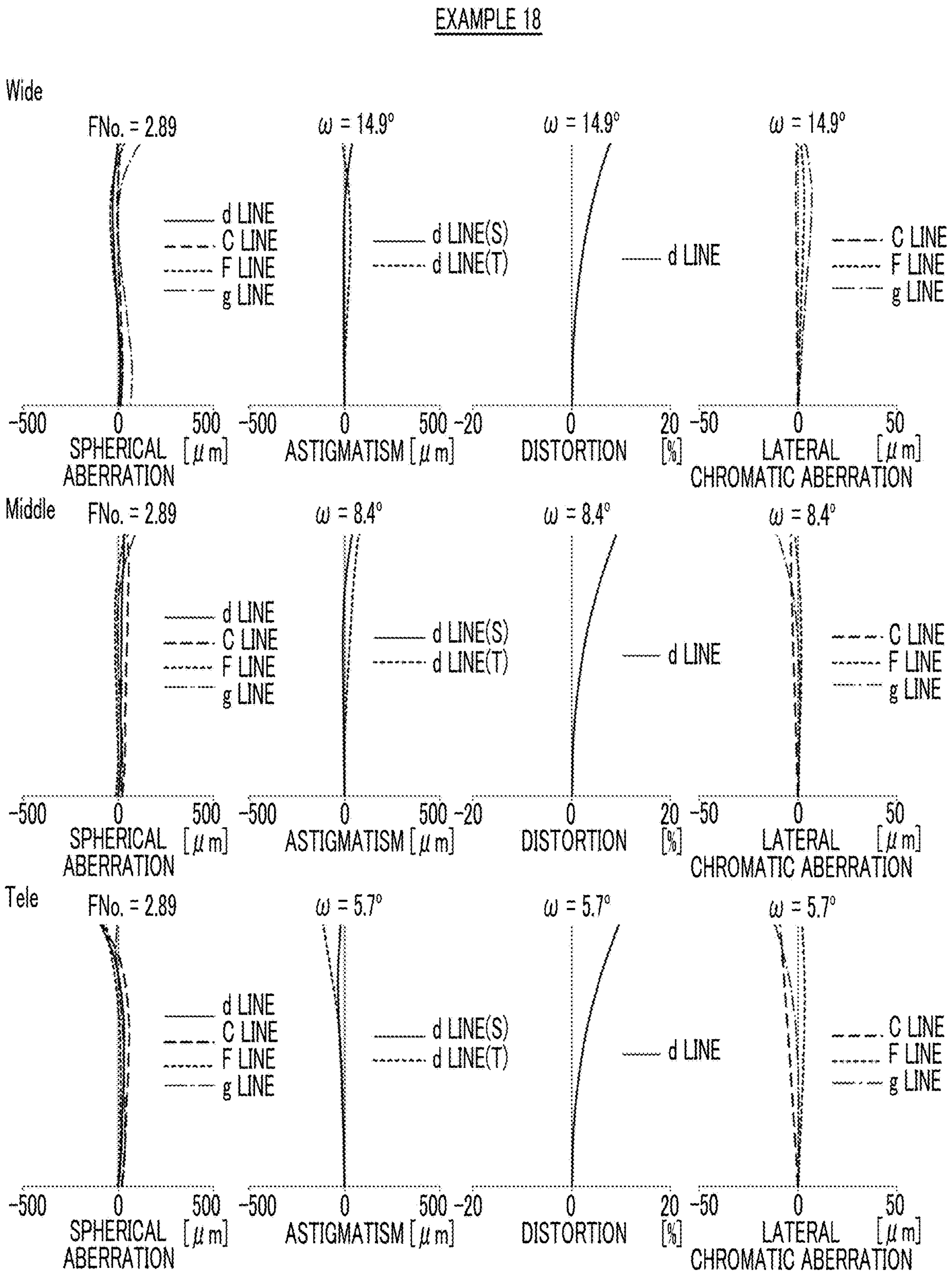
FIG. 37 is a diagram of aberrations in the zoom lens of Example 18.

Regarding the zoom lens of Example 18, Table 52 shows basic lens data, Table 53 shows specifications and variable surface spacings, and Table 54 shows aspherical coefficients thereof. FIG. 37 shows aberration diagrams thereof.

TABLE 52

| Example 18 | | | | | |
|---|---|---|---|---|---|
| Sn | R | D | Nd | νd | θgF |
| 1 | 91.6957 | 1.9555 | 1.90366 | 31.34 | 0.5964 |
| 2 | 64.2076 | 7.2945 | 1.43700 | 95.10 | 0.5336 |
| 3 | −1088.5197 | 0.2615 | | | |
| 4 | 60.1849 | 5.9368 | 1.43700 | 95.10 | 0.5336 |
| 5 | 374.9938 | DD[5] | | | |
| 6 | 2347.2205 | 2.3572 | 1.43700 | 95.10 | 0.5336 |

TABLE 52-continued

| Example 18 | | | | | |
|---|---|---|---|---|---|
| Sn | R | D | Nd | νd | θgF |
| 7 | −141.1219 | 2.9789 | | | |
| 8 | 1055.0108 | 1.0217 | 1.59282 | 68.62 | 0.5441 |
| 9 | 18.4933 | 2.6811 | 1.85896 | 22.73 | 0.6284 |
| 10 | 25.5750 | 4.4531 | | | |
| 11 | −47.4638 | 0.7569 | 1.75500 | 52.32 | 0.5476 |
| 12 | 104.5048 | DD[12] | | | |
| 13 | 95.2305 | 2.6297 | 1.95906 | 17.47 | 0.6599 |
| 14 | −165.4545 | 0.1000 | | | |
| 15 | 61.2213 | 0.9579 | 1.95906 | 17.47 | 0.6599 |
| 16 | 24.8625 | 6.4347 | 1.58913 | 61.13 | 0.5407 |
| 17 | −78.3839 | DD[17] | | | |
| 18 | −54.4183 | 0.8974 | 1.53172 | 48.84 | 0.5631 |
| 19 | 27.4942 | 2.5839 | 2.00330 | 28.27 | 0.5980 |
| 20 | 51.2504 | DD[20] | | | |
| 21(St) | ∞ | 1.3000 | | | |
| *22 | 20.9994 | 5.6178 | 1.49710 | 81.56 | 0.5385 |
| *23 | −116.2899 | 0.0998 | | | |
| 24 | 37.6131 | 0.8576 | 1.91082 | 35.25 | 0.5822 |
| 25 | 15.5016 | 7.0261 | 1.59282 | 68.62 | 0.5441 |
| 26 | −57.3246 | 2.4998 | | | |
| 27 | 344.2464 | 2.1940 | 1.64769 | 33.79 | 0.5939 |
| 28 | −46.0967 | 0.6626 | 1.69100 | 54.82 | 0.5450 |
| 29 | 19.9368 | 10.1869 | | | |
| 30 | 31.3550 | 5.0367 | 1.62004 | 36.26 | 0.5880 |
| 31 | −28.9296 | 0.0999 | | | |
| *32 | −68.2660 | 1.0740 | 1.69350 | 53.18 | 0.5483 |
| *33 | 22.3346 | 26.9151 | | | |
| 34 | ∞ | 2.8500 | 1.51633 | 64.14 | 0.5353 |
| 35 | ∞ | 1.0038 | | | |

TABLE 53

| Example 18 | | | |
|---|---|---|---|
| | Wide | Middle | Tele |
| Zr | 1.0 | 1.8 | 2.6 |
| f | 50.29 | 89.98 | 132.62 |
| Bf | 29.80 | 29.80 | 29.80 |
| FNo. | 2.89 | 2.89 | 2.89 |
| 2ω[°] | 29.8 | 16.8 | 11.4 |
| DD[5] | 2.8336 | 26.6850 | 36.9073 |
| DD[12] | 13.1757 | 8.7537 | 2.9856 |
| DD[17] | 4.2892 | 5.4649 | 10.9755 |
| DD[20] | 34.5591 | 13.9540 | 3.9893 |

TABLE 54

| Example 18 | | | | |
|---|---|---|---|---|
| Sn | 22 | 23 | 32 | 33 |
| KA | 1.0000000E+00 | 1.0000000E+00 | 1.0000000E+00 | 1.0000000E+00 |
| A3 | −1.0461880E−20 | 6.2771277E−20 | 2.3414365E−21 | 3.0458794E−20 |
| A4 | −6.3923819E−06 | 2.0143462E−05 | 1.8891252E−04 | 2.1904540E−04 |
| A5 | −9.6741365E−07 | −2.6650607E−06 | 1.8665767E−05 | 2.2676218E−05 |
| A6 | 3.4858404E−07 | 6.9990946E−07 | −9.0938163E−06 | −9.9379689E−06 |
| A7 | −4.5462534E−09 | −4.4477067E−09 | −1.1614746E−06 | −1.1677591E−06 |
| A8 | −2.0351380E−08 | −3.0268008E−08 | 3.7519321E−07 | 3.9653743E−07 |
| A9 | 2.7357946E−09 | 3.2038025E−09 | 3.7194221E−08 | 3.4964417E−08 |

TABLE 54-continued

| Example 18 | | | | |
|---|---|---|---|---|
| Sn | 22 | 23 | 32 | 33 |
| A10 | 3.1480286E−10 | 5.6804975E−10 | −1.1732712E−08 | −1.1744927E−08 |
| A11 | −7.5049508E−11 | −1.0237627E−10 | −6.6855933E−10 | −6.5944712E−10 |
| A12 | −1.2281208E−12 | −3.9626804E−12 | 2.3835705E−10 | 2.3512290E−10 |
| A13 | 9.3374796E−13 | 1.4321978E−12 | 7.0045031E−12 | 7.9012572E−12 |
| A14 | −1.6724425E−14 | −9.1164217E−15 | −3.0507332E−12 | −3.0679892E−12 |
| A15 | −6.1927862E−15 | −1.0445213E−14 | −4.3373486E−14 | −5.8290704E−14 |
| A16 | 2.1689998E−16 | 2.9305863E−16 | 2.4034133E−14 | 2.4943533E−14 |
| A17 | 2.1229175E−17 | 3.8998884E−17 | 1.5490882E−16 | 2.3994843E−16 |
| A18 | −9.5085563E−19 | −1.5774185E−18 | −1.0763980E−16 | −1.1422189E−16 |
| A19 | −2.9631210E−20 | −5.9012641E−20 | −2.6638477E−19 | −4.1944250E−19 |
| A20 | 1.5007209E−21 | 2.8420132E−21 | 2.1130842E−19 | 2.2350639E−19 |

EXAMPLE 19

Figure 38:
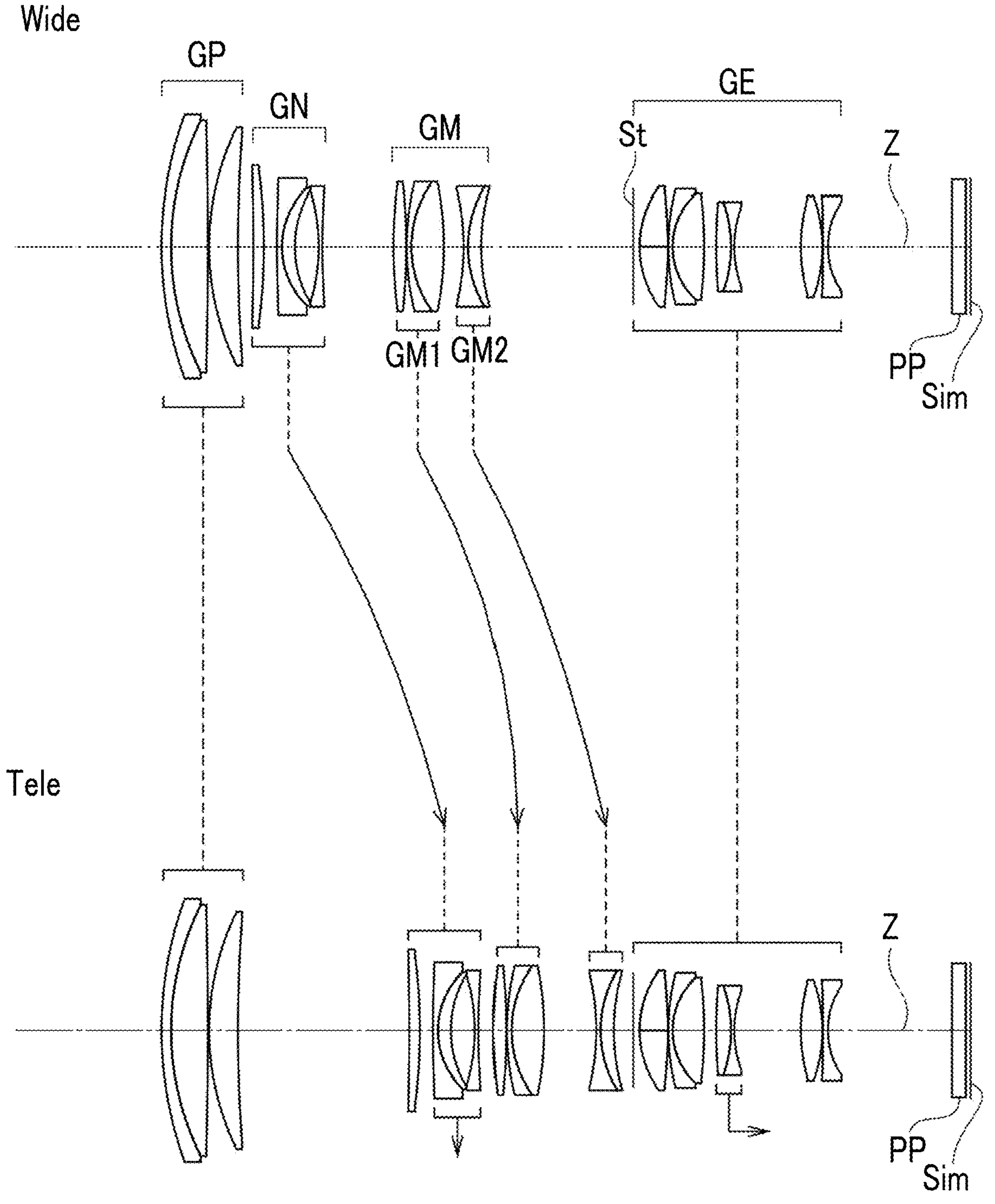
FIG. 38 is a cross-sectional view of a configuration of a zoom lens of Example 19 and a diagram showing movement loci thereof.

FIG. 38 shows a configuration and movement loci of the zoom lens of Example 19. The zoom lens of Example 19 consists of, in order from the object side to the image side, an object side positive group GP, an object side negative group GN, an intermediate group GM, and a final group GE. The object side positive group GP consists of one lens group which group GP and the final group GE remain stationary with respect to the image plane Sim, and the other lens groups move by changing the spacings between the adjacent lens groups. The zoom lens includes only one focusing group. The focusing group consists of two lenses which are fourth and fifth from the object side in the final group GE. During focusing from the infinite distance object to the close-range object, the focusing group moves to the image side. The vibration-proof group consists of three lenses which are second, third, and fourth from the object side in the object side negative group GN.

Figure 39:
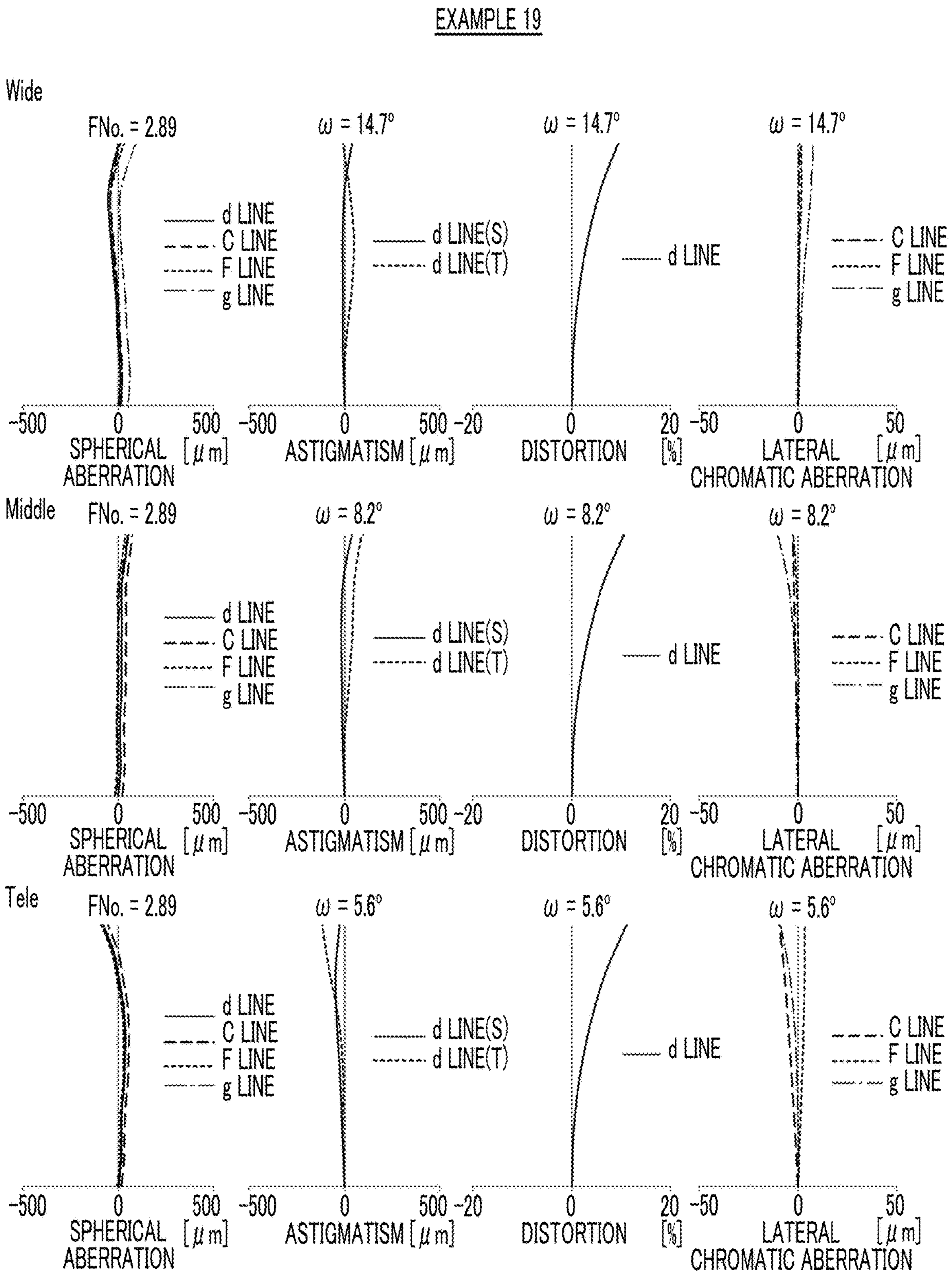
FIG. 39 is a diagram of aberrations in the zoom lens of Example 19.

Regarding the zoom lens of Example 19, Table 55 shows basic lens data, Table 56 shows specifications and variable surface spacings, and Table 57 shows aspherical coefficients thereof. FIG. 39 shows aberration diagrams thereof.

TABLE 55

| Example 19 | | | | | |
|---|---|---|---|---|---|
| Sn | R | D | Nd | νd | θgF |
| 1 | 85.2488 | 1.9496 | 1.90366 | 31.34 | 0.5964 |
| 2 | 61.5680 | 7.5625 | 1.43700 | 95.10 | 0.5336 |
| 3 | −1102.4691 | 0.2615 | | | |
| 4 | 59.3816 | 5.9238 | 1.43700 | 95.10 | 0.5336 |
| 5 | 338.9463 | DD[5] | | | |
| 6 | −709.3084 | 2.1694 | 1.43700 | 95.10 | 0.5336 |
| 7 | −130.1013 | 2.7056 | | | |
| 8 | 357.3452 | 1.0161 | 1.59282 | 68.62 | 0.5441 |
| 9 | 17.8654 | 2.6438 | 1.85896 | 22.73 | 0.6284 |
| 10 | 23.8847 | 4.9065 | | | |
| 11 | −41.7686 | 0.7536 | 1.77250 | 49.60 | 0.5521 |
| 12 | 184.2881 | DD[12] | | | |
| 13 | 110.5347 | 2.6123 | 1.95906 | 17.47 | 0.6599 |
| 14 | −135.4228 | 0.1000 | | | |
| 15 | 59.8947 | 0.9533 | 1.95906 | 17.47 | 0.6599 |
| 16 | 24.2581 | 6.6816 | 1.60311 | 60.64 | 0.5415 |
| 17 | −71.0964 | DD[17] | | | |

TABLE 55-continued

| Example 19 | | | | | |
|---|---|---|---|---|---|
| Sn | R | D | Nd | νd | θgF |
| 18 | −52.0067 | 0.8921 | 1.54072 | 47.23 | 0.5651 |
| 19 | 25.5584 | 2.7064 | 2.00069 | 25.46 | 0.6136 |
| 20 | 47.1663 | DD[20] | | | |
| 21(St) | ∞ | 1.3000 | | | |
| *22 | 21.8230 | 5.8300 | 1.49710 | 81.56 | 0.5385 |
| *23 | −84.5352 | 0.0998 | | | |
| 24 | 52.2545 | 0.8505 | 1.88300 | 39.22 | 0.5729 |
| 25 | 15.6947 | 6.4987 | 1.59282 | 68.62 | 0.5441 |
| 26 | −93.6867 | 2.4999 | | | |
| 27 | 130.2762 | 3.0212 | 1.51742 | 52.43 | 0.5565 |
| 28 | −28.7105 | 0.6660 | 1.56883 | 56.36 | 0.5489 |
| 29 | 25.4532 | 13.6870 | | | |
| 30 | 38.9255 | 4.4096 | 1.59270 | 35.31 | 0.5934 |
| 31 | −32.3880 | 0.1000 | | | |
| *32 | −84.1667 | 1.0676 | 1.61881 | 63.85 | 0.5418 |
| *33 | 23.2375 | 25.4621 | | | |
| 34 | ∞ | 2.8500 | 1.51633 | 64.14 | 0.5353 |
| 35 | ∞ | 0.9996 | | | |

TABLE 56

| Example 19 | | | |
|---|---|---|---|
| | Wide | Middle | Tele |
| Zr | 1.0 | 1.8 | 2.6 |
| f | 50.30 | 89.99 | 132.63 |
| Bf | 28.34 | 28.34 | 28.34 |
| FNo. | 2.89 | 2.89 | 2.89 |
| 2ω[°] | 29.4 | 16.4 | 11.2 |
| DD[5] | 3.1489 | 25.6848 | 35.2070 |
| DD[12] | 14.6182 | 9.3901 | 2.9829 |
| DD[17] | 4.0632 | 5.6572 | 10.7284 |
| DD[20] | 31.0713 | 12.1694 | 3.9833 |

TABLE 57

| Example 19 | | | | |
|---|---|---|---|---|
| Sn | 22 | 23 | 32 | 33 |
| KA | 1.0000000E+00 | 1.0000000E+00 | 1.0000000E+00 | 1.0000000E+00 |
| A3 | 1.5692819E−20 | −4.1847518E−20 | 3.7462984E−20 | −4.5688190E−20 |
| A4 | −6.9866395E−06 | 1.4410750E−05 | 2.3616448E−04 | 2.6432022E−04 |
| A5 | 5.4016818E−07 | −2.2585509E−06 | 2.8269927E−05 | 3.8595172E−05 |
| A6 | −9.6338946E−08 | 5.5849457E−07 | −1.0339119E−05 | −1.2367415E−05 |
| A7 | 2.2264375E−08 | 1.5905340E−08 | −1.4830667E−06 | −1.5303119E−06 |
| A8 | −9.6824778E−09 | −2.8735475E−08 | 3.7842441E−07 | 4.3991979E−07 |
| A9 | 1.1971030E−09 | 2.4898394E−09 | 4.5548135E−08 | 4.1904663E−08 |
| A10 | 1.9426192E−10 | 5.7742514E−10 | −1.0853338E−08 | −1.1572767E−08 |
| A11 | −4.7046720E−11 | −9.1159406E−11 | −8.1902152E−10 | −7.9160134E−10 |
| A12 | −4.9805084E−13 | −4.2678115E−12 | 2.0530042E−10 | 2.1228049E−10 |
| A13 | 6.5384918E−13 | 1.3249571E−12 | 8.6775584E−12 | 9.8179718E−12 |
| A14 | −1.8927065E−14 | −6.9131692E−15 | −2.4307723E−12 | −2.5924136E−12 |
| A15 | −4.5538447E−15 | −9.8125643E−15 | −5.3806805E−14 | −7.4912728E−14 |
| A16 | 2.2012469E−16 | 2.9104896E−16 | 1.7440817E−14 | 1.9849400E−14 |
| A17 | 1.5953108E−17 | 3.6897661E−17 | 1.8614128E−16 | 3.1533694E−16 |
| A18 | −9.6288025E−19 | −1.6202240E−18 | −7.0065506E−17 | −8.5398225E−17 |
| A19 | −2.2403729E−20 | −5.6023193E−20 | −2.9502806E−19 | −5.5746008E−19 |
| A20 | 1.5465451E−21 | 2.9866825E−21 | 1.2245072E−19 | 1.5623101E−19 |

EXAMPLE 20

Figure 40:
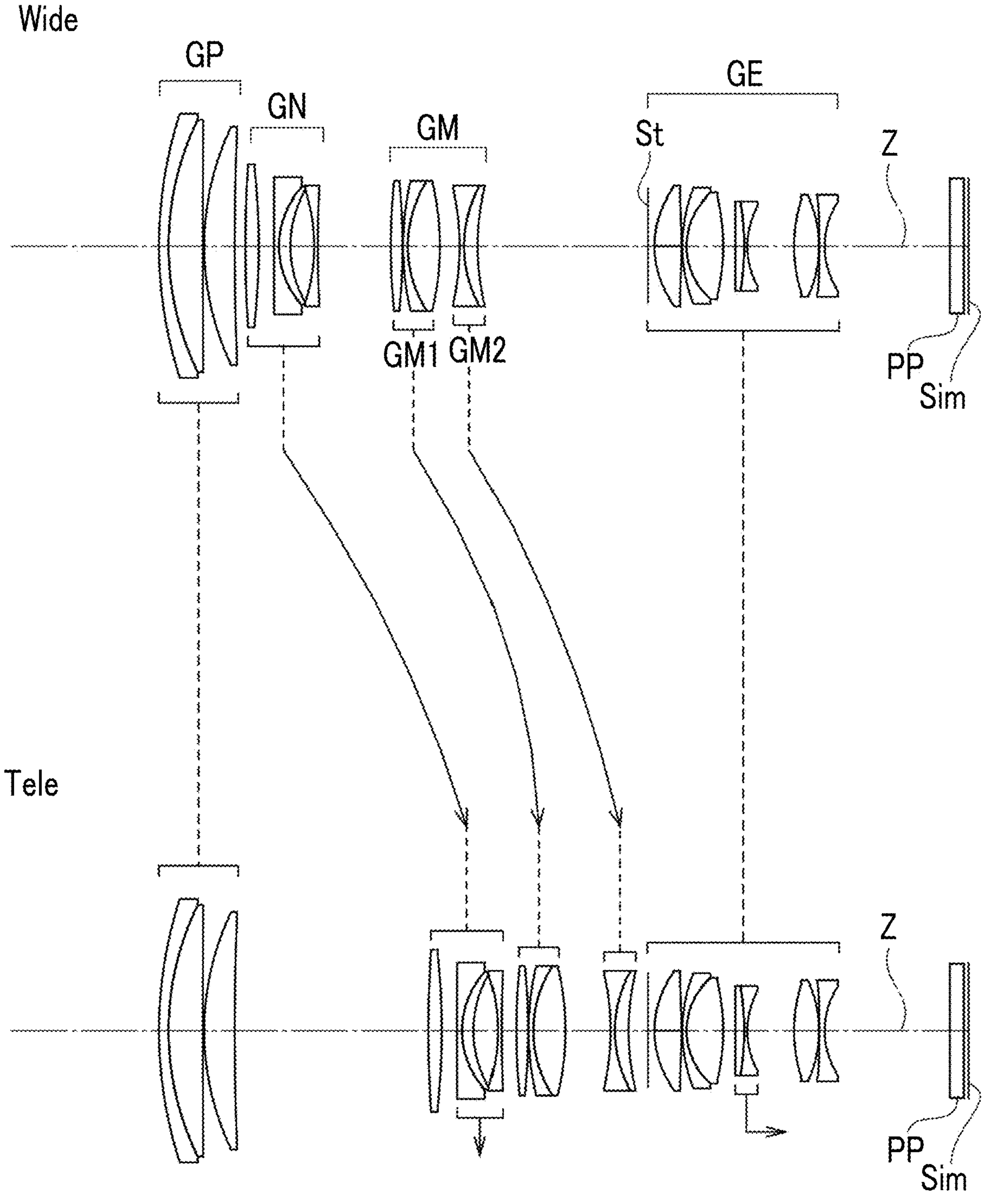
FIG. 40 is a cross-sectional view of a configuration of a zoom lens of Example 20 and a diagram showing movement loci thereof.

FIG. 40 shows a configuration and movement loci of the zoom lens of Example 20. The zoom lens of Example 20 consists of, in order from the object side to the image side, an object side positive group GP, an object side negative group GN, an intermediate group GM, and a final group GE. The object side positive group GP consists of one lens group which group GP and the final group GE remain stationary with respect to the image plane Sim, and the other lens groups move by changing the spacings between the adjacent lens groups. The zoom lens includes only one focusing group. The focusing group consists of two lenses which are fourth and fifth from the object side in the final group GE. During focusing from the infinite distance object to the close-range object, the focusing group moves to the image side. The vibration-proof group consists of three lenses which are second, third, and fourth from the object side in the object side negative group GN.

Figure 41:
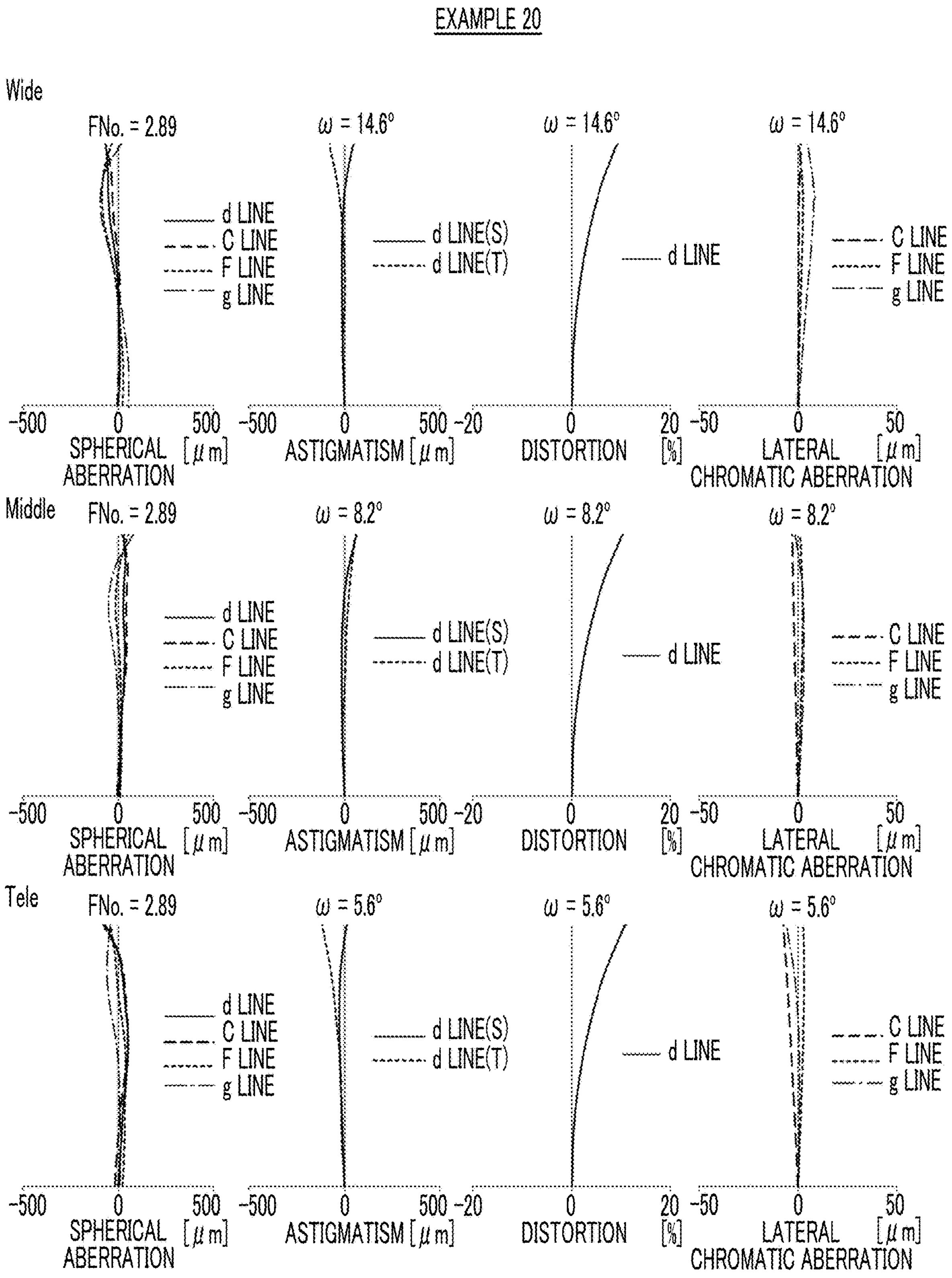
FIG. 41 is a diagram of aberrations in the zoom lens of Example 20.

Regarding the zoom lens of Example 20, Table 58 shows basic lens data, Table 59 shows specifications and variable surface spacings, and Table 60 shows aspherical coefficients thereof. FIG. 41 shows aberration diagrams thereof.

TABLE 58

| Example 20 | | | | | |
|---|---|---|---|---|---|
| Sn | R | D | Nd | νd | θgF |
| 1 | 94.3082 | 1.9530 | 1.90525 | 35.04 | 0.5849 |
| 2 | 62.9352 | 7.0389 | 1.43700 | 95.10 | 0.5336 |
| 3 | 6417.6747 | 0.2615 | | | |
| 4 | 60.4175 | 6.2450 | 1.43700 | 95.10 | 0.5336 |
| 5 | 616.2513 | DD[5] | | | |
| 6 | 266.2525 | 2.7470 | 1.43700 | 95.10 | 0.5336 |
| 7 | −156.5361 | 3.1286 | | | |
| 8 | 2552.1355 | 1.0201 | 1.59282 | 68.62 | 0.5441 |
| 9 | 19.1412 | 2.3293 | 1.89286 | 20.36 | 0.6394 |
| 10 | 24.7393 | 4.8845 | | | |
| 11 | −39.5141 | 0.7552 | 1.72916 | 54.68 | 0.5445 |
| 12 | 309.8171 | DD[12] | | | |
| 13 | 138.3796 | 2.4208 | 1.95906 | 17.47 | 0.6599 |
| 14 | −139.5193 | 0.1000 | | | |
| 15 | 62.2412 | 0.9533 | 1.95906 | 17.47 | 0.6599 |
| 16 | 26.0946 | 6.5983 | 1.55200 | 70.70 | 0.5422 |
| 17 | −59.4537 | DD[17] | | | |
| 18 | −56.1172 | 0.8964 | 1.53996 | 59.46 | 0.5442 |

TABLE 58-continued

| Example 20 | | | | | |
|---|---|---|---|---|---|
| Sn | R | D | Nd | νd | θgF |
| 19 | 26.9865 | 2.7940 | 1.95375 | 32.32 | 0.5901 |
| 20 | 56.1491 | DD[20] | | | |
| 21(St) | ∞ | 1.3000 | | | |
| *22 | 20.9994 | 5.5351 | 1.49710 | 81.56 | 0.5385 |
| *23 | −112.2811 | 0.1824 | | | |
| 24 | 34.4622 | 0.8627 | 1.91082 | 35.25 | 0.5822 |
| 25 | 15.3933 | 7.4920 | 1.59282 | 68.62 | 0.5441 |
| 26 | −46.9358 | 2.5000 | | | |
| 27 | −2450.7971 | 1.7947 | 1.85896 | 22.73 | 0.6284 |
| 28 | −60.0013 | 0.6632 | 1.77250 | 49.60 | 0.5521 |
| 29 | 18.4553 | 9.5659 | | | |
| 30 | 33.5255 | 5.1205 | 1.59551 | 39.24 | 0.5804 |
| 31 | −26.3839 | 0.0998 | | | |
| *32 | −106.7695 | 1.0710 | 1.72903 | 54.04 | 0.5447 |
| *33 | 20.3936 | 25.6307 | | | |
| 34 | ∞ | 2.8500 | 1.51633 | 64.14 | 0.5353 |
| 35 | ∞ | 1.0024 | | | |

TABLE 59

| Example 20 | | | |
|---|---|---|---|
| | Wide | Middle | Tele |
| Zr | 1.0 | 1.8 | 2.6 |
| f | 50.67 | 90.65 | 133.60 |
| Bf | 28.51 | 28.51 | 28.51 |
| FNo. | 2.89 | 2.89 | 2.89 |
| 2ω[°] | 29.2 | 16.4 | 11.2 |
| DD[5] | 2.1821 | 28.2119 | 39.6839 |
| DD[12] | 14.9282 | 9.7570 | 2.9800 |
| DD[17] | 4.0328 | 5.0116 | 9.2353 |
| DD[20] | 34.7519 | 12.9144 | 3.9958 |

TABLE 60

| Example 20 | | | | |
|---|---|---|---|---|
| Sn | 22 | 23 | 32 | 33 |
| KA | 1.0000000E+00 | 1.0000000E+00 | 1.0000000E+00 | 1.0000000E+00 |
| A3 | 1.0461880E−20 | 0.0000000E+00 | −2.3414365E−21 | −1.5229397E−20 |
| A4 | −6.8175312E−06 | 2.2758731E−05 | 1.4623895E−04 | 1.7331639E−04 |
| A5 | −7.9719360E−07 | −1.5170455E−06 | 1.1084876E−05 | 1.7825753E−05 |
| A6 | 2.5777556E−07 | 3.6642990E−07 | −6.0202525E−06 | −7.5378131E−06 |
| A7 | 8.5037259E−09 | 1.3301461E−08 | −8.0583141E−07 | −8.0351102E−07 |
| A8 | −1.8630043E−08 | −2.2867582E−08 | 2.2747527E−07 | 2.6856593E−07 |
| A9 | 2.1875259E−09 | 2.3816459E−09 | 2.7816156E−08 | 2.3906538E−08 |
| A10 | 3.1314037E−10 | 4.6813719E−10 | −7.3109577E−09 | −7.5130144E−09 |
| A11 | −6.5659723E−11 | −8.8892018E−11 | −5.0964260E−10 | −4.8836625E−10 |
| A12 | −1.5019723E−12 | −2.9621115E−12 | 1.5186137E−10 | 1.4890521E−10 |
| A13 | 8.4068602E−13 | 1.3074225E−12 | 5.1361341E−12 | 6.4636650E−12 |
| A14 | −1.2855058E−14 | −1.6944446E−14 | −1.9278486E−12 | −1.9513012E−12 |
| A15 | −5.6370473E−15 | −9.7659258E−15 | −2.8313651E−14 | −5.1938068E−14 |
| A16 | 1.9130320E−16 | 3.3805429E−16 | 1.4692878E−14 | 1.5867895E−14 |
| A17 | 1.9383388E−17 | 3.6961877E−17 | 8.1497393E−17 | 2.2763823E−16 |
| A18 | −8.6489473E−19 | −1.7382134E−18 | −6.2802099E−17 | −7.1984495E−17 |
| A19 | −2.7017375E−20 | −5.6406256E−20 | −1.0825133E−19 | −4.1526186E−19 |
| A20 | 1.3799228E−21 | 3.0953067E−21 | 1.1754840E−19 | 1.3826886E−19 |

EXAMPLE 21

Figure 42:
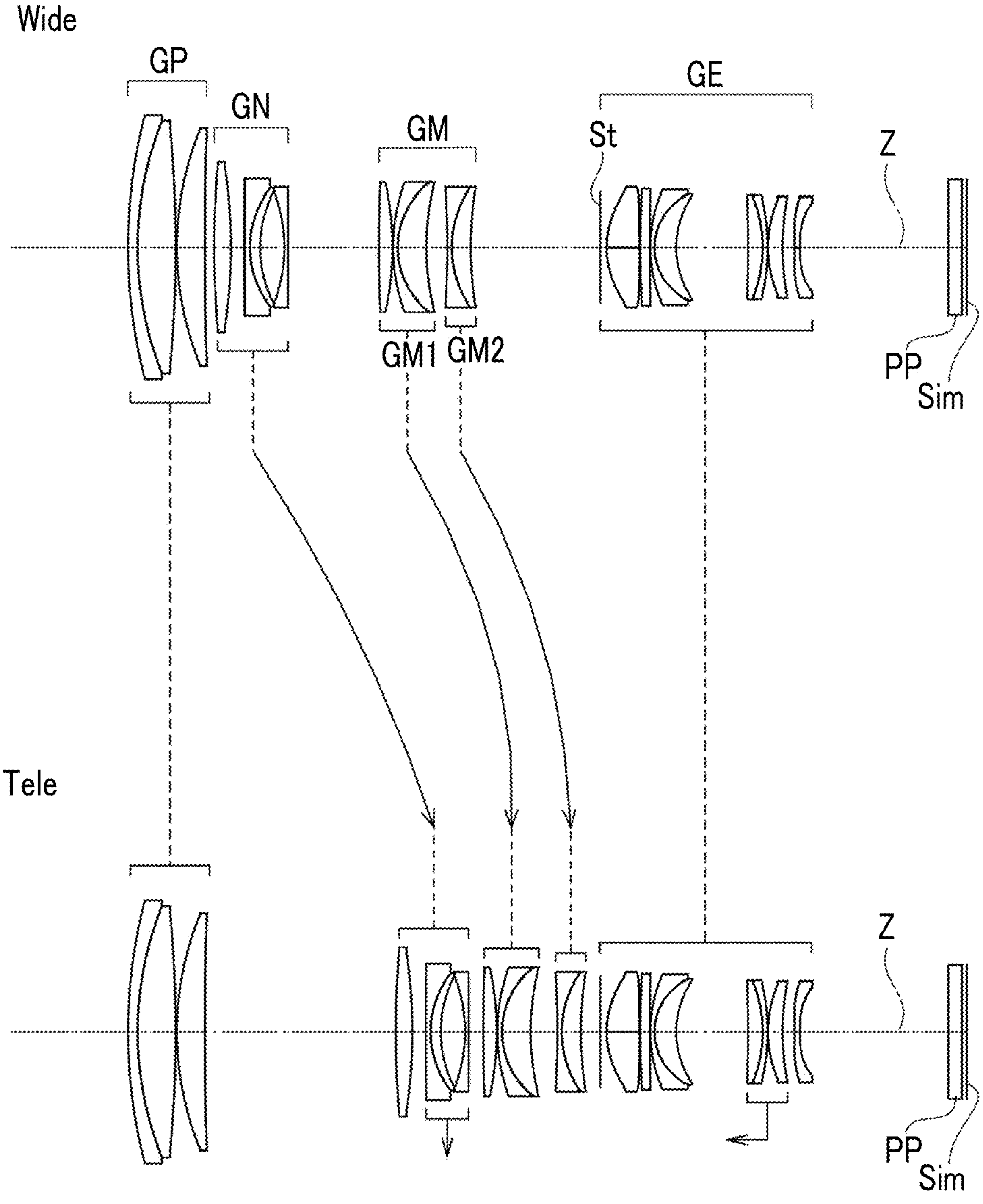
FIG. 42 is a cross-sectional view of a configuration of a zoom lens of Example 21 and a diagram showing movement loci thereof.

FIG. 42 shows a configuration and movement loci of the zoom lens of Example 21. The zoom lens of Example 21 consists of, in order from the object side to the image side, an object side positive group GP, an object side negative group GN, an intermediate group GM, and a final group GE. The object side positive group GP consists of one lens group which has a positive refractive power. The object side negative group GN consists of one lens group which has a negative refractive power. The intermediate group GM consists of, in order from the object side to the image side, two lens groups including a first M lens group GM1 that has a positive refractive power and a second M lens group GM2 that has a negative refractive power. The final group GE consists of one lens group which has a positive refractive power. The final group GE includes an aperture stop St.

During zooming from the wide-angle end to the telephoto end, the object side positive group GP and the final group GE remain stationary with respect to the image plane Sim, and the other lens groups move by changing the spacings between the adjacent lens groups. The zoom lens includes only one focusing group. The focusing group consists of three lenses which are the fifth, sixth, and seventh from the object side in the final group GE. During focusing from the infinite distance object to the close-range object, the focusing group moves toward the object side. The vibration-proof group consists of three lenses which are second, third, and fourth from the object side in the object side negative group GN.

Figure 43:
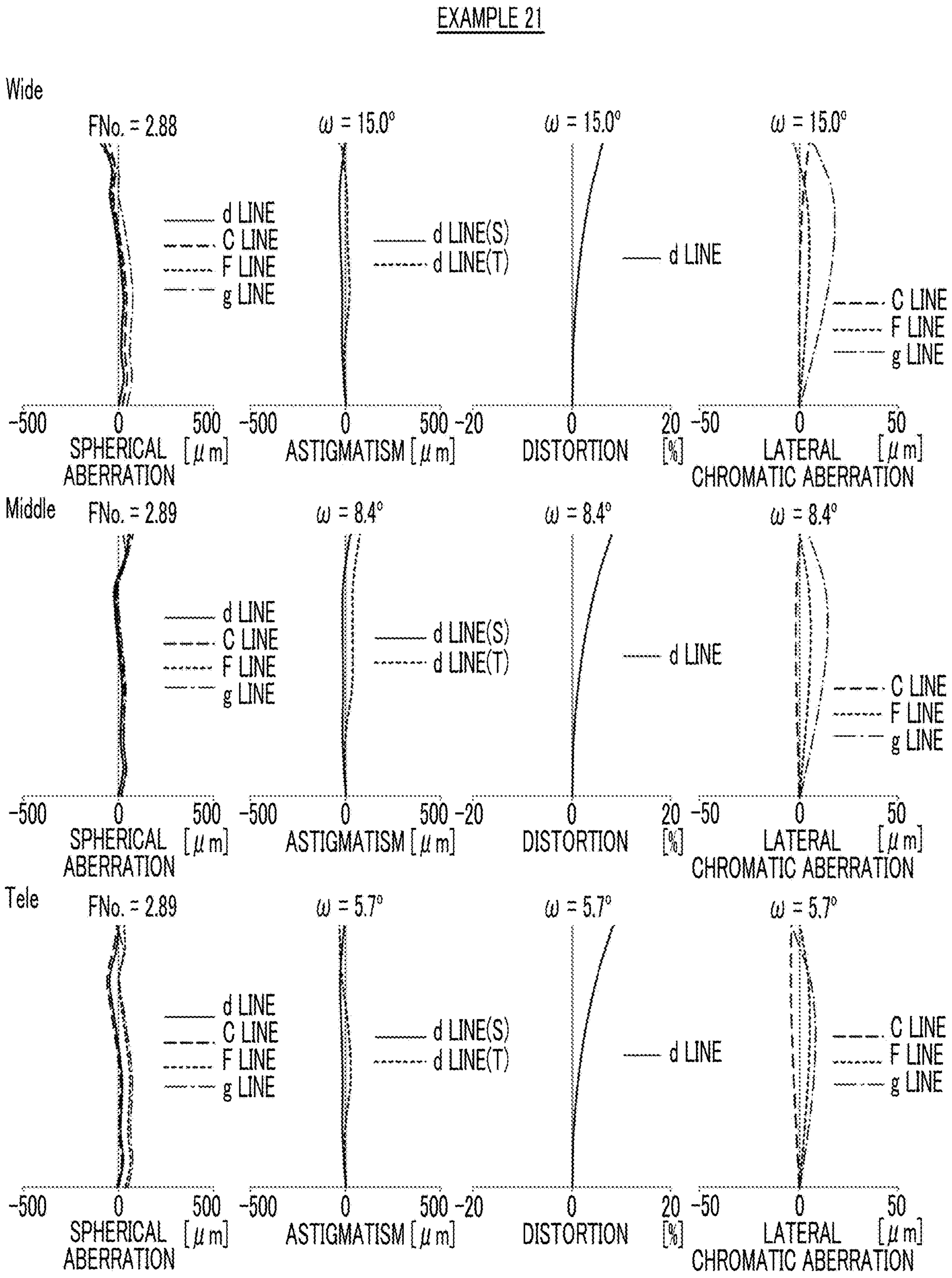
FIG. 43 is a diagram of aberrations in the zoom lens of Example 21.

Regarding the zoom lens of Example 21, Table 61 shows basic lens data, Table 62 shows specifications and variable surface spacings, and Table 63 shows aspherical coefficients thereof. FIG. 43 shows aberration diagrams thereof.

TABLE 61

| Example 21 | | | | | |
|---|---|---|---|---|---|
| Sn | R | D | Nd | νd | θgF |
| 1 | 115.4774 | 1.9599 | 1.91082 | 35.25 | 0.5822 |
| 2 | 73.9315 | 7.8128 | 1.43700 | 95.10 | 0.5336 |
| 3 | −287.7150 | 0.2615 | | | |
| 4 | 67.6182 | 5.7510 | 1.43700 | 95.10 | 0.5336 |

TABLE 61-continued

| Example 21 | | | | | |
|---|---|---|---|---|---|
| Sn | R | D | Nd | νd | θgF |
| 5 | 781.3473 | DD[5] | | | |
| 6 | 209.1069 | 3.4305 | 1.43700 | 95.10 | 0.5336 |
| 7 | −115.1173 | 2.7084 | | | |
| 8 | 1580.4117 | 1.0238 | 1.59282 | 68.62 | 0.5441 |
| 9 | 20.9514 | 2.0829 | 1.89286 | 20.36 | 0.6394 |
| 10 | 26.5077 | 5.0020 | | | |
| 11 | −33.5574 | 0.7617 | 1.75500 | 52.32 | 0.5476 |
| 12 | −1630.9951 | DD[12] | | | |
| 13 | 419.1666 | 2.7644 | 1.88300 | 39.22 | 0.5729 |
| 14 | −64.8143 | 0.1000 | | | |
| 15 | 40.6769 | 0.9587 | 1.95906 | 17.47 | 0.6599 |
| 16 | 17.7928 | 5.8978 | 1.76385 | 48.49 | 0.5590 |
| 17 | 57.0789 | DD[17] | | | |
| 18 | −196.2989 | 0.9009 | 1.74400 | 44.79 | 0.5656 |
| 19 | 22.9567 | 3.9084 | 1.95906 | 17.47 | 0.6599 |
| 20 | 80.0805 | DD[20] | | | |
| 21(St) | ∞ | 1.3000 | | | |
| *22 | 19.1551 | 6.7866 | 1.49710 | 81.56 | 0.5385 |
| *23 | −410.3545 | 0.0998 | | | |
| 24 | 199.8956 | 2.0000 | 1.95906 | 17.47 | 0.6599 |
| 25 | 904.4046 | 0.1000 | | | |
| 26 | 31.0117 | 0.8502 | 1.80610 | 40.93 | 0.5702 |
| 27 | 12.6534 | 4.4696 | 1.55032 | 75.50 | 0.5400 |
| 28 | 20.0000 | 14.5914 | | | |
| 29 | −321.0258 | 3.0000 | 1.59282 | 68.62 | 0.5441 |
| 30 | −29.2585 | 1.0000 | 1.95906 | 17.47 | 0.6599 |
| 31 | −48.7282 | 0.1000 | | | |
| 32 | 26.2236 | 3.0000 | 1.74950 | 35.33 | 0.5819 |
| 33 | 58.4042 | 2.4965 | | | |
| *34 | −38.8146 | 1.0759 | 1.49710 | 81.56 | 0.5385 |
| *35 | 122.6994 | 30.4503 | | | |
| 36 | ∞ | 2.8500 | 1.51633 | 64.14 | 0.5353 |
| 37 | ∞ | 1.0068 | | | |

TABLE 62

| Example 21 | | | |
|---|---|---|---|
| | Wide | Middle | Tele |
| Zr | 1.0 | 1.8 | 2.6 |
| f | 50.63 | 90.59 | 133.52 |
| Bf | 33.34 | 33.34 | 33.34 |
| FNo. | 2.88 | 2.89 | 2.89 |
| 2ω[°] | 30.0 | 16.8 | 11.4 |

TABLE 62-continued

| Example 21 | | | |
|---|---|---|---|
| | Wide | Middle | Tele |
| DD[5] | 1.9312 | 27.0737 | 39.0453 |
| DD[12] | 18.6801 | 12.4174 | 2.9713 |
| DD[17] | 4.3124 | 4.0862 | 5.5029 |
| DD[20] | 26.6097 | 7.9562 | 4.0138 |

TABLE 63

| Example 21 | | | | |
|---|---|---|---|---|
| Sn | 22 | 23 | 34 | 35 |
| KA | 1.0000000E+00 | 1.0000000E+00 | 1.0000000E+00 | 1.0000000E+00 |
| A3 | 1.0461880E−20 | −8.3695036E−20 | −3.7462984E−20 | 2.1321155E−19 |
| A4 | −1.6355264E−05 | 1.0679141E−05 | 5.9157101E−04 | 5.8170552E−04 |
| A5 | 3.5924758E−06 | −7.2080315E−06 | 3.8237457E−05 | 5.9111845E−05 |
| A6 | −1.2802104E−06 | 2.0763511E−06 | −2.2306320E−05 | −2.8249260E−05 |
| A7 | 1.5702692E−07 | −1.0568281E−07 | 2.5184431E−07 | 1.1729706E−06 |
| A8 | 1.4372541E−08 | −6.1269225E−08 | 5.9795189E−07 | 6.5292706E−07 |
| A9 | −5.6346297E−09 | 8.4829105E−09 | −4.8896321E−08 | −9.2883430E−08 |
| A10 | 1.3355799E−10 | 7.8592262E−10 | −1.0105034E−08 | −6.0404677E−09 |
| A11 | 8.9387020E−11 | −1.8917843E−10 | 1.5131733E−09 | 2.1194259E−09 |
| A12 | −5.6326438E−12 | −2.9304893E−12 | 8.7455087E−11 | −3.3581054E−11 |
| A13 | −8.3569439E−13 | 2.1380230E−12 | −2.3952494E−11 | −2.5385310E−11 |
| A14 | 7.1315234E−14 | −3.3404243E−14 | −4.6182435E−14 | 1.4049808E−12 |
| A15 | 4.7185491E−15 | −1.3449425E−14 | 2.1282260E−13 | 1.7340890E−13 |
| A16 | −4.7182758E−16 | 4.3005011E−16 | −5.9973832E−15 | −1.4794190E−14 |
| A17 | −1.5045136E−17 | 4.5237652E−17 | −1.0038515E−15 | −6.4304097E−16 |
| A18 | 1.6497073E−18 | −1.8925378E−18 | 4.7683331E−17 | 7.4329344E−17 |
| A19 | 2.0892303E−20 | −6.3849222E−20 | 1.9514271E−18 | 1.0093186E−18 |
| A20 | −2.4225872E−21 | 3.0794596E−21 | −1.1988799E−19 | −1.5356526E−19 |

EXAMPLE 22

Figure 44:
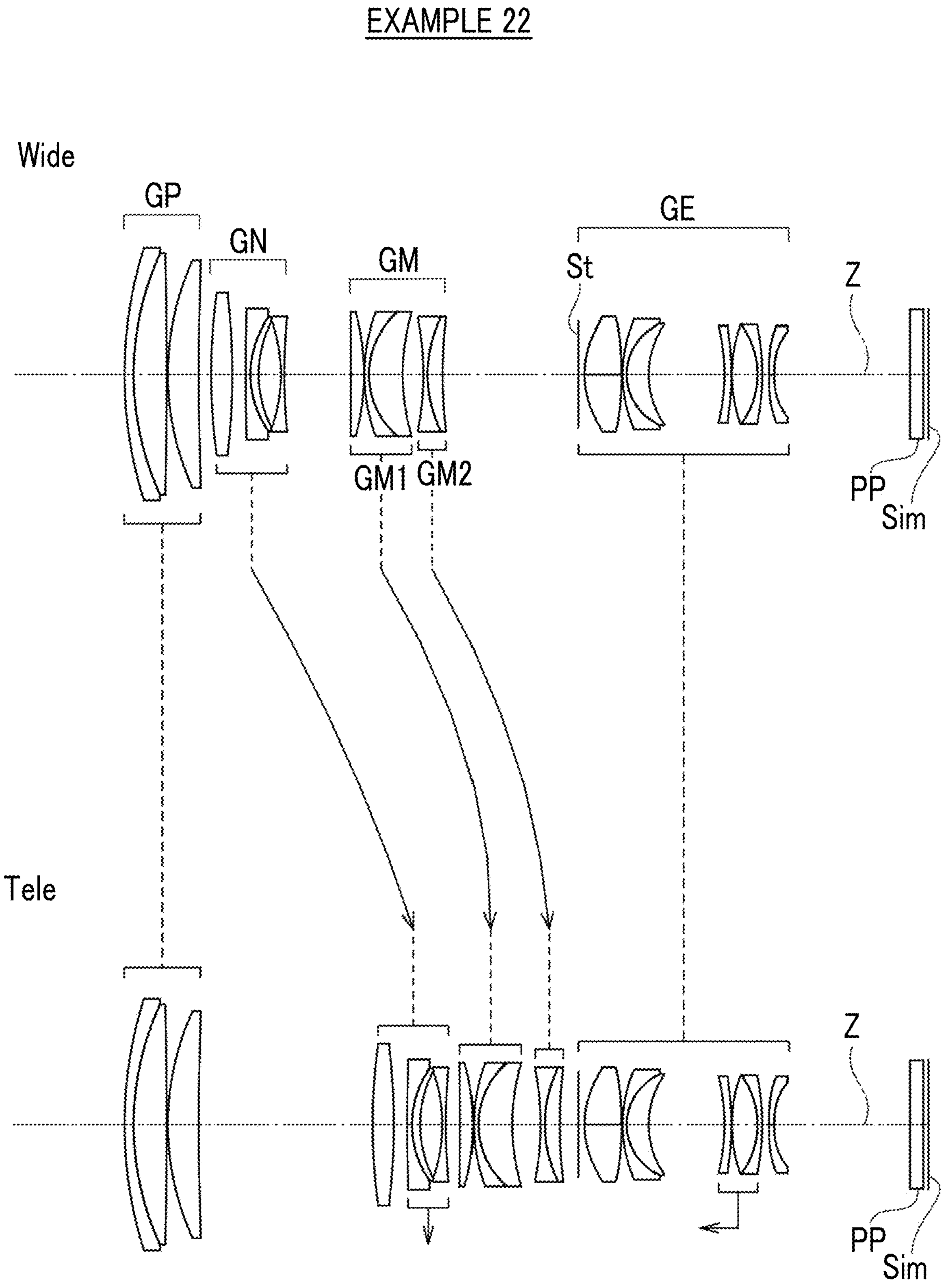
FIG. 44 is a cross-sectional view of a configuration of a zoom lens of Example 22 and a diagram showing movement loci thereof.

FIG. 44 shows a configuration and movement loci of the zoom lens of Example 22. The zoom lens of Example 22 consists of, in order from the object side to the image side, an object side positive group GP, an object side negative group GN, an intermediate group GM, and a final group GE. The object side positive group GP consists of one lens group which has a positive refractive power. The object side negative group GN consists of one lens group which has a negative refractive power. The intermediate group GM consists of, in order from the object side to the image side, two lens groups including a first M lens group GM1 that has a positive refractive power and a second M lens group GM2 that has a negative refractive power. The final group GE consists of one lens group which has a positive refractive power. The final group GE includes an aperture stop St.

During zooming from the wide-angle end to the telephoto end, the object side positive group GP and the final group GE remain stationary with respect to the image plane Sim, and the other lens groups move by changing the spacings between the adjacent lens groups. The zoom lens includes only one focusing group. The focusing group consists of three lenses which are the fourth, fifth, and sixth from the object side in the final group GE. During focusing from the infinite distance object to the close-range object, the focusing group moves toward the object side. The vibration-proof group consists of three lenses which are second, third, and fourth from the object side in the object side negative group GN.

Figure 45:
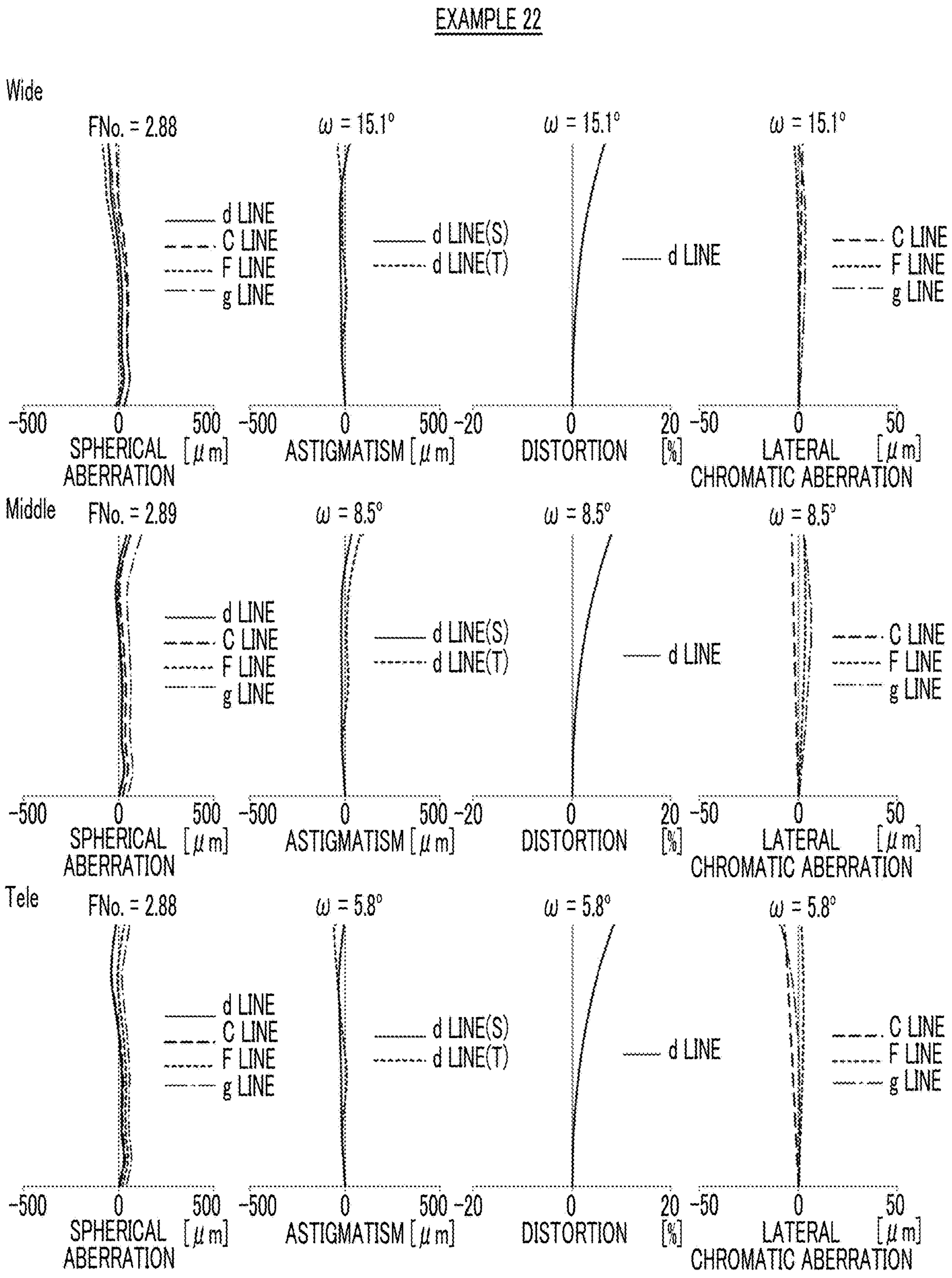
FIG. 45 is a diagram of aberrations in the zoom lens of Example 22.

Regarding the zoom lens of Example 22, Table 64 shows basic lens data, Table 65 shows specifications and variable surface spacings, and Table 66 shows aspherical coefficients thereof. FIG. 45 shows aberration diagrams thereof.

TABLE 64

| Example 22 | | | | | |
|---|---|---|---|---|---|
| Sn | R | D | Nd | νd | θgF |
| 1 | 96.1895 | 1.9595 | 1.91082 | 35.25 | 0.5822 |
| 2 | 66.1029 | 7.0737 | 1.43700 | 95.10 | 0.5336 |
| 3 | −1247.8682 | 0.2615 | | | |
| 4 | 62.8231 | 6.6281 | 1.43700 | 95.10 | 0.5336 |
| 5 | 712.7977 | DD[5] | | | |

TABLE 64-continued

| Example 22 | | | | | |
|---|---|---|---|---|---|
| Sn | R | D | Nd | νd | θgF |
| 6 | 134.6993 | 4.5380 | 1.43700 | 95.10 | 0.5336 |
| 7 | −152.9718 | 2.8840 | | | |
| 8 | 536.0913 | 1.0212 | 1.59282 | 68.62 | 0.5441 |
| 9 | 22.5636 | 1.7513 | 1.95906 | 17.47 | 0.6599 |
| 10 | 26.7118 | 4.7469 | | | |
| 11 | −37.2885 | 0.7581 | 1.72916 | 54.68 | 0.5445 |
| 12 | 145.1723 | DD[12] | | | |
| 13 | −1371.1758 | 2.7787 | 1.88300 | 40.80 | 0.5656 |
| 14 | −53.7339 | 0.1000 | | | |
| 15 | 40.3243 | 0.9615 | 1.95906 | 17.47 | 0.6599 |
| 16 | 18.5790 | 7.2450 | 1.75500 | 52.32 | 0.5476 |
| 17 | 50.2979 | DD[17] | | | |
| 18 | −65.0150 | 0.8994 | 1.60311 | 60.64 | 0.5415 |
| 19 | 29.4898 | 3.2038 | 1.95906 | 17.47 | 0.6599 |
| 20 | 107.7403 | DD[20] | | | |
| 21(St) | ∞ | 1.3000 | | | |
| *22 | 20.6921 | 7.9935 | 1.49710 | 81.56 | 0.5385 |
| *23 | −64.4004 | 0.2000 | | | |
| 24 | 31.7557 | 0.8454 | 1.69930 | 51.11 | 0.5552 |
| 25 | 12.4450 | 4.7276 | 1.55032 | 75.50 | 0.5400 |
| 26 | 19.9999 | 16.2410 | | | |
| 27 | −46.5074 | 1.5000 | 1.95906 | 17.47 | 0.6599 |
| 28 | −64.2844 | 0.1000 | | | |
| 29 | 33.8540 | 5.5000 | 1.59282 | 68.62 | 0.5441 |
| 30 | −19.0791 | 1.0000 | 1.70300 | 52.38 | 0.5507 |
| 31 | −55.4777 | 1.4944 | | | |
| *32 | −198.4984 | 1.0795 | 1.49710 | 81.56 | 0.5385 |
| *33 | 36.4977 | 29.1184 | | | |
| 34 | ∞ | 2.8500 | 1.51633 | 64.14 | 0.5353 |
| 35 | ∞ | 3.6283 | | | |

TABLE 65

| Example 22 | | | |
|---|---|---|---|
| | Wide | Middle | Tele |
| Zr | 1.0 | 1.8 | 2.6 |
| f | 50.05 | 89.54 | 131.97 |
| Bf | 32.11 | 32.11 | 32.11 |
| FNo. | 2.88 | 2.89 | 2.88 |
| 2ω[°] | 30.2 | 17.0 | 11.6 |
| DD[5] | 2.6449 | 25.7357 | 37.2668 |
| DD[12] | 14.2864 | 10.9283 | 2.9634 |
| DD[17] | 4.4383 | 4.2714 | 6.0782 |
| DD[20] | 28.9489 | 9.3832 | 4.0101 |

TABLE 66

| Example 22 | | | | |
|---|---|---|---|---|
| Sn | 22 | 23 | 32 | 33 |
| KA | 1.0000000E+00 | 1.0000000E+00 | 1.0000000E+00 | 1.0000000E+00 |
| A3 | 4.5770723E−21 | 4.1847518E−20 | 2.4350940E−19 | −3.0458794E−20 |
| A4 | −1.5834129E−05 | 1.4481484E−05 | 3.5609148E−04 | 3.5997397E−04 |
| A5 | 5.3463455E−06 | −4.5375524E−06 | 5.8896778E−05 | 8.0146588E−05 |
| A6 | −1.9669931E−06 | 1.1645259E−06 | −1.7465587E−05 | −2.4820824E−05 |
| A7 | 2.7163716E−07 | −3.0062657E−08 | −1.3837000E−06 | 1.5706400E−08 |
| A8 | 1.4484893E−08 | −3.7564263E−08 | 6.4716510E−07 | 6.5025265E−07 |
| A9 | −8.0660594E−09 | 4.2347142E−09 | 2.7858931E−09 | −5.5329808E−08 |
| A10 | 3.9398424E−10 | 5.1537170E−10 | −1.5440338E−08 | −7.5808584E−09 |
| A11 | 9.5763821E−11 | −9.9847082E−11 | 6.7488356E−10 | 1.3623930E−09 |
| A12 | −9.1532083E−12 | −2.5091057E−12 | 2.1498567E−10 | 6.6897509E−12 |
| A13 | −5.7964518E−13 | 1.1304433E−12 | −1.6940854E−11 | −1.5950664E−11 |
| A14 | 8.4323923E−14 | −1.1273661E−14 | −1.5680892E−12 | 9.0420372E−13 |
| A15 | 1.6712353E−15 | −7.0439216E−15 | 1.8860540E−13 | 1.0294029E−13 |
| A16 | −4.0801736E−16 | 1.9455680E−16 | 3.8047570E−15 | −1.1521590E−14 |
| A17 | −1.4101711E−18 | 2.3610797E−17 | −1.0241395E−15 | −3.5422276E−16 |
| A18 | 1.0337666E−18 | −9.0034820E−19 | 1.5860603E−17 | 6.4117163E−17 |
| A19 | −1.4003866E−21 | −3.3633417E−20 | 2.1974894E−18 | 5.1008467E−19 |
| A20 | −1.1141920E−21 | 1.5148687E−21 | −8.0681071E−20 | −1.4317068E−19 |

EXAMPLE 23

Figure 46:
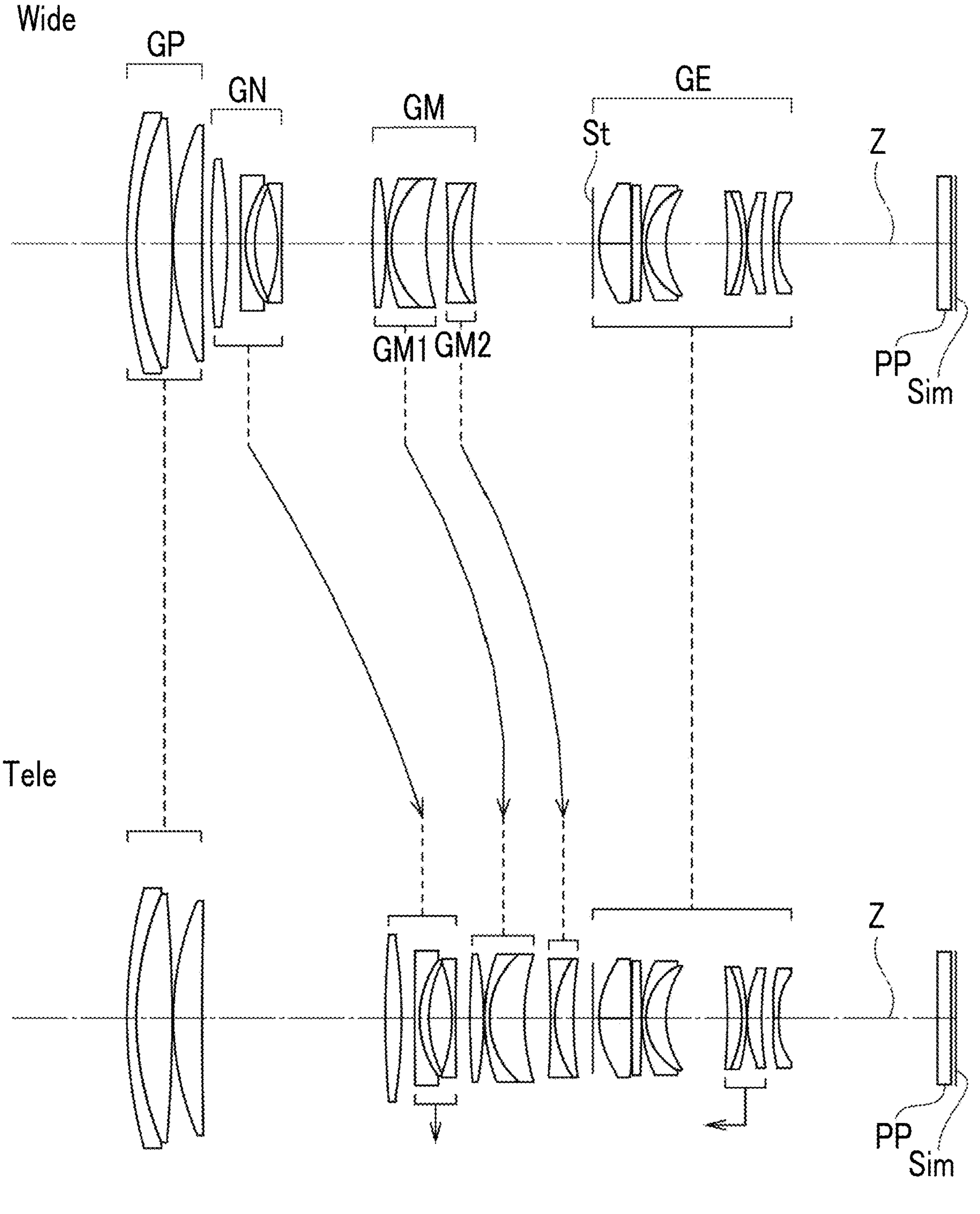
FIG. 46 is a cross-sectional view of a configuration of a zoom lens of Example 23 and a diagram showing movement loci thereof.

FIG. 46 shows a configuration and movement loci of the zoom lens of Example 23. The zoom lens of Example 23 consists of, in order from the object side to the image side, an object side positive group GP, an object side negative group GN, an intermediate group GM, and a final group GE. The object side positive group GP consists of one lens group which has a positive refractive power. The object side negative group GN consists of one lens group which has a negative refractive power. The intermediate group GM consists of, in order from the object side to the image side, two lens groups including a first M lens group GM1 that has a positive refractive power and a second M lens group GM2 that has a negative refractive power. The final group GE consists of one lens group which has a positive refractive power. The final group GE includes an aperture stop St.

During zooming from the wide-angle end to the telephoto end, the object side positive group GP and the final group GE remain stationary with respect to the image plane Sim, and the other lens groups move by changing the spacings between the adjacent lens groups. The zoom lens includes only one focusing group. The focusing group consists of three lenses which are the fifth, sixth, and seventh from the object side in the final group GE. During focusing from the infinite distance object to the close-range object, the focusing group moves toward the object side. The vibration-proof group consists of three lenses which are second, third, and fourth from the object side in the object side negative group GN.

Figure 47:
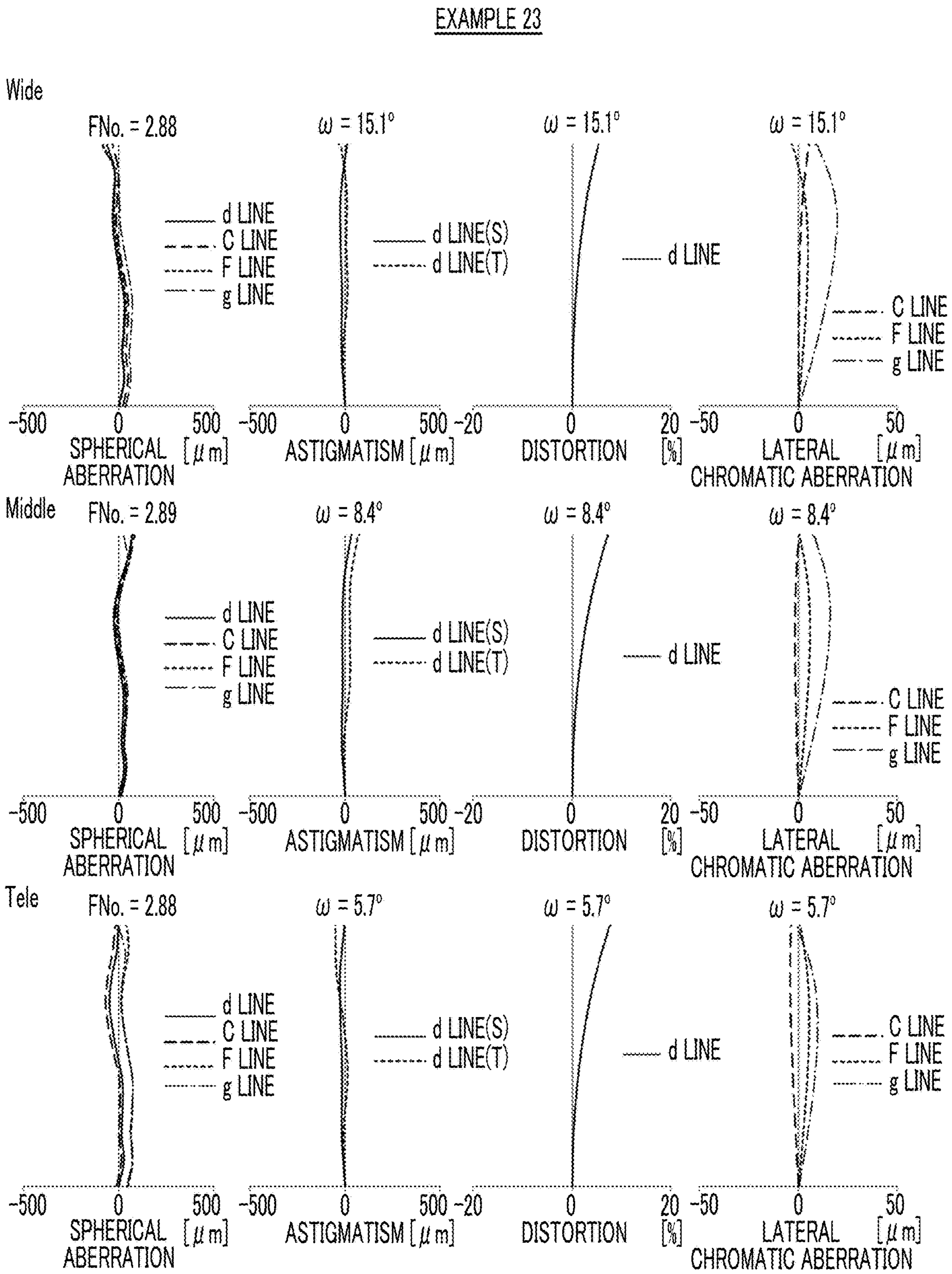
FIG. 47 is a diagram of aberrations in the zoom lens of Example 23.

Regarding the zoom lens of Example 23, Table 67 shows basic lens data, Table 68 shows specifications and variable surface spacings, and Table 69 shows aspherical coefficients thereof. FIG. 47 shows aberration diagrams thereof.

TABLE 67

| Example 23 | | | | | |
|---|---|---|---|---|---|
| Sn | R | D | Nd | νd | θgF |
| 1 | 111.6729 | 1.9593 | 1.91082 | 35.25 | 0.5822 |
| 2 | 71.5163 | 7.4328 | 1.43700 | 95.10 | 0.5336 |
| 3 | −323.3647 | 0.2615 | | | |
| 4 | 66.3495 | 5.9548 | 1.43700 | 95.10 | 0.5336 |

TABLE 67-continued

| Example 23 | | | | | |
|---|---|---|---|---|---|
| Sn | R | D | Nd | νd | θgF |
| 5 | 1154.9484 | DD[5] | | | |
| 6 | 228.4770 | 3.3461 | 1.43700 | 95.10 | 0.5336 |
| 7 | −116.5523 | 2.7277 | | | |
| 8 | 1683.1553 | 1.0230 | 1.59282 | 68.62 | 0.5441 |
| 9 | 22.1753 | 1.9325 | 1.92286 | 18.90 | 0.6496 |
| 10 | 27.5153 | 4.7773 | | | |
| 11 | −35.2258 | 0.7608 | 1.75500 | 52.32 | 0.5476 |
| 12 | 615.3319 | DD[12] | | | |
| 13 | 172.3992 | 2.8252 | 1.88300 | 40.80 | 0.5656 |
| 14 | −78.4819 | 0.1000 | | | |
| 15 | 39.6968 | 0.9584 | 1.95906 | 17.47 | 0.6599 |
| 16 | 18.4975 | 7.2492 | 1.72916 | 54.67 | 0.5453 |
| 17 | 49.4207 | DD[17] | | | |
| 18 | −198.8249 | 0.9014 | 1.74400 | 44.79 | 0.5656 |
| 19 | 23.8907 | 3.8583 | 1.95906 | 17.47 | 0.6599 |
| 20 | 91.6373 | DD[20] | | | |
| 21(St) | ∞ | 1.3000 | | | |
| *22 | 19.8770 | 6.7092 | 1.49710 | 81.56 | 0.5385 |
| *23 | −7389.3771 | 0.0998 | | | |
| 24 | 594.6670 | 2.0000 | 1.95906 | 17.47 | 0.6599 |
| 25 | −376.6232 | 0.1000 | | | |
| 26 | 28.9176 | 0.8506 | 1.80610 | 40.93 | 0.5702 |
| 27 | 12.9177 | 4.1758 | 1.55032 | 75.50 | 0.5400 |
| 28 | 19.9999 | 12.7441 | | | |
| 29 | −133.7595 | 3.0000 | 1.59282 | 68.62 | 0.5441 |
| 30 | −26.3664 | 1.0000 | 1.95906 | 17.47 | 0.6599 |
| 31 | −41.8091 | 0.1000 | | | |
| 32 | 25.4121 | 3.0000 | 1.74400 | 44.79 | 0.5656 |
| 33 | 71.4235 | 2.4923 | | | |

TABLE 67-continued

| Example 23 | | | | | |
|---|---|---|---|---|---|
| Sn | R | D | Nd | νd | θgF |
| *34 | −35.0436 | 1.0759 | 1.49710 | 81.56 | 0.5385 |
| *35 | 91.6419 | 32.9717 | | | |
| 36 | ∞ | 2.8500 | 1.51633 | 64.14 | 0.5353 |
| 37 | ∞ | 1.0067 | | | |

TABLE 68

| Example 23 | | | |
|---|---|---|---|
| | Wide | Middle | Tele |
| Zr | 1.0 | 1.8 | 2.6 |
| f | 50.69 | 90.70 | 133.68 |
| Bf | 35.86 | 35.86 | 35.86 |
| FNo. | 2.88 | 2.89 | 2.88 |
| 2ω[°] | 30.2 | 16.8 | 11.4 |
| DD[5] | 1.9301 | 26.3721 | 38.1023 |
| DD[12] | 18.9509 | 12.6928 | 2.9664 |
| DD[17] | 4.5703 | 4.0758 | 5.4586 |
| DD[20] | 25.0938 | 7.4044 | 4.0178 |

TABLE 69

| Example 23 | | | | |
|---|---|---|---|---|
| Sn | 22 | 23 | 34 | 35 |
| KA | 1.0000000E+00 | 1.0000000E+00 | 1.0000000E+00 | 1.0000000E+00 |
| A3 | −5.2309398E−20 | 8.3695036E−20 | 4.4955581E−19 | 3.0458794E−19 |
| A4 | −1.6585238E−05 | 1.0402752E−05 | 6.8026797E−04 | 6.6767551E−04 |
| A5 | 4.9516033E−06 | −6.3116604E−06 | 2.4736283E−05 | 4.8838814E−05 |
| A6 | −1.6177979E−06 | 1.8338722E−06 | −2.4844952E−05 | −3.1946484E−05 |
| A7 | 1.5356389E−07 | −1.0559057E−07 | 1.1594034E−06 | 2.1592376E−06 |
| A8 | 2.7788153E−08 | −5.2043591E−08 | 5.8433503E−07 | 6.8835801E−07 |
| A9 | −6.6735990E−09 | 7.6778254E−09 | −8.1829559E−08 | −1.3377722E−07 |
| A10 | −1.0376256E−10 | 6.4397142E−10 | −7.3190818E−09 | −4.2540603E−09 |
| A11 | 1.1953440E−10 | −1.7023964E−10 | 2.2098596E−09 | 3.0378521E−09 |
| A12 | −3.5637837E−12 | −1.8239833E−12 | 7.5658455E−12 | −1.0104565E−10 |
| A13 | −1.2300569E−12 | 1.9397019E−12 | −3.2855276E−11 | −3.7425186E−11 |
| A14 | 6.4765759E−14 | −3.8276948E−14 | 1.1168137E−12 | 2.4486683E−12 |
| A15 | 7.4805475E−15 | −1.2345628E−14 | 2.8062293E−13 | 2.6565638E−13 |
| A16 | −4.9765582E−16 | 4.4437170E−16 | −1.5539514E−14 | −2.3317805E−14 |
| A17 | −2.5094568E−17 | 4.2021255E−17 | −1.2871550E−15 | −1.0262862E−15 |
| A18 | 1.8996551E−18 | −1.9266349E−18 | 8.9703220E−17 | 1.1028415E−16 |
| A19 | 3.5832547E−20 | −5.9917345E−20 | 2.4508594E−18 | 1.6766219E−18 |
| A20 | −2.9439450E−21 | 3.1279147E−21 | −1.9734155E−19 | −2.1523092E−19 |

EXAMPLE 24

Figure 48:
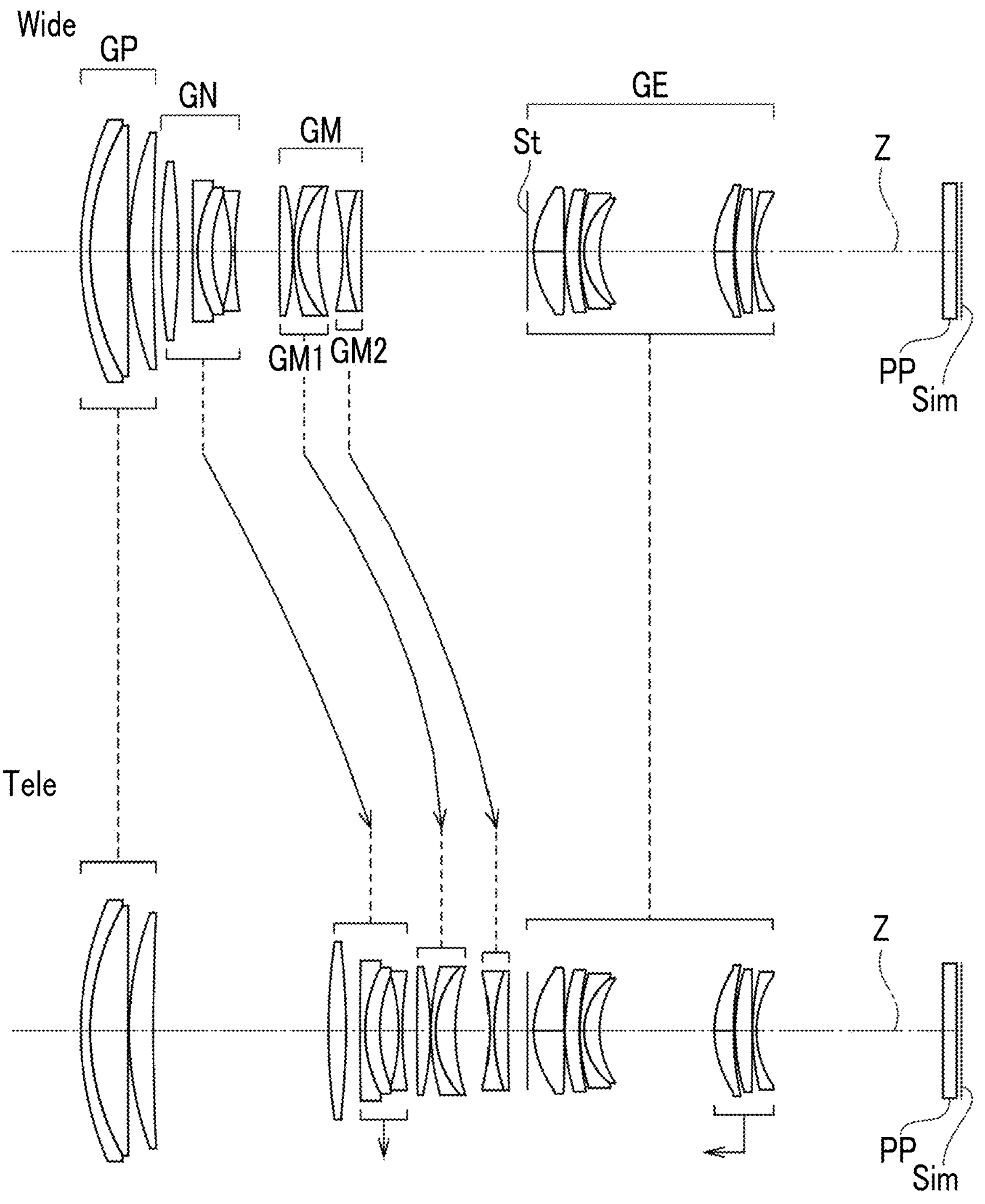
FIG. 48 is a cross-sectional view of a configuration of a zoom lens of Example 24 and a diagram showing movement loci thereof.

FIG. 48 shows a configuration and movement loci of the zoom lens of Example 24. The zoom lens of Example 24 consists of, in order from the object side to the image side, an object side positive group GP, an object side negative group GN, an intermediate group GM, and a final group GE. The object side positive group GP consists of one lens group which has a positive refractive power. The object side negative group GN consists of one lens group which has a negative refractive power. The intermediate group GM consists of, in order from the object side to the image side, two lens groups including a first M lens group GM1 that has a positive refractive power and a second M lens group GM2 that has a negative refractive power. The final group GE consists of one lens group which has a positive refractive power. The final group GE includes an aperture stop St.

During zooming from the wide-angle end to the telephoto end, the object side positive group GP and the final group GE remain stationary with respect to the image plane Sim, and the other lens groups move by changing the spacings between the adjacent lens groups. The zoom lens includes only one focusing group. The focusing group consists of three lenses which are first, second, and third from the image side in the final group GE. During focusing from the infinite distance object to the close-range object, the focusing group moves toward the object side. The vibration-proof group consists of three lenses which are second, third, and fourth from the object side in the object side negative group GN.

Figure 49:
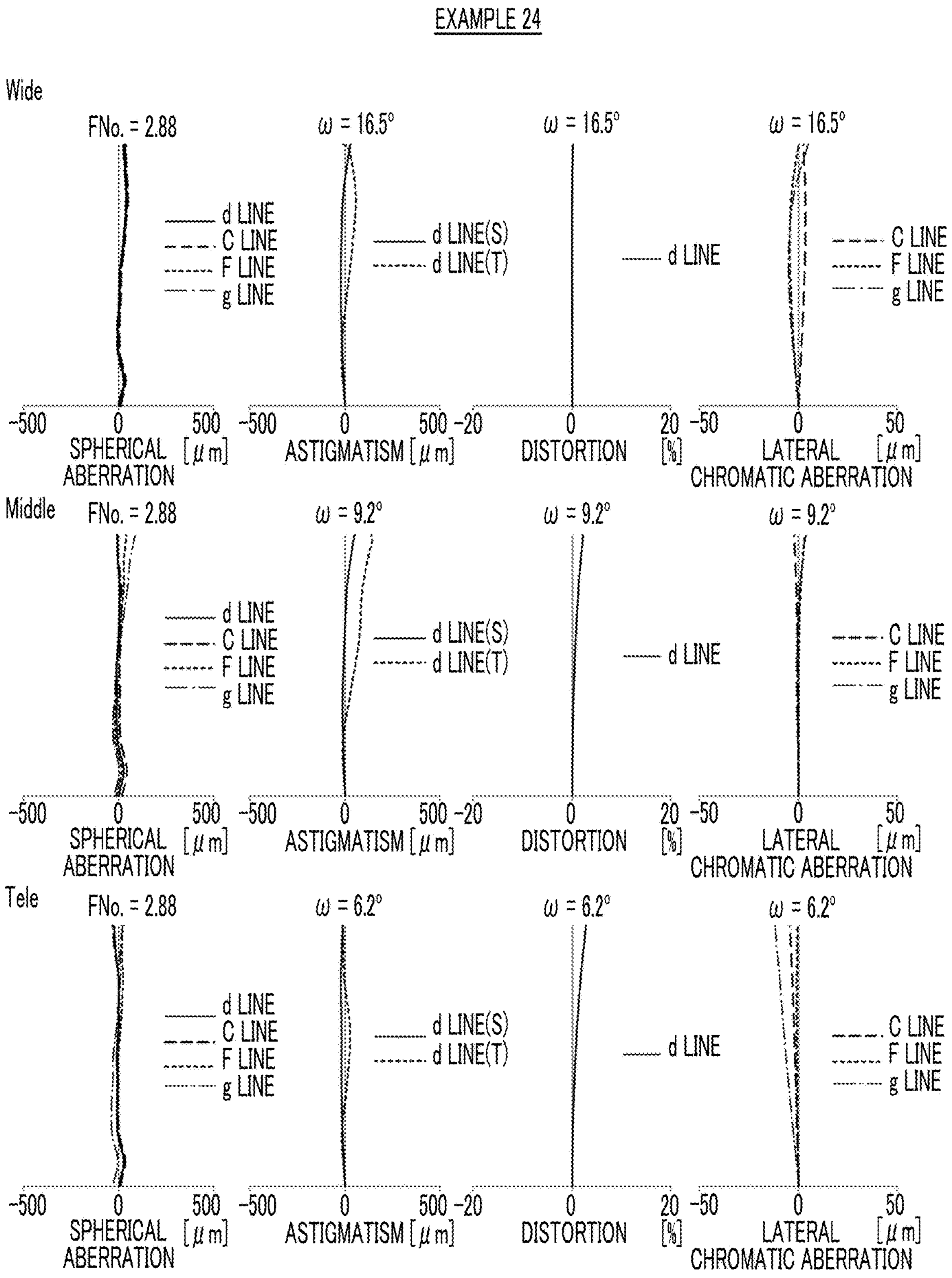
FIG. 49 is a diagram of aberrations in the zoom lens of Example 24.

Regarding the zoom lens of Example 24, Table 70 shows basic lens data, Table 71 shows specifications and variable surface spacings, and Table 72 shows aspherical coefficients thereof. FIG. 49 shows aberration diagrams thereof.

TABLE 70

| Example 24 | | | | | |
|---|---|---|---|---|---|
| Sn | R | D | Nd | νd | θgF |
| 1 | 73.2013 | 1.9460 | 1.91082 | 35.25 | 0.5822 |
| 2 | 56.7115 | 7.7773 | 1.43700 | 95.10 | 0.5336 |
| 3 | 7847.0026 | 0.2615 | | | |
| 4 | 75.1784 | 4.9969 | 1.43700 | 95.10 | 0.5336 |

TABLE 70-continued

| Example 24 | | | | | |
|---|---|---|---|---|---|
| Sn | R | D | Nd | νd | θgF |
| 5 | 534.2565 | DD[5] | | | |
| 6 | 141.7379 | 3.6283 | 1.43700 | 95.10 | 0.5336 |
| 7 | −161.8123 | 2.9230 | | | |
| 8 | 1120.0000 | 1.0503 | 1.59282 | 68.62 | 0.5441 |
| 9 | 30.1161 | 3.0000 | 1.95906 | 17.47 | 0.6599 |
| 10 | 32.1500 | 3.9395 | | | |
| 11 | −43.5816 | 0.7479 | 1.77250 | 49.60 | 0.5521 |
| 12 | 82.8510 | DD[12] | | | |
| 13 | 502.0206 | 2.8053 | 1.81600 | 46.62 | 0.5568 |
| 14 | −60.9855 | 0.1000 | | | |
| 15 | 49.9530 | 0.9534 | 1.95906 | 17.47 | 0.6599 |
| 16 | 21.0950 | 4.0821 | 1.83400 | 37.16 | 0.5776 |
| 17 | 46.4032 | DD[17] | | | |
| 18 | −53.5867 | 0.8861 | 1.55200 | 70.70 | 0.5422 |
| 19 | 41.3107 | 2.8829 | 1.95906 | 17.47 | 0.6599 |
| 20 | 453.4546 | DD[20] | | | |

TABLE 70-continued

| Example 24 | | | | | |
|---|---|---|---|---|---|
| Sn | R | D | Nd | νd | θgF |
| 21(St) | ∞ | 1.3000 | | | |
| *22 | 20.1445 | 6.3498 | 1.49710 | 81.56 | 0.5385 |
| *23 | −917.2125 | 0.0998 | | | |
| 24 | 45.3372 | 3.0000 | 1.95906 | 17.47 | 0.6599 |
| 25 | 60.7784 | 0.1000 | | | |
| 26 | 42.0542 | 0.8440 | 1.73800 | 32.33 | 0.5900 |
| 27 | 14.3228 | 3.1982 | 1.49700 | 81.61 | 0.5389 |
| 28 | 20.6819 | 23.7737 | | | |
| *29 | 23.7331 | 3.9601 | 1.49700 | 81.61 | 0.5389 |
| *30 | 79.3455 | 0.3000 | | | |
| 31 | 46.6656 | 3.5000 | 1.69680 | 55.53 | 0.5434 |
| 32 | −2392.7266 | 0.1000 | | | |
| 33 | 54.9642 | 0.8000 | 1.72047 | 34.71 | 0.5835 |
| 34 | 21.8402 | 38.5126 | | | |
| 35 | ∞ | 2.8500 | 1.51633 | 64.14 | 0.5353 |
| 36 | ∞ | 1.0061 | | | |

TABLE 71

| Example 24 | | | |
|---|---|---|---|
| | Wide | Middle | Tele |
| Zr | 1.0 | 1.8 | 2.6 |
| f | 48.81 | 87.33 | 128.70 |
| Bf | 41.40 | 41.40 | 41.40 |
| FNo. | 2.88 | 2.88 | 2.88 |
| 2ω[°] | 33.0 | 18.4 | 12.4 |
| DD[5] | 1.5587 | 24.3841 | 36.1925 |
| DD[12] | 9.2270 | 9.2839 | 2.9711 |
| DD[17] | 5.1655 | 4.1803 | 6.9939 |
| DD[20] | 34.1899 | 12.2928 | 3.9836 |

TABLE 72

| Example 24 | | | | |
|---|---|---|---|---|
| Sn | 22 | 23 | 29 | 30 |
| KA | 1.0000000E+00 | 1.0000000E+00 | 1.0000000E+00 | 1.0000000E+00 |
| A3 | −5.4924868E−20 | −6.2771277E−20 | 1.2337303E−20 | 0.0000000E+00 |
| A4 | −1.5460946E−05 | 5.9553144E−06 | −2.6184926E−06 | 4.0498615E−06 |
| A5 | 4.1276173E−06 | −5.1493890E−06 | 2.8950359E−07 | 1.8034123E−06 |
| A6 | −1.4338099E−06 | 1.3760352E−06 | −2.1633773E−07 | −4.2641219E−07 |
| A7 | 2.0852612E−07 | −1.6516885E−09 | 1.3678614E−08 | −6.7401578E−09 |
| A8 | 4.0245045E−09 | −5.1465689E−08 | 8.7556193E−09 | 1.7713414E−08 |
| A9 | −4.9397721E−09 | 4.5164189E−09 | −1.1968484E−09 | −1.4634298E−09 |
| A10 | 3.1660018E−10 | 8.2889050E−10 | −1.3417587E−10 | −3.1728446E−10 |
| A11 | 5.0187446E−11 | −1.2186549E−10 | 2.6708691E−11 | 4.3797246E−11 |
| A12 | −5.4242798E−12 | −5.4274069E−12 | 9.0940049E−13 | 2.5786390E−12 |
| A13 | −2.9162960E−13 | 1.4373493E−12 | −3.0159255E−13 | −5.6727772E−13 |
| A14 | 4.2969470E−14 | −1.3811067E−15 | −5.0384884E−16 | −4.9091470E−15 |
| A15 | 1.1653347E−15 | −8.7246371E−15 | 1.9054206E−15 | 3.8103531E−15 |
| A16 | −1.9787383E−16 | 1.9991107E−16 | −3.2233946E−17 | −6.0615091E−17 |
| A17 | −3.8121062E−18 | 2.6566232E−17 | −6.4198909E−18 | −1.2982283E−17 |
| A18 | 5.5937279E−19 | −9.4079556E−19 | 1.8851394E−19 | 3.9395696E−19 |
| A19 | 7.2969857E−21 | −3.2034689E−20 | 8.9766807E−21 | 1.7769638E−20 |
| A20 | −8.0564584E−22 | 1.3798710E−21 | −3.4460688E−22 | −7.0740619E−22 |

EXAMPLE 25

Figure 50:
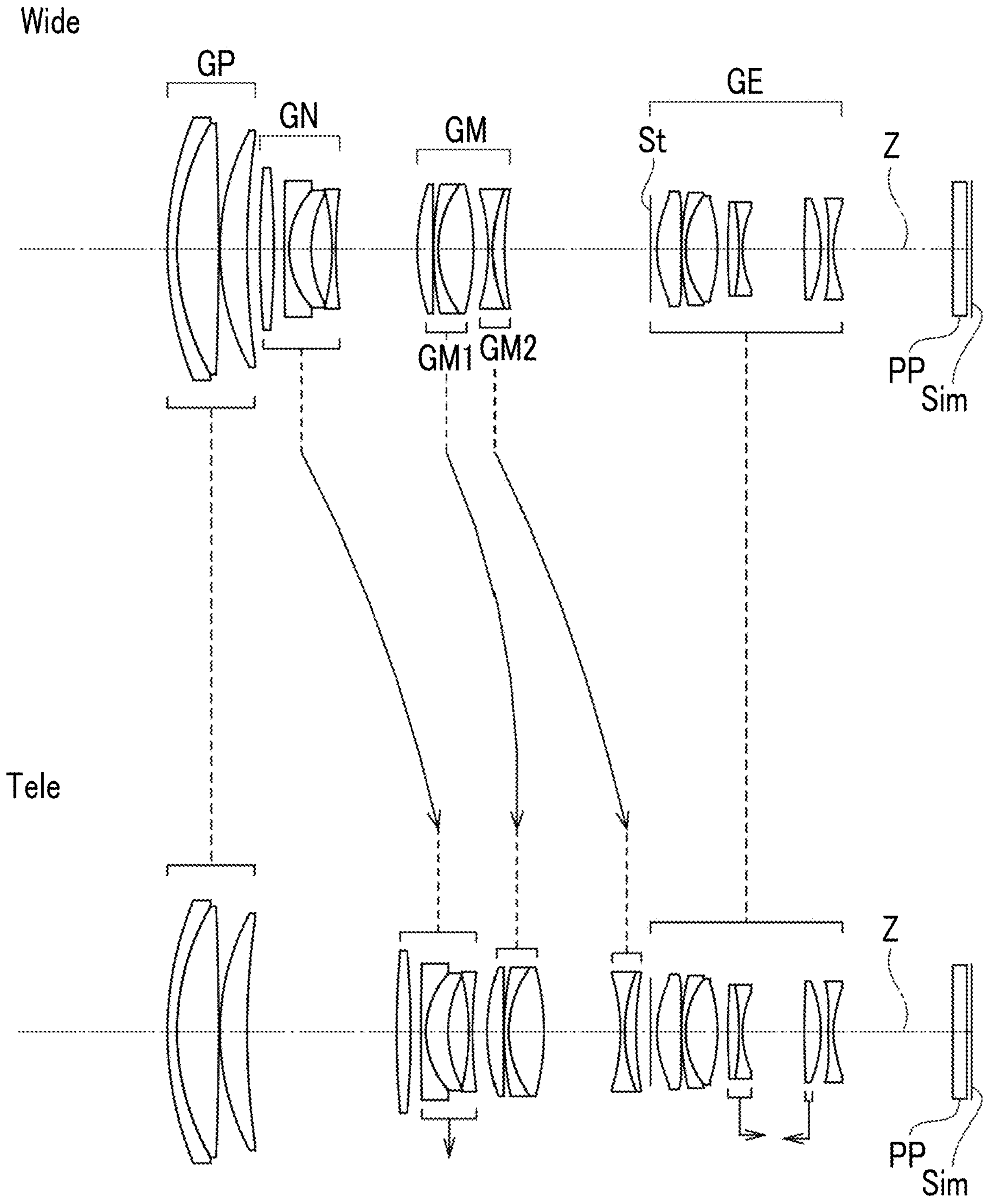
FIG. 50 is a cross-sectional view of a configuration of a zoom lens of Example 25 and a diagram showing movement loci thereof.

FIG. 50 shows a configuration and movement loci of the zoom lens of Example 25. The zoom lens of Example 25 consists of, in order from the object side to the image side, an object side positive group GP, an object side negative group GN, an intermediate group GM, and a final group GE. The object side positive group GP consists of one lens group which has a positive refractive power. The object side negative group GN consists of one lens group which has a negative refractive power. The intermediate group GM consists of, in order from the object side to the image side, two lens groups including a first M lens group GM1 that has a positive refractive power and a second M lens group GM2 that has a negative refractive power. The final group GE consists of one lens group which has a positive refractive power. The final group GE includes an aperture stop St.

During zooming from the wide-angle end to the telephoto end, the object side positive group GP and the final group GE remain stationary with respect to the image plane Sim, and the other lens groups move by changing the spacings between the adjacent lens groups. The zoom lens includes two focusing groups. The focusing group on the object side, which is the first focusing group, consists of two lenses which are fourth and fifth from the object side in the final group GE. The focusing group on the image side consists of one lens which is sixth from the object side in the final group GE. During focusing from the infinite distance object to the close-range object, the focusing group on the object side moves to the image side, and the focusing group on the image side moves to the object side. The vibration-proof group consists of three lenses which are second, third, and fourth from the object side in the object side negative group GN.

Figure 51:
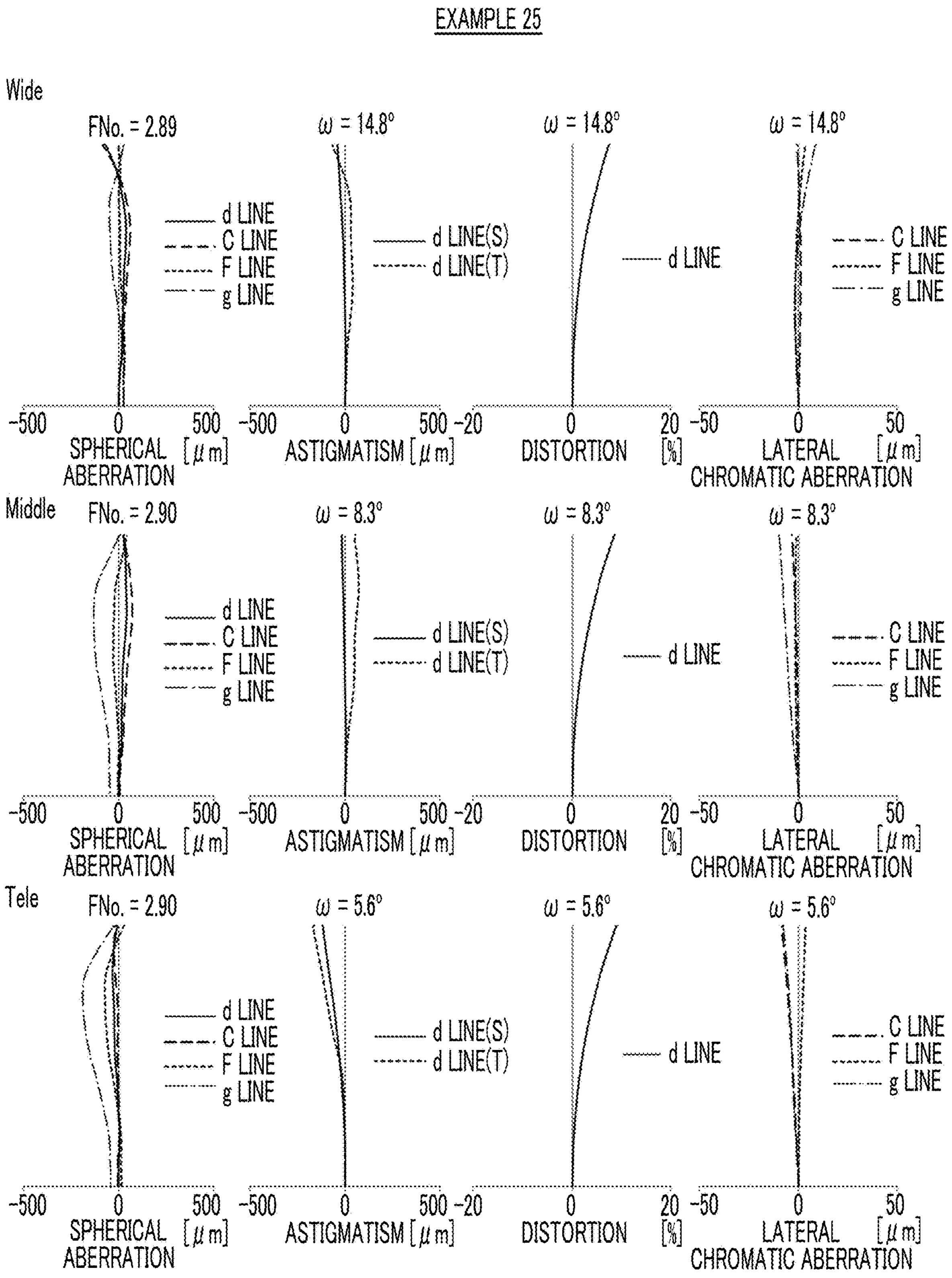
FIG. 51 is a diagram of aberrations in the zoom lens of Example 25.

Regarding the zoom lens of Example 25, Table 73 shows basic lens data, Table 74 shows specifications and variable surface spacings, and Table 75 shows aspherical coefficients thereof. FIG. 51 shows aberration diagrams thereof.

TABLE 73

| Example 25 | | | | | |
|---|---|---|---|---|---|
| Sn | R | D | Nd | νd | θgF |
| 1 | 76.0396 | 1.9575 | 1.85150 | 40.78 | 0.5696 |
| 2 | 55.2588 | 8.5946 | 1.43700 | 95.10 | 0.5336 |
| 3 | −640.5727 | 0.2615 | | | |
| 4 | 55.2155 | 5.5915 | 1.43700 | 95.10 | 0.5336 |

TABLE 73-continued

| Example 25 | | | | | |
|---|---|---|---|---|---|
| Sn | R | D | Nd | νd | θgF |
| 5 | 177.2697 | DD[5] | | | |
| 6 | 208.7464 | 2.8691 | 1.43700 | 95.10 | 0.5336 |
| 7 | −204.9978 | 2.1364 | | | |
| 8 | 529.8782 | 1.0268 | 1.59282 | 68.62 | 0.5441 |
| 9 | 19.1668 | 4.5552 | 1.76182 | 26.52 | 0.6136 |
| 10 | 26.2695 | 4.2561 | | | |
| 11 | −51.0547 | 0.7626 | 1.83481 | 42.74 | 0.5649 |
| 12 | 100.6239 | DD[12] | | | |
| 13 | 44.0857 | 3.2450 | 1.92286 | 18.90 | 0.6496 |

TABLE 74

| Example 25 | | | |
|---|---|---|---|
| | Wide | Middle | Tele |
| Zr | 1.0 | 1.8 | 2.6 |
| f | 50.80 | 90.89 | 133.95 |
| Bf | 27.51 | 27.51 | 27.51 |
| FNo. | 2.89 | 2.90 | 2.90 |
| 2ω[°] | 29.6 | 16.6 | 11.2 |
| DD[5] | 2.6301 | 22.1824 | 30.8013 |
| DD[12] | 16.8108 | 10.3334 | 3.0058 |
| DD[17] | 3.0448 | 8.6185 | 15.7431 |
| DD[20] | 30.0632 | 11.4146 | 2.9987 |

TABLE 75

| Example 25 | | | | |
|---|---|---|---|---|
| Sn | 22 | 23 | 32 | 33 |
| KA | 1.0000000E+00 | 1.0000000E+00 | 1.0000000E+00 | 1.0000000E+00 |
| A3 | 1.4123537E−19 | −9.4156916E−20 | 7.4925968E−20 | −1.2183517E−19 |
| A4 | −6.8270842E−06 | 1.6065891E−05 | −4.7601781E−04 | −5.0702215E−04 |
| A5 | −5.2826591E−06 | −2.5110974E−06 | 4.9751171E−05 | 5.1534066E−05 |
| A6 | 2.0994510E−06 | 8.9707805E−07 | 3.8834840E−06 | 3.9248222E−06 |
| A7 | −3.2022748E−07 | −1.3602624E−07 | −2.9482457E−06 | −2.2497012E−06 |
| A8 | −2.6669510E−08 | −1.3191285E−08 | 4.1195455E−07 | 1.4305376E−07 |
| A9 | 1.2509724E−08 | 5.2991669E−09 | 6.6729812E−08 | 7.8256728E−08 |
| A10 | −3.9860442E−10 | −2.6720835E−11 | −1.9110438E−08 | −9.1213169E−09 |
| A11 | −2.0981930E−10 | −1.1055820E−10 | −3.8735037E−10 | −1.8100403E−09 |
| A12 | 1.5628521E−11 | 5.1327476E−12 | 3.7658257E−10 | 2.4715472E−10 |
| A13 | 1.8824395E−12 | 1.2831079E−12 | −9.6045813E−12 | 2.5656723E−11 |
| A14 | −1.9573299E−13 | −8.8625917E−14 | −3.8406504E−12 | −3.7525767E−12 |
| A15 | −9.3054413E−15 | −8.4260128E−15 | 1.9198323E−13 | −2.1335254E−13 |
| A16 | 1.2414587E−15 | 7.0833580E−16 | 1.9243611E−14 | 3.2500120E−14 |
| A17 | 2.3497784E−17 | 2.9459403E−17 | −1.3218337E−15 | 9.5390297E−16 |
| A18 | −4.0489170E−18 | −2.8241517E−18 | −3.1438944E−17 | −1.4924077E−16 |
| A19 | −2.2892072E−20 | −4.2660369E−20 | 3.2762990E−18 | −1.7688461E−18 |
| A20 | 5.4161003E−21 | 4.5396743E−21 | −4.0771244E−20 | 2.8063511E−19 |

TABLE 73-continued

| Example 25 | | | | | |
|---|---|---|---|---|---|
| Sn | R | D | Nd | νd | θgF |
| 14 | 5665.3433 | 0.1000 | | | |
| 15 | 70.1417 | 0.9550 | 2.00272 | 19.32 | 0.6451 |
| 16 | 23.5971 | 7.2573 | 1.49700 | 81.61 | 0.5389 |
| 17 | −54.5263 | DD[17] | | | |
| 18 | −42.4670 | 0.9005 | 1.49700 | 81.61 | 0.5389 |
| 19 | 35.8591 | 2.2987 | 2.00069 | 25.46 | 0.6136 |
| 20 | 74.3822 | DD[20] | | | |
| 21(St) | ∞ | 1.3000 | | | |
| *22 | 23.1493 | 4.9781 | 1.61881 | 63.85 | 0.5418 |
| *23 | −749.5885 | 0.0998 | | | |
| 24 | 52.3977 | 0.8427 | 1.96300 | 24.11 | 0.6213 |
| 25 | 18.9598 | 6.5816 | 1.59282 | 68.62 | 0.5441 |
| 26 | −35.8111 | 2.1529 | | | |
| 27 | 168.3767 | 2.2840 | 1.95906 | 17.47 | 0.6599 |
| 28 | −60.0013 | 0.7058 | 1.85150 | 40.78 | 0.5696 |
| 29 | 21.0621 | 12.7096 | | | |
| 30 | 192.6921 | 3.4206 | 1.89286 | 20.36 | 0.6394 |
| 31 | −29.1116 | 1.4998 | | | |
| *32 | 54.2704 | 1.0709 | 1.85896 | 22.73 | 0.6284 |
| *33 | 16.0211 | 24.6237 | | | |
| 34 | ∞ | 2.8500 | 1.51633 | 64.14 | 0.5353 |
| 35 | ∞ | 1.0060 | | | |

EXAMPLE 26

Figure 52:
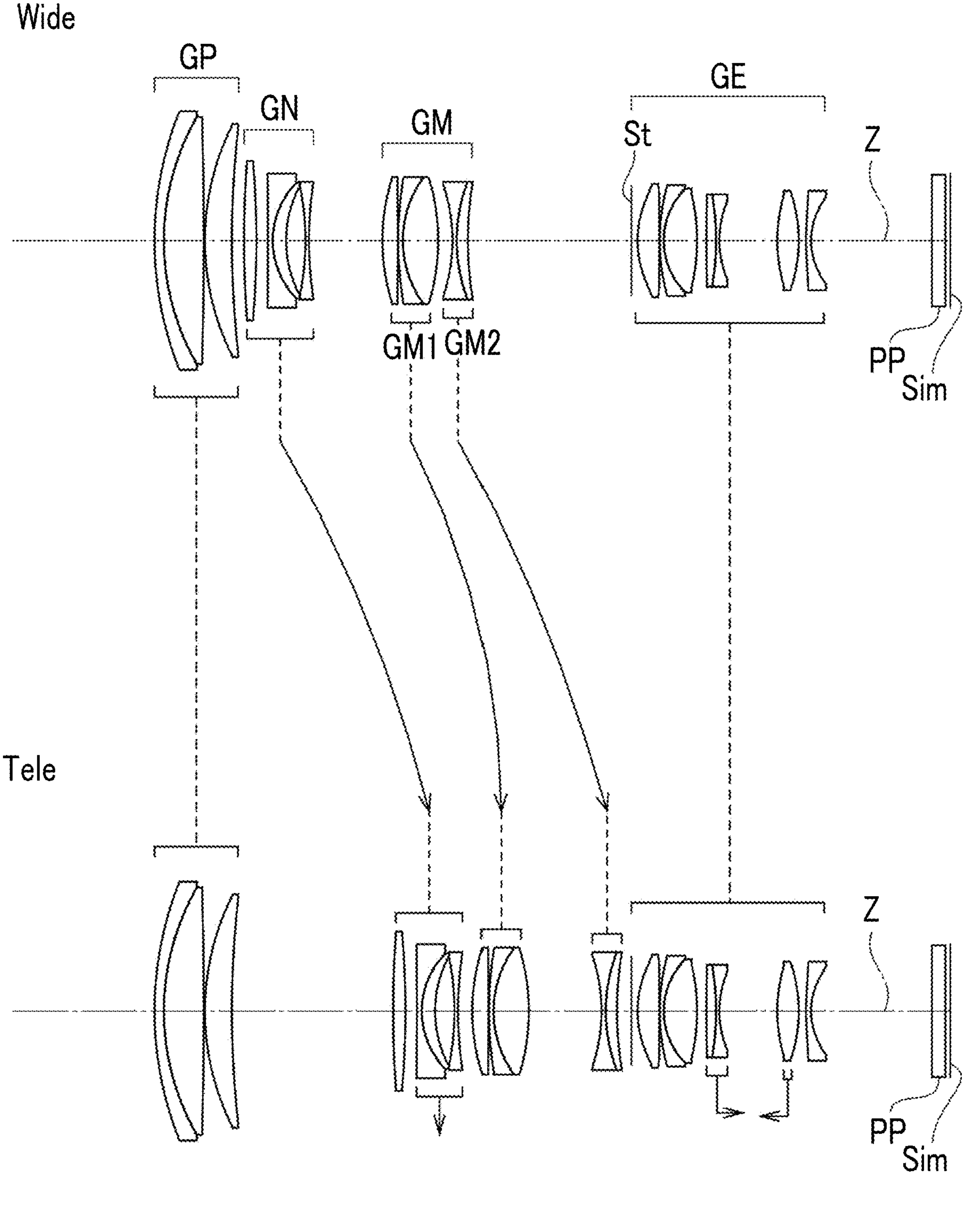
FIG. 52 is a cross-sectional view of a configuration of a zoom lens of Example 26 and a diagram showing movement loci thereof.

FIG. 52 shows a configuration and movement loci of the zoom lens of Example 26. The zoom lens of Example 26 consists of, in order from the object side to the image side, an object side positive group GP, an object side negative group GN, an intermediate group GM, and a final group GE. The object side positive group GP consists of one lens group which has a positive refractive power. The object side negative group GN consists of one lens group which has a negative refractive power. The intermediate group GM consists of, in order from the object side to the image side, two lens groups including a first M lens group GM1 that has a positive refractive power and a second M lens group GM2 that has a negative refractive power. The final group GE consists of one lens group which has a positive refractive power. The final group GE includes an aperture stop St.

During zooming from the wide-angle end to the telephoto end, the object side positive group GP and the final group GE remain stationary with respect to the image plane Sim, and the other lens groups move by changing the spacings between the adjacent lens groups. The zoom lens includes two focusing groups. The focusing group on the object side, which is the first focusing group, consists of two lenses which are fourth and fifth from the object side in the final group GE. The focusing group on the image side consists of one lens which is sixth from the object side in the final group GE. During focusing from the infinite distance object to the close-range object, the focusing group on the object side moves to the image side, and the focusing group on the image side moves to the object side. The vibration-proof group consists of three lenses which are second, third, and fourth from the object side in the object side negative group GN.

Figure 53:
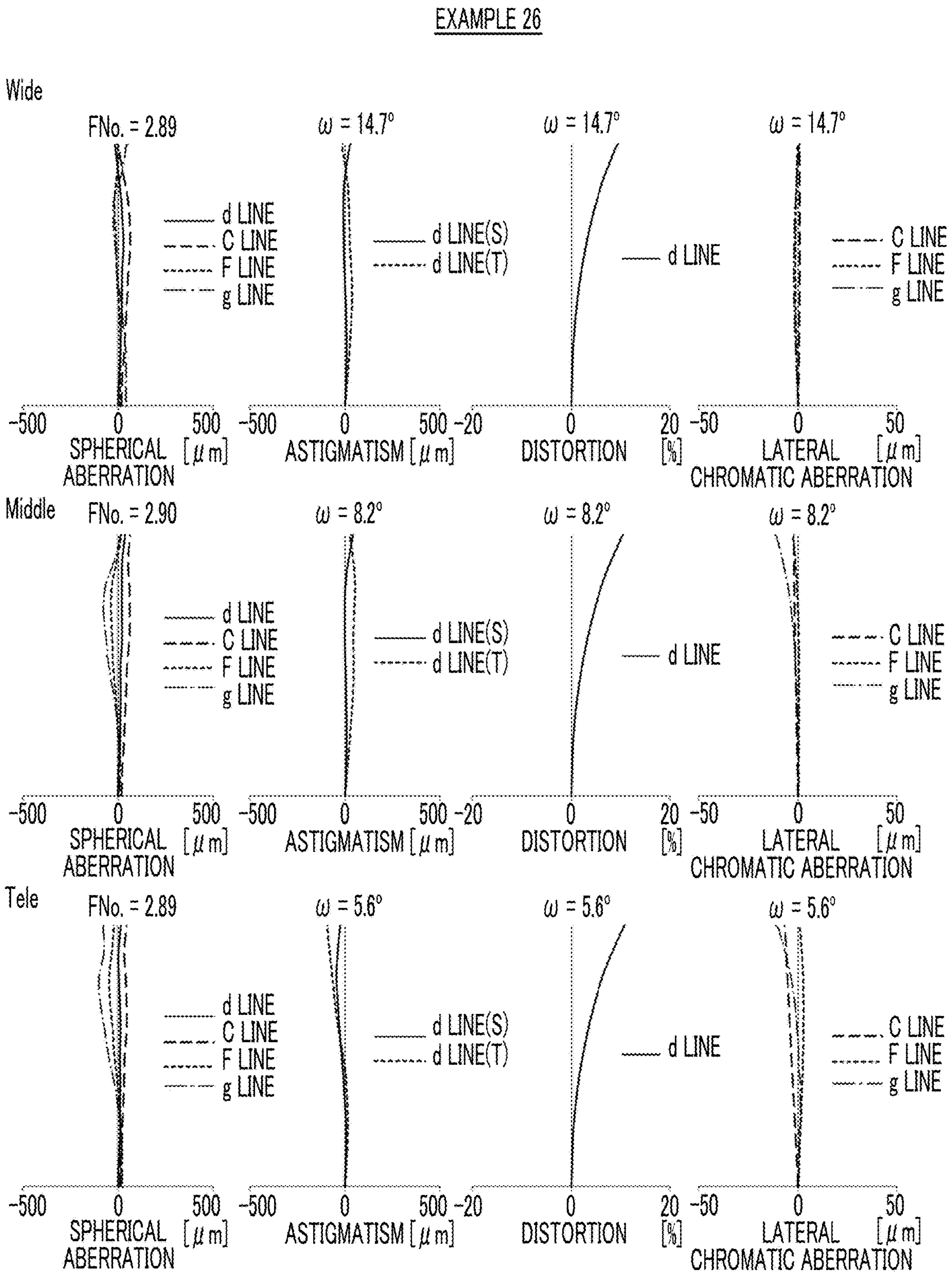
FIG. 53 is a diagram of aberrations in the zoom lens of Example 26.

Regarding the zoom lens of Example 26, Table 76 shows basic lens data, Table 77 shows specifications and variable surface spacings, and Table 78 shows aspherical coefficients thereof. FIG. 53 shows aberration diagrams thereof.

TABLE 76

| Example 26 | | | | | |
|---|---|---|---|---|---|
| Sn | R | D | Nd | νd | θgF |
| 1 | 77.8737 | 1.9476 | 1.88300 | 40.80 | 0.5656 |
| 2 | 55.4905 | 8.3269 | 1.43700 | 95.10 | 0.5336 |
| 3 | −1072.4266 | 0.2615 | | | |
| 4 | 57.5353 | 5.6492 | 1.43700 | 95.10 | 0.5336 |
| 5 | 225.8764 | DD[5] | | | |
| 6 | 247.3277 | 2.5719 | 1.43700 | 95.10 | 0.5336 |
| 7 | −201.1779 | 2.4013 | | | |
| 8 | −1328.2787 | 1.0148 | 1.59282 | 68.62 | 0.5441 |
| 9 | 18.3338 | 2.7845 | 1.85478 | 24.80 | 0.6123 |
| 10 | 25.9273 | 4.0510 | | | |
| 11 | −61.6790 | 0.7523 | 1.83481 | 42.74 | 0.5649 |
| 12 | 88.3998 | DD[12] | | | |
| 13 | 46.2386 | 3.2144 | 1.95906 | 17.47 | 0.6599 |
| 14 | −1550.8674 | 0.1000 | | | |
| 15 | 85.8649 | 0.9625 | 1.95906 | 17.47 | 0.6599 |
| 16 | 24.0279 | 7.3914 | 1.49700 | 81.61 | 0.5389 |
| 17 | −48.1394 | DD[17] | | | |
| 18 | −38.5925 | 0.8890 | 1.49700 | 81.61 | 0.5389 |
| 19 | 36.5125 | 2.3527 | 2.00100 | 29.13 | 0.5995 |
| 20 | 81.8796 | DD[20] | | | |
| 21(St) | ∞ | 1.3000 | | | |
| *22 | 22.8804 | 4.5525 | 1.61881 | 63.85 | 0.5418 |

TABLE 76-continued

| Example 26 | | | | | |
|---|---|---|---|---|---|
| Sn | R | D | Nd | νd | θgF |
| *23 | −347.3699 | 0.0998 | | | |
| 24 | 47.1935 | 0.8242 | 1.90366 | 31.31 | 0.5948 |
| 25 | 16.3280 | 6.9780 | 1.59282 | 68.62 | 0.5441 |
| 26 | −45.3011 | 1.9998 | | | |
| 27 | 593.2773 | 1.9764 | 2.00272 | 19.32 | 0.6451 |
| 28 | −60.0013 | 0.6994 | 1.85150 | 40.78 | 0.5696 |
| 29 | 22.5909 | 12.1231 | | | |
| 30 | 36.0808 | 4.4800 | 1.59551 | 39.24 | 0.5804 |
| 31 | −33.3084 | 1.5001 | | | |
| *32 | 50.2352 | 1.0631 | 1.72903 | 54.04 | 0.5447 |
| *33 | 14.1488 | 25.2990 | | | |
| 34 | ∞ | 2.8500 | 1.51633 | 64.14 | 0.5353 |
| 35 | ∞ | 1.0144 | | | |

TABLE 77

| Example 26 | | | |
|---|---|---|---|
| | Wide | Middle | Tele |
| Zr | 1.0 | 1.8 | 2.6 |
| f | 50.46 | 90.28 | 133.05 |
| Bf | 28.19 | 28.19 | 28.19 |
| FNo. | 2.89 | 2.90 | 2.89 |
| 2ω[°] | 29.4 | 16.4 | 11.2 |
| DD[5] | 2.5573 | 24.2027 | 33.7469 |
| DD[12] | 15.3540 | 9.5645 | 2.9676 |
| DD[17] | 2.9898 | 8.2158 | 15.2104 |
| DD[20] | 34.0138 | 12.9319 | 2.9900 |

TABLE 78

| Example 26 | | | | |
|---|---|---|---|---|
| Sn | 22 | 23 | 32 | 33 |
| KA | 1.0000000E+00 | 1.0000000E+00 | 1.0000000E+00 | 1.0000000E+00 |
| A3 | 7.3233157E−20 | 6.2771277E−20 | 0.0000000E−00 | −9.1376381E−20 |
| A4 | −3.1039909E−06 | 1.7658353E−05 | −1.6413810E−04 | −1.5672789E−04 |
| A5 | −2.4600057E−06 | −1.6594973E−06 | 4.2467432E−05 | 3.8086772E−05 |
| A6 | 9.0739484E−07 | 6.3235322E−07 | −4.7697645E−06 | −4.4330117E−06 |
| A7 | −1.0974739E−07 | −1.0108407E−07 | −1.8706570E−06 | −1.0302214E−06 |
| A8 | −2.0909958E−08 | −8.4280094E−09 | 5.6831181E−07 | 2.3991365E−07 |
| A9 | 5.7756260E−09 | 3.7411649E−09 | 1.4998242E−08 | 3.2369664E−08 |
| A10 | 1.3340493E−10 | −3.0343575E−12 | −1.9753260E−08 | −8.2412809E−09 |
| A11 | −1.3216144E−10 | −8.1159462E−11 | 9.2620784E−10 | −7.9207089E−10 |
| A12 | 4.0260508E−12 | 3.3610099E−12 | 3.3570665E−10 | 1.8747890E−10 |
| A13 | 1.5662444E−12 | 9.8209026E−13 | −2.9015190E−11 | 1.1669363E−11 |
| A14 | −8.8105649E−14 | −6.2900874E−14 | −2.8626847E−12 | −2.6052336E−12 |
| A15 | −1.0181982E−14 | −6.6791496E−15 | 3.5959587E−13 | −9.7736687E−14 |
| A16 | 7.3161385E−16 | 5.2629832E−16 | 9.3169611E−15 | 2.0860884E−14 |
| A17 | 3.4635228E−17 | 2.4034046E−17 | −2.1070782E−15 | 4.3176843E−16 |
| A18 | −2.8670235E−18 | −2.1617937E−18 | 1.7107663E−17 | −8.7285418E−17 |
| A19 | −4.8316979E−20 | −3.5651024E−20 | 4.8200835E−18 | −7.8427280E−19 |
| A20 | 4.3787536E−21 | 3.5228083E−21 | −1.3248879E−19 | 1.4540169E−19 |

EXAMPLE 27

Figure 54:
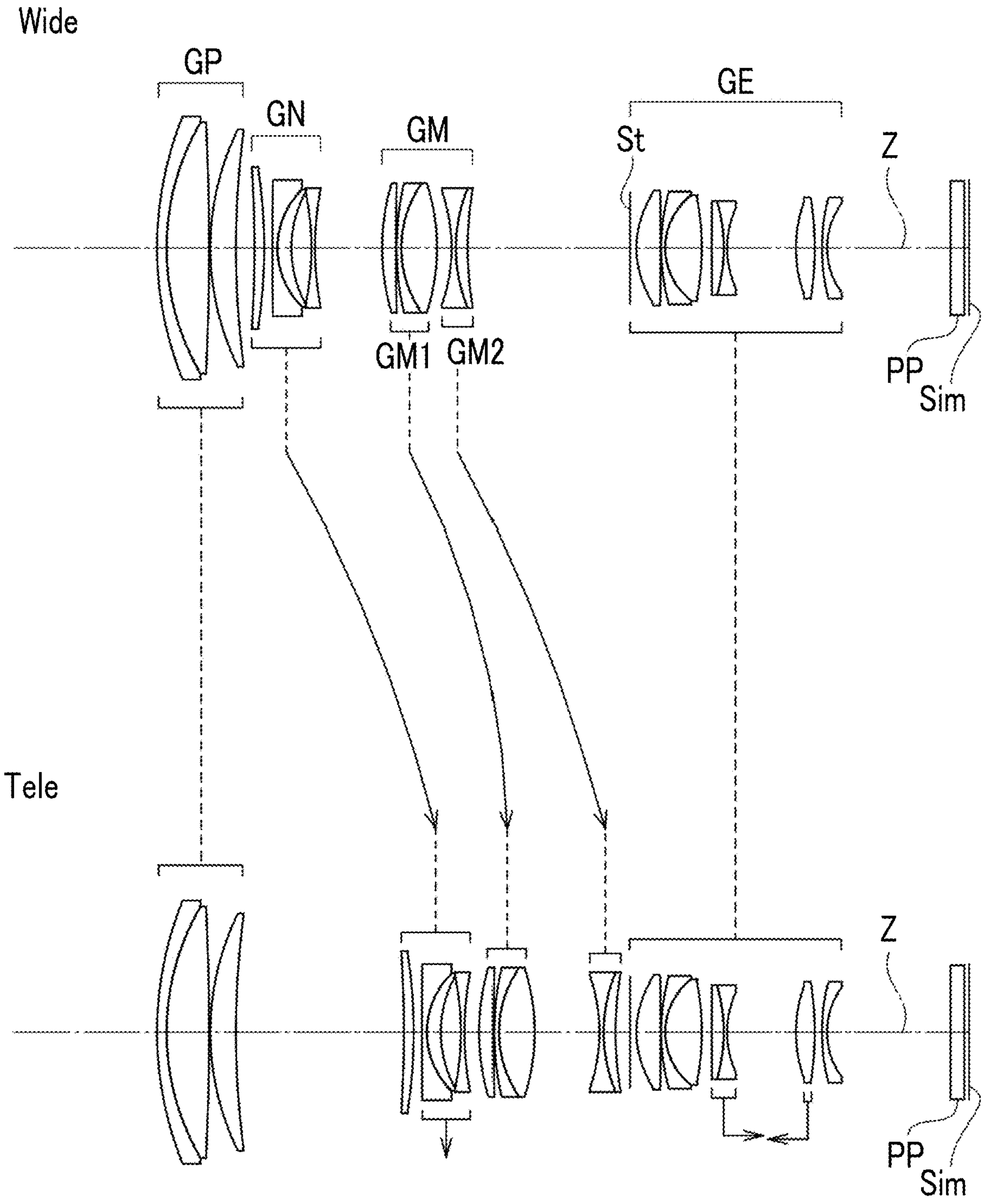
FIG. 54 is a cross-sectional view of a configuration of a zoom lens of Example 27 and a diagram showing movement loci thereof.

FIG. 54 shows a configuration and movement loci of the zoom lens of Example 27. The zoom lens of Example 27 consists of, in order from the object side to the image side, an object side positive group GP, an object side negative group GN, an intermediate group GM, and a final group GE. The object side positive group GP consists of one lens group which has a positive refractive power. The object side negative group GN consists of one lens group which has a negative refractive power. The intermediate group GM consists of, in order from the object side to the image side, two lens groups including a first M lens group GM1 that has a positive refractive power and a second M lens group GM2 that has a negative refractive power. The final group GE consists of one lens group which has a positive refractive power. The final group GE includes an aperture stop St.

During zooming from the wide-angle end to the telephoto end, the object side positive group GP and the final group GE remain stationary with respect to the image plane Sim, and the other lens groups move by changing the spacings between the adjacent lens groups. The zoom lens includes two focusing groups. The focusing group on the object side, which is the first focusing group, consists of two lenses which are fourth and fifth from the object side in the final group GE. The focusing group on the image side consists of one lens which is sixth from the object side in the final group GE. During focusing from the infinite distance object to the close-range object, the focusing group on the object side moves to the image side, and the focusing group on the image side moves to the object side. The vibration-proof group consists of three lenses which are second, third, and fourth from the object side in the object side negative group GN.

Figure 55:
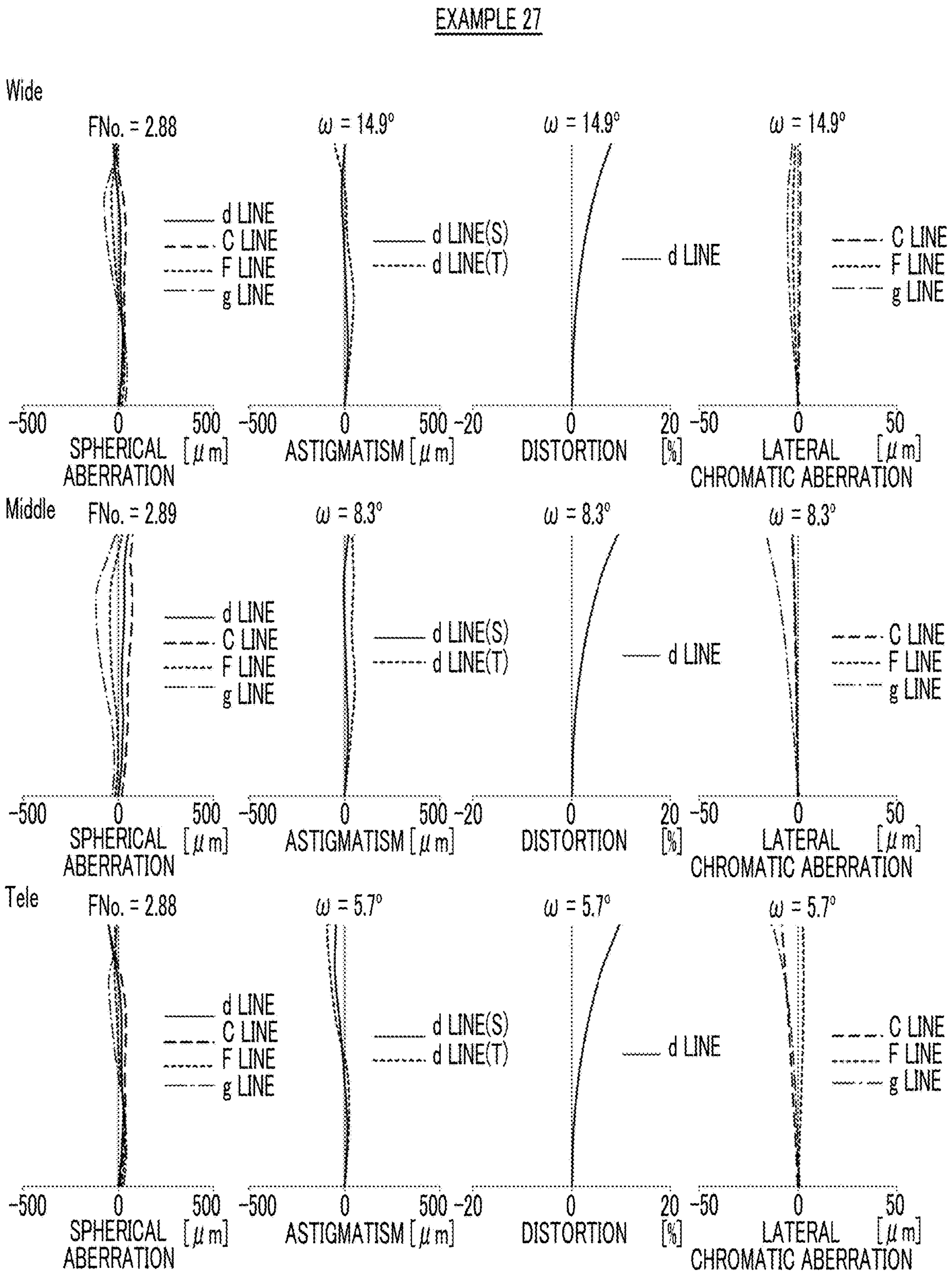
FIG. 55 is a diagram of aberrations in the zoom lens of Example 27.

Regarding the zoom lens of Example 27, Table 79 shows basic lens data, Table 80 shows specifications and variable surface spacings, and Table 81 shows aspherical coefficients thereof. FIG. 55 shows aberration diagrams.

TABLE 79

Example 27

| Sn | R | D | Nd | νd | θgF |
|---|---|---|---|---|---|
| 1 | 77.2738 | 1.9458 | 1.80400 | 46.53 | 0.5578 |
| 2 | 54.8064 | 8.7251 | 1.43700 | 95.10 | 0.5336 |
| 3 | −562.9847 | 0.2615 | | | |
| 4 | 59.1531 | 5.2634 | 1.43700 | 95.10 | 0.5336 |
| 5 | 197.3726 | DD[5] | | | |
| 6 | −285.6209 | 2.0336 | 1.43700 | 95.10 | 0.5336 |
| 7 | −112.5625 | 1.6911 | | | |
| 8 | 1131.1026 | 1.0123 | 1.59282 | 68.62 | 0.5441 |
| 9 | 18.0118 | 2.8648 | 1.91082 | 35.25 | 0.5822 |
| 10 | 25.6469 | 4.1111 | | | |
| 11 | −60.4306 | 0.7505 | 1.81600 | 46.62 | 0.5568 |
| 12 | 70.4017 | DD[12] | | | |
| 13 | 50.2001 | 2.8659 | 2.10420 | 17.02 | 0.6631 |
| 14 | 841.8617 | 0.1000 | | | |
| 15 | 63.1047 | 0.9599 | 2.10420 | 17.02 | 0.6631 |
| 16 | 24.7626 | 7.3318 | 1.49700 | 81.61 | 0.5389 |
| 17 | −46.0413 | DD[17] | | | |
| 18 | −37.6813 | 0.8880 | 1.49700 | 81.61 | 0.5389 |
| 19 | 34.5621 | 2.4229 | 2.00069 | 25.46 | 0.6136 |
| 20 | 76.8432 | DD[20] | | | |
| 21(St) | ∞ | 1.3000 | | | |
| *22 | 21.1264 | 4.9803 | 1.61881 | 63.85 | 0.5418 |
| *23 | −348.5708 | 0.0998 | | | |
| 24 | 46.2110 | 0.8238 | 1.90366 | 31.34 | 0.5964 |
| 25 | 14.5529 | 7.5274 | 1.59282 | 68.62 | 0.5441 |
| 26 | −55.9869 | 1.9998 | | | |
| 27 | 1356.7929 | 2.4920 | 2.00272 | 19.32 | 0.6451 |
| 28 | −36.3779 | 0.6983 | 1.83400 | 37.16 | 0.5776 |
| 29 | 21.3876 | 14.1206 | | | |
| 30 | 30.0284 | 3.8563 | 1.65412 | 39.68 | 0.5738 |
| 31 | −71.7521 | 1.4998 | | | |
| *32 | 65.6822 | 1.0634 | 1.80139 | 45.45 | 0.5581 |
| *33 | 19.6735 | 25.3028 | | | |
| 34 | ∞ | 2.8500 | 1.51633 | 64.14 | 0.5353 |
| 35 | ∞ | 1.0112 | | | |

TABLE 80

Example 27

| | Wide | Middle | Tele |
|---|---|---|---|
| Zr | 1.0 | 1.8 | 2.6 |
| f | 50.36 | 90.11 | 132.81 |
| Bf | 28.19 | 28.19 | 28.19 |
| FNo. | 2.88 | 2.89 | 2.88 |
| 2ω[°] | 29.8 | 16.6 | 11.4 |
| DD[5] | 3.7765 | 25.0337 | 34.4681 |
| DD[12] | 13.7755 | 8.9008 | 2.9734 |
| DD[17] | 2.9898 | 7.1064 | 13.2942 |
| DD[20] | 33.1777 | 12.6786 | 2.9838 |

TABLE 81

Example 27

| Sn | 22 | 23 | 32 | 33 |
|---|---|---|---|---|
| KA | 1.0000000E+00 | 1.0000000E+00 | 1.0000000E+00 | 1.0000000E+00 |
| A3 | 5.2309398E−20 | 4.1847518E−20 | 7.4925968E−20 | 4.2642311E−19 |
| A4 | −6.5524292E−06 | 1.5202701E−05 | 2.0326259E−05 | 5.2566410E−05 |
| A5 | 1.1429545E−06 | −1.4658192E−06 | 8.7122513E−05 | 8.1363611E−05 |
| A6 | −3.6981863E−07 | 6.8844029E−07 | −1.5438894E−05 | −1.5057849E−05 |
| A7 | 8.5997734E−09 | −1.3267968E−07 | −3.4495087E−06 | −2.2601528E−06 |
| A8 | 1.6103795E−08 | −3.7502152E−09 | 1.0312655E−06 | 5.9156108E−07 |
| A9 | −2.4172466E−09 | 3.9922706E−09 | 4.4322349E−08 | 6.1899494E−08 |
| A10 | −1.8874421E−10 | −1.2340559E−10 | −3.2216903E−08 | −1.6300976E−08 |
| A11 | 6.3957304E−11 | −7.5076932E−11 | 7.2323939E−10 | −1.3988608E−09 |
| A12 | −5.0196061E−13 | 4.2829971E−12 | 5.4028478E−10 | 3.2395096E−10 |
| A13 | −8.5734890E−13 | 8.6099146E−13 | −3.0845544E−11 | 2.0784650E−11 |
| A14 | 3.8659696E−14 | −6.1056835E−14 | −4.9092818E−12 | −4.3106434E−12 |
| A15 | 6.2419537E−15 | −5.8102561E−15 | 4.0430108E−13 | −1.8236747E−13 |
| A16 | −4.2080185E−16 | 4.5682731E−16 | 2.1374518E−14 | 3.5310265E−14 |
| A17 | −2.3292973E−17 | 2.1134016E−17 | −2.4189611E−15 | 8.5352677E−16 |

TABLE 81-continued

| Example 27 | | | | |
|---|---|---|---|---|
| Sn | 22 | 23 | 32 | 33 |
| A18 | 1.9543814E−18 | −1.7536797E−18 | −2.0519699E−17 | −1.5858571E−16 |
| A19 | 3.4820912E−20 | −3.1872937E−20 | 5.5957573E−18 | −1.6419976E−18 |
| A20 | −3.4528049E−21 | 2.6968344E−21 | −8.6920984E−20 | 2.9609740E−19 |

EXAMPLE 28

Figure 56:
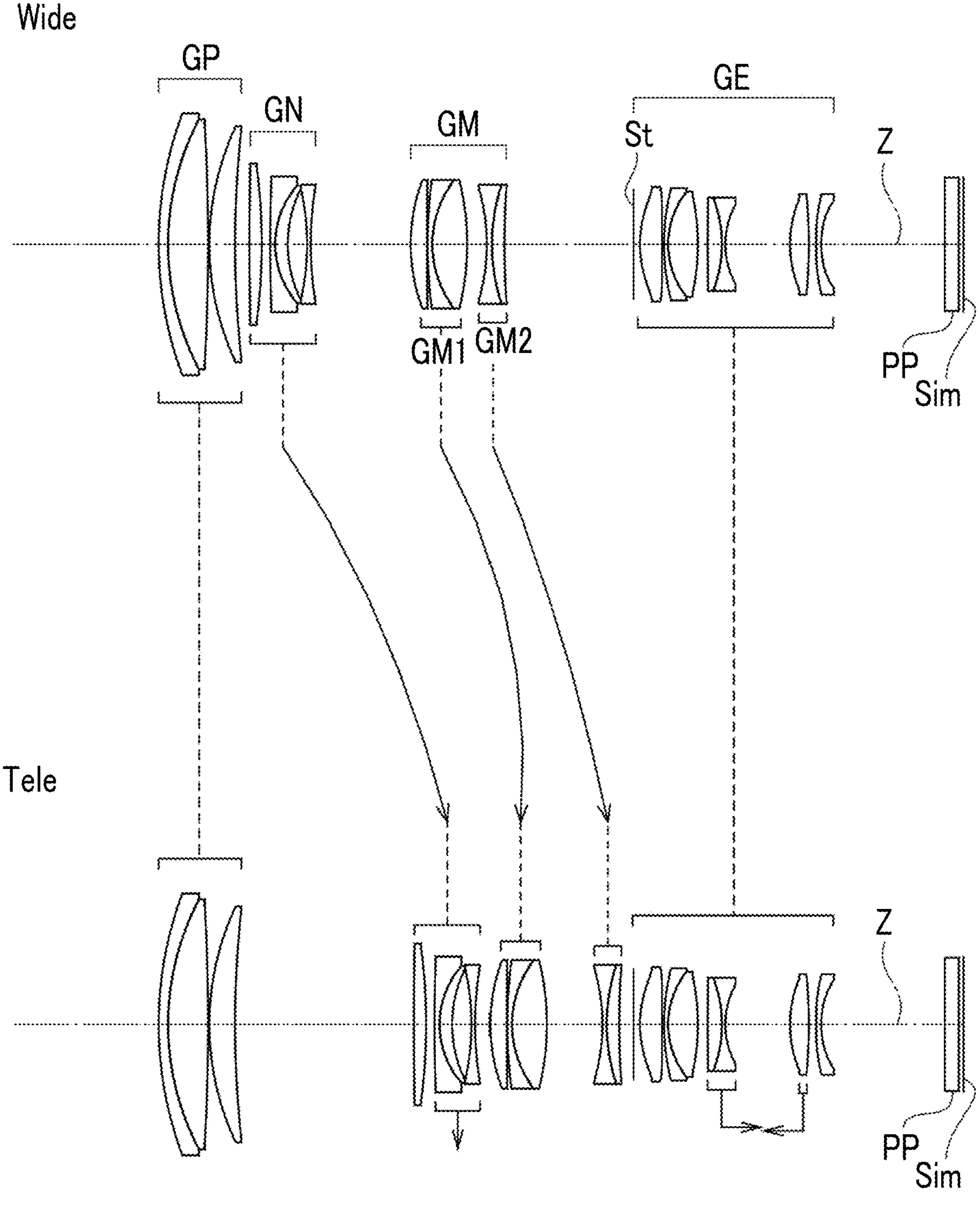
FIG. 56 is a cross-sectional view of a configuration of a zoom lens of Example 28 and a diagram showing movement loci thereof.

FIG. 56 shows a configuration and movement loci of the zoom lens of Example 28. The zoom lens of Example 28 consists of, in order from the object side to the image side, an object side positive group GP, an object side negative group GN, an intermediate group GM, and a final group GE. The object side positive group GP consists of one lens group which has a positive refractive power. The object side negative group GN consists of one lens group which has a negative refractive power. The intermediate group GM consists of, in order from the object side to the image side, two lens groups including a first M lens group GM1 that has a positive refractive power and a second M lens group GM2 that has a negative refractive power. The final group GE consists of one lens group which has a positive refractive power. The final group GE includes an aperture stop St.

During zooming from the wide-angle end to the telephoto end, the object side positive group GP and the final group GE remain stationary with respect to the image plane Sim, and the other lens groups move by changing the spacings between the adjacent lens groups. The zoom lens includes two focusing groups. The focusing group on the object side, which is the first focusing group, consists of two lenses which are fourth and fifth from the object side in the final group GE. The focusing group on the image side consists of one lens which is sixth from the object side in the final group GE. During focusing from the infinite distance object to the close-range object, the focusing group on the object side moves to the image side, and the focusing group on the image side moves to the object side. The vibration-proof group consists of three lenses which are second, third, and fourth from the object side in the object side negative group GN.

Figure 57:
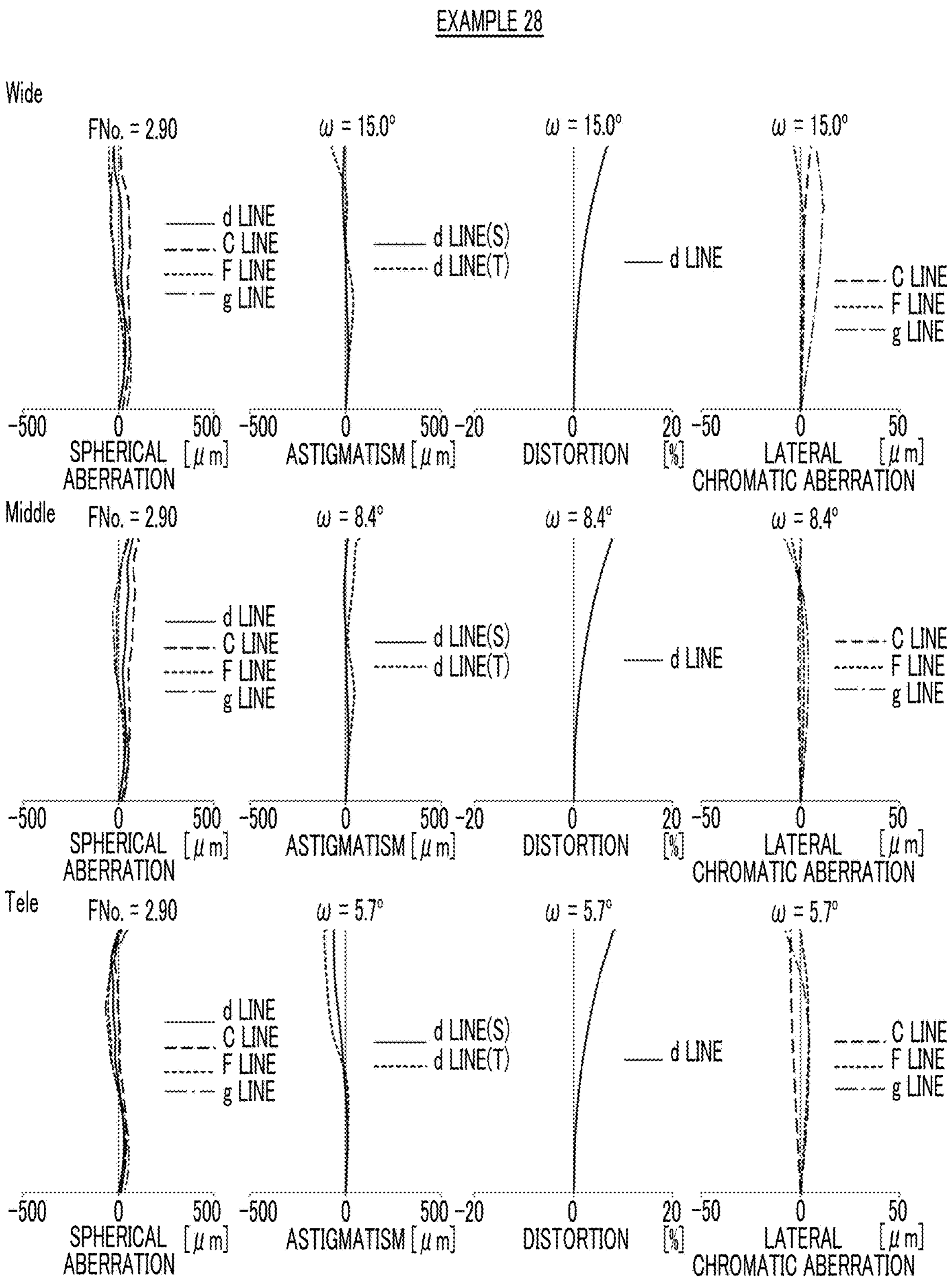
FIG. 57 is a diagram of aberrations in the zoom lens of Example 28.

Regarding the zoom lens of Example 28, Table 82 shows basic lens data, Table 83 shows specifications and variable surface spacings, and Table 84 shows aspherical coefficients thereof. FIG. 57 shows aberration diagrams thereof.

TABLE 82

| Example 28 | | | | | |
|---|---|---|---|---|---|
| Sn | R | D | Nd | νd | θgF |
| 1 | 82.5236 | 1.9481 | 1.83481 | 42.74 | 0.5649 |
| 2 | 59.2766 | 8.2610 | 1.43700 | 95.10 | 0.5336 |
| 3 | −471.1597 | 0.2615 | | | |
| 4 | 61.2514 | 5.3196 | 1.43700 | 95.10 | 0.5336 |
| 5 | 236.6255 | DD[5] | | | |
| 6 | 852.9334 | 2.5555 | 1.43700 | 95.10 | 0.5336 |
| 7 | −129.2719 | 1.7562 | | | |
| 8 | 564.2761 | 1.0105 | 1.59282 | 68.62 | 0.5441 |
| 9 | 19.6024 | 2.5918 | 1.85025 | 30.05 | 0.5980 |
| 10 | 27.7137 | 4.0042 | | | |
| 11 | −54.3230 | 0.7531 | 1.81600 | 46.62 | 0.5568 |
| 12 | 79.3273 | DD[12] | | | |

TABLE 82-continued

| Example 28 | | | | | |
|---|---|---|---|---|---|
| Sn | R | D | Nd | νd | θgF |
| 13 | 40.3875 | 3.4044 | 1.95906 | 17.47 | 0.6599 |
| 14 | 1409.8874 | 0.1000 | | | |
| 15 | 113.2473 | 0.9568 | 2.00272 | 19.32 | 0.6451 |
| 16 | 23.2394 | 7.2085 | 1.49700 | 81.61 | 0.5389 |
| 17 | −58.4520 | DD[17] | | | |
| 18 | −43.6900 | 0.8888 | 1.49700 | 81.61 | 0.5389 |
| 19 | 41.8068 | 2.5651 | 2.00069 | 25.46 | 0.6136 |
| 20 | 169.3806 | DD[20] | | | |
| 21(St) | ∞ | 1.3000 | | | |
| *22 | 24.4044 | 4.5634 | 1.61881 | 63.85 | 0.5418 |
| *23 | −1532.2689 | 0.4239 | | | |
| 24 | 50.7223 | 0.8331 | 1.85896 | 22.73 | 0.6284 |
| 25 | 18.6052 | 6.1487 | 1.59282 | 68.62 | 0.5441 |
| 26 | −49.5796 | 1.9998 | | | |
| 27 | 603.3841 | 2.9610 | 2.00069 | 25.46 | 0.6136 |
| 28 | −28.3457 | 0.6954 | 1.83481 | 42.74 | 0.5649 |
| 29 | 18.0775 | 13.3715 | | | |
| 30 | 26.0590 | 3.9042 | 1.64769 | 33.79 | 0.5939 |
| 31 | −110.1095 | 1.4998 | | | |
| *32 | 313.9462 | 1.0677 | 1.80139 | 45.45 | 0.5581 |
| *33 | 27.3536 | 25.5025 | | | |
| 34 | ∞ | 2.8500 | 1.51633 | 64.14 | 0.5353 |
| 35 | ∞ | 1.0266 | | | |

TABLE 83

| Example 28 | | | |
|---|---|---|---|
| | Wide | Middle | Tele |
| Zr | 1.0 | 1.8 | 2.6 |
| f | 50.55 | 90.44 | 133.29 |
| Bf | 28.41 | 28.41 | 28.41 |
| FNo. | 2.90 | 2.90 | 2.90 |
| 2ω[°] | 30.0 | 16.8 | 11.4 |
| DD[5] | 2.9550 | 27.0104 | 36.8993 |
| DD[12] | 20.6318 | 12.0130 | 2.9709 |
| DD[17] | 4.0574 | 4.8407 | 11.4678 |
| DD[20] | 26.6857 | 10.4658 | 2.9920 |

TABLE 84

| Example 28 | | | | |
|---|---|---|---|---|
| Sn | 22 | 23 | 32 | 33 |
| KA | 1.0000000E+00 | 1.0000000E+00 | 1.0000000E+00 | 1.0000000E+00 |
| A3 | −2.0923759E−20 | 4.1847518E−20 | −2.9970387E−19 | 6.0917587E−20 |
| A4 | −8.4997883E−06 | 1.2364000E−05 | 5.0138400E−05 | 8.3524707E−05 |
| A5 | −1.6443500E−06 | −3.6796892E−06 | 1.1615459E−04 | 1.0532429E−04 |
| A6 | 8.4053292E−07 | 1.3749105E−06 | −1.8880515E−05 | −1.5891779E−05 |
| A7 | −1.8626751E−07 | −2.1798449E−07 | −4.6603848E−06 | −3.5946508E−06 |
| A8 | −6.7089817E−09 | −1.7201635E−08 | 1.2469893E−06 | 6.6186692E−07 |
| A9 | 7.3547479E−09 | 8.5897454E−09 | 6.7037292E−08 | 1.0732027E−07 |
| A10 | −3.8297544E−10 | −1.9532410E−10 | −3.8430788E−08 | −1.9636641E−08 |
| A11 | −1.3765480E−10 | −1.7040640E−10 | 5.7024960E−10 | −2.3297717E−09 |
| A12 | 1.2188039E−11 | 1.0493950E−11 | 6.3804116E−10 | 4.0637583E−10 |
| A13 | 1.3901803E−12 | 1.9078684E−12 | −3.2089322E−11 | 3.2307225E−11 |
| A14 | −1.5672613E−13 | −1.5893851E−13 | −5.7827984E−12 | −5.4501192E−12 |
| A15 | −7.8725273E−15 | −1.2206507E−14 | 4.3374721E−13 | −2.6679573E−13 |
| A16 | 1.0511437E−15 | 1.1969188E−15 | 2.5522196E−14 | 4.4271095E−14 |
| A17 | 2.3665561E−17 | 4.1760956E−17 | −2.6137913E−15 | 1.1910840E−15 |
| A18 | −3.6537453E−18 | −4.5809631E−18 | −2.8490598E−17 | −1.9620310E−16 |
| A19 | −2.9481773E−20 | −5.9357134E−20 | 6.0511058E−18 | −2.2098275E−18 |
| A20 | 5.2095215E−21 | 7.1109535E−21 | −8.7949929E−20 | 3.6180238E−19 |

Tables 85 to 90 each show corresponding values of Conditional Expressions (1) to (36) of the zoom lenses of Examples 1 to 28. Preferable ranges of the conditional expressions may be set by using the corresponding values of the examples shown in Tables 85 to 90 as the upper or lower limits of the conditional expressions.

TABLE 85

| Expression Number | | Example 1 | Example 2 | Example 3 | Example 4 | Example 5 |
|---|---|---|---|---|---|---|
| (1) | Bfw/(fw × tanωw) | 1.552 | 1.524 | 1.461 | 1.454 | 1.971 |
| (2) | (Rnf − Rnr)/(Rnf + Rnr) | 1.143 | 0.193 | 0.972 | 0.048 | 0.711 |
| (3) | (νMp1 + νMp2)/2 | 88.109 | 88.109 | 88.109 | 88.109 | 88.109 |
| (4) | Fnow | 2.88 | 2.87 | 2.88 | 2.87 | 2.88 |
| (5) | fw/fGPw | 0.535 | 0.481 | 0.318 | 0.300 | 0.353 |
| (6) | ft/fGPw | 1.410 | 1.269 | 0.839 | 0.790 | 0.931 |
| (7) | fw/fGMp | 2.095 | 2.264 | 2.582 | 2.120 | 2.556 |
| (8) | fw/fGMw | 1.401 | 1.204 | 1.659 | 1.300 | 1.656 |
| (9) | fw/fGEw | 0.957 | 0.659 | 0.826 | 1.319 | 0.718 |
| (10) | fw/\|ffoc\| | 0.888 | 0.624 | 1.206 | 1.304 | 1.221 |
| (11) | ft/\|ffoc\| | 2.342 | 1.646 | 3.181 | 3.439 | 3.222 |
| (12) | ωW | 16.96 | 16.72 | 15.75 | 16.75 | 15.31 |
| (13) | fw/fGNw | −2.320 | −1.723 | −1.705 | −1.884 | −1.949 |
| (14) | ft/fGNw | −6.117 | −4.545 | −4.497 | −4.970 | −5.142 |
| (15) | ft/fGMt | 4.116 | 3.167 | 4.936 | 4.557 | 4.636 |
| (16) | (TLt − TLw)/fw × (fw/ft) | 0.103 | 0.198 | 0.291 | 0.325 | 0.334 |
| (17) | $\|(1 - \beta fw^2) \times \beta fRw^2\|$ | 0.231 | 0.229 | 1.032 | 1.655 | 1.407 |
| (18) | $\|(1 - \beta ft^2) \times \beta fRt^2\|$ | 1.983 | 1.540 | 2.154 | 2.833 | 2.223 |
| (19) | STw/STt | 0.968 | 0.818 | 0.836 | 0.910 | 0.877 |
| (20) | νPave | 88.102 | 88.102 | 88.102 | 88.102 | 88.102 |
| (21) | DGPw/TLw | 0.117 | 0.111 | 0.103 | 0.109 | 0.109 |
| (22) | DGNw/TLw | 0.196 | 0.195 | 0.184 | 0.146 | 0.195 |
| (23) | DGMw/TLw | 0.236 | 0.184 | 0.242 | 0.227 | 0.212 |
| (24) | DGEw/TLw | 0.130 | 0.139 | 0.095 | 0.179 | 0.130 |
| (25) | DGMt/TLt | 0.226 | 0.157 | 0.199 | 0.198 | 0.166 |
| (26) | ΔGP/TLt | −0.074 | −0.146 | −0.213 | −0.218 | −0.234 |
| (27) | \|ΔGN\|/TLt | 0.077 | 0.005 | 0.024 | 0.076 | 0.007 |
| (28) | \|ΔGM\|/TLt | 0.023 | 0.131 | 0.075 | 0.001 | 0.064 |
| (29) | fGPw/fGNw | −4.338 | −3.582 | −5.361 | −6.289 | −5.522 |
| (30) | fGMt/fGMw | 0.898 | 1.003 | 0.886 | 0.753 | 0.942 |
| (31) | fGNw/fGMw | −0.604 | −0.699 | −0.973 | −0.690 | −0.850 |
| (32) | fGPw/\|fGEw\| | 1.790 | 1.371 | 2.596 | 4.402 | 2.035 |
| (33) | fGMw/fGEw | 0.683 | 0.548 | 0.498 | 1.014 | 0.434 |
| (34) | Denw/fw | 1.300 | 1.425 | 1.402 | 1.040 | 1.188 |
| (35) | Dexw/(fw × tanωw) | 4.593 | 3.887 | 5.818 | 4.549 | 5.594 |
| (36) | ft × Fnot/TLt | 2.083 | 2.207 | 2.155 | 1.937 | 2.031 |

TABLE 86

| Expression Number | | Example 6 | Example 7 | Example 8 | Example 9 | Example 10 |
|---|---|---|---|---|---|---|
| (1) | Bfw/(fw × tanωw) | 1.437 | 1.441 | 1.269 | 1.281 | 0.733 |
| (2) | (Rnf − Rnr)/(Rnf + Rnr) | 2.011 | 0.738 | 0.949 | 1.126 | 0.787 |
| (3) | (νMp1 + νMp2)/2 | 88.109 | 88.109 | 71.912 | 74.283 | 59.941 |
| (4) | Fnow | 2.88 | 2.88 | 3.61 | 3.61 | 3.50 |
| (5) | fw/fGPw | 0.307 | 0.256 | 0.238 | 0.214 | 0.135 |
| (6) | ft/fGPw | 0.810 | 0.676 | 1.679 | 1.513 | 2.116 |
| (7) | fw/fGMp | 2.135 | 2.381 | 0.648 | 0.548 | 0.658 |
| (8) | fw/fGMw | 1.256 | 1.420 | 0.869 | 0.783 | 0.473 |
| (9) | fw/fGEw | −0.400 | 0.815 | 0.135 | 0.125 | 0.271 |
| (10) | fw/\|ffoc\| | 1.298 | 0.970 | 0.589 | 1.355 | 0.948 |
| (11) | ft/\|ffoc\| | 3.425 | 2.560 | 4.156 | 9.566 | 14.887 |
| (12) | ωW | 16.91 | 16.85 | 40.47 | 40.20 | 42.56 |
| (13) | fw/fGNw | −1.899 | −1.501 | −1.602 | −1.355 | −0.989 |
| (14) | ft/fGNw | −5.009 | −3.961 | −11.310 | −9.566 | −15.521 |
| (15) | ft/fGMt | 4.060 | 4.437 | 6.310 | 5.705 | 8.531 |
| (16) | (TLt − TLw)/fw × (fw/ft) | 0.326 | 0.310 | 0.501 | 0.490 | 0.297 |
| (17) | $\|(1-\beta fw^2) \times \beta fRw^2\|$ | 1.691 | 0.833 | 1.251 | 0.955 | 3.879 |
| (18) | $\|(1-\beta ft^2) \times \beta fRt^2\|$ | 2.775 | 2.063 | 8.939 | 4.789 | 17.835 |
| (19) | STw/STt | 0.900 | 0.826 | 0.789 | 0.797 | 0.838 |
| (20) | νPave | 88.102 | 71.142 | 58.556 | 58.929 | 76.767 |
| (21) | DGPw/TLw | 0.110 | 0.105 | 0.103 | 0.089 | 0.093 |
| (22) | DGNw/TLw | 0.133 | 0.185 | 0.190 | 0.171 | 0.101 |
| (23) | DGMw/TLw | 0.322 | 0.238 | 0.329 | 0.301 | 0.154 |
| (24) | DGEw/TLw | 0.031 | 0.109 | 0.021 | 0.025 | 0.156 |
| (25) | DGMt/TLt | 0.236 | 0.197 | 0.192 | 0.176 | 0.119 |
| (26) | ΔGP/TLt | −0.220 | −0.216 | −0.385 | −0.376 | −0.386 |
| (27) | \|ΔGN\|/TLt | 0.076 | 0.011 | 0.173 | 0.143 | 0.009 |
| (28) | \|ΔGM\|/TLt | 0.008 | 0.101 | 0.252 | 0.245 | 0.155 |
| (29) | fGPw/fGNw | −6.184 | −5.858 | −6.735 | −6.321 | −7.335 |
| (30) | fGMt/fGMw | 0.816 | 0.844 | 0.973 | 0.970 | 0.870 |
| (31) | fGNw/fGMw | −0.662 | −0.946 | −0.543 | −0.578 | −0.478 |
| (32) | fGPw/\|fGEw\| | 1.303 | 3.182 | 0.566 | 0.585 | 2.008 |
| (33) | fGMw/fGEw | −0.319 | 0.574 | 0.155 | 0.160 | 0.572 |
| (34) | Denw/fw | 0.960 | 1.533 | 1.347 | 1.360 | 1.607 |
| (35) | Dexw/(fw × tanωw) | 6.067 | 4.606 | 3.161 | 3.171 | 2.468 |
| (36) | ft × Fnot/TLt | 1.950 | 2.018 | 4.469 | 4.467 | 8.195 |

TABLE 87

| Expression Number | | Example 11 | Example 12 | Example 13 | Example 14 | Example 15 |
|---|---|---|---|---|---|---|
| (1) | Bfw/(fw × tanωw) | 0.744 | 0.754 | 0.866 | 0.869 | 0.783 |
| (2) | (Rnf − Rnr)/(Rnf + Rnr) | 1.068 | 1.000 | 1.092 | 0.987 | 0.946 |
| (3) | (νMp1 + νMp2)/2 | 61.342 | 60.650 | 62.423 | 63.752 | 47.453 |
| (4) | Fnow | 3.50 | 3.50 | 3.50 | 3.50 | 3.50 |
| (5) | fw/fGPw | 0.138 | 0.140 | 0.145 | 0.131 | 0.228 |
| (6) | ft/fGPw | 2.161 | 2.195 | 2.281 | 2.317 | 3.581 |
| (7) | fw/fGMp | 1.000 | 0.608 | 0.634 | 0.668 | 0.542 |
| (8) | fw/fGMw | 0.627 | 0.387 | 0.394 | 0.384 | 0.415 |
| (9) | fw/fGEw | −0.877 | 0.503 | 0.481 | 0.392 | 0.513 |
| (10) | fw/\|ffoc\| | 0.694 | 0.674 | 0.616 | 0.719 | 0.580 |
| (11) | ft/\|ffoc\| | 10.893 | 10.575 | 9.668 | 12.694 | 9.099 |
| (12) | ωW | 42.63 | 41.85 | 41.87 | 44.39 | 41.40 |
| (13) | fw/fGNw | −0.967 | −0.970 | −0.986 | −0.930 | −1.296 |
| (14) | ft/fGNw | −15.174 | −15.223 | −15.480 | −16.423 | −20.346 |
| (15) | ft/fGMt | 11.853 | 6.995 | 7.170 | 8.337 | 6.545 |
| (16) | (TLt − TLw)/fw × (fw/ft) | 0.301 | 0.298 | 0.293 | 0.285 | 0.168 |
| (17) | $\|(1-\beta fw^2) \times \beta fRw^2\|$ | 3.258 | 3.258 | 2.894 | 3.418 | 3.331 |
| (18) | $\|(1-\beta ft^2) \times \beta fRt^2\|$ | 17.090 | 16.481 | 14.248 | 15.256 | 15.166 |
| (19) | STw/STt | 0.767 | 0.747 | 0.753 | 0.766 | 0.840 |
| (20) | νPave | 77.491 | 74.698 | 72.631 | 64.855 | 62.320 |
| (21) | DGPw/TLw | 0.101 | 0.114 | 0.095 | 0.086 | 0.144 |
| (22) | DGNw/TLw | 0.104 | 0.100 | 0.097 | 0.102 | 0.078 |
| (23) | DGMw/TLw | 0.276 | 0.156 | 0.166 | 0.161 | 0.165 |
| (24) | DGEw/TLw | 0.136 | 0.197 | 0.186 | 0.176 | 0.217 |
| (25) | DGMt/TLt | 0.141 | 0.113 | 0.118 | 0.115 | 0.122 |
| (26) | ΔGP/TLt | −0.386 | −0.386 | −0.386 | −0.386 | −0.270 |
| (27) | \|ΔGN\|/TLt | 0.020 | 0.025 | 0.037 | 0.019 | 0.000 |
| (28) | \|ΔGM\|/TLt | 0.181 | 0.185 | 0.204 | 0.206 | 0.162 |
| (29) | fGPw/fGNw | −7.022 | −6.934 | −6.787 | −7.087 | −5.682 |
| (30) | fGMt/fGMw | 0.830 | 0.870 | 0.863 | 0.814 | 0.996 |
| (31) | fGNw/fGMw | −0.648 | −0.400 | −0.400 | −0.413 | −0.320 |

TABLE 87-continued

| Expression Number | | Example 11 | Example 12 | Example 13 | Example 14 | Example 15 |
|---|---|---|---|---|---|---|
| (32) | fGPw/\|fGEw\| | 6.372 | 3.597 | 3.311 | 2.986 | 2.248 |
| (33) | fGMw/fGEw | −1.399 | 1.298 | 1.220 | 1.020 | 1.235 |
| (34) | Denw/fw | 1.735 | 1.761 | 1.665 | 1.737 | 1.618 |
| (35) | Dexw/(fw × tanωw) | 2.661 | 2.719 | 2.886 | 2.783 | 2.477 |
| (36) | ft × Fnot/TLt | 8.073 | 8.163 | 8.290 | 8.517 | 10.093 |

TABLE 88

| Expression Number | | Example 16 | Example 17 | Example 18 | Example 19 | Example 20 |
|---|---|---|---|---|---|---|
| (1) | Bfw/(fw × tanωw) | 0.864 | 1.621 | 2.226 | 2.150 | 2.158 |
| (2) | (Rnf − Rnr)/(Rnf + Rnr) | 0.975 | 1.093 | 0.966 | 0.905 | 0.985 |
| (3) | (νMp1 + νMp2)/2 | 59.590 | 61.303 | 39.303 | 39.056 | 44.083 |
| (4) | Fnow | 3.50 | 3.50 | 2.89 | 2.89 | 2.89 |
| (5) | fw/fGPw | 0.133 | 0.156 | 0.455 | 0.475 | 0.435 |
| (6) | ft/fGPw | 2.090 | 2.455 | 1.200 | 1.252 | 1.146 |
| (7) | fw/fGMp | 0.554 | 0.670 | 1.185 | 1.250 | 1.129 |
| (8) | fw/fGMw | 0.313 | 0.348 | 0.733 | 0.749 | 0.691 |
| (9) | fw/fGEw | 0.552 | 0.489 | 1.110 | 1.077 | 1.081 |
| (10) | fw/\|ffoc\| | 0.397 | 0.170 | 1.691 | 1.004 | 2.065 |
| (11) | ft/\|ffoc\| | 6.225 | 2.672 | 4.457 | 2.646 | 5.443 |
| (12) | ωW | 42.97 | 43.54 | 14.91 | 14.69 | 14.61 |
| (13) | fw/fGNw | −0.963 | −1.024 | −1.913 | −1.969 | −1.816 |
| (14) | ft/fGNw | −15.126 | −16.076 | −5.044 | −5.190 | −4.787 |
| (15) | ft/fGMt | 5.985 | 5.520 | 2.183 | 2.269 | 1.993 |
| (16) | (TLt − TLw)/fw × (fw/ft) | 0.301 | 0.301 | 0.000 | 0.000 | 0.000 |
| (17) | $\|(1 - \beta fw^2) \times \beta fRw^2\|$ | 1.513 | 0.608 | 4.843 | 2.508 | 6.487 |
| (18) | $\|(1 - \beta ft^2) \times \beta fRt^2\|$ | 6.774 | 2.471 | 4.844 | 2.508 | 6.485 |
| (19) | STw/STt | 0.836 | 0.756 | 1.000 | 1.000 | 1.000 |
| (20) | νPave | 77.898 | 71.650 | 95.099 | 95.099 | 95.099 |
| (21) | DGPw/TLw | 0.096 | 0.097 | 0.094 | 0.095 | 0.094 |
| (22) | DGNw/TLw | 0.100 | 0.089 | 0.087 | 0.086 | 0.090 |
| (23) | DGMw/TLw | 0.140 | 0.136 | 0.109 | 0.109 | 0.108 |
| (24) | DGEw/TLw | 0.222 | 0.116 | 0.215 | 0.235 | 0.212 |
| (25) | DGMt/TLt | 0.110 | 0.084 | 0.149 | 0.149 | 0.140 |
| (26) | ΔGP/TLt | −0.386 | −0.386 | 0.000 | 0.000 | 0.000 |
| (27) | \|ΔGN\|/TLt | 0.010 | 0.079 | 0.207 | 0.194 | 0.228 |
| (28) | \|ΔGM\|/TLt | 0.136 | 0.243 | 0.145 | 0.124 | 0.155 |
| (29) | fGPw/fGNw | −7.238 | −6.548 | 4.205 | −4.144 | −4.179 |
| (30) | fGMt/fGMw | 0.821 | 0.990 | 0.885 | 0.870 | 0.913 |
| (31) | fGNw/fGMw | −0.325 | −0.340 | −0.383 | −0.380 | −0.380 |
| (32) | fGPw/\|fGEw\| | 4.145 | 3.129 | 2.439 | 2.267 | 2.486 |
| (33) | fGMw/fGEw | 1.763 | 1.406 | 1.515 | 1.438 | 1.565 |
| (34) | Denw/fw | 1.619 | 1.637 | 1.538 | 1.527 | 1.506 |
| (35) | Dexw/(fw × tanωw) | 2.857 | 3.927 | 3.833 | 4.130 | 3.653 |
| (36) | ft × Fnot/TLt | 8.074 | 8.071 | 2.328 | 2.320 | 2.344 |

TABLE 89

| Expression Number | | Example 21 | Example 22 | Example 23 | Example 24 | Example 25 |
|---|---|---|---|---|---|---|
| (1) | Bfw/(fw × tanωw) | 2.453 | 2.371 | 2.615 | 2.870 | 2.049 |
| (2) | (Rnf − Rnr)/(Rnf + Rnr) | 0.974 | 0.919 | 0.974 | 0.948 | 0.930 |
| (3) | (νMp1 + νMp2)/2 | 43.853 | 46.561 | 47.739 | 41.890 | 50.252 |
| (4) | Fnow | 2.89 | 2.89 | 2.89 | 2.89 | 2.89 |
| (5) | fw/fGPw | 0.448 | 0.448 | 0.458 | 0.438 | 0.499 |
| (6) | ft/fGPw | 1.181 | 1.179 | 1.206 | 1.155 | 1.314 |
| (7) | fw/fGMp | 0.843 | 0.795 | 0.789 | 0.577 | 1.130 |
| (8) | fw/fGMw | 0.607 | 0.566 | 0.604 | 0.471 | 0.692 |
| (9) | fw/fGEw | 1.038 | 1.123 | 1.055 | 1.001 | 1.102 |
| (10) | fw/\|ffoc\| | 1.122 | 0.951 | 1.253 | 0.610 | 1.654 |
| (11) | ft/\|ffoc\| | 2.956 | 2.505 | 3.302 | 1.609 | 4.360 |
| (12) | ωW | 15.03 | 15.14 | 15.14 | 16.46 | 14.80 |
| (13) | fw/fGNw | −1.731 | −1.792 | −1.746 | −1.794 | −1.947 |
| (14) | ft/fGNw | −4.564 | −4.722 | −4.603 | −4.728 | −5.133 |
| (15) | ft/fGMt | 1.617 | 1.511 | 1.600 | 1.248 | 2.244 |

TABLE 89-continued

| Expression Number | | Example 21 | Example 22 | Example 23 | Example 24 | Example 25 |
|---|---|---|---|---|---|---|
| (16) | (TLt − TLw)/fw × (fw/ft) | 0.000 | 0.000 | 0.000 | 0.000 | 0.000 |
| (17) | $\|(1 - \beta fw^2) \times \beta fRw^2\|$ | 2.047 | 1.669 | 2.546 | 0.884 | 1.153 |
| (18) | $\|(1 - \beta ft^2) \times \beta fRt^2\|$ | 2.046 | 1.668 | 2.544 | 0.884 | 1.153 |
| (19) | STw/STt | 1.000 | 1.000 | 1.000 | 1.000 | 1.000 |
| (20) | νPave | 95.099 | 95.099 | 95.099 | 95.099 | 95.099 |
| (21) | DGPw/TLw | 0.092 | 0.093 | 0.091 | 0.083 | 0.100 |
| (22) | DGNw/TLw | 0.088 | 0.092 | 0.085 | 0.085 | 0.095 |
| (23) | DGMw/TLw | 0.110 | 0.115 | 0.120 | 0.093 | 0.108 |
| (24) | DGEw/TLw | 0.231 | 0.238 | 0.218 | 0.255 | 0.221 |
| (25) | DGMt/TLt | 0.117 | 0.124 | 0.125 | 0.103 | 0.185 |
| (26) | ΔGP/TLt | 0.000 | 0.000 | 0.000 | 0.000 | 0.000 |
| (27) | \|ΔGN\|/TLt | 0.217 | 0.202 | 0.211 | 0.191 | 0.171 |
| (28) | \|ΔGM\|/TLt | 0.125 | 0.136 | 0.118 | 0.157 | 0.087 |
| (29) | fGPw/fGNw | −3.866 | −4.004 | −3.815 | −4.093 | −3.906 |
| (30) | fGMt/fGMw | 0.990 | 0.986 | 0.994 | 0.994 | 0.813 |
| (31) | fGNw/fGMw | −0.351 | −0.316 | −0.346 | −0.262 | −0.355 |
| (32) | fGPw/\|fGEw\| | 2.318 | 2.510 | 2.305 | 2.283 | 2.210 |
| (33) | fGMw/fGEw | 1.709 | 1.986 | 1.748 | 2.126 | 1.591 |
| (34) | Denw/fw | 1.477 | 1.611 | 1.470 | 1.524 | 1.648 |
| (35) | Dexw/(fw × tanωw) | 4.690 | 4.709 | 4.663 | 6.156 | 3.724 |
| (36) | ft × Fnot/TLt | 2.254 | 2.226 | 2.254 | 2.053 | 2.351 |

TABLE 90

| Expression Number | | Example 26 | Example 27 | Example 28 |
|---|---|---|---|---|
| (1) | Bfw/(fw × tanωw) | 2.136 | 2.110 | 2.101 |
| (2) | (Rnf − Rnr)/(Rnf + Rnr) | 1.028 | 0.969 | 0.933 |
| (3) | (νMp1 + νMp2)/2 | 49.539 | 49.313 | 49.539 |
| (4) | Fnow | 2.89 | 2.89 | 2.89 |
| (5) | fw/fGPw | 0.472 | 0.484 | 0.484 |
| (6) | ft/fGPw | 1.244 | 1.277 | 1.275 |
| (7) | fw/fGMp | 1.158 | 1.201 | 0.941 |
| (8) | fw/fGMw | 0.712 | 0.746 | 0.732 |
| (9) | fw/fGEw | 1.067 | 1.071 | 0.909 |
| (10) | fw/\|ffoc\| | 1.683 | 1.687 | 1.942 |
| (11) | ft/\|ffoc\| | 4.436 | 4.447 | 5.119 |
| (12) | ωW | 14.65 | 14.85 | 14.97 |
| (13) | fw/fGNw | −1.891 | −1.995 | −1.887 |
| (14) | ft/fGNw | −4.985 | −5.257 | −4.974 |
| (15) | ft/fGMt | 2.298 | 2.345 | 2.025 |
| (16) | (TLt − TLw)/fw × (fw/ft) | 0.000 | 0.000 | 0.000 |
| (17) | $\|(1 - \beta fw^2) \times \beta fRw^2\|$ | 1.228 | 1.423 | 1.716 |
| (18) | $\|(1 - \beta ft^2) \times \beta fRt^2\|$ | 1.228 | 1.423 | 1.716 |
| (19) | STw/STt | 1.000 | 1.000 | 1.000 |
| (20) | νPave | 95.099 | 95.099 | 95.099 |
| (21) | DGPw/TLw | 0.098 | 0.098 | 0.096 |
| (22) | DGNw/TLw | 0.082 | 0.075 | 0.077 |
| (23) | DGMw/TLw | 0.108 | 0.106 | 0.116 |
| (24) | DGEw/TLw | 0.219 | 0.236 | 0.227 |
| (25) | DGMt/TLt | 0.182 | 0.168 | 0.161 |
| (26) | ΔGP/TLt | 0.000 | 0.000 | 0.000 |
| (27) | \|ΔGN\|/TLt | 0.189 | 0.185 | 0.206 |
| (28) | \|ΔGM\|/TLt | 0.114 | 0.120 | 0.099 |
| (29) | fGPw/fGNw | −4.008 | −4.118 | −3.902 |
| (30) | fGMt/fGMw | 0.817 | 0.839 | 0.953 |
| (31) | fGNw/fGMw | −0.377 | −0.374 | −0.388 |
| (32) | fGPw/\|fGEw\| | 2.261 | 2.212 | 1.878 |
| (33) | fGMw/fGEw | 1.498 | 1.436 | 1.241 |
| (34) | Denw/fw | 1.556 | 1.523 | 1.468 |
| (35) | Dexw/(fw × tanωw) | 3.757 | 4.046 | 3.969 |
| (36) | ft × Fnot/TLt | 2.320 | 2.311 | 2.332 |

The zoom lenses of Examples 1 to 28 each are configured to have a small size, but maintain high optical performance by satisfactorily correcting various aberrations. Further, the zoom lenses of Examples 1 to 28 each have a large image circle.

Figure 58:
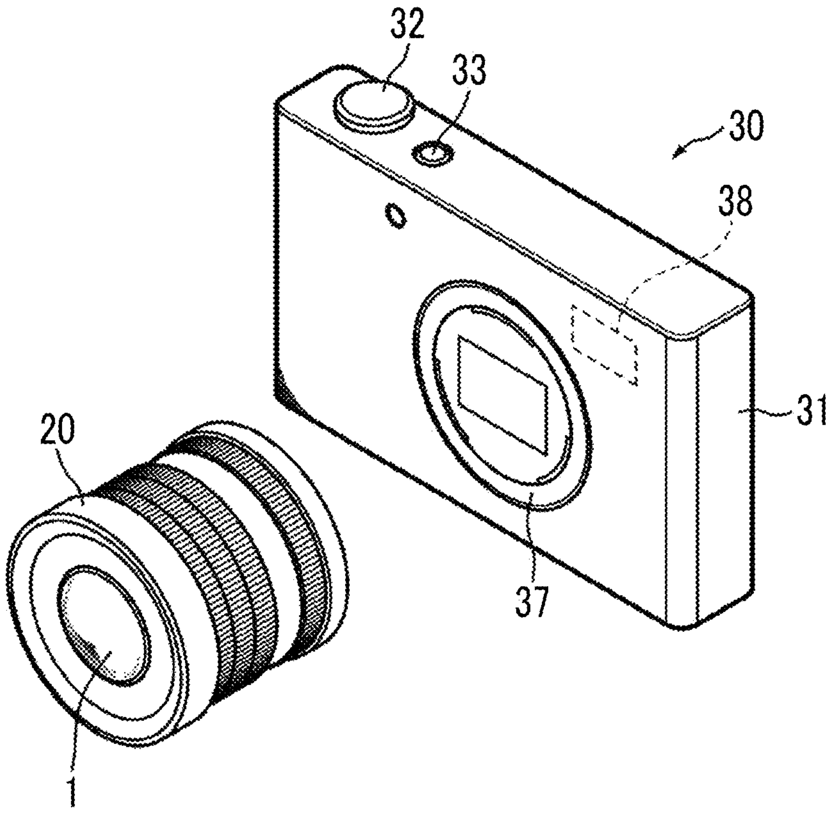
FIG. 58 is a perspective view of the front side of the imaging apparatus according to an embodiment.
Figure 59:
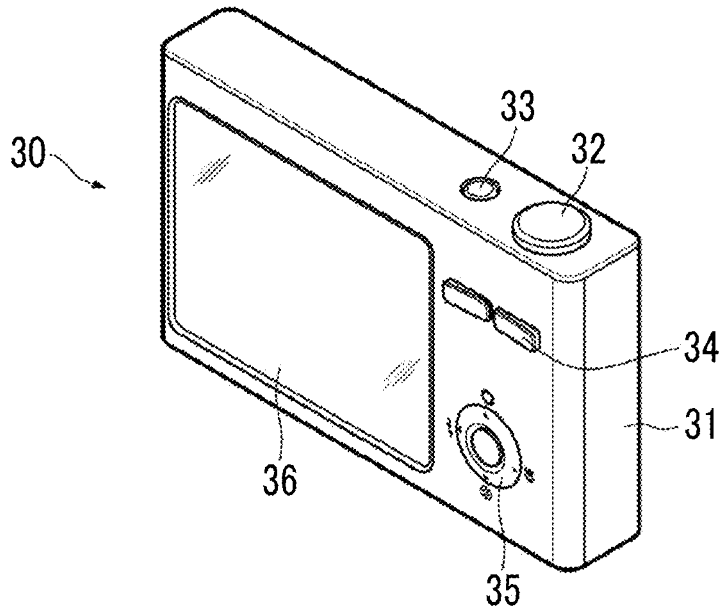
FIG. 59 is a perspective view of the rear side of the imaging apparatus according to the embodiment.

Next, an imaging apparatus according to an embodiment of the present disclosure will be described. FIGS. 58 and 59 show external views of a camera 30 which is the imaging apparatus according to the embodiment of the present disclosure. FIG. 58 is a perspective view of the camera 30 viewed from a front side, and FIG. 59 is a perspective view of the camera 30 viewed from a rear side. The camera 30 is a so-called mirrorless type digital camera, and the interchangeable lens 20 can be removably attached thereto. The interchangeable lens 20 is configured to include a zoom lens 1, which is housed in a lens barrel, according to an embodiment of the present disclosure.

The camera 30 comprises a camera body 31. A shutter button 32 and a power button 33 are provided on an upper surface of the camera body 31. Further, an operating part 34, an operating part 35, and a display unit 36 are provided on a rear surface of the camera body 31. The display unit 36 is able to display a captured image and an image within an angle of view before imaging.

An imaging aperture, through which light from an imaging target is incident, is provided in a center of the front surface of the camera body 31. A mount 37 is provided at a position corresponding to the imaging aperture, and the interchangeable lens 20 is mounted on the camera body 31 with the mount 37 interposed therebetween.

An imaging element 38 is provided in the camera body 31. The imaging element 38 outputs an imaging signal corresponding to the subject image formed by the interchangeable lens 20. For example, a charge coupled device (CCD) or a complementary metal oxide semiconductor (CMOS) is used as the imaging element 38. A signal processing circuit (not shown in the drawing), a recording medium (not shown in the drawing), and the like are provided in the camera body 31. The signal processing circuit processes the imaging signal which is output from the imaging element 38 to generate an image. The recording medium is used to record the generated image. The camera 30 is able to capture a still image or a video in a case where the shutter button 32 is pressed, and is able to store image data, which is obtained through imaging, in the storage medium.

The technique of the present disclosure has been hitherto described through embodiments and examples, but the technique of the present disclosure is not limited to the above-mentioned embodiments and examples, and may be modified into various forms. For example, values such as the curvature radius, the surface spacing, the refractive index, the Abbe number, and the aspherical coefficient of each lens are not limited to the values shown in the examples, and different values may be used therefor.

Further, the imaging apparatus according to the embodiment of the present disclosure is not limited to the above example, and may be modified into various forms such as a camera other than the mirrorless type, a film camera, a video camera, and a security camera.

Regarding the above-mentioned embodiments and examples, the following Supplementary Notes will be further disclosed.

Supplementary Note 1

A zoom lens consisting of, in order from an object side to an image side:

an object side positive group which has a positive refractive power;

an object side negative group which has a negative refractive power;

an intermediate group; and a final group, in which the object side positive group, the object side negative group, the intermediate group, and the final group each include at least one lens group, all spacings between adjacent lens groups change, and all mutual spacings between lenses in each lens group do not change during zooming, all lenses in the object side positive group and all lenses in the intermediate group remain stationary with respect to an image plane during focusing, and assuming that a back focal length of a whole system in terms of an air-equivalent distance in a state where an infinite distance object is in focus at a wide-angle end is Bfw, a focal length of the whole system in the state where the infinite distance object is in focus at the wide-angle end is fw, and a maximum half angle of view in the state where the infinite distance object is in focus at the wide-angle end is ωw, Conditional Expression (1) is satisfied, which is represented by $$0.5 < Bfw/(fw \times \tan\omega w) < 5. \quad (1)$$

Supplementary Note 2

The zoom lens according to Supplementary Note 1, in which the object side negative group includes a lens group, which is closest to the object side and which has a negative refractive power, among the lens groups which have negative refractive powers and which are included in the zoom lens.

Supplementary Note 3

The zoom lens according to Supplementary Note 1 or 2, in which the final group consists of one lens group.

Supplementary Note 4

The zoom lens according to any one of Supplementary Notes 1 to 3, in which the intermediate group includes at least three lenses.

Supplementary Note 5

The zoom lens according to any one of Supplementary Notes 1 to 4, in which assuming that a paraxial curvature radius of an object side surface of a negative lens, which is closest to the object side, among the negative lenses, which are included in the object side negative group, is Rnf, and a paraxial curvature radius of an image side surface of the negative lens, which is closest to the object side, among the negative lenses, which are included in the object side negative group, is Rnr, Conditional Expression (2) is satisfied, which is represented by $$0.02 < (Rnf - Rnr)/(Rnf + Rnr) < 3. \quad (2)$$

Supplementary Note 6

The zoom lens according to any one of Supplementary Notes 1 to 5, in which a lens group, which is closest to the object side in the object side positive group, moves during zooming.

Supplementary Note 7

The zoom lens according to any one of Supplementary Notes 1 to 6, comprising at least one focusing group that moves during focusing, in which a focusing group, which is closest to the object side, among the focusing groups, which are included in the zoom lens, has a negative refractive power.

Supplementary Note 8

The zoom lens according to any one of Supplementary Notes 1 to 7, in which the object side negative group includes at least two negative lenses, an image side surface of a negative lens, which is closest to the object side, among the negative lenses, which are included in the object side negative group, is a concave surface, and an object side surface of a negative lens, which is closest to the image side, among the negative lenses, which are included in the object side negative group, is a concave surface.

Supplementary Note 9

The zoom lens according to any one of Supplementary Notes 1 to 8, in which the intermediate group includes at least one lens group which has a positive refractive power, a lens group, which is closest to the object side and which has a positive refractive power, among lens groups, which are included in the intermediate group and which have positive refractive powers, includes at least two positive lenses, and assuming that an Abbe number of a positive lens, which is closest to the object side, among positive lenses, which are included in the intermediate group, based on a d-line is vMp1, and an Abbe number of a positive lens, which is second from the object side, among the positive lenses, which are included in the intermediate group, based on the d-line is vMp2, Conditional Expression (3) is satisfied, which is represented by $$20 < (vMp1 + vMp2)/2 < 100. \quad (3)$$

Supplementary Note 10

The zoom lens according to any one of Supplementary Notes 1 to 9, in which the intermediate group includes at least two lens groups that include a lens group in which a spacing between adjacent lens groups changes during zooming.

Supplementary Note 11

The zoom lens according to any one of Supplementary Notes 1 to 10, in which the intermediate group includes at least one lens group which has a positive refractive power, and a lens group, which is closest to the object side and which has a positive refractive power, among lens groups, which have positive refractive powers and which are included in the intermediate group, includes two positive lenses, successively in order from a position closest to the object side to the image side.

Supplementary Note 12

The zoom lens according to any one of Supplementary Notes 1 to 11, in which the intermediate group includes at least one lens group which has a positive refractive power, a lens group, which is closest to the object side and which has a positive refractive power, among lens groups, which are included in the intermediate group and which have positive refractive powers, includes at least two positive lenses, and an object side surface of a positive lens, which is closest to the object side, among the positive lenses, which are included in the lens group that is closest to the object side and that has a positive refractive power in the intermediate group, is a convex surface.

Supplementary Note 13

The zoom lens according to any one of Supplementary Notes 1 to 12, in which the object side negative group includes at least four lenses.

Supplementary Note 14

The zoom lens according to any one of Supplementary Notes 1 to 13, in which assuming that an open F number in a state where the infinite distance object is in focus at the wide-angle end is Fnow, Conditional Expression (4) is satisfied, which is represented by $$2 < Fnow < 4.8. \quad (4)$$

Supplementary Note 15

The zoom lens according to any one of Supplementary Notes 1 to 14, in which a lens group closest to the image side among lens groups that are included in the intermediate group has a positive refractive power.

Supplementary Note 16

The zoom lens according to any one of Supplementary Notes 1 to 15, in which assuming that a focal length of the object side positive group at the wide-angle end is fGPw, Conditional Expression (5) is satisfied, which is represented by $$0.05 < fw/fGPw < 2.5. \quad (5)$$

Supplementary Note 17

The zoom lens according to any one of Supplementary Notes 1 to 16, in which assuming that a focal length of the whole system in a state where the infinite distance object is in focus at a telephoto end is ft, and a focal length of the object side positive group at the wide-angle end is fGPw, Conditional Expression (6) is satisfied, which is represented by $$0.4 < ft/fGPw < 4.5. \quad (6)$$

Supplementary Note 18

The zoom lens according to any one of Supplementary Notes 1 to 17, in which the object side negative group includes a lens group in which a biconvex air lens is formed.

Supplementary Note 19

The zoom lens according to any one of Supplementary Notes 1 to 18, in which the object side negative group includes a lens group which has a negative refractive power, and the entirety or a part of the lens group which has a negative refractive power in the object side negative group moves along an optical axis during focusing.

Supplementary Note 20

The zoom lens according to any one of Supplementary Notes 1 to 18, in which the entirety or a part of the final group moves along an optical axis during focusing.

Supplementary Note 21

The zoom lens according to any one of Supplementary Notes 1 to 20, in which a lens group closest to the image side in the final group moves during zooming.

Supplementary Note 22

An imaging apparatus comprising: the zoom lens according to any one of Supplementary Notes 1 to 21.

What is claimed is:

1. A zoom lens consisting of, in order from an object side to an image side:
- an object side positive group which has a positive refractive power;
- an object side negative group which has a negative refractive power;
- an intermediate group; and
- a final group,
- wherein the object side positive group, the object side negative group, the intermediate group, and the final group each include at least one lens group,
- all spacings between adjacent lens groups change, and all mutual spacings between lenses in each lens group do not change during zooming,
- all lenses in the object side positive group and all lenses in the intermediate group remain stationary with respect to an image plane during focusing, and
- assuming that
  - a back focal length of the zoom lens in terms of an air-equivalent distance in a state where an infinite distance object is in focus at a wide-angle end is Bfw,
  - a focal length of the zoom lens in the state where the infinite distance object is in focus at the wide-angle end is fw, and
  - a maximum half angle of view in the state where the infinite distance object is in focus at the wide-angle end is ωw,
  - Conditional Expression (1) is satisfied, which is represented by $$0.5 < Bfw/(fw \times \tan\omega w) < 5. \tag{1}$$

2. The zoom lens according to claim 1, wherein the object side negative group includes a lens group, which is closest to the object side and which has a negative refractive power, among the lens groups which have negative refractive powers and which are included in the zoom lens.

3. The zoom lens according to claim 1, wherein the final group consists of one lens group.

4. The zoom lens according to claim 1, wherein the intermediate group includes at least three lenses.

5. The zoom lens according to claim 1, wherein assuming that
- a paraxial curvature radius of an object side surface of a negative lens, which is closest to the object side, among the negative lenses, which are included in the object side negative group, is Rnf, and
- a paraxial curvature radius of an image side surface of the negative lens, which is closest to the object side, among the negative lenses, which are included in the object side negative group, is Rnr,
- Conditional Expression (2) is satisfied, which is represented by $$0.02 < (Rnf - Rnr)/(Rnf + Rnr) < 3. \tag{2}$$

6. The zoom lens according to claim 1, wherein during zooming, a lens group, which is closest to the object side in the object side positive group, moves.

7. The zoom lens according to claim 1, comprising at least one focusing group that moves during focusing,
- wherein a focusing group, which is closest to the object side, among the focusing groups, which are included in the zoom lens, has a negative refractive power.

8. The zoom lens according to claim 1,
- wherein the object side negative group includes at least two negative lenses,
- an image side surface of a negative lens, which is closest to the object side, among the negative lenses, which are included in the object side negative group, is a concave surface, and
- an object side surface of a negative lens, which is closest to the image side, among the negative lenses, which are included in the object side negative group, is a concave surface.

9. The zoom lens according to claim 1,
- wherein the intermediate group includes at least one lens group which has a positive refractive power,
- a lens group, which is closest to the object side and which has a positive refractive power, among lens groups, which are included in the intermediate group and which have positive refractive powers, includes at least two positive lenses, and
- assuming that
  - an Abbe number of a positive lens, which is closest to the object side, among positive lenses, which are included in the intermediate group, based on a d-line is νMp1, and
  - an Abbe number of a positive lens, which is second from the object side, among the positive lenses, which are included in the intermediate group, based on the d-line is νMp2,
  - Conditional Expression (3) is satisfied, which is represented by $$20 < (\nu Mp1 + \nu Mp2)/2 < 100. \tag{3}$$

10. The zoom lens according to claim 1, wherein the intermediate group includes at least two lens groups in which a spacing between adjacent lens groups changes during zooming.

11. The zoom lens according to claim 1,
- wherein the intermediate group includes at least one lens group which has a positive refractive power, and
- a lens group, which is closest to the object side and which has a positive refractive power, among lens groups, which have positive refractive powers and which are included in the intermediate group, includes two positive lenses, successively in order from a position closest to the object side to the image side.

12. The zoom lens according to claim 1,
- wherein the intermediate group includes at least one lens group which has a positive refractive power,
- a lens group, which is closest to the object side and which has a positive refractive power, among lens groups, which are included in the intermediate group and which have positive refractive powers, includes at least two positive lenses, and an object side surface of a positive lens, which is closest to the object side, among the positive lenses, which are included in the lens group that is closest to the object side and that has a positive refractive power in the intermediate group, is a convex surface.

13. The zoom lens according to claim 1, wherein the object side negative group includes at least four lenses.

14. The zoom lens according to claim 1, wherein assuming that an open F number in a state where the infinite distance object is in focus at the wide-angle end is Fnow, Conditional Expression (4) is satisfied, which is represented by $$2 < Fnow < 4.8. \quad (4)$$

15. The zoom lens according to claim 1, wherein a lens group closest to the image side among lens groups that are included in the intermediate group has a positive refractive power.

16. The zoom lens according to claim 1, wherein assuming that a focal length of the object side positive group at the wide-angle end is fGPw, Conditional Expression (5) is satisfied, which is represented by $$0.05 < fw/fGPw < 2.5. \quad (5)$$

17. The zoom lens according to claim 1, wherein assuming that a focal length of the zoom lens in a state where the infinite distance object is in focus at a telephoto end is ft, and a focal length of the object side positive group at the wide-angle end is fGPw, Conditional Expression (6) is satisfied, which is represented by $$0.4 < ft/fGPw < 4.5. \quad (6)$$

18. The zoom lens according to claim 1, wherein the object side negative group includes a lens group in which a biconvex air lens is formed.

19. The zoom lens according to claim 1, wherein the object side negative group includes a lens group which has a negative refractive power, and the entirety or a part of the lens group which has the negative refractive power in the object side negative group moves along an optical axis during focusing.

20. The zoom lens according to claim 1, wherein the entirety or a part of the final group moves along an optical axis during focusing.

21. The zoom lens according to claim 1, wherein a lens group closest to the image side in the final group moves during zooming.

22. An imaging apparatus comprising: the zoom lens according to claim 1.

* * * * *